(12) United States Patent
Luken

(10) Patent No.: US 7,251,277 B2
(45) Date of Patent: Jul. 31, 2007

(54) EFFICIENT MEANS FOR CREATING MPEG-4 TEXTUAL REPRESENTATION FROM MPEG-4 INTERMEDIA FORMAT

(75) Inventor: William L. Luken, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 742 days.

(21) Appl. No.: 10/309,571

(22) Filed: Dec. 4, 2002

(65) Prior Publication Data

US 2004/0109502 A1    Jun. 10, 2004

(51) Int. Cl.
*H04N 7/12* (2006.01)
*G06F 7/00* (2006.01)

(52) U.S. Cl. .................. 375/240.08; 707/101

(58) Field of Classification Search ........... 375/240.08, 375/240.26, 240.01; 707/101; 709/231, 709/246
See application file for complete search history.

(56) References Cited

U.S. PATENT DOCUMENTS

| | | | | |
|---|---|---|---|---|
| 6,751,623 | B1 * | 6/2004 | Basso et al. | 707/101 |
| 2003/0031260 | A1 * | 2/2003 | Tabatabai et al. | 375/240.25 |
| 2003/0061369 | A1 * | 3/2003 | Aksu et al. | 709/231 |
| 2003/0110297 | A1 * | 6/2003 | Tabatabai et al. | 709/246 |
| 2004/0110297 | A1 | 6/2004 | Wan | |

OTHER PUBLICATIONS

"Avipix products", [http://web.archive.org/web/20011219115055/http://avipix.com/products.html].
Kim et al., "Extensible MPEG-4 Textual Format (XMT)", [http://www1.acm.org/sigs/sigmm/MM2000/ep/michelle/index.html].
"MPEG-4 BIFS and XMT Tutorial", [http://gpac.sourceforge.net/tutorials/bifs_intro.htm].
"MPEG-4 Tools by ENST", [http://web.archive.org/web/20011202135253/http://www.comelec.enst.fri~dufourd/mpeg-4/tools.html].
"MPEG-4 Systems(XMT-A)-based Authoring Tool", [http://web.archive.org/web/200306028002759/http://www.etri.re.krie_etri/intro/newtech/etri21c_32_2003.html].
Koenen, MPEG-4 Overview -(V.21-Jeju Version), ISO/IEC JTC1/CS29/WG11 N4668, pp. 1-81 (Mar. 2002).

* cited by examiner

*Primary Examiner*—Gims Philippe
(74) *Attorney, Agent, or Firm*—Ido Tuchman; Lisa M. Yamonaco

(57) ABSTRACT

A method, system, and computer program product for converting a binary MPEG-4 (mp4) binary file into an Extensible MPEG-4 Textual (XMT) file. The invention includes generating at least one intermediary structured document representing the mp4 binary file. A translator is configured to input the intermediate document and generate an XMT structured document. An XMT serializer is then used to create the XMT file based on the XMT structured document.

30 Claims, 65 Drawing Sheets

```
500 —<NodeName
510 —    DEF = "nodeIDstring"
520 —    field0 = "value0"
520 —    field2 = "value2"
520 —    field3 = "value3"
520 —    field5 = "value5" . . . >
530 —    <field1>
550 —        <NodeName1 . . . />
550 —        <NodeName2 . . . />
             . . .
540 —    </field1>
530 —    <field4>
550 —        <NodeName3 . . . />
             . . .
540 —    </field4>
560 —</NodeName>
```

*Fig. 5A*

```
570 — <NodeName
580 —     USE = "nodeIDstring" />
                              590
```

*Fig. 5B*

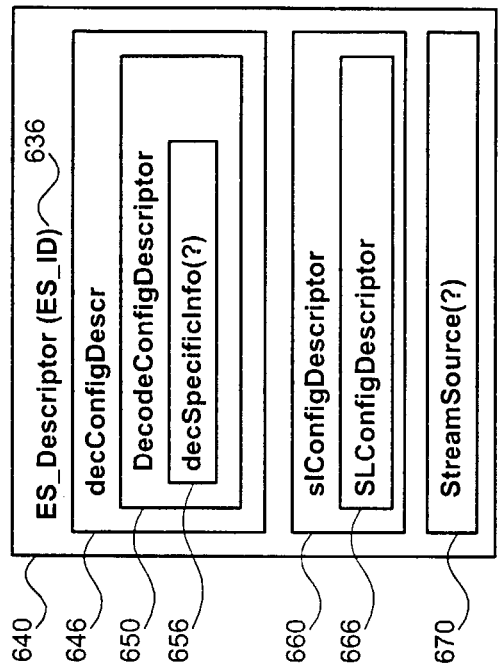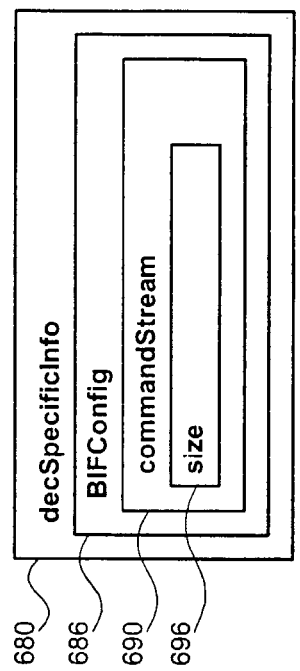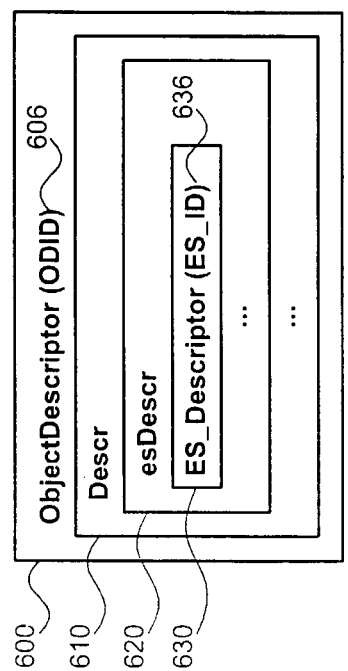

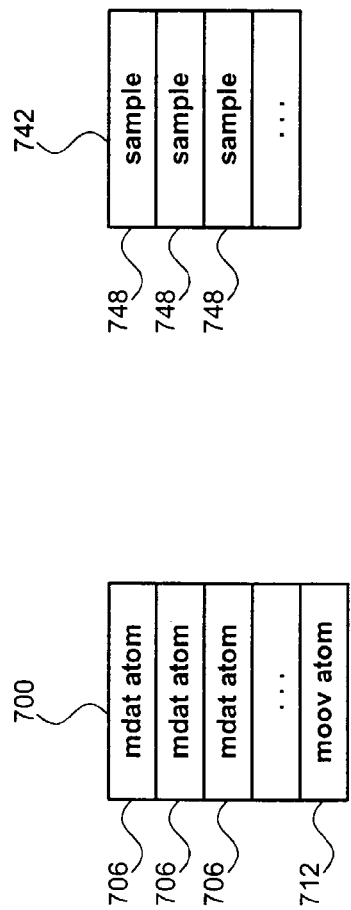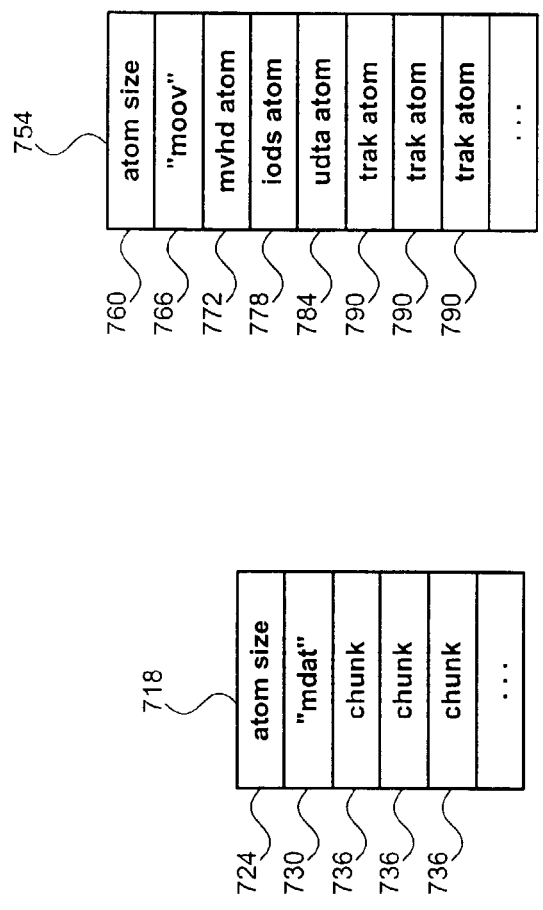

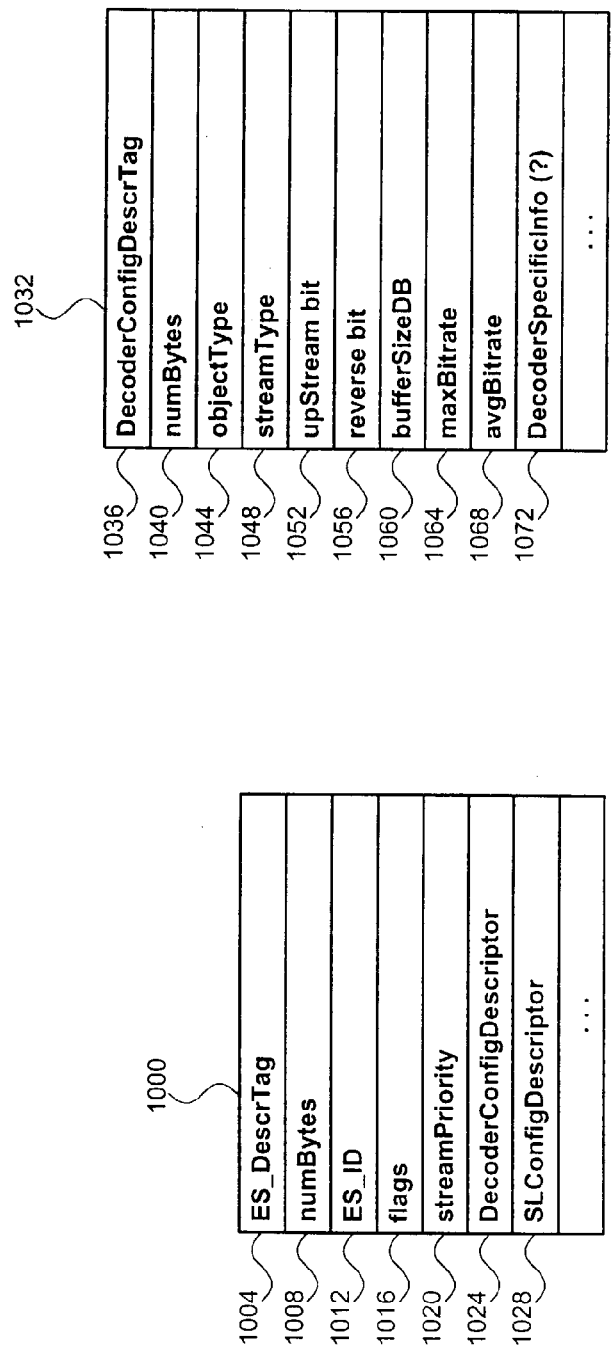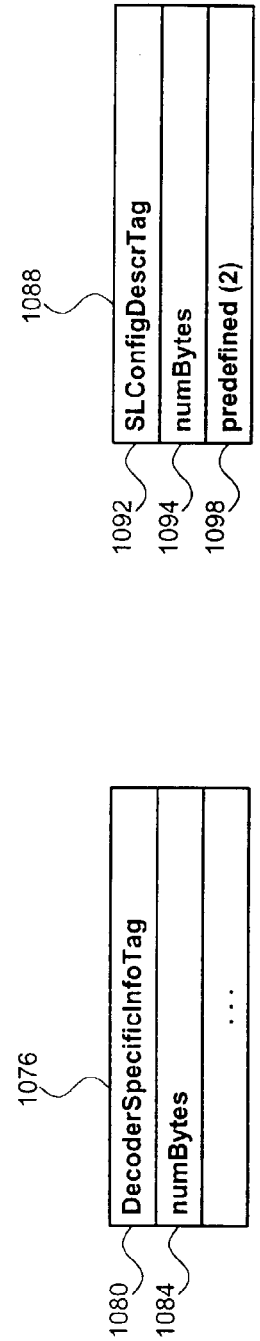
Fig. 10A, Fig. 10B, Fig. 10C, Fig. 10D

Fig. 13A

| 1300 |
|---|
| Insertion code |
| type = Node |
| nodeID |
| insertionPosition |
| position (?) |
| SFNode |

1304 — Insertion code
1308 — type = Node
1312 — nodeID
1316 — insertionPosition
1320 — position (?)
1324 — SFNode

Fig. 13B

| 1328 |
|---|
| Insertion code |
| type = IndexedValue |
| nodeID |
| inFieldID |
| insertionPosition |
| position (?) |
| field value |

1332 — Insertion code
1336 — type = IndexedValue
1340 — nodeID
1344 — inFieldID
1348 — insertionPosition
1352 — position (?)
1356 — field value

Fig. 13C

| 1360 |
|---|
| Insertion code |
| type = Route |
| isUpdateable |
| routeID (?) |
| departureNodeID |
| departureFieldID |
| arrivalNodeID |
| arrivalFieldID |

1364 — Insertion code
1368 — type = Route
1372 — isUpdateable
1376 — routeID (?)
1380 — departureNodeID
1384 — departureFieldID
1388 — arrivalNodeID
1392 — arrivalFieldID

Fig. 18A

1800
- 1805: list = true
- 1810: Route
- 1815: moreRoutes = true
- 1810: Route
- 1810: Route
- 1820: moreRoutes = false

Fig. 18B

1830
- 1835: list = false
- 1840: nBits
- 1845: numRoutes
- 1850: Route[0]
- 1850: Route[1]
- 1850: Route[numRoutes - 1]

Fig. 18C

1860
- 1865: isUpdateable
- 1870: routeID (?)
- 1875: routeName (?, ?)
- 1880: outNodeID
- 1885: outFieldRef
- 1890: inNodeID
- 1895: inFieldRef

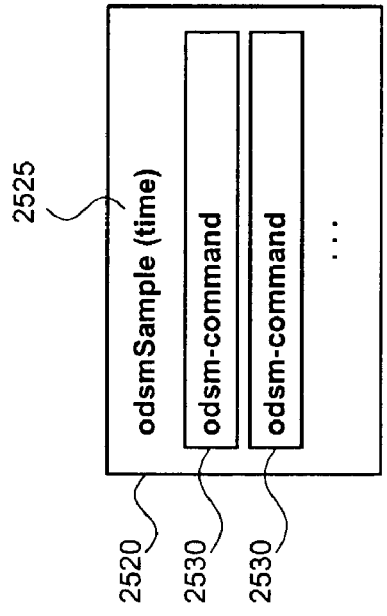
*Fig. 25B*
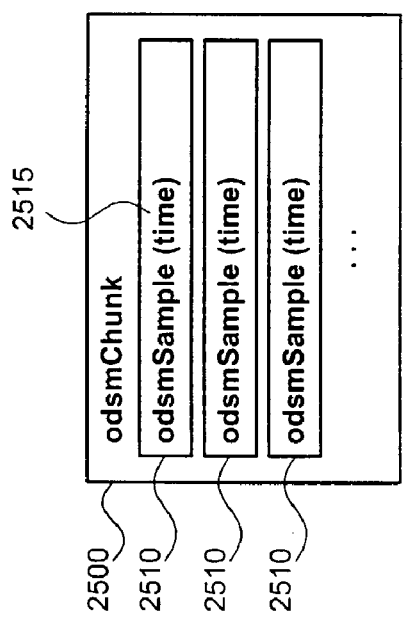
*Fig. 25A*
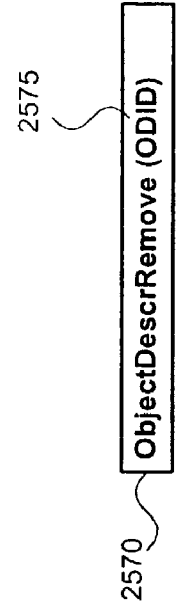
*Fig. 25C*
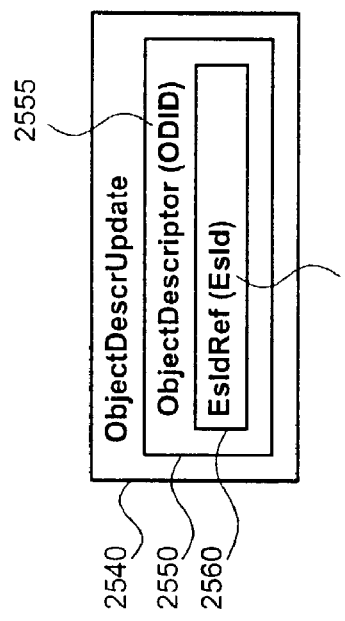

| mp4file | XMT-A |
|---|---|
| "1" | "MPEG4Systems1" |
| "2" | "MPEG4Systems2" |
| "32" | "MPEG4Visual" |
| "64" | "MPEG4Audio" |
| "108" | "JPEG" |
| "255" | "Uspecified" |

Fig. 62B

| mp4file | XMT-A |
|---|---|
| "1" | "ObjectDescriptor" |
| "2" | "ClockRefernence" |
| "3" | "SceneDescription" |
| "4" | "Visual" |
| "5" | "Audio" |
| "6" | "MPEG7" |
| "7" | "IPMP" |
| "8" | "OCI" |
| "9" | "MPEGJ" |

Fig. 62A

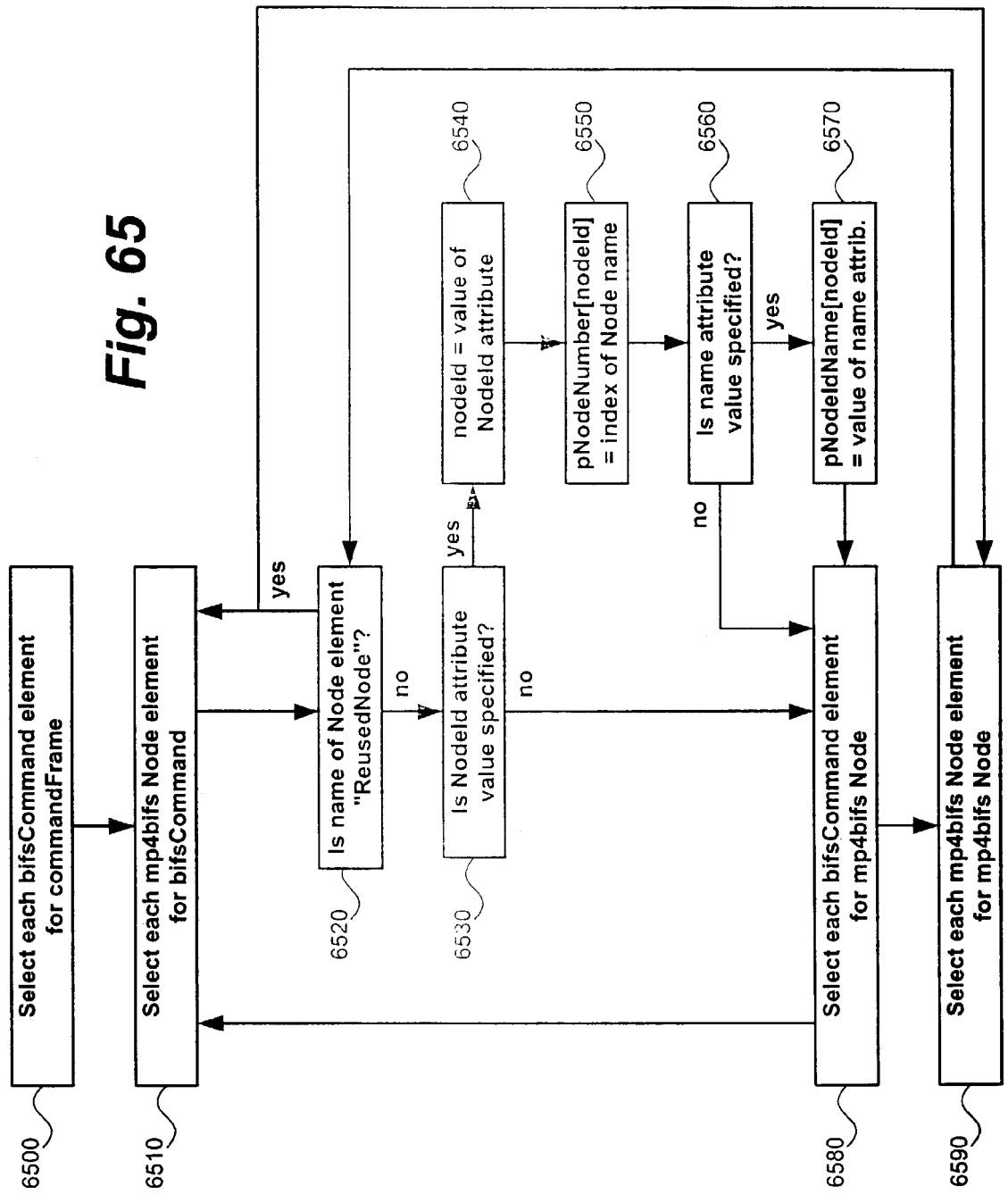

EFFICIENT MEANS FOR CREATING MPEG-4 TEXTUAL REPRESENTATION FROM MPEG-4 INTERMEDIA FORMAT

FIELD OF THE INVENTION

The present invention relates generally to data representation of multimedia information, and more specifically to the transformation of one form of multimedia information representation known as "MPEG-4 Intermedia Format" to another form of multimedia information representation known as "MPEG-4 Textual Representation".

BACKGROUND

Computers are commonly used to present a variety of digital media, including images, audio samples (sounds), and video media, as well as text and geometric shapes. Each of these media types can be presented individually, or a number of such media elements can be presented together in what is known as a composite multimedia presentation.

The ability to create and distribute composite multimedia presentations is very important for the dissemination of information based on various media types. In addition, standardized means of representing composite multimedia presentations have been created to enable many authors to create presentations that can be reproduced on a variety of computer platforms, such as personal computers, set-top boxes, and other devices.

Two well-known standardized formats of composite multimedia presentation developed by the Motion Pictures Experts Group (MPEG) are an Extensible MPEG-4 Textual (XMT) format and a binary coded MPEG-4 (mp4) format. The XMT format is well suited for authoring composite multimedia presentations, while the mp4 format is well suited for compact storage and transmission of composite multimedia presentations. Thus, it is desirable to efficiently convert XMT-formatted presentation to an mp4-formatted presentation.

SUMMARY OF THE INVENTION

As detailed below, the present invention is a method, system, and apparatus for converting a binary coded MPEG-4 (mp4) format into an Extensible MPEG-4 Textual (XMT) format. The invention utilizes an efficient facility consisting of a relatively small amount of software and which requires only modest resources to achieve composite multimedia presentation conversion from mp4 format to XMT format.

Thus, an aspect of the present invention involves a method for converting an MPEG-4 (mp4) binary file into an Extensible MPEG-4 Textual (XMT) file. The method includes a generating operation to generate a set of data structures representing the mp4 binary file. A first translating operation translates the set of data structures into at least one intermediary structured document, and a second translating operation translates the intermediary structured document into an XMT structured document. A creating operation then creates the XMT file based on the XMT structured document.

Another aspect of the invention is a system for converting an MPEG-4 (mp4) binary file into an Extensible MPEG-4 Textual (XMT) file. The system includes a binary file decoder configured to input the mp4 binary file and generate a set of data structures representing the mp4 binary file. A first translator is configured to input the set of data structures and to create at least one intermediary structured document. A second translator is configured to input the intermediary structured document and generate an XMT structured document. An XMT serializer configured to input the XMT structured document and generate the XMT file.

Yet another aspect of the invention is a computer program product embodied in a tangible media for converting an MPEG-4 (mp4) binary file into an Extensible MPEG-4 Textual (XMT) file. The computer program performs the operations of generating a set of data structures representing the mp4 binary file, translating translate the set of data structures into at least one intermediary structured document, translating the intermediate structured document into an XMT structured document, and creating the XMT file based on the XMT structured document The foregoing and other features, utilities and advantages of the invention will be apparent from the following more particular description of various embodiments of the invention as illustrated in the accompanying drawings.

BRIEF DESCRIPTION OF THE DRAWINGS

FIG. 5A shows an exemplary XMT-A BIFS Node.

FIG. 5B shows an exemplary reused XMT-A BIFS Node.

FIG. 6A shows an exemplary XMT-A ObjectDescriptor.

FIG. 6B shows an exemplary XMT-A ES_Descriptor.

FIG. 6C shows an exemplary DecoderSpecificInfo for sdsm (BIFS).

FIG. 7A shows an exemplary mp4 binary file generated by one embodiment of the invention.

FIG. 7B shows an exemplary mdat atom.

FIG. 7C shows an exemplary chunk.

FIG. 7D shows an exemplary moov atom.

FIG. 10A shows an exemplary binary ES descriptor.

FIG. 10B shows an exemplary decoder config descriptor.

FIG. 10C shows an exemplary decoder specific info descriptor.

FIG. 10D shows an exemplary binary SL config descriptor.

FIG. 13A shows an exemplary Node insertion command.

FIG. 13B shows an exemplary IndexedValue insertion command.

FIG. 13C shows an exemplary Route insertion command.

FIG. 18A shows exemplary Routes (list form).

FIG. 18B shows exemplary Routes (vector form).

FIG. 18C shows an exemplary Route.

FIG. 25A shows an exemplary odsmChunk element.

FIG. 25B shows an exemplary odsmSample element.

FIG. 25C shows exemplary odsm-command elements.

FIG. 50 shows an exemplary decodeEsIdRef procedure flowchart.

FIG. 51 shows an exemplary flowchart for creating media files and represting mdat atoms.

FIG. 52 shows an exemplary SdsmDataToXml procedure flowchart.

FIG. 53 shows an exemplary decode sdsm chunk procedure flowchart.

FIG. 54 shows an exemplary decode insertion command procedure flowchart.

FIG. 55 shows an exemplary decode deletion command procedure flowchart.

FIG. 56 shows an exemplary decode replacement command procedure flowchart.

FIG. 57 shows an exemplary decode SFNode procedure flowchart.

FIG. 58 shows an exemplary flowchart to create an xml representation of a moov atom.

FIG. 59 shows an exemplary flowchart for creating an XMT-A document.

FIG. 60 shows an exemplary flowchart creating an XMT-A Header.

FIG. 61 shows an exemplary flowchart for processing EsIdInc elements.

FIG. 62A shows an exemplary streamType conversion table.

FIG. 62B shows an exemplary objectType to object-TypeIndication table.

Figure 63:
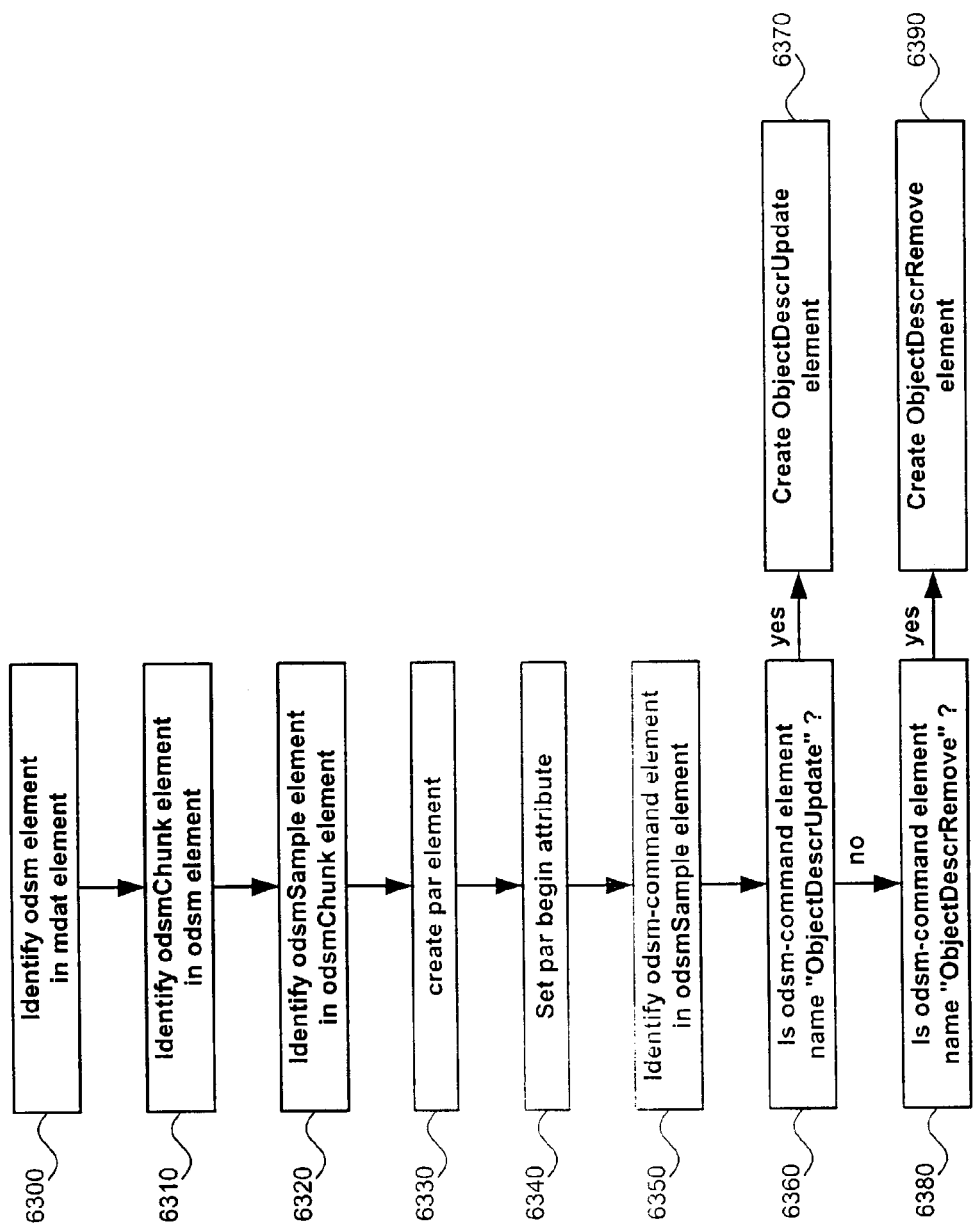

FIG. 63 shows an exemplary flowchart procedure for creating "par" elements representing Object Descriptor commands.

Figure 64:
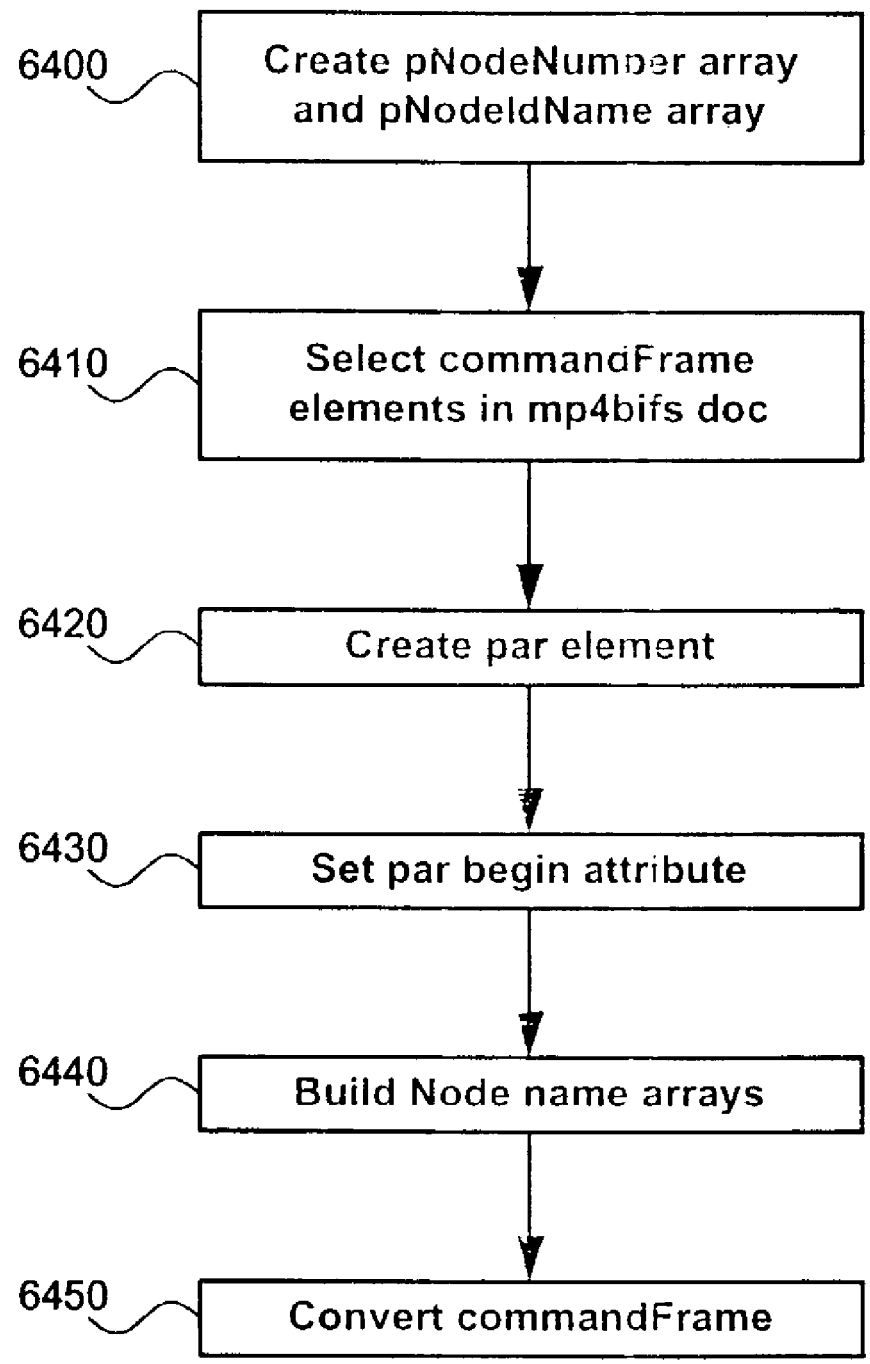

FIG. 64 shows an exemplary flowchart for creating "par" elements representing commandFrame elements.

FIG. 65 shows an exemplary flowchart for creating tables of node number values and nodeId names.

TABLE OF HEADINGS

| | |
|---|---|
| MPEG-4 Textual Representation | 1.0 |
| MPEG-4 Intermedia Format Files | 2.0 |
| Scene Description Stream (sdsm) | 3.0 |
| Object Descriptor Stream (odsm) | 4.0 |
| mp4-file Document | 5.0 |
| mp4-bifs Document | 6.0 |
| mp4 to xmta Converter | 7.0 |

DETAILED DESCRIPTION OF THE INVENTION

The present invention is a method, system, and computer program for converting an Extensible MPEG-4 Textual (XMT) format (also referred to herein as an XMT-A document and an MPEG-4 Textual Representation) into a binary coded MPEG-4 (mp4) format (also referred to as an MPEG-4 intermedia binary format). The invention utilizes a novel approach to achieve conversion from XMT-A to mp4 that requires a relatively small amount of software and only modest resources. The invention is described herein with reference to FIGS. 1-65.

1.0 MPEG-4 Textual Representation

The MPEG-4 Textual Representation consists of a "text file" representing the structure of a multimedia presentation. A multimedia presentation consists of a synchronized combination or sequence of sounds, still images, video clips, and other elements. A text file is an electronic data structure composed of a sequence of binary codes for letters, numbers, and punctuation. Text files can generally be interpreted using software commonly known as "text editors". There are many examples of text editors, including software known as "NotePad.exe" for computers based on the Windows (r) operating system, and "vi" for computers using various operating systems known collectively as UNIX. Windows is a registered trademark of Microsoft Corporation, located in Redmond, Wash. Text files of the type comprising the MPEG-4 Textual Representation are known as "XMT-A" files.

Within the scope of text files, an XMT-A file is an example of an Extensible Markup Language (XML) file. An XML file is a structured document base on the principles specified by the World Wide Web Consortium (see http://www.w3.org/TR/2000/REC-XML-20001006). An XMT-A file represents a particular embodiment of an XML file, as specified by the International Standards Organization and International Electrotechinal Commission (see ISO/IEC document 14496-1:2000 Amd.2, October 2000 available from http://mpeg.telecomitalialab.com/working_documents.htm and International Organization for Standardization (ISO), 1, rue de Varembé, Case postal 56, CH-1211 Geneva 20, Switzerland). A complete description of every part of the XMT-A specifications would be very voluminous. Thus, the following description of XMT-A files is limited to the portions of the specification needed to describe the present invention. Readers should consult the cited XMT specifications document for a complete description of the XMT-A file structure.

Like any XML file, an XMT-A file consists of a hierarchical set of "elements". Each element may contain subordinate elements known as child elements. In addition, each element may possess a set of data values known as "attributes". Each attribute has a name and a value. The particular attribute names and possible child elements possessed by any particular element depend on the element's type. The interpretation of each attribute value depends on the corresponding attribute name and of the element possessing the attribute.

Figure 1B:
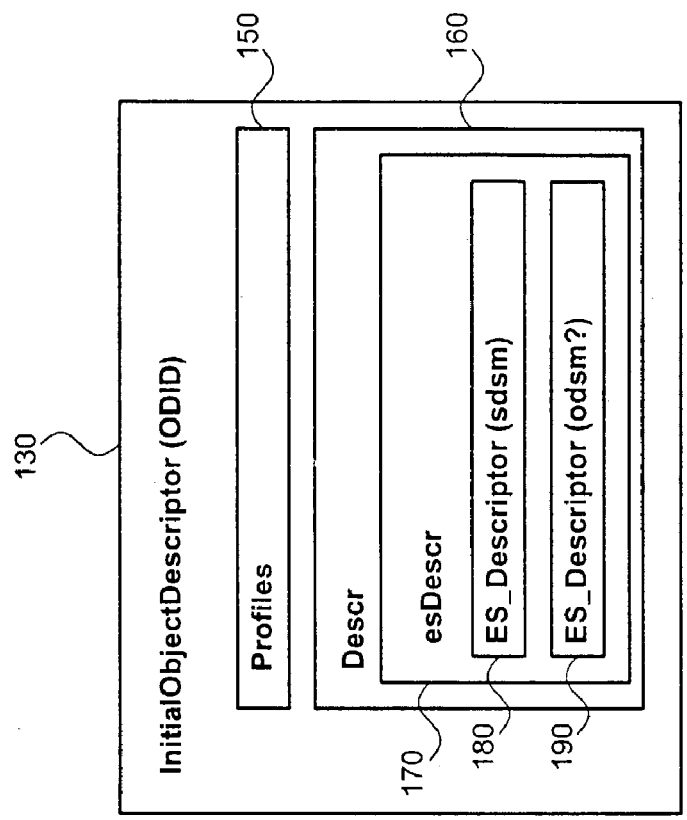
FIG. 1B shows an exemplary XMT-A Initial Object Descriptor.
Figure 1A:
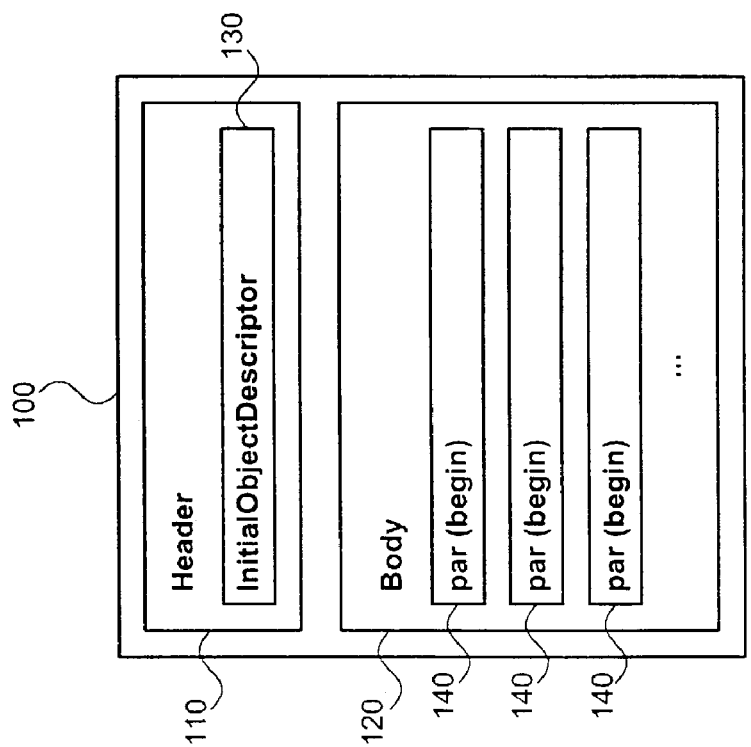
FIG. 1A shows an exemplary XMT-A document utilized by one embodiment of the invention.

As illustrated in FIG. 1A, an XMT-A file 100 consists of two main parts, a Header element 110 and a Body element 120. The Header element 110 contains a single child element defined as an InitialObjectDescriptor element 130. The Body element 120 contains one or more "par" elements 140 as child elements.

The InitialObjectDescriptor 130 has one attribute, an ObjectDescriptorID (ODID), and its value is a character string. As shown in FIG. 1B, this element has two children, a Profiles element 150 and a Descr element 160. A Profiles element 150 has no child elements. The Profiles element 150 possesses several attributes including "includeInclineProfileLevelFlag", "sceneProfileLevelIndication", "ODProfileLevelIndication", "audioProfileLevelIndication", "visualProfileLevelIndication", and "graphicsProfileLevelIndication".

A Descr element 160 may have several types of child elements. The only type essential to the present invention is a single "esDescr" element 170. An esDescr element 170 may possess one or more "ES_Descriptor" child elements 180, 190. An ES_Descriptor element specifies certain properties of an "elementary stream", a concept defined in the MPEG-4 documentation. The structure of an $ES_{13}$ Descriptor element is indicated below.

The esDescr element 170 subordinate to an InitialobjectDescriptor element 130 may possess one or two ES_Descriptor elements 180, 190. In every case, there should be an ES_Descriptor 180 for the elementary stream defined as the "sdsm" or "scene description stream". In addition, there may be a second ES_Descriptor 190 for an elementary stream defined as the "odsm" or "object descriptor stream". The ES_Descriptor element 190 for the odsm is required only for XMT-A files that depend on audio data, visual data, or other types of media data not specified within the sdsm.

Figure 2B:
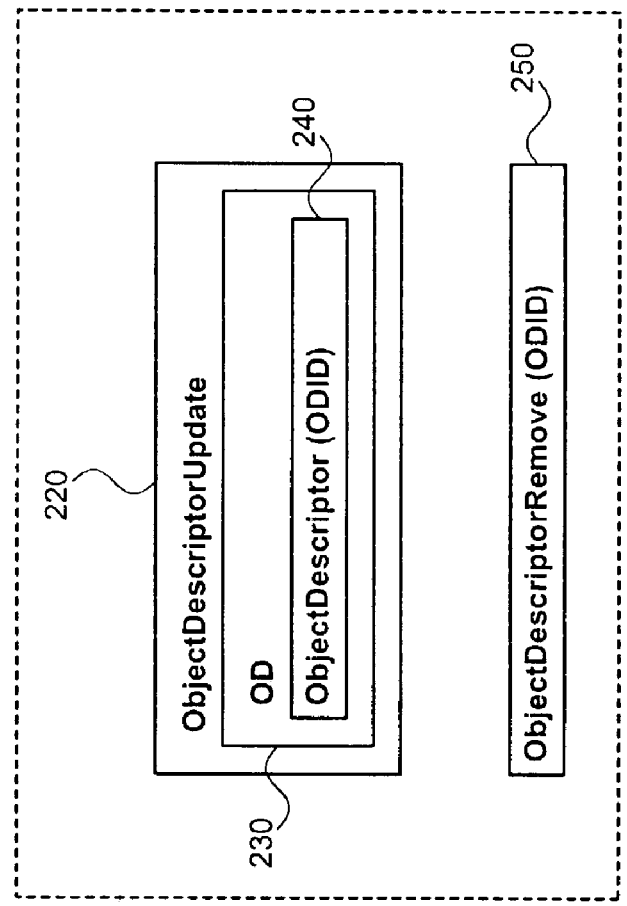
FIG. 2B shows exemplary XMT-A odsm command elements.
Figure 2A:
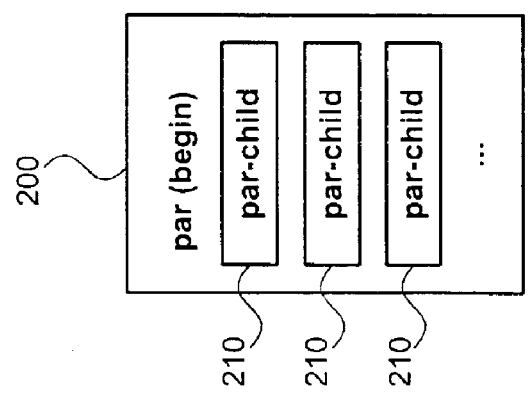
FIG. 2A shows an exemplary XMT-A par element.

As shown in FIG. 2A, each par element 140, 200 contains one or more "par-child" elements 210. A "par-child" element may be another par element, an odsm command, or a bifs command. Each par element also contains an attribute with the name "begin". The value of the begin attribute specifies the time when the odsm or bifs commands within the par element are to be performed. The time value determined by the begin attribute of a par element is calculated relative to the time value implied by any parent, and the Body element 120 implies a begin time of zero.

A par-child element 210 may contain instances of two types of odsm command elements, shown in FIG. 2B. These include ObjectDescriptorUpdate elements 220 and ObjectDescriptorRemove elements 250. An ObjectDescriptorUpdate element 220 contains a single OD child element 230, and the OD element 230 contains a single ObjectDescriptor child element 240. An ObjectDescriptor element 240 is described in more detail below. An ObjectDescriptorRemove element 250 has one attribute and no child elements. The attribute of an ObjectDescriptorRemove element 250 is named "ODID".

Figure 3C:
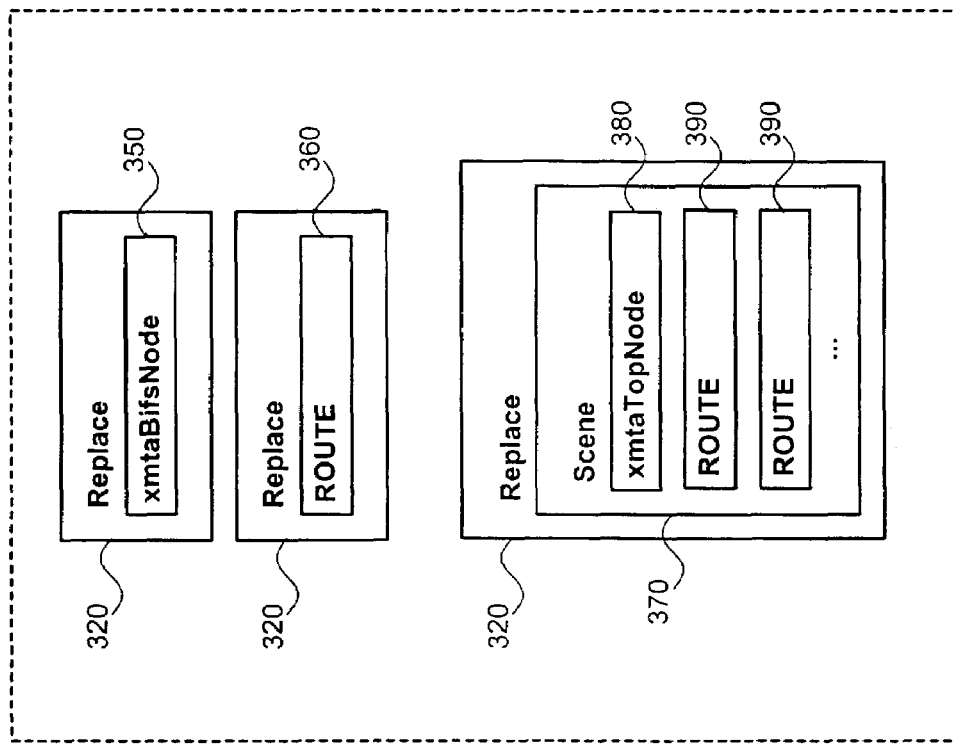
FIG. 3C shows exemplary XMT-A Replace commands.
Figure 3A:
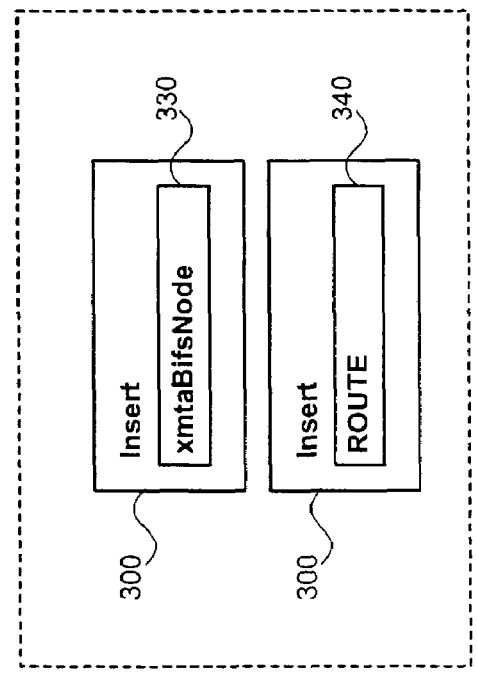
FIG. 3A shows exemplary XMT-A Insert commands.
Figure 3B:
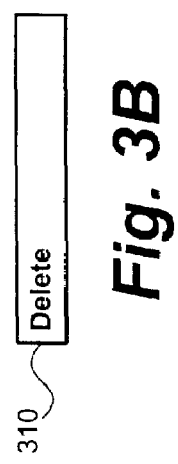
FIG. 3B shows an exemplary XMT-A Delete command.

A par-child element 210 may contain instances of three types of bifs command elements, shown in FIG. 3. These include Insert elements 300, Delete elements 310, and Replace elements 320. As shown in FIG. 3A, an Insert element 300 may have either an "xmtaBifsNode" child element 330 or a "ROUTE" child element 340. The Delete element 310 has no children. The Replace element 320 may have an "xmtaBifsNode" 350 child element, a "ROUTE" child element 360, or a "Scene" child element 370. A Scene element has an "xmtaTopNode" child element 380. A Scene element may also have one or more ROUTE child elements 390.

A ROUTE element 340, 390 has no children. The attributes of a ROUTE element 340, 390 include "fromNode", "fromField", "toNode", and "toField".

Figure 4:
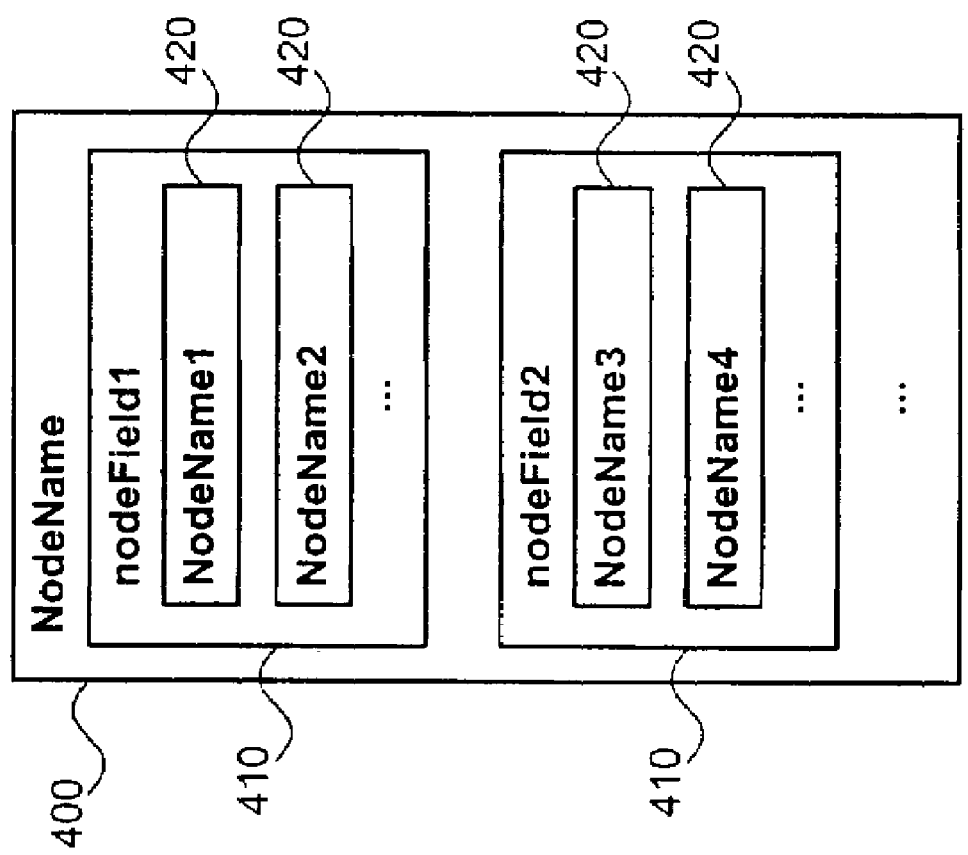
FIG. 4 shows an exemplary XMT-A BIFS Node element.

The term "xmtaBifsNode element" 330 represents any one of roughly 100 defined BIFS Node elements. Each of these has the general structure 400 shown in FIG. 4. Each xmtaBifsNode element 400 represents a BIFS Node, a binary data structure defined in the MPEG-4 Systems specifications ISO-IEC document ISO/IEC 14496-1:2001, August 2001, Chapter 9). Information regarding this document is available at http://mpeg.telecomitalialab.com/documents.htm and International Organization for Standardization (ISO), 1, rue de Varembé, Case postale 56, CH-1211 Geneva 20, Switzerland. The element tag for each xmtaBifsNode element 400 is based on the corresponding NodeName defined in the MPEG-4 Systems specifications. Some types of xmtaBifsNode elements may have subordinate (child) elements based on certain properties of the corresponding BIFS Node. These are called nodeField elements 410. Each nodeField element may have one or more subordinate elements consisting of further xmtaBifsNode elements 420. This arrangement may be repeated recursively to describe a hierarchical tree of BIFS nodes. There is no limit to the depth of this hierarchy.

Each BIFS Node has a number of properties called "fields". Each of these field has a defined field name (string) and field data type (boolean, integer, float, etc.). One of the field data types is "Node". All of the field data types other than Node are represented by like-named attributes of an xmtaBifsNode element 400. Each field with type "Node" is represented by a like-named child element 410 of an xmtaBifsNode element 400. Each child element 410 of an xmtaBifsNode element 400 may have one or more xmtaBifsNode elements 420 as child elements (grandchildren to the xmtaBifsNode parent element 400).

The XML representation of an XMT-A BIFS Node is illustrated in FIG. 5. Each XMT-A BIFS Node element is identified by a NodeName tag 500, 570 which uniquely identifies one of over 100 possible types of XMT-A BIFS nodes. Each node element may be an original node element 500 or a reused node element 570. In the case of an original node element 500, an optional attribute "DEF" 510 may be used to provide a unique alphanumeric description of a particular node. If this attribute is provided, the node is classified as "reusable".

An original XMT-A BIFS node element also possesses a set of field attributes 520, with one field attribute for each property field defined for nodes of type NodeName and having a node data type other than "node" or "buffer". These attributes are identified as "field0", "field2", "field3", and "field5" in FIG. 5A. The actual names of each of these attributes are determined by the corresponding property field names defined in the MPEG-4 Systems specifications for nodes of type "NodeName". The values assigned to each of these attributes must represent data values having a node data type (boolean, integer, float, etc.) defined in the MPEG-4 Systems specifications.

In addition, an original XMT-A BIFS node element 500 may have one or more field-value child elements 530, 540 with element tags corresponding to the field names for property fields having data type of "node" or "buffer". Each such field-value element has a start-tag 530 and an end-tag 540. Examples of such field-value elements 530, 540 are represented by element tags <field1> . . . </field1> and <field4> . . . </field4> in FIG. 5A.

In the case of a property field with data type "node", the fieldvalue element may contain one or more child elements corresponding to BIFS-Node elements 550. Examples of such BIFS-Node children are represented by element tags <NodeName1 . . . />, <NodeName2 . . . />, and <NodeName3 . . . />.

In the case of a property field with data type "buffer", the field-value element may contain one or more child elements corresponding to BIFS command elements 300, 310, 320.

If an XMT-A BIFS Node element includes any field-value child elements, the Node element will be terminated by a </NodeName> end-tag 560, following standard XML principles.

The foregoing definition of an XMT-A BIFS node element is applied recursively to each of the subordinate BIFS node elements (<NodeName1>, etc.), allowing a hierarchical tree of nodes to be created. There is no limit to the depth of this tree of XMT-A BIFS node elements.

In the case of a reused node 570, the node element has only one attribute and no children. The sole attribute is a "USE" attribute 580 whose value 590 is a node ID string. The node ID string provided as the value for the USE attribute must match the node ID string specified as the DEF attribute 510 of an original node element 500 with the same NodeName.

The term "xmtaTopNode" represents one of a defined subset of xmtaBifsNode elements permitted to serve as child elements to the Scene element.

As shown in FIG. 6A, an ObjectDescriptor element 240, 600 (grandchild to an ObjectDescriptorUpdate element 220) is similar to the InitialObjectDescriptor element 130 described above. Unlike an InitialObjectDescriptor element 130, the ObjectDescriptor element 240, 600 lacks a Profiles child element 150. Like an InitialObjectDescriptor element 130, an ObjectDescriptor element 240, 600 has an "ObjectDescriptorID" (ODID) attribute 606. A typical ObjectDescriptor element 240, 600 has a single Descr child element 610, the Descr element 610 has a single esDescr child element 620, and the esDescr element 620 has a single ES_Descriptor child element 630. The Descr element 610, esDescr element 620, and ES_Descriptor element 630 are similar to the corresponding children 160, 170, 180, 190 of the InitialObjectDescriptor element 130.

An ES_Descriptor element 180, 190, 630 may be contained within either an ObjectDescriptor element 600 or an InitialObjectDescriptor element 130. In either case, an ES_Descriptor element 180, 190, 630 has the structure 640 shown in FIG. 6B. The value of the "ES_ID" attribute 636 of an ES_Descriptor element 640 is an alphanumeric string which is unique to each stream. An ES_Descriptor 640 element always has a decConfigDescr child element 646 and an slConfigDescr child element 660. If an ES_Descriptor element 630, 640 is subordinate to an ObjectDescriptor element 600, the ES_Descriptor element 630, 640 also has a StreamSource child element 670. If an ES_Descriptor element 180, 190, 640 is subordinate to an InitialobjectDescriptor element 130, the ES_Descriptor element 180, 190, 640 does not have a StreamSource child element 670.

A decConfigDescr element 646 has a DecoderConfigDescriptor child element 650. A DecoderConfigDescriptor element 650 has several attributes including "streamType" and "objectTypeIndication" which indicate whether the parent ES_Descriptor element 640 represents audio, visual, sdsm, odsm, or other type of media. A DecoderConfigDescription element 650 may also have a decSpecificInfo child element 656 depending the values of the streamType and objectTypeIndication.

In the case of an ES_Descriptor element 180 for an sdsm (scene description stream), the DecoderConfigDescriptor 650 element has a decSpecificInfo child element 656. As shown in FIG. 6C, the decSpecificInfo 680 element has a BIFSConfig child element 686. The BIFSConfig element 686 possesses several attributes which specify how the BIFS Nodes are to be encoded. The BIFSConfig element 686 also possesses a commandStream element 690 and the commandStream element 690 possesses a "size" element 696.

The slConfig element 660 has an SLConfigDescriptor child element 666. The SLConfigDescriptor element 666 has one attribute named "predefined" and no child elements. The "predefined" attribute always has the value "2".

The StreamSource element 670 has one attribute, "url", and no child elements. The value of the url attribute specifies either a file name or a Internet address (URL, Uniform Resource Locator) indicating the location of a media data file containing audio data, visual data, or other data which defines the actual sounds, images, etc. for a particular stream. The StreamSource element 670 is not present for the sdsm (scene description stream) or odsm (object descriptor stream) because these streams are both determined by the XMT-A file.

2.0 MPEG-4 Intermedia Format Files

An MPEG-4 Intermedia Format file is a form of electronic data with a structure and composition defined in Chapter 13 of the MPEG-4 Systems specifications document ISO-IEC document ISO/IEC 14496-1:2001, August 2001. This form of electronic data structure is an example of what is commonly known as a "binary file" because it is composed of a sequence of binary data values which are not limited to representations of letters, numbers, and punctuation. This allows for a more compact data structure than is afforded by typical text files such as XMT-A files. Stored forms of electronic data having the structure defined by the MPEG-4 Intermedia Format are called "mp4 binary files". Unlike XMT-A files, mp4 binary files cannot be interpreted by most text editing software.

The MPEG-4 Intermedia Format has been derived from the QuickTime (r) file format defined by Apple Computers, Inc. in 1996 and available online at http://developer.apple.com/techpubs/quicktime/qtdevdocs/REF/refFileFormat96.htm and http://developer.apple.com/techpubs/quicktime/qtdevdocs/PDF/QTFileFormat.pdf. QuickTime is registered trademark of Apple Computer, Inc.

Because of its QuickTime (r) heritage, the MPEG-4 Intermedia Format retains a number of characteristics derived from QuickTime (r) specifications. These characteristics include the concept of an "atom" as a unit of data structure. Each atom has two parts, a header and a body. The header contains an atom size value which specified the number of bytes comprising the atom, including the header. The header also contains an atomId which specifies the type of atom. The body of an atom contains the data carried by the atom. This data may include subordinate atoms. In its basic form, an atom has an atom size value comprised of four bytes (unsigned integer) and an atomId also consisting of four bytes (characters). Extended forms of an atom having atom size values and atomId values with more than 4 bytes are also defined in the MPEG-4 specifications.

As shown in FIG. 7A, an mp4 binary file 700 is composed of one or more "mdat" atoms 706 and one "moov" atom 712. The moov atom 712 may precede or follow the mdat atom(s) 706. As shown in FIG. 7B, each mdat atom 718 consists of an atom size value 724 followed by the four-byte atomId "mdat" 730 and a sequence of data blocks called "chunks" 736. As shown in FIG. 7C, each chunk 742 is composed of a sequence of media data "samples" 748. Each sample 748 specifies a block of data associated with a particular point in time for a single media stream. All samples within a single chunk must represent the same media data stream. It is not necessarily possible to identify the individual samples 748 or chunks 736, 742 from inspection of an mdat atom 700. Each sample 748 and chunk 736, 742 may be identified using tables stored elsewhere within the mp4 binary file.

As shown in FIG. 7D, the moov atom 754 consists of an atom size value 760 followed by the four-byte atomId "moov" 766 and several subordinate atoms including an "mvhd" (moov header) atom 772, an "iods" (initial object descriptor) atom 778, and one or more "trak" atoms 790. The "moov" atom 712, 754 includes one "trak" atom 790 for each data stream, including the sdsm (scene description stream) and odsm (object descriptor stream), if present. The "moov" atom 712, 754 may also include an optional "udta" (user data) atom 784. A "udta" atom 784 may be used to imbed optional information such as a copyright message in an mp4 binary file.

The mvhd atom 772 consists of an atom size value followed by the four-byte atomId "mvhd" and a number of data values including time and date stamps, a time scale value, and a file duration value. The value of the atom size for the mvhd atom is always 108. The time and date stamps indicate when the file was created. The time scale value indicates the number of ticks per second used to represent time values for the file. The file duration value indicates the total time required to present the material in the file, in the time units specified by the time scale value.

Figure 8B:
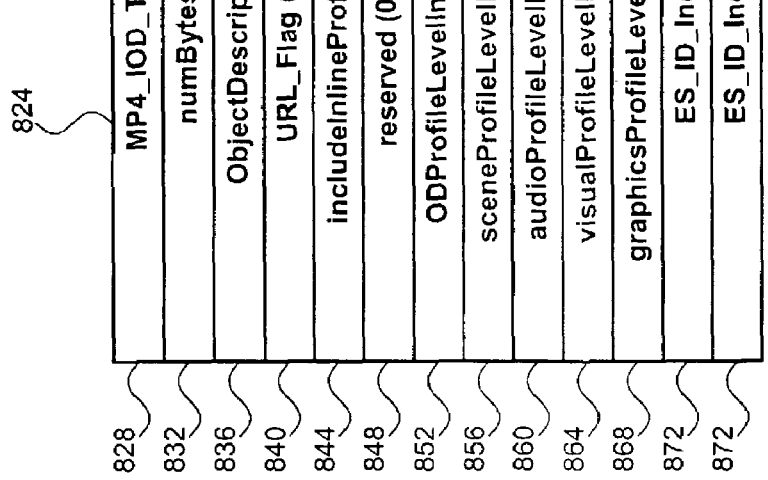
FIG. 8B shows an exemplary Mp4fInitObjectDescr.
Figure 8A:
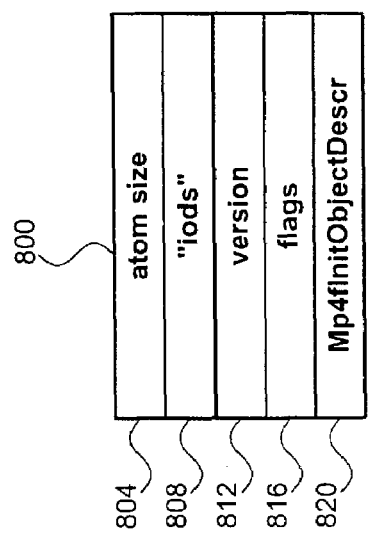
FIG. 8A shows an exemplary mp4 file iods atom.
Figure 8C:
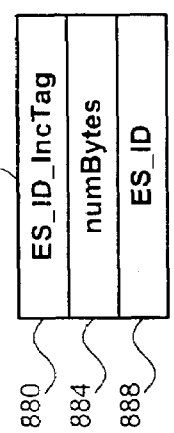
FIG. 8C shows an exemplary ES_ID_Inc.

As shown in FIG. 8A, an iods atom 800 consists of an atom size value 804 followed by the four-byte atomId "iods" 808, an 8-bit version value 812, a 24-bit flags value 816, and an Mp4fInitobjDescr data structure 820. As shown in FIG. 8B, the Mp4fInitObjDescr data structure 824 consists of a one-byte MP4_IOD_TAG value 828, the number of bytes 832 in the subsequent data block, a 10-bit ObjectDescriptorID 836, two flag bits 840, 844, four reserved bits 848 and five profile level indication values 852, 856, 860, 864, 868. The profile level indication values are followed by one or two MPEG-4 ES_ID_Inc data structures 872. One ES_ID_Inc structure indicates the ES_ID value of the trak atom 790 corresponding to the sdsm (scene description stream). The second ES_ID_Inc structure, if present, indicates the ES_ID of the trak atom 790 corresponding to the odsm (object descriptor stream). The second ES_ID_Inc structure is present only when an odsm is present. As shown in FIG. 8C, each ES_ID_Inc data structure consists of a one-byte ES_ID_IncTag value 880, the number of bytes 884 in the subsequent data (always 4) and a 32-bit ES_ID value 888.

Figure 9B:
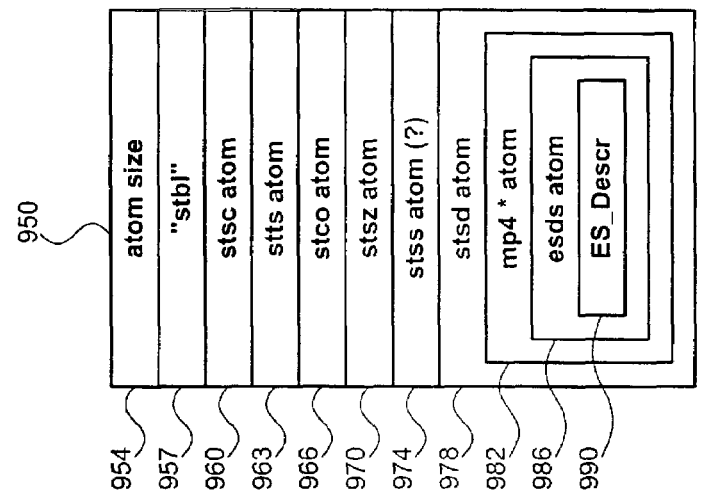
FIG. 9B shows an exemplary sample tables atom.
Figure 9A:
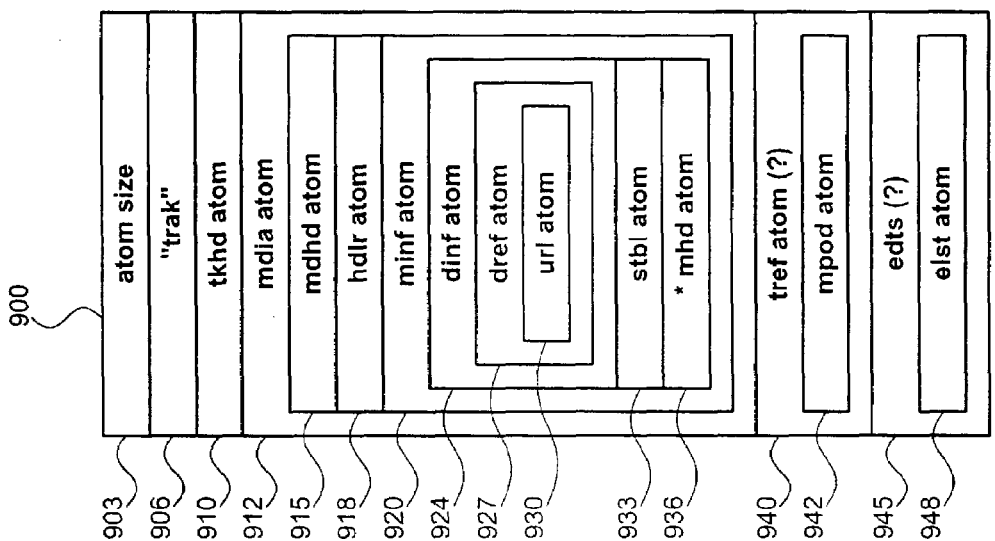
FIG. 9A shows an exemplary trak atom.

As shown in FIG. 9A, each trak atom 900 consists of an atom size value 903 followed by the four-byte atomId "trak" 906, a "tkhd" (track header) atom 910, and a "mdia" (media) atom 912. In the case of a trak atom representing the odsm (object descriptor stream), the trak atom also includes a "tref" (track reference) atom 940. In the case of a track with a delayed start, an "edts" (edit list) atom 945 is provided to indicate when to start the track. The mdia atom 912 consists of an "mdhd" (media header) atom 915, an "hdlr" (handler) atom 918, an "minf" (media information) atom 920, an "stbl" (sample tables) atom 933, and a media information header atom 936. The label "*mhd" represents any one of several media information header atom types including "nmhd" (for sdsm and odsm tracks), "smhd" (for audio tracks), "vmhd" (for visual tracks), etc.

The tkhd atom 910, mdhd atom 915, and hdlr atom 918 contain a number of data values including a trackId number, time and date stamps, media time scales and media duration values. Each track has its own time scale which can differ from the global time scale specified in the mvhd atom 772.

As shown in FIG. 9B, the sample tables atom 950 consists of an atom size value 954 followed by the four-byte atomId "stbl" 957 and a series of sample table atoms 960, 963, 966, 970, 974, 978. The various sample table atoms may be in any order. These include an "stsc" (sample-to-chunk table) atom 960, an "stts" (time-to-sample table) atom 963, an "stco" (chunk offset table) atom 966, an "stsz" (sample size table) atom 970, a possible "stss" (sync sample table) atom 974, and an "stsd" (sample description table) atom 978. Each of these sample table atoms contains data describing properties of the binary media data 736, 748 stored in the associated mdat atom 706, 718.

The sample-to-chunk table atom (stsc atom) 960 consists of an atom size value, a four-byte atomId ("stsc"), a 32-bit unsigned integer (numStscEntries), and a sequence of sample-to-chunk data records. The value of numStscEntries specifies the number of entries in the sequence of sample-to-chunk data records. Each sample-to-chunk data record consists of three 32-bit unsigned integers which specify a starting chunk number, a number of samples per chunk, and a sample description index. The sample description index is an index to an entry in the sample description table 978. The number of samples per chunk specifies the number of samples 748 in the chunk 736 specified by the starting chunk number, and all subsequent chunks preceding the starting chunk specified by the next entry.

The time-to-sample table atom (stts atom) 963 consists of an atom size value, a four-byte atomId ("stts"), a 32-bit unsigned integer (numSttsEntries), and a sequence of time-to-sample data records. The value of numSttsEntries specifies the of entries in the sequence of time-to-sample data records. Each time-to-sample data record consists of two 32-bit unsigned integers which specify a sample count and a sample duration in track time scale units. The sample count value specifies the number of successive samples 748 having the corresponding sample duration.

The chunk offset table atom (stco atom) 966 consists of an atom size value, a four-byte atomId ("stco"), a 32-bit unsigned integer (numStcoEntries), and a sequence of chunk offset values. The value of numStcoEntries specifies the number of entries in the sequence of chunk offset values. Each entry in this sequence consists of one 32-bit unsigned integer which specifies the number of bytes between the start of the mp4 file and the start of the corresponding chunk 736 within an mdat atom 718.

The sample size table atom (stsz atom) 970 consists of an atom size value, a four-byte atomId ("stsz"), and a 32-bit unsigned integer (iSampleSize) which specifies the size of all media data samples 748 associated with this trak atom 900. If the media data samples associated with this trak atom are not all equal in size, the value of iSampleSize is specified as zero, followed by a 32-bit unsigned integer (numStszEntries) and a sequence of sample size values. The value of numStszEntries specifies the number of entries in the sequence of sample size values. Each entry in this sequence consists of one 32-bit unsigned integer which specifies the number of bytes in the corresponding sample 748 within the media data 718 associated with this trak atom 900.

The sync sample table atom (stss atom) 974, if present, consists of an atom size value, a four-byte atomId ("stss"), a 32-bit unsigned integer (numStssEntries), and a sequence of sample index values. The value of numStssEntries specifies the number of entries in the sequence of sample index values. Each entry in this sequence consists of one 32-bit unsigned integer which specifies a sample index for a "random access sample". A random access sample index identifies a media data sample 748 corresponding to a point in the media data associated with this trak atom 900 where a media player can start processing the media data without regard to any preceding samples. The sample index values in this table must be monotonically increasing.

The sample description table atom (stsd atom) 978, consists of an atom size value, a four-byte atomId ("stsd"), a 32-bit unsigned integer (numStsdEntries), and a sequence of sample description data records. The value of numStsdEntries specifies the number of entries in the sequence of sample description data records. Each sample description data record specifies the means used to encode the media data samples identified by the corresponding index in a sample-to-chunk data record. The sequence of sample description data records typically has a single entry (numStsdEntries=1) which specifies the type of media (audio, visual, sdsm, odsm), the compression algorithms used for audio and video samples, etc. Each sample description table entry is contained within an "mp4*" atom 982, where "mp4*" is a generic substitute for "mp4s" (for sdsm and odsm samples), "mp4a" (for audio samples), and "mp4v" (for visual samples). Each "mp4*" atom 982 contains an "esds" (elementary stream descriptor) atom 986, and each esds atom 986 contains an MPEG-4 elementary stream descriptor (Es_Descr) data structure 990.

The structure of the MPEG-4 elementary stream descriptor 1000 is shown in FIG. 10A. This data structure consists of a one-byte tag (ES_DescrTag) 1004, followed by an indication 1008 of the number of bytes in the remainder of the data structure, a 16-bit ES_ID value (usually zero) 1012, three 1-bit flags (streamDependenceFlag, URL_Flag, and OCRstreamFlag) 1016, and a 5-bit stream priority value 1020. If any of the three flags 1016 is non-zero, then additional data values (not shown) may follow the stream priority value 1020. These optional data values are not required for this invention.

The stream priority value 1020 is followed by a decoder configuration descriptor data structure 1024 and a sync-layer configuration descriptor data structure 1028. The structure of the decoder configuration descriptor 1024, 1032 is shown in FIG. 10B. This data structure consists of a one-byte tag (DecoderConfigDescrTag) 1036, followed by an indication 1040 of the number of bytes in the remainder of the data structure, and a series of data values: objectType 1044, streamType 1048, upstream bit 1052, reserved bit 1056, bufferSizeDB 1060, maxBitrate 1064, and avgBitrate 1068. These values may be followed by a streamType and objectType dependent decoder specific information data structure 1072. A decoder specific information data structure 1072 is required for the sdsm, but not the odsm. Most audio and visual media data streams also have decoder specific information data structures within the decoder configuration descriptor 1032.

The structure of the decoder specific information data 1072, 1076 is shown in FIG. 10C. This data structure consists of a one-byte tag (DecoderSpecificInfoTag) 1080, followed by an indication 1084 of the number of bytes in the remainder of the data structure. The remaining bytes depend on the objectType and streamType. In the case of the sdsm (scene description stream or BIFS), the decoder specific information 1072, 1076 includes indications of the number of bits used to encode nodeID values, and the number of bits used to encode routeID values. Each of these values is represented by a 5-bit unsigned integer.

The structure of the sync layer configuration descriptor 1028, 1088 is shown in FIG. 10D. This data structure consists of a one-byte tag (SLConfigDescrTag) 1090, followed by an indication 1094 of the number of bytes in the remainder of the data structure (always 1), and a single data byte (value 2, "predefined") 1098 which indicates that a predefined configuration is to be used for the sync layer.

3.0 Scene Description Stream (sdsm)

The means used to encode or decode particular types of audio and visual data streams are not determined by either the XMT-A specifications or the MPEG-4 Intermedia File specifications, so the details of how these streams are encoded will not be covered here. An XMT-A document contains detailed information regarding the contents of the stream description stream (sdsm) and object description stream (odsm). Consequently, each XMT-A document is intimately related to the sdsm and odsm streams contained within an MPEG-4 Intermedia File. This section describes the structure of the sdsm data, and the following section describes the structure of the odsm data.

Figure 11B:
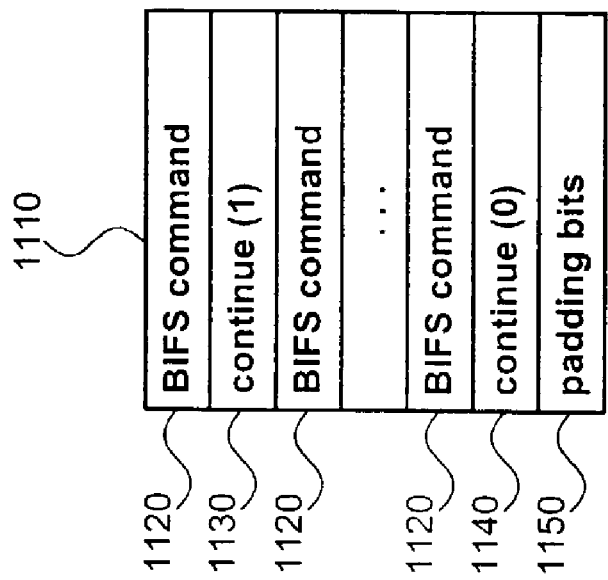
FIG. 11B shows an exemplary sdsm command frame.
Figure 11A:
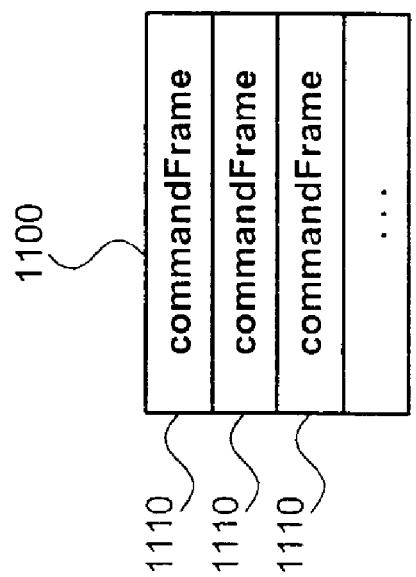
FIG. 11A shows an exemplary sdsm binary chunk.

Like any other media data stream, the sdsm data is composed of one or more chunks, and each chunk is composed of one or more samples. As shown in FIG. 11A, each sample within an sdsm binary chunk 1100 is defined as a "command frame" 1110. Each command frame 1110 is byte-aligned. As shown in FIG. 11B, each command frame 1110 consists of one or more "BIFS commands" 1120. "BIFS" stands for "BInary Format for Streams". Each BIFS command 1120 is followed by a continue bit 1130, 1140. If the value of the continue bit is (1) 1130, another BIFS command follows. Otherwise 1140, continue bit is followed by a sufficient number of null padding bits 1150 to complete the last byte. Individual BIFS commands 1120, except for the first BIFS command in a command frame, are not generally byte-aligned.

As shown in FIG. 12, there are four types of BIFS commands: "insertion", "deletion", "replacement", and "scene replacement". A BIFS insertion command 1200 consists of the two-bit insertion code (value="00") 1206 followed by a two-bit parameter type code 1210 and insertion command data 1216. A BIFS deletion command 1220 consists of the two-bit deletion code (value="00") 1226 followed by a two-bit parameter type code 1230 and deletion command data 1236. A BIFS replacement command 1240 consists of the two-bit replacement code (value="10") 1244 followed by a two-bit parameter type code 1250 and replacement command data 1260. A BIFS scene replacement command 1270 consists of the two-bit scene replacement code (value="11") 1280 followed by a BIFS Scene data structure 1290.

As shown in FIG. 13, there are three types of BIFS insertion commands, (a) the Node Insertion command, (b) the Indexed Value Insertion command, and (c) the Route Insertion command. The type of insertion command is determined by the parameter type value 1210. A Node Insertion command 1300 consists of the two-bit insertion code (value="00") 1304 followed by the two-bit parameter type code (value="01", type=Node) 1308, a nodeID value 1312, a two-bit insertion position code 1316, and an SFNode data structure 1324. If the value of the insertion position code 1316 is zero, an 8-bit position value 1320 follows the insertion position code 1316. The nodeID value 1312 specifies one of a set of updateable nodes defined elsewhere in the BIFS commands. The number of bits used to encode this and other nodeID values is specified in the decoder specific information 1072 for the sdsm stream. The structure of the SFNode data structure 1324 is explained below.

An Indexed Value Insertion command 1328 consists of the two-bit insertion code (value="00") 1332 followed by the two-bit parameter type code (value="10", type=IndexedValue) 1336, a nodeID value 1340, an inFieldID value 1344, a two-bit insertion position code 1348, and a field value data structure 1356. If the value of the insertion position code 1348 is zero, an 8-bit position value 1352 follows the insertion position code 1348. The nodeID value 1340 specifies one of a set of updateable nodes defined elsewhere in the BIFS commands. The number of bits used to encode the nodeID value 1340 is specified in the decoder specific information 1072 for the sdsm stream. The inFieldID value 1344 identifies one of the data fields for the BIFS node specified by the value of nodeID 1340. The number of bits used to encode the inFieldID value 1344 depends on tables contained in the MPEG-4 Systems Specifications.

The contents of a field value data structure depend on the field data type (boolean, integer, float, string, node, etc.) for a specified data field for a specified BIFS node. This can be as simple as one bit or as complex as an SFNode data structure. The field data type for each data field of each BIFS node is specified in tables contained in the MPEG-4 Systems Specifications.

A Route Insertion command 1360 consists of the two-bit insertion code (value="00") 1364 followed by the two-bit parameter type code (value="11", type=Route) 1368, an "isUpdateable" bit 1372, a departureNodeID value 1380, a departureFieldID value 1384, an arrivalNodeID value 1388, and an arrivalFieldID value 1392. If the value of the "isUpdateable" bit is (1), a routeID value 1376 follows the "isUpdateable" bit 1372. The number of bits used to encode the departureNodeID value 1380 and the arrivalNodeID value 1388 is specified in the decoder specific information 1072 for the sdsm stream. The number of bits used to encode the departureFieldID value 1384 and the number of bits used to encode the arrivalFieldID value 1392 depend on tables contained in the MPEG-4 Systems Specifications.

Figure 14B:
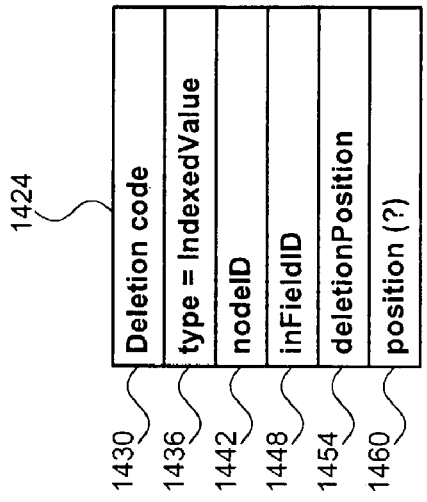
FIG. 14B shows an exemplary IndexedValue deletion command.
Figure 14C:
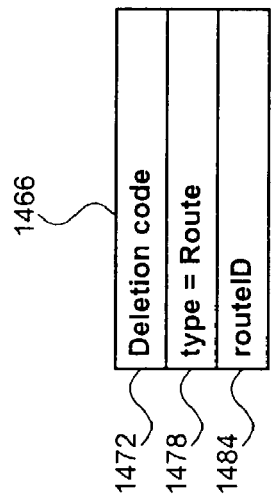
FIG. 14C shows an exemplary Route deletion command.
Figure 14A:
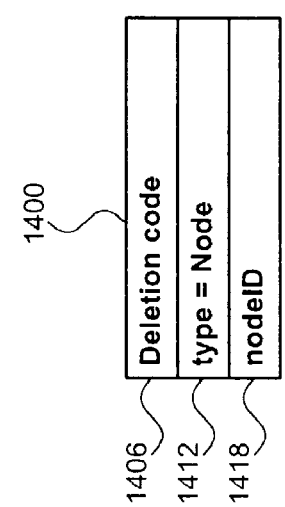
FIG. 14A shows an exemplary Node deletion command.
Figure 15A:
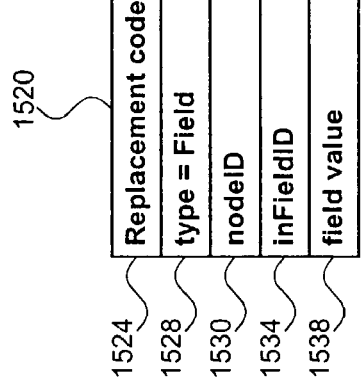
FIG. 15A shows an exemplary Node replacement command.
Figure 15B:
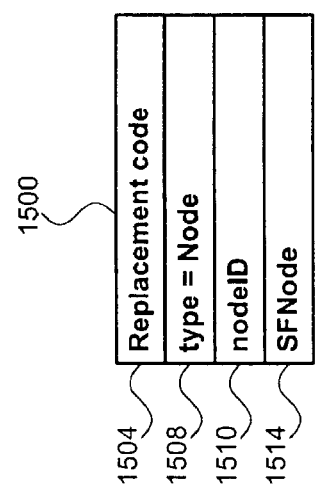
FIG. 15B shows an exemplary Field replacement command.
Figure 15C:
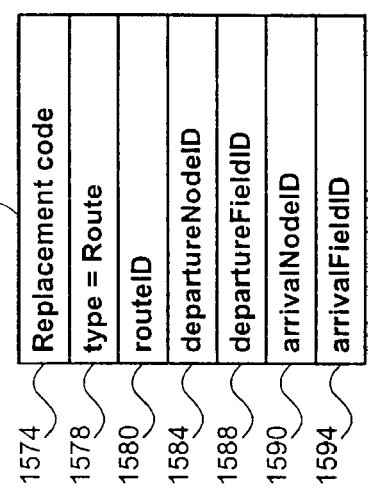
FIG. 15C shows an exemplary IndexedValue replacement command.
Figure 15D:
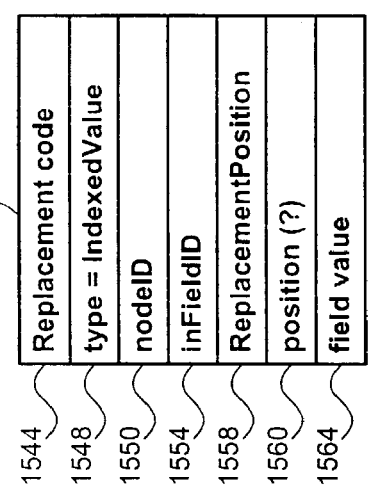
FIG. 15D shows an exemplary Route replacement command.

As shown in FIG. 14, there are three types of BIFS deletion commands: (a) the Node Deletion command, (b) the Indexed Value Deletion command, and (c) the Route Deletion command. The type of deletion command is determined by the parameter type value 1230. A Node Deletion command 1400 consists of the two-bit deletion code (value="00") 1406 followed by the two-bit parameter type code (value="00", type=Node) 1412 and a nodeID value 1418. The nodeID value 1418 specifies one of a set of updateable nodes defined elsewhere in the BIFS commands. The number of bits used to encode the nodeID value 1418 is specified in the decoder specific information 1072 for the sdsm stream.

An Indexed Value Deletion command 1424 consists of the two-bit deletion code (value="01") 1430 followed by the two-bit parameter type code (value="10", type=Indexed Value) 1436, a nodeID value 1442, an inFieldID value 1448, and a two-bit deletion position value 1454. The nodeID value 1418 specifies one of a set of updateable nodes defined elsewhere in the BIFS commands. The number of bits used to encode the nodeID value 1418 is specified in the decoder specific information 1072 for the sdsm stream.

A Route Deletion command 1466 consists of the two-bit deletion code (value="10") 1472 followed by the two-bit parameter type code (value="11", type=Route) 1478 and a routeID value 1484. The routeID value 1484 specifies one of a set of updateable routes defined elsewhere in the BIFS commands. The number of bits used to encode the routeID value 1484 is specified in the decoder specific information 1072 for the sdsm stream.

As shown in FIG. 15, there are four types of replacement commands, (a) the Node Replacement command, (b) the Field Replacement command, (c) the Indexed Value Replacement command, and (d) the Route Replacement command. The type of replacement command is determined by the parameter type value 1250. A Node Replacement command 1500 consists of the two-bit replacement code (value="10") 1504 followed by the two-bit parameter type code (value="01", type=Node) 1508, a nodeID value 1510, and an SFNode data structure 1514. The nodeID value 1510 specifies one of a set of updateable nodes defined elsewhere in the BIFS commands. The number of bits used to encode the nodeID value 1510 is specified in the decoder specific information 1072 for the sdsm stream. The structure of the SFNode data structure 1514 is explained below A Field Replacement command 1520 consists of the two-bit replacement code (value="10") 1524 followed by the two-bit parameter type code (value="01", type=Field) 1528, a nodeID value 1530, an inFieldID value 1534, and a field value data structure 1538. The nodeID value 1530 specifies one of a set of updateable nodes defined elsewhere in the BIFS commands. The number of bits used to encode the nodeID value 1530 is specified in the decoder specific information 1072 for the sdsm stream. The inFieldID value 1534 identifies one of the data fields for the BIFS node specified by the value of nodeID 1530. The number of bits used to encode the inFieldID value 1534 depends on tables contained in the MPEG-4 Systems Specifications.

An Indexed Value Replacement command 1540 consists of the two-bit replacement code (value="10") 1544 followed by the two-bit parameter type code (value="10", type=IndexedValue) 1548, a nodeID value 1550, an inFieldID value 1554, a two-bit replacement position code 1558, and a field value data structure 1564. If the value of the replacement position code 1558 is zero, an 8-bit position value 1560 follows the replacement position code 1558. The nodeID value 1550 specifies one of a set of updateable nodes defined elsewhere in the BIFS commands. The number of bits used to encode the nodeID value 1550 is specified in the decoder specific information 1072 for the sdsm stream. The inFieldID value 1554 identifies one of the data fields for the BIFS node specified by the value of nodeID 1550. The number of bits used to encode the inFieldID value 1554 depends on tables contained in the MPEG-4 Systems Specifications.

An Route Replacement command 1570 consists of the two-bit replacement code (value="10") 1574 followed by the two-bit parameter type code (value="11", type=Route) 1578, a routeID value 1580, a departureNodeID value 1584, a departureFieldID value 1588, an arrivalNodeID value 1590, and an arrivalFieldID value 1594. The routeID value 1580 specifies one of a set of updateable routes defined elsewhere in the BIFS commands. The number of bits used to encode the routeID value 1580 is specified in the decoder specific information 1072 for the sdsm stream. The number of bits used to encode the departureNodeID value 1584 and the arrivalNodeID value 1590 is specified in the decoder specific information 1072 for the sdsm stream. The number of bits used to encode the departureFieldID value 1588 and the number of bits used to encode the arrivalFieldID value 1594 depend on tables contained in the MPEG-4 Systems Specifications.

Figure 12A:
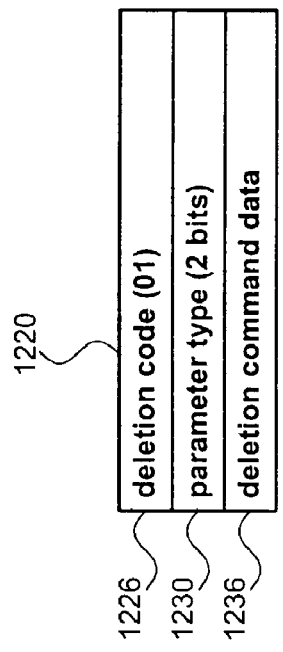
FIG. 12A shows an exemplary BIFS insertion command.
Figure 12B:
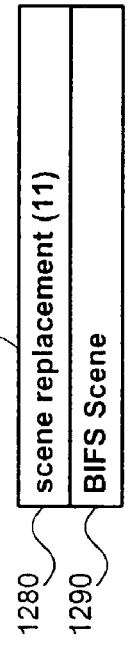
FIG. 12B shows an exemplary BIFS deletion command.
Figure 12C:
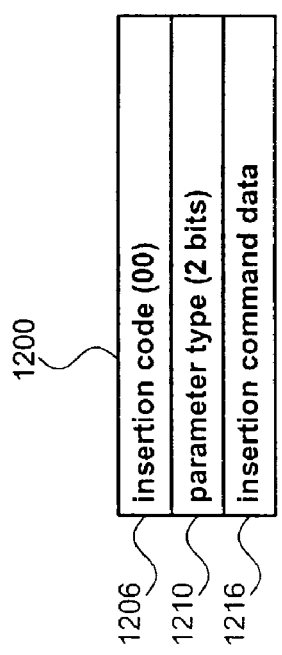
FIG. 12C shows an exemplary BIFS replacement command.
Figure 12D:
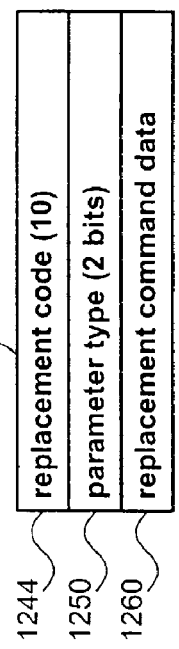
FIG. 12D shows an exemplary BIFS scene replacement command.
Figure 16:
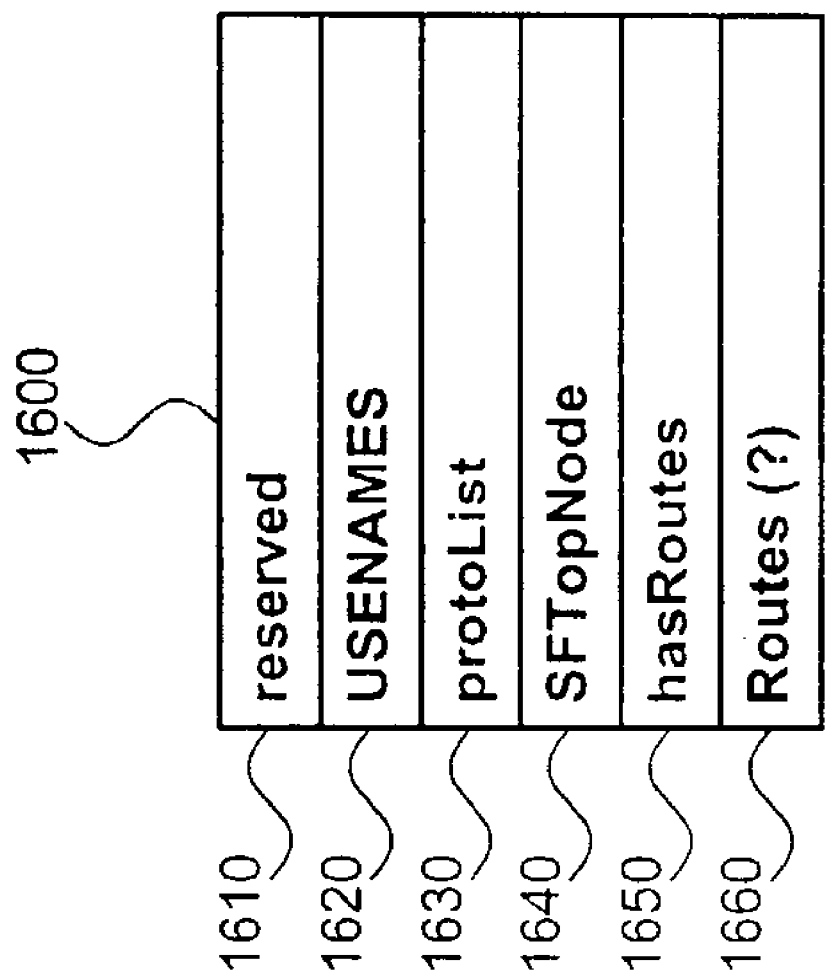
FIG. 16 shows an exemplary BIFS Scene.

As shown in FIG. 12D, a ReplaceScene BIFS command 1270 consists of a two-bit scene replacement code (value="11") 1280 followed by a BIFS Scene data structure 1290. As shown in FIG. 16, a BIFS Scene data structure 1600 consists of a 6-bit reserved field 1610, two one-bit flags (USENAMES 1620 and protoList 1630), an SFTopNode data structure 1640, and a one-bit flag (hasRoutes) 1650. If the protoList flag 1630 is true (1), then additional data defined in the MPEG-4 Systems specifications follows the protoList flag. The SFTopNode data structure 1640 is a special case of an SFNode data structure which is shown in FIG. 17. If the hasRoutes flag 1650 is true (1), then a Routes data structure 1660 follows the hasRoutes flag. The structure of a Routes data structure is shown in FIG. 18.

Figure 17A:
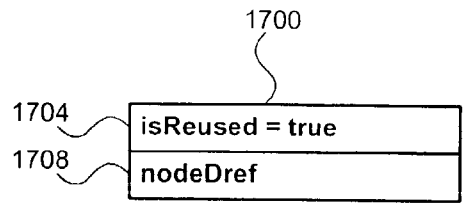
FIG. 17A shows an exemplary SFNode (reused).
Figure 17B:
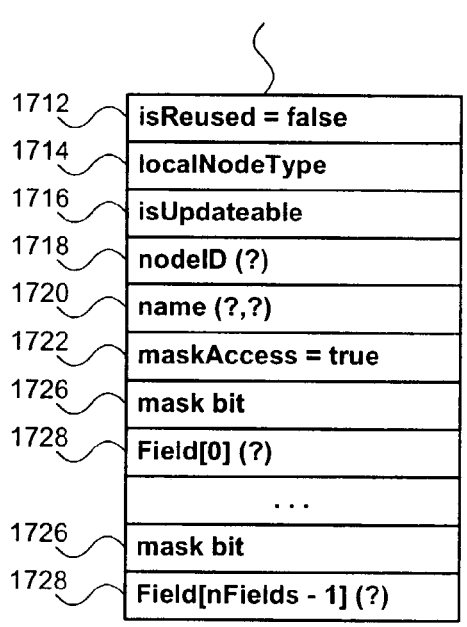
FIG. 17B shows an exemplary SFNode (mask Node).
Figure 17C:
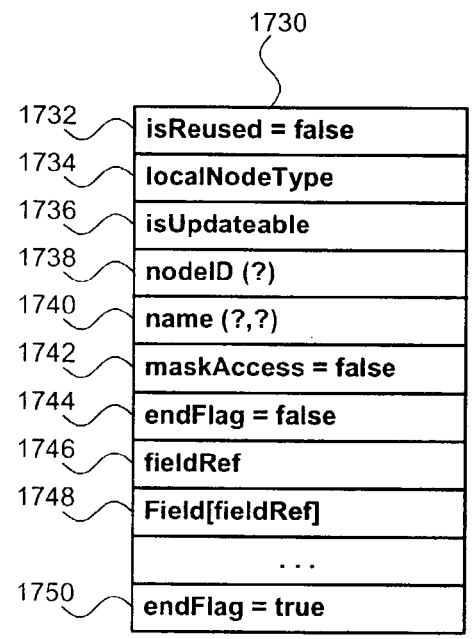
FIG. 17C shows an exemplary SFNode (list Node).

As shown in FIGS. 17A, 17B, and 17C, an SFNode data structure may have one of three forms: (a) reused, (b) mask Node, and (c) list Node. All three forms start with a one-bit flag (isReused). In the case of a reused SFNode 1700, the value of the isReused flag is "1" (true) 1704, and the remainder of the SFNode data structure consists of a nodeIDref value 1708. The value of nodeIDref 1708 must match the nodeID value for an updateable SFNode defined elsewhere in the sdsm data.

If the isReusedFlag is false (0) 1712, 1732, an SFNode type may have one of the two forms shown in FIGS. 17B and 17C depending on the value of the maskaccess flag bit 1722, 1742. In either case, the data for the SFNode includes a local node type value (localNodeType) 1714, 1734, a one-bit flag (isupdateable) 1716, 1736, and a second one-bit flag (maskAccess) 1722, 1742. The number of bits used to encode the local node type 1714, 1734 depend on tables specified in the MPEG-4 Systems specifications. If the isupdateable flag 1716, 1736 is true (1), a nodeID value 1718, 1738 follows the isupdateable flag. If the isupdateable flag 1716, 1736 is true (1) and the USENAMES flag 1620 in the associated BIFSScene data structure 1600 is also true (1), then a null terminated string ("name") 1720, 1740 follows the nodeID value 1718, 1738.

If the maskAccess bit is true (1) 1722, the SFNode has the "mask Node" structure 1710. In this case, as shown in FIG. 17B, the maskAccess bit 1722 is followed by an ordered sequence of mask bits 1726, one for each of the nFields property field defined in the MPEG-4 specifications for BIFS nodes with a node type given by the value of localNodeType 1714. In each case where one of these mask bits is true (1), the mask bit is followed by a binary field value 1728 encoded according to a field data type (integer, boolean, string, node, etc.) determined by the localNodeType 1734, the field number (position within the sequence of mask bits), and tables defined in the MPEG-4 specifications.

If the maskAccess bit is false (0) 1742, the SFNode has the "list Node" structure 1730. In this case, as shown in FIG. 17C, the MaskAccess bit 1742 is followed by one or more field reference records. Each field reference record starts with a one-bit end flag 1744, 1750. If the end flag is false (0) 1744, the end flag 1744 is followed by a field reference index number (fieldRef) 1746 for a property field defined for the local node type 1734, and the fieldref value 1746 is followed by a binary field value 1748 encoded according to a field data type (integer, boolean, string, node, etc.) determined by the local node type 1734 and the property field indicated by the fieldRef value 1746. The number of bits used to encode the fieldRef value 1746 is determined by tables defined in the MPEG-4 Systems specifications. If the end flag is true (1) 1750, the list of field values terminates.

Figure 17D:
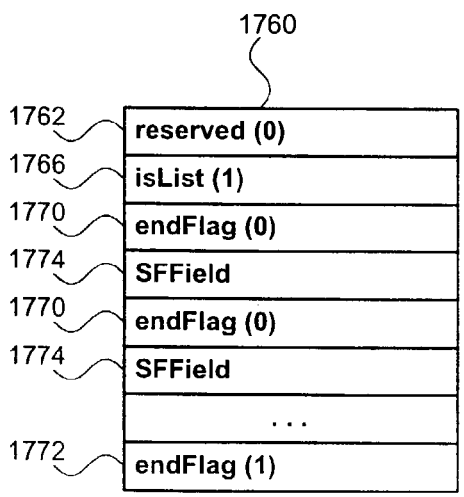
FIG. 17D shows an exemplary MFField (list form).
Figure 17E:
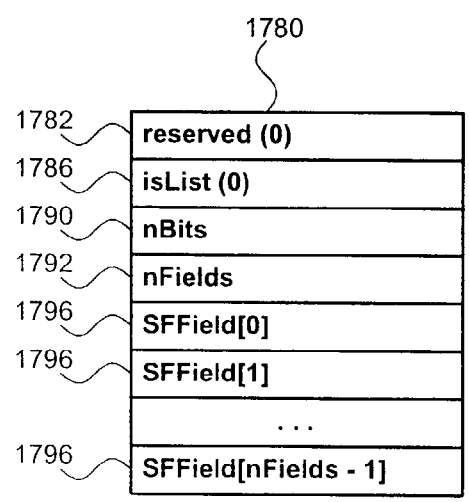
FIG. 17E shows an exemplary MFField (vector form).

Each property field value included within an SFNode structure may consist of a single data value (SFField data structure) or multiple data values (MFField data structure). Each MFField data structure contains zero or more SFField components. As shown in FIG. 17D and FIG. 17E, there are two forms of MFField structures, the list form 1760 and the vector form 1780, based on the value of the isList bit 1766, 1786. Both forms start with a one-bit reserved bit 1762, 1782 followed by the isList bit 1766, 1786.

If the isList bit has the value (1) 1766, the MFField data structure has the list form 1760. In this case, the isList bit 1766 is followed by a sequence of one-bit endFlag values 1770, 1772. If the value of the endFlag bit is "0" 1770, the endFlag bit is followed by an SFField data structure 1774. If the value of the endFlag bit is "1" 1772, the MFField data structure ends.

If the isList bit has the value (0) 1786, the MFField data structure has the vector form 1780. In this case, the isList bit 1786 is followed by a 5-bit field (nBits) 1790 which specifies the number of bits in the following field count value (nFields) 1792. This is followed by a sequence of nFields SFField structures 1796.

The structure of each SFField value depends on the particular field data type associated with the corresponding property field, as indicated by tables specified in the MPEG-4 Systems specifications. A boolean field, for example, consists of a single bit. Other cases including integers, floats, strings, SFNode, are defined and described in the MPEG-4 Systems specifications.

The last component of a BIFS Scene data structure 1600 is an optional Routes data structure 1660. As shown in FIGS. 18A and 18B, there are two forms of the Routes data structure, the list form 1800 and the vector form 1830. Both forms of the Routes data structure start with a one-bit list flag 1805, 1835. If the value of the list flag is true (1) 1805, the Routes data structure has the list form 1800. In this case, the list bit 1805 is followed by one or more Route data structures 1810, and each Route data structure 1810 is followed a one-bit moreRoutes flag 1810, 1820. If the value of the moreRoutes flag is true (1) 1810, another Route data structure 1810 follows. If the value of the moreRoutes flag is false (0) 1820, the Routes data structure 1800 ends.

If the value of the list flag in a Routes data structure is false (0) 1835, the Routes data structure has the vector form 1830. In this case, the list bit 1835 is followed by a five-bit nBits field 1840. The unsigned integer value contained in the nBits field specifies the number of bits used to encode the following numRoutes value 1845. The unsigned integer encoded in the numRoutes value 1845 specified the number of Route data structures 1850 which follow the numRoutes value 1845.

As shown in FIG. 18C, a Route data structure 1860 consists of a one-bit flag (isUpdateable) 1865, an outNodeID value 1880, an outFieldRef value 1885, an inNodeID value 1890, and an inFieldRef value 1895. If the value of the isupdateable flag 1865 is true (1), then the isUpdateable flag 1865 is followed by a routeID value 1870. If the value of the isupdateable flag 1865 is true (1), and the value of the USENAMES flag 1620 in the corresponding BIFS Scene data structure 1600 is also true (1), the routeID value 1870 is followed by a null-terminated string (routeName) 1875. The numbers of bits used to encode the outNodeID value, inNodeID value, and the routeID value are specified in the decoder specific information 1072 for the sdsm stream. The numbers of bits used to encode the outFieldRef and inFieldRef are determined by tables defined in the MPEG-4 Systems specifications.

4.0 Object Descriptor Stream (odsm)

Figure 19A:
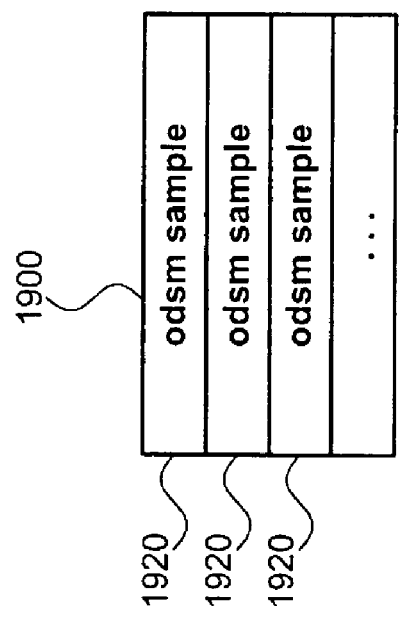
FIG. 19A shows an exemplary odsm binary chunk.
Figure 19B:
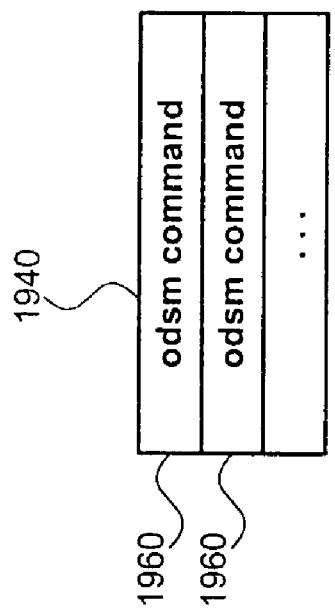
FIG. 19B shows an exemplary odsm binary sample.

Like any other MPEG-4 elementary stream, the odsm (object descriptor stream) is contained in a sequence of one or more chunks 736. As shown in FIG. 19, each odsm chunk 1900 is composed of a sequence of odsm samples 1920, and each odsm sample 1940, is composed on a sequence of odsm commands 1960. The number of odsm samples 1920 in each odsm chunk 1900 are determined by the contents of the sample-to-chunk table atom (stsc) 960 in the trak atom 790, 900 for the object descriptor stream. The number of odsm commands 1960 in each odsm sample 1940 are determined by the sample size table atom (stsz) 970 in the trak atom 790, 900 for the object descriptor stream.

Figure 20A:
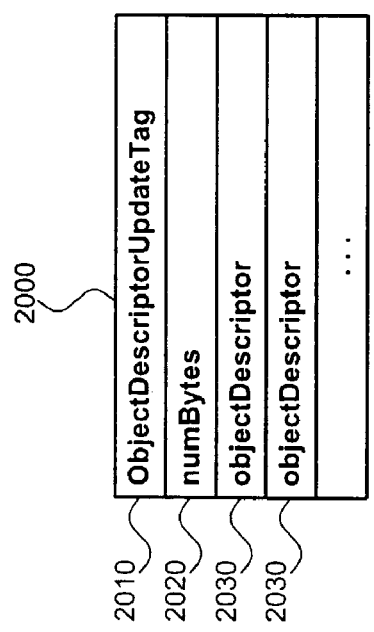
FIG. 20A shows an exemplary ObjectDescriptorUpdate command.
Figure 20B:
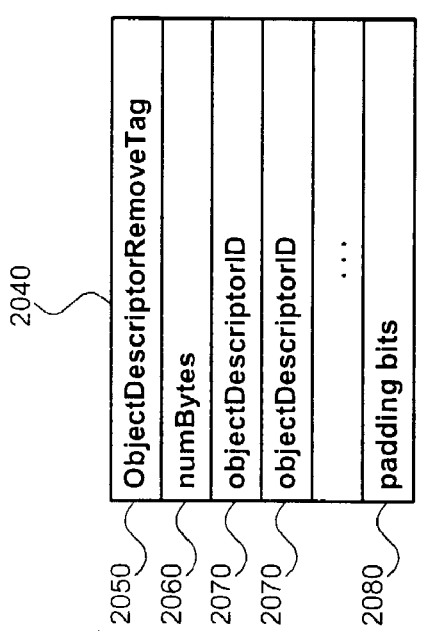
FIG. 20B shows an exemplary ObjectDescriptorRemove command.

There are two possible odsm commands, the ObjectDescriptorUpdate command, and the ObjectDescriptorRemove command. As shown in FIG. 20A, the ObjectDescriptorUpdate command 2000 consists of a one-byte ObjectDescriptorUpdateTag 2010, an indication of the number of bytes in the remainder of the command (numBytes) 2020, and a sequence of ObjectDescriptors 2030. The structure of an ObjectDescriptor is summarized in FIG. 21. As shown in FIG. 20B, the ObjectDescriptorRemove command 2040 consists of a one-byte ObjectDescriptorRemoveTag 2050, an indication of the number of bytes in the remainder of the command (numBytes) 2060, a sequence of objectDescriptorId values 2070, and 2 to 6 padding bits 2080.

Each numBytes value 2020, 2060 specifies the number of bytes in the remainder of an odsm command. If the value of numBytes is less than 128, this value is encoded in a single byte. Otherwise, the value of numBytes is encoded in a sequence of size bytes. The high order bit in each size byte indicates whether another size byte is to follow. If this high order bit is a "1", then another size byte follows. The remaining seven bits in each size byte specify seven bits of the resulting unsigned integer value of numBytes.

Each objectDescriptorId value 2070 is encoded in 10 bits and the sequence of 10-bit objDesciptorId values found in an ObjectDescriptorRemove command 2040 is packed into a sequence of bytes. If the number of objectDescriptorId values is not a multiple of 4, two, four or six null bits 2080 follow the last objectDescriptorId value to fill the last byte in this command.

Figure 21A:
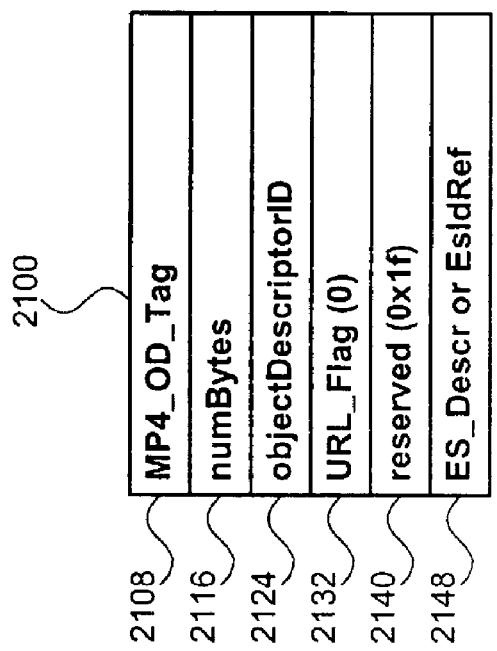
FIG. 21A shows an exemplary binary object descriptor.

As shown in FIG. 21A, an ObjectDescriptor 2100 within an ObjectDescriptorUpdate command 2000 consists of a one-byte MP4_OD_Tag 2108 followed by a numBytes value 2116, a ten-bit ObjectDescriptorID value 2124, a one-bit URL_Flag value 2132, a five-bit reserved field (0x1f) 2140, and either an ES_Descr data structure or an EsIdRef data structure 2148. In this form of the ObjectDescriptor, the value of the URL_Flag 2132 is always false (0). The numBytes value 2116 specifies the number of bytes comprising the remainder of the object descriptor, and this is encoded in the same manner specified for the numBytes value 2020, 2060 found in an ObjectDescriptorUpdate command 2000 or an ObjectDescriptorRemove command 2040.

Figure 21B:
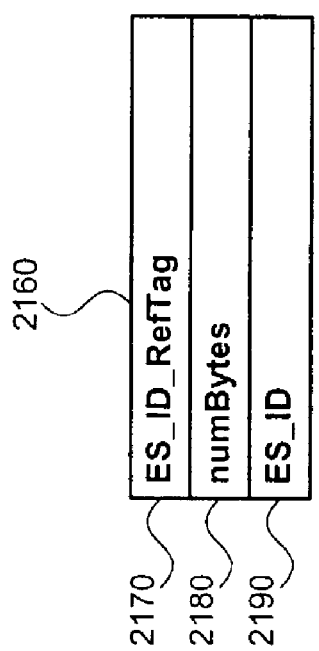
FIG. 21B shows an exemplary binary EsIdRef descriptor.

The structure of an ES_Descr data structure 1000 is shown in FIG. 10A. As shown in FIG. 21B, an EsIdRef data structure 2160 consists of a one-byte ES_ID_RefTag 2170, a numBytes value 2180, and a 16-bit elementary stream ID (ES_ID) value 2190. In this case, the value of numBytes is always "2", and this value is specified as an 8-bit integer.

Figure 22:
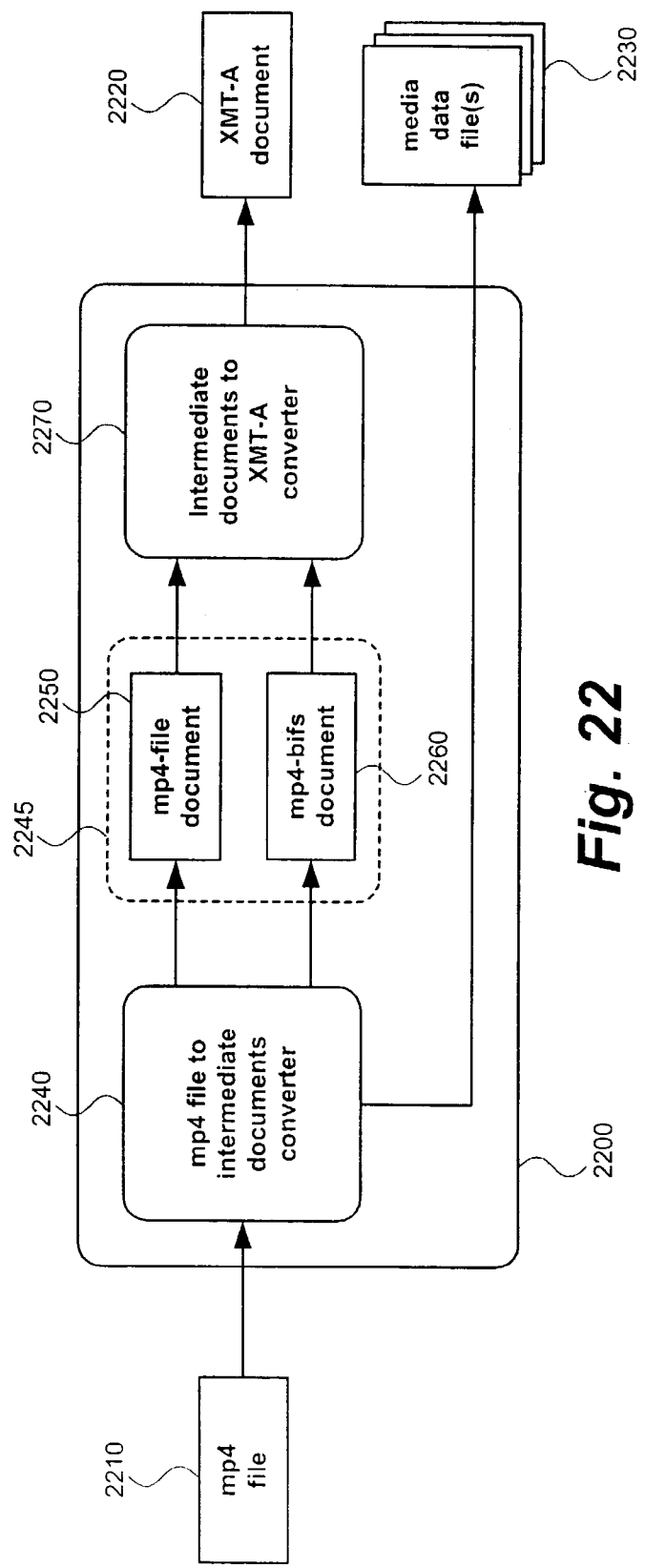
FIG. 22 shows an exemplary MPEG-4 intermedia to XMT-A file converter contemplated by the present invention.

The operation of the present invention is shown generally in FIG. 22. The process 2200 creates an XMT-A document 2220 and a set of media data files 2230 based on the contents of an MPEG-4 Intermedia file 2210. The input MPEG-4 Intermedia file 2210 may also be referred to as an "mp4 binary file" or an "mp4 file". The output XMT-A document may consist of a text file based on the XMT-A specifications ISO/IEC 14496-1:2000 Amd.2, or a set of data structures representative of such a file. The output media data files 2230 represent audio, video, and image data contained within the mp4 file 2210. Each of the output media data files is identified by a StreamSource reference 670 contained in the output XMT-A document 2220. The number of media data files 2230 may be zero.

The logical operations performed by the invention 2200 may be implemented (1) as a sequence of computer implemented steps running on a computer system and/or (2) as interconnected machine modules within the computing system. The implementation is a matter of choice dependent on the performance requirements of the system applying the invention. Accordingly, the logical operations making up the embodiments of the present invention described herein are referred to alternatively as operations, steps, or modules.

Furthermore, the operations performed by the present invention can be a computer readable program embodied as computer readable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As shown in FIG. 22, the process of creating the output XMT-A document 2220 and media data files 2230 is accomplished in two steps. In the first step, an mp4 file to intermediate documents converter 2240 interprets an input mp4 file 2210 and creates a set of intermediate documents 2245 and a set of media data files 2230. The set of intermediate documents 2245 consists of an mp4-file document 2250 and an mp4-bifs document 2260. In the second step, an intermediate documents to XMT-A converter 2270 generates the output XMT-A 2230 based on the intermediate documents 2245.

One reason for dividing this process 2200 into these two steps is that, while the input mp4 file 2210 represents the same information represented by the output XMT-A document 2220 and media data files 2230, the organization and structure of the input mp4 file 2210 differs greatly from the organization and structure of the output XMT-A document. For example, the structure of an mp4 file 2210 is closely related to the structure of a Quicktime media data file, but the structure of an XMT-A document 2220 has none of the characteristics of a Quicktime media data file. An XMT-A document 2220 contains descriptions of a scene description stream (sdsm) and an object descriptor stream (odsm), but these can be mixed together in any order. An mp4 file 2210 also contains descriptions of the sdsm and odsm, but each of these is represented as a separate stream of temporally ordered samples.

Because the structure and organization of an mp4 file 2210 differs so much from the structure and organization of an XMT-A document 2220, it is advantageous to divide the process of creating an XMT-A document 2220 based on an mp4 file 2210 into two steps (a) decoding, and (b) reorganization. In the first step, the binary information encoded within an mp4 file is interpreted and used to create a set of structured documents representing the structure and organization of the mp4 file, the sdsm, and the odsm. Any other binary data is merely copied into new media data files. This step can be performed without regard to the definition of an XMT-A document. In the second step, the structured documents created in the first step are used to create an XMT-A document. This step can be performed without regard to the manner in which this information had been represented in binary form in the mp4 file.

In order to accomplish the objective of dividing the process of creating an XMT-A document 2220 based on an mp4 file 2210 into these two steps 2240, 2270, it is necessary to define new structured documents 2245 representing (a) the structure and organization of the mp4 file, (b) the structure and organization of the stream description stream (sdsm) as represented in the mp4 file, and (c) the structure and organization of the object descriptor stream (odsm) as represented in the mp4 file. This may be accomplished be defining three new types of structured documents, one representing the mp4 file, one representing the sdsm, and one representing the odsm. Of these, the structured documents required to represent the mp4 file and the sdsm are relatively complex, but the structured document required to represent the odsm is very simple. Consequently, it is convenient to incorporate the description of the odsm into the structured document employed to represent the mp4 file. Consequently, in this embodiment of this invention, two new structured documents are introduced, one for the mp4 file and odsm, and one for the sdsm. These two structured documents are identified as the mp4-file document 2250 and the mp4-bifs document 2260. These are referred to collectively as the intermediate documents 2245.

It should be noticed that the use of two types of structured documents has been chosen as a matter of convenience. The same objectives could have been achieved by defining three types of structured documents (mp4-file only, odsm only, and sdsm only), or all three types of information could be consolidated into a single composite structured document.

In one embodiment of the present invention, the particular types of structured documents created to represent the reorganized information are based on the "XML" (extensible Markup Language) technology. This is advantageous because:

(a) the definition of an XMT-A document is based on XML technology, (b) XML technology provides a standardized means of representing structured documents, and (c) standardized software tools exist for working with structured documents based on XML technology.

Thus, in one embodiment of the invention, the process of reorganizing the information contained in the XMT-A file is reduced to an XML-to-XML transformation. In addition, the existence of standardized software for working with XML files makes it possible to manage the input XMT-A documents as well as the intermediate documents without the need to develop new specialized software to perform the same functions.

Although this embodiment is based on the use of XML technology to represent the intermediate documents, it is possible to create alternative embodiments of this invention that employ other types of structured documents.

The following material describes (1) the structure of an mp4-file document 2250, (2) the structure of an mp4-bifs document 2260, (3) the operation of the XMT-A to intermediate documents converter 2240, and (4) the operation of the intermediate documents to mp4 file converter 2270.

5.0 mp4-File Document

Figure 23B:
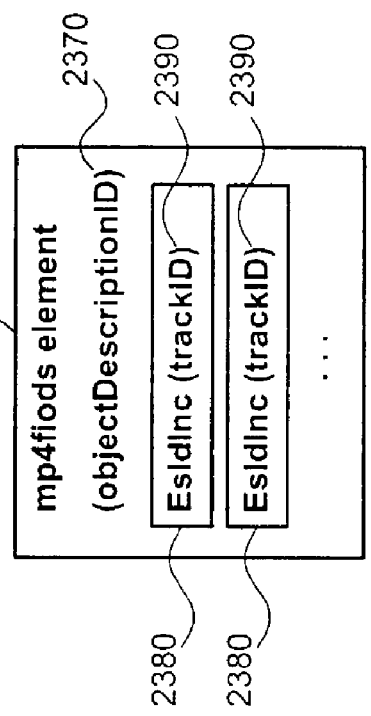
FIG. 23B shows an exemplary mp4fiods element.
Figure 23A:
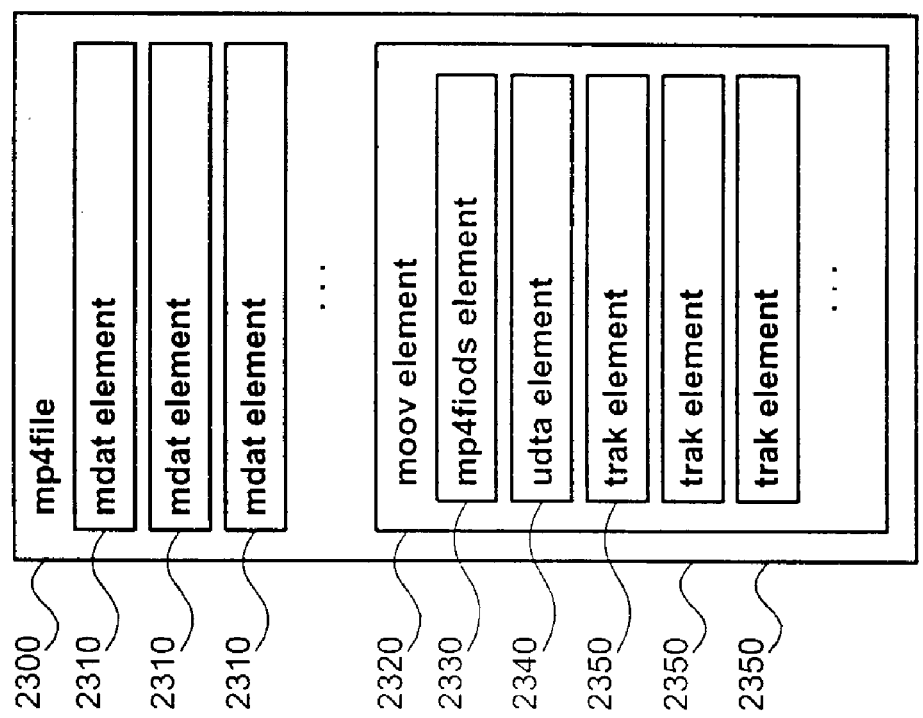
FIG. 23A shows an exemplary mp4file document.

As shown in FIG. 23A, the structure of an mp4-file document 2300 is very similar to the structure of an mp4 binary file 700. An mp4-file document 2300 contains a set of one or more media data (mdat) elements 2310 and a single moov element 2320. The moov element 2320 includes an mp4fiods (mp4 file initial object descriptor) element 2330 and one or more trak elements 2350. A moov element 2320 may also include an optional user data (udta) element 2340. The udta element 2340 may be used to include information such as a copyright notice. The properties of the mvhd atom 772 are represented by attributes of the moov element 2320.

As shown in FIG. 23B, an mp4fiods element 2360 possesses an objectDescriptorID attribute 2370. An mp4fiods element 2360 also possesses several other attributes not shown in FIG. 23B. These additional attributes include the boolean attribute "includeInlineProfilesFlag", and integer attributes "sceneProfileLevelIndication", "ODProfileLevelIndication", "audioProfileLevelIndication", "visualProfileLevelIndication", and "graphicsProfileLevelIndication". An mp4fiods element 2360 also includes one or more EsIdInc elements 2380. Each EsIdInc element 2380 possesses a trackID attribute 2390 which matches the trackID attribute of the related trak element 2340.

Figure 24A:
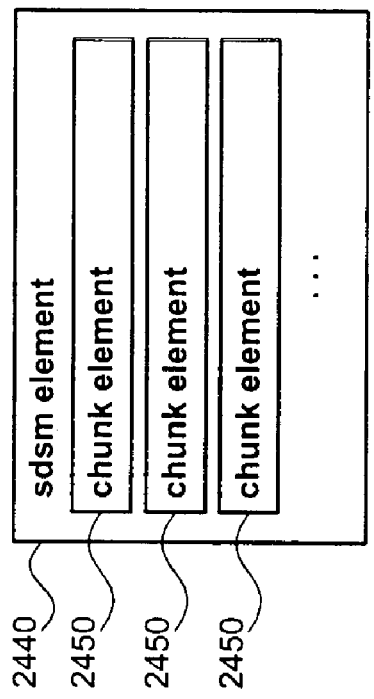
FIG. 24A shows an exemplary mdat element.

As shown in FIG. 24A, each mdat element 240 may contain one or more of the following elements: sdsm elements 2410, odsm elements 2420, and mediaFile elements 2430. Each of these elements possesses a unique "trackID" attribute which matches the trackID attribute of the related trak element 2340. Each mediaFile element 2430 has a "name" attribute which specifies the file name for an external binary file which contains the associated media data (audio data, visual data, etc.). Each sdsm element 2410 has an "xmlFile" attribute specifying the name of an XML file representing the associated mp4-bifs document 2260. In one embodiment, creation of XML files representing an mp4-file document and/or an mp4-bifs document may be useful for diagnostic purposes, but such files are not required for the operation of the invention.

Figure 24B:
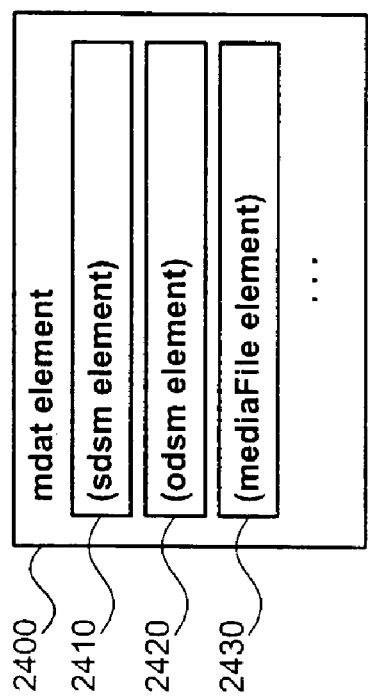
FIG. 24B shows an exemplary sdsm element.
Figure 24C:
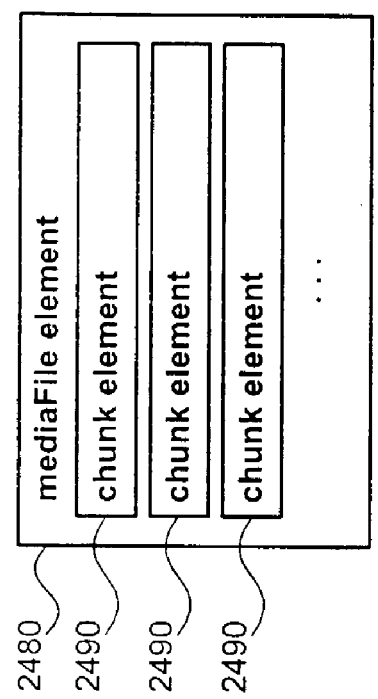
FIG. 24C shows an exemplary odsm element.
Figure 24D:
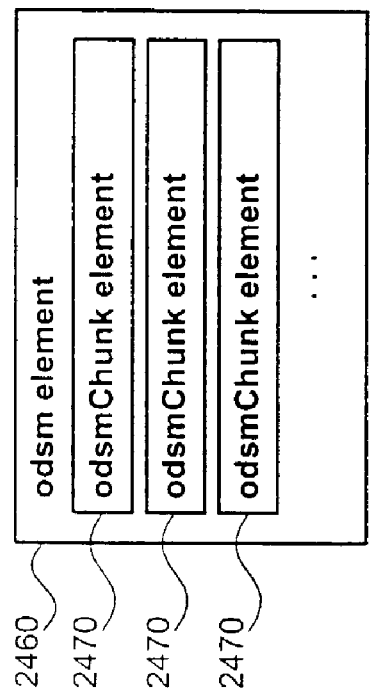
FIG. 24D shows an exemplary mediaFile element.

As shown in FIGS. 24B and 24D, each sdsm element 2440 and each mediaFile element 280 contains one or more chunk elements 2450, 2490. Each chunk element 2450, 2490 possesses a "size" attribute indicating the number of bytes in the associated block of binary data, if known. Each chunk element 2450, 2490 also possesses an "offset" attribute indicating the number of bytes between the start of the binary sdsm data or media data file and the start of the data for the current chunk within the binary sdsm data or media data file, if known. Additional information describing the scene description stream (sdsm) is contained within the mp4-bifs document.

As shown in FIG. 24C, each odsm element 2460 contains one or more odsmChunk 2470 elements. Each odsmChunk element 2470 possesses a "size" attribute indicating the number of bytes in the associated portion of the object descriptor stream, if known. Each odsmchunk element 2470 also possesses an "offset" attribute indicating the number of bytes between the start of the binary data for the associated object descriptor stream and the start of the data for the current chunk within that stream, if known.

As shown in FIG. 25A, each odsmchunk element 2500 contains one or more odsmSample elements 2510. As shown in FIG. 25B, each odsmsample element 2520 contains one or more odsm-command elements 2530. As shown in FIG. 25C, each odsm-command element may be an ObjectDescrUpdate element 2540 or an ObjectDescrRemove element 2570. Each ObjectDescrUpdate element 2540 contains an ObjectDescriptor element 2550, and the ObjectDescriptor element 2550 contained within an ObjectDescrUpdate element 2540 contains an EsIdRef element 2560.

Each odsmSample element 2510, 2520 possesses a "time" attribute which specifies the time in seconds when the commands contained within the odsmsample element 2510, 2520 are to be executed. Each ObjectDescriptor element 2550 and each ObjectDescrRemove element 2570 possesses an "ODID" attribute 2555, 2575 which specifies a numerical object descriptor ID. Each EsIdRef element 2560 possesses an "EsId" attribute 2565 which specifies a numerical elementary stream ID.

Figure 26B:
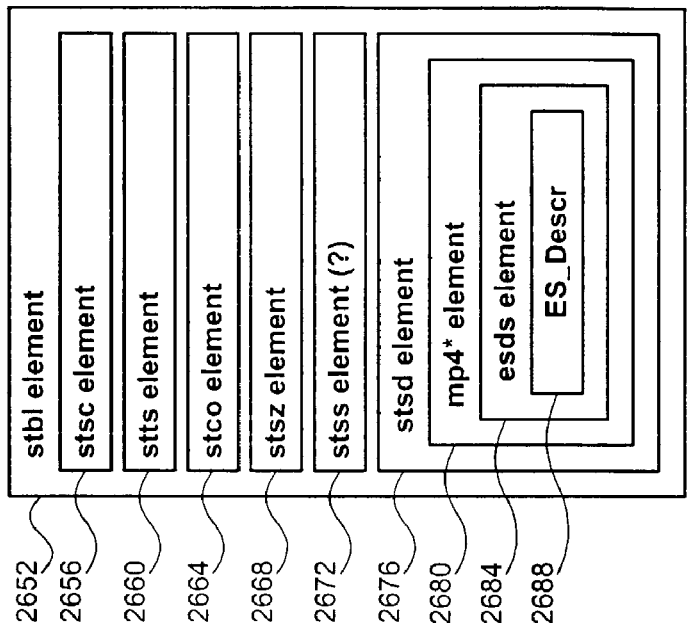
FIG. 26B shows an exemplary stbl element.
Figure 26A:
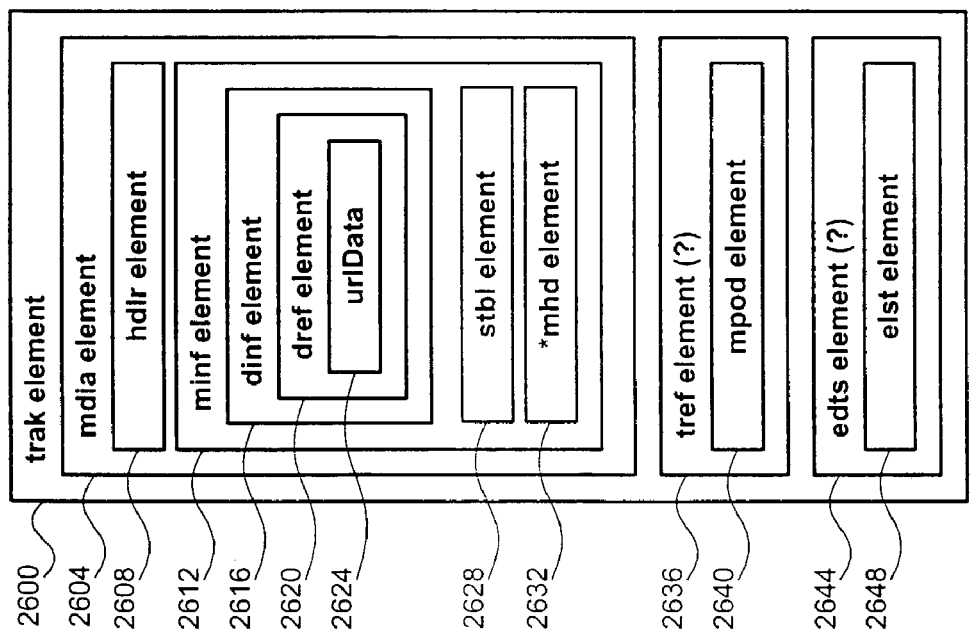
FIG. 26A shows an exemplary trak element.

The structure of a trak element 2350, 2600, as shown in FIG. 26A, is very similar to that of a trak atom 790, 900 within an mp4 file 700. Each trak element 2600 contains an mdia element 2604. A trak element 2600 may also contain a tref (track reference) element 2636 and/or an edts (edit list) element 2644. There is no tkhd element analogous to the tkhd atom 910 in an mp4 file. Instead, the properties contained within a tkhd atom 910 are represented as the attributes of a trak element 2600.

An mdia element 2604 contains an hdlr element 2608 and an minf element 2612. The properties of an mdhd atom 915 are represented as the attributes of a mdia element 2604. The minf element 2612 contains a dinf element 2616, an stbl element 2628, and a media header element 2632. The media header element ("*mhd") 2632 may have one of several forms depending on the type of data in the associated data stream. The media header element 2632 within a trak element associated with the sdsm or odsm is represented by an "nmhd" element. The media header element 2632 within a trak element associated with an audio stream is represented by an "smhd" element, and the media header element 2632 within a trak element associated with a visual stream is represented by a "vmhd" element.

As shown in FIG. 26B, an stbl (sample tables) element 2628, 2652 contains an stsc (sample-to-chunk table) element 2656, an stts (time-to-sample table) element 2660, an stco (chunk offset table) element 2664, an stsz (sample size table) element 2668, and an stsd (sample description table) element 2676. An stbl element 2664 may also include an stss (sync sample table) element 2672 depending on the stream or media type. An stsd element 2676 may contain one of several types of subordinate elements represented as "mp4* element" 2680 in FIG. 26B. In the case of an stsd element 2676 contained within a trak element 2600 associated with an sdsm or odsm stream, the stsd element 2680 contains an "mp4s" element. In the case of an stsd element 2680 contained within a trak element 2600 associated with an audio stream, the stsd element 2680 contains an "mp4a" element. In the case of an stsd element 2680 contained within a trak element 2600 associated with a visual stream, the stsd element 2680 contains an "mp4v" element. In each case, the "mp4*" element 2680 contains an esds element 2684, and the esds element 2684 contains an ES_Descr element 2688.

Figure 27:
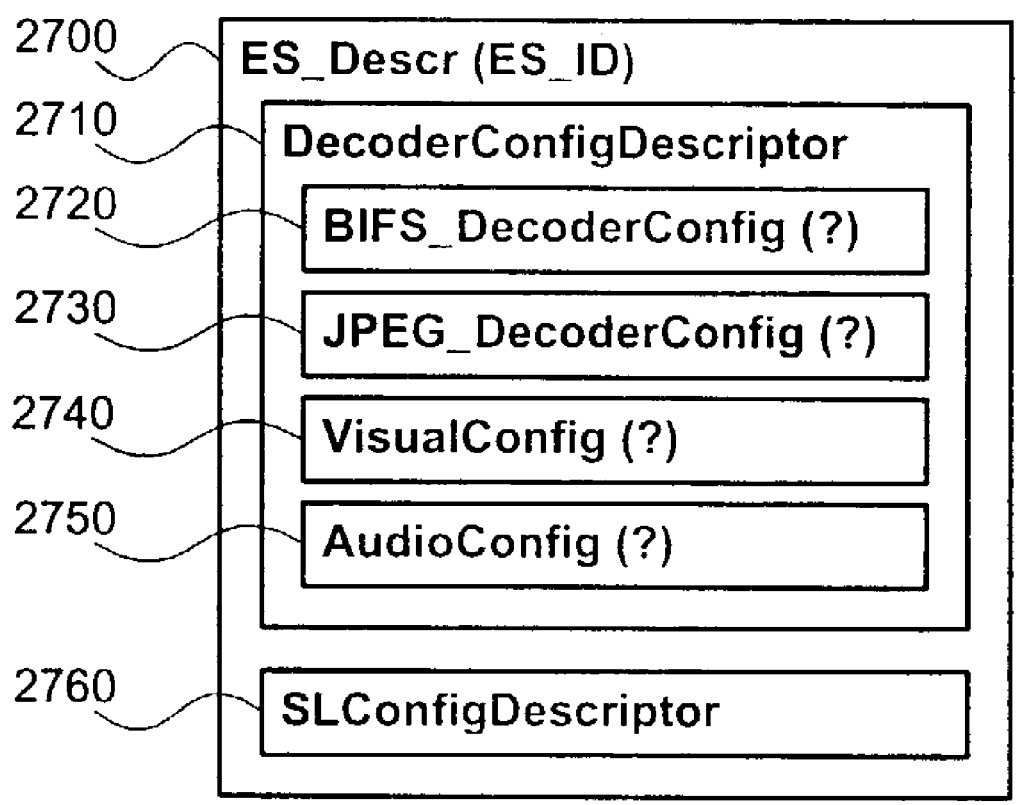
FIG. 27 shows an exemplary ES_Descr.

As shown in FIG. 27, an ES_Descr element 2700 contains a DecoderConfigDescriptor element 2710 and an SLConfigDescriptor element 2760. The DecoderConfigDescriptor element 2710 may contain one of several types of decoder specific information elements including a BIFS_DecoderConfig element 2720, JPEG_DecoderConfig 2730, VisualConfig 2740, or AudioConfig 2750. Each of the various types of decoder specific information elements represents a form of the DecoderSpecificInfo data structure 1072 contained within a binary DecoderConfigDescriptor structure 1032. The properties of the binary ES_Descr structure 1000, DecoderConfigDescriptor structure 1032, SLConfigDescriptor structure 1088, and DecoderSpecificInfo structure 1076, are represented by attributes of the corresponding elements 2700, 2710, 2760, 2720, 2730, 2740, 2750 of the mp4-file document 2300.

6.0 mp4-bifs Document

Figure 28A:
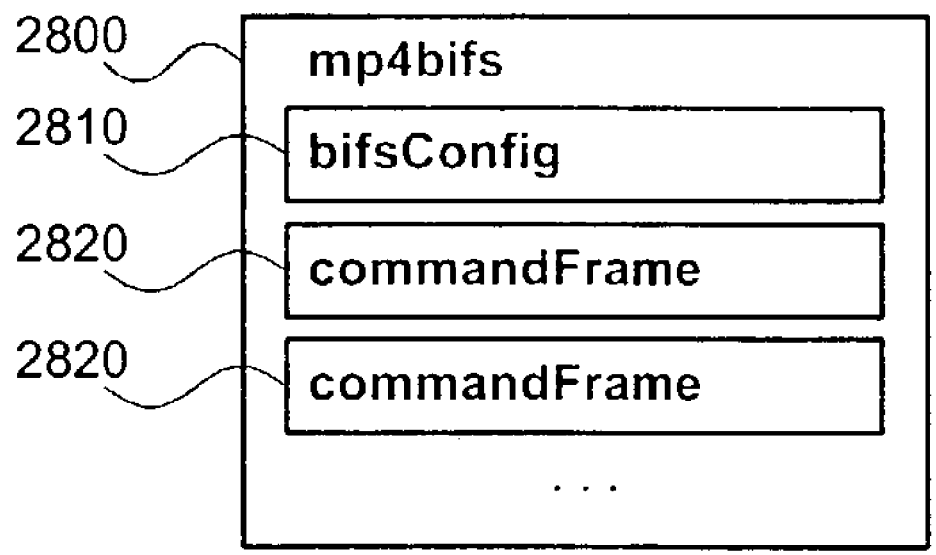
FIG. 28A shows an exemplary mp4bifs document.
Figure 28B:
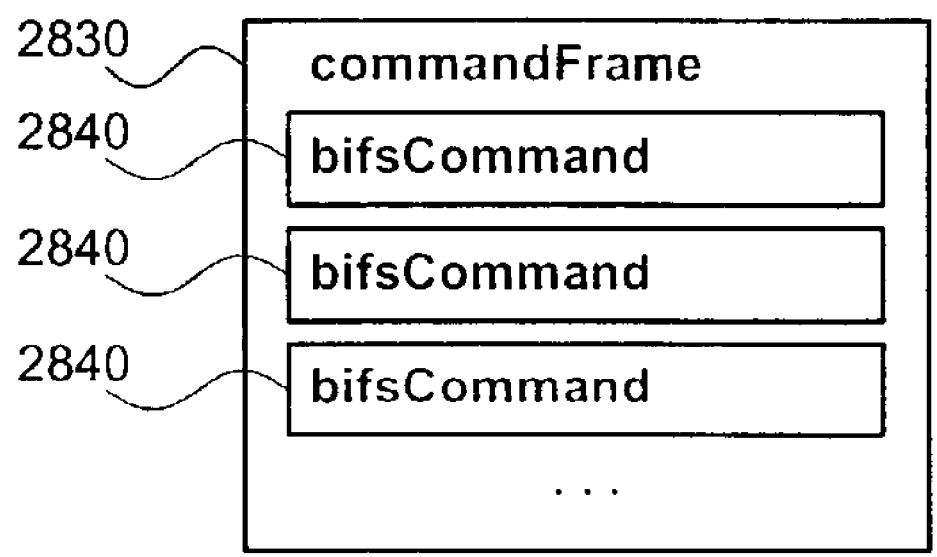
FIG. 28B shows an exemplary mp4bifs commandFrame element.

As shown in FIG. 28A, an mp4-bifs document 2800 contains a single bifsconfig element 2810 followed by a sequence of one or more commandFrame elements 2820. As shown in FIG. 28B, each commandFrame element 2830 contains one of more mp4bifs bifsCommand elements 2840. Each commandFrame element 2820, 2830 possesses an attribute "time" which specifies the time in seconds when the commands contained within the commandFrame element are to be executed.

Figure 29A:
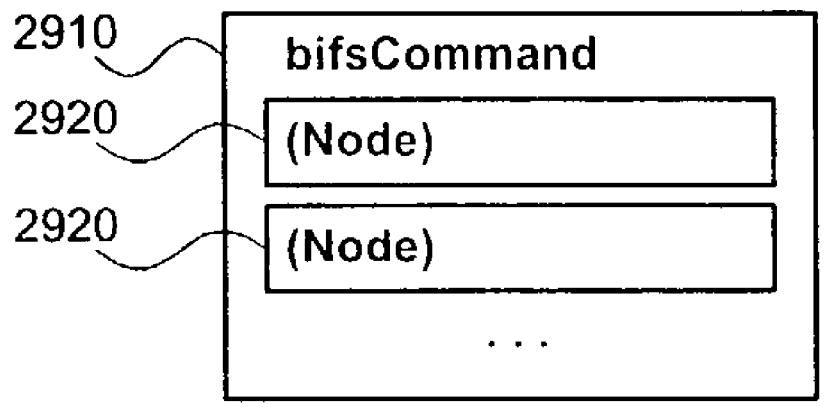
FIG. 29A shows an exemplary mp4bifs bifscommand element.

Each mp4bifs bifsCommand element 2840 represents one of eleven possible MPEG-4 BIFS commands: InsertNode, InsertIndexedValue, InsertRoute, DeleteNode, DeleteIndexedValue, DeleteRoute, ReplaceNode, ReplaceField, ReplaceIndexedValue, ReplaceRoute, and ReplaceScene. As shown in FIG. 29A, an mp4bifs bifsCommand element 2910 may contain one or more mp4bifs Node elements 2920. Of the eleven types of bifsCommand elements, InsertNode, InsertIndexedValue, ReplaceNode, ReplaceField, ReplaceIndexedValue, and ReplaceScene may include subordinate mp4bifs Node elements 2920. The InsertIndexedValue, ReplaceIndexedValue, and ReplaceField bifscommand elements may have subordinate bifsCommand elements 2910.

Figure 29B:
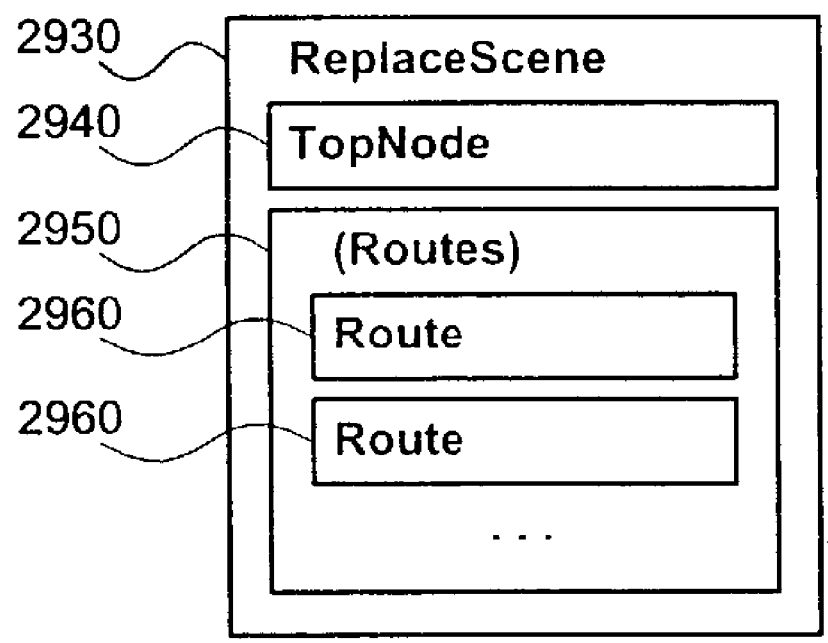
FIG. 29B shows an exemplary mp4bifs ReplaceScene element.

As shown in FIG. 29B, a ReplaceScene bifsCommand element 2930 may include only a single subordinate mp4bifs Node element and this must be a "TopNode" element 2940. A TopNode element 2940 corresponds to a member of a particular subset of MPEG-4 BIFS nodes. This subset is defined in the MPEG-4 Systems specifications. In addition, a ReplaceScene bifsCommand element 2930 may also include a subordinate "Routes" element 2950, and the "Routes" element 2950 may contain one or more subordinate "Route" elements 2960. An mp4bifs Route element 2960 has the attributes "routeId", "arrivalNodeId", "arrivalField", "departureNodeId", and "departureField".

In addition to possible subordinate mp4bifs Node elements, each type of mp4bifs bifscommand element possesses the following attribute values:

1. InsertNode: "parentId", "insertionPosition", and "position"
2. InsertIndexedValue: "nodeId", "inFieldName", "insertionPosition", "position", and "value"
3. InsertRoute: "RouteId", "departureNode", "departureField", "arrivalNode", and "arrivalField"
4. DeleteNode: "nodeId"
5. DeleteIndexedValue: "nodeId", "inFieldName", "deletionPosition", and "position"
6. DeleteRoute: "routeId"
7. ReplaceNode: "parentId"
8. ReplaceField: "nodeId", "inFieldName", and "value"
9. ReplaceIndexedValue: "nodeId", "inFieldName", "insertionPosition", "position", and "value"
10. ReplaceRoute: "routeId", "departureNode", "departureField", "arrivalNode", and "arrivalField"
11. ReplaceScene: "USENAMES" (a boolean value)

For the bifscommand elements InsertIndexedValue, ReplaceField, and ReplaceIndexedValue, if the property field specified by the "inFieldName" attribute has a node data type of "Node" (per MPEG-4 specifications), then this element will contain one or more subordinate mp4bifs Node elements 2920 and the "value" attribute will contain a list of the node names associated with each of the subordinate Node elements.

An mp4bifs Node element 2920 represents one of the many types of MPEG-4 BIFS node data structures. Over 100 different types of BIFS nodes are defined in the MPEG-4 systems specifications. Each type of MPEG-4 BIFS node has a particular NodeName and a set of property fields.

Figure 30B:
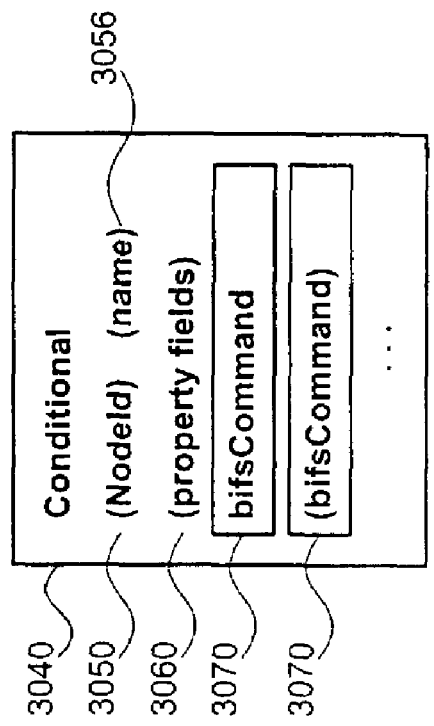
FIG. 30B shows an exemplary mp4bifs Conditional Node element.

There are two basic types of mp4bifs Node elements: original Node elements and reused Node elements. As shown in FIG. 30A, an mp4bifs original Node element 3000 is identified by a "NodeName" corresponding to the NodeName property of one of the BIFS nodes defined in the MPEG-4 Systems Specifications.

An mp4bifs original Node element 3000 may have an optional NodeId attribute 3010. If a value is specified for the NodeId attribute 3010, the Node element 3000 is classified as a "reusable Node". The value of the NodeId attribute 3010, if specified, is an integer in the range of 1 to the number of reusable Nodes defined in the current scene. If a value has been specified for the NodeId attribute 3010, and the value of the "USENAMES" attribute of the associated ReplaceScene command is "true", then the Node element will also have a "name" attribute 3016.

In addition to the NodeId 3010 and name 3016 attributes, each original Node element has a number of property field attributes 3020. Each property field attribute 3020 corresponds to one of the property fields defined in the MPEG-4 Systems Specifications for the node type identified by the NodeName for a particular Node element. Each property field has a defined field data type, such as boolean, integer, float, etc. The set of possible field data types includes "SFNode" and "MFNode". If the NodeName for a particular original Node element corresponds to an MPEG-4 BIFS node with a property field or fields with field data type "SFNode" and "MFNode", then the Node element may possess one or more subordinate Node elements 3030. If so, the value of the corresponding property field attribute consists of the NodeName strings for each subordinate Node element associated with the property field.

If, for example, a particular mp4bifs Node element with NodeName "Group" possesses a subordinate mp4bifs Node elements with NodeNames of "Transform2D", "Valuator", and "TimeSensor" associated with the "children" attribute, then the value of the "children" attribute would be "Transform2D Valuator TimeSensor".

In the special case of a Conditional BIFS node, one of the property fields has the property field name "buffer", the field data type for the "buffer" property field is "command buffer", and the value of the "buffer" property field consists of one or more BIFS commands. In this case, the NodeName of the corresponding mp4bifs Node element 3040 is "Conditional". The values of the NodeId attribute 3050 and name attribute 3056 for a Conditional Node element 3040 may be specified as for any other mp4bifs original Node element 3000. Instead of subordinate Node elements 3030, the Conditional Node element possesses one or more subordinate bifsCommand elements 3070, and the value of the "buffer" attribute consists of an ordered list of the command names of the subordinate bifsCommand elements 3070.

If, for example, a particular Conditional Node element possesses a subordinate InsertRoute bifsCommand element followed by a subordinate DeleteNode bifsCommand elements, then the value of the "buffer" attribute would be "InsertRoute DeleteNode".

The ability of an original Node element to possess subordinate Node elements or bifsCommand elements may be repeated recursively to a hierarchical collection of BIFS command and Node elements.

Figure 30C:
FIG. 30C shows an exemplary mp4bifs Reused Node element.
Figure 30A:
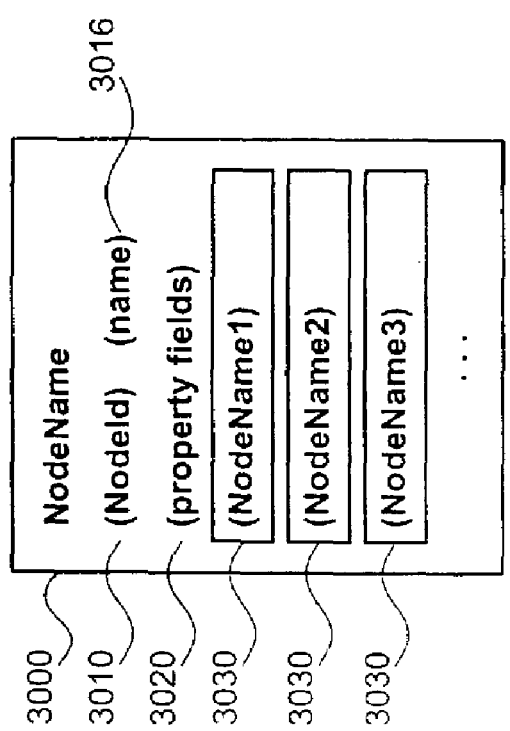
FIG. 30A shows an exemplary mp4bifs original Node element.

As shown in FIG. 30C, a reused Node element 3080 has a NodeName of "ReusedNode". A ReusedNode element 3080 has no subordinate elements. A ReusedNode element 3080 has a single attribute named "nodeRef" 3090. The value of the nodeRef attribute 3090 must match the value of the NodeId attribute 3010, 3050 for one of the reusable original Node elements 3000, 3040.

7.0 mp4 to xmta Converter

As shown in FIG. 22, the process 2200 creates an XMT-A document 2220 and a set of zero or more binary media data files 2230 based on an MPEG-4 Intermedia binary file ("mp4 file") 2210.

This process consists of two main steps:
  a. creating 2240 a pair of intermediate xml documents 2240, 2250 and a set of media data files 2230 based on an mp4 binary file 2210.
  b. creating 2270 an xmta xml document 2220 based on the pair of intermediate xml documents 2250, 2260.
  Each of these steps is described below.

Creation of a Pair of Intermediate xml Documents and a Set of Media Data Files Based on an mp4 Binary File The process 2240 of creating a pair of intermediate xml documents 2240, 2250 and a set of media data files 2230 based on an mp4 binary file 2210 consists of two parts:
  (1) A QtInfo data structure 3100 is created based on the contents of an mp4 binary file 2210.
  (2) A set of media data files 2230 and a pair of intermediate xml documents 2250, 2260 are created based on the resulting QtInfo data structure 3100. The set of media data files 2230 may be empty.

In an alternative embodiment of this invention, these two parts could be combined into a single process in which the intermediate xml documents 2250, 2260 and media data files 2230 are created directly from the mp4 binary file 2210 without creating a QtInfo data structure 3100. As shown in FIG. 7A, an mp4 binary file 700 is composed of a moov atom 712 and one or more mdat atoms 706. The mdat atoms 706, which contain the data needed to create the media data files 2230, cannot be interpreted without the information specified in the moov atom 712. Consequently, it is advantageous to create a temporary data structure such as the QtInfo data structure 3100 to represent the contents of the mp4 binary file 2210 before creating the intermediate xml files 2250, 2260 and media data files 2230.

The QtInfo Data Structure

Figure 31A:
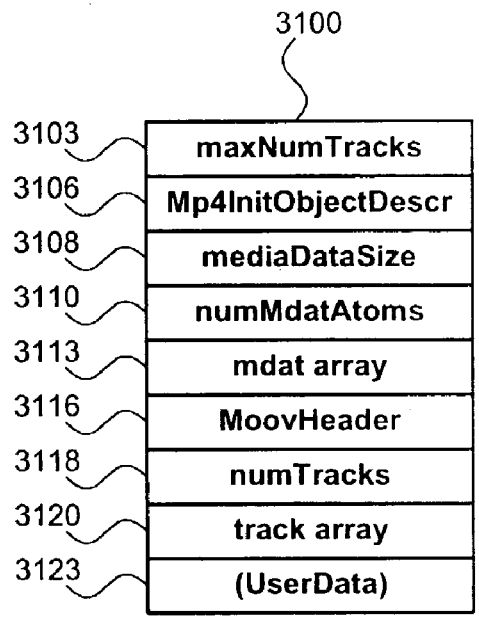
FIG. 31A shows an exemplary QtInfo structure.

A QtInfo data structure represents the contents of an mp4 binary file 700. As shown in FIG. 31A, a QtInfo data structure 3100, consists of the following components:

1. maxNumTracks 3103: an integer which specifies the number of entries in the mdat array 3113 and the trak array 3120.

Figure 31B:
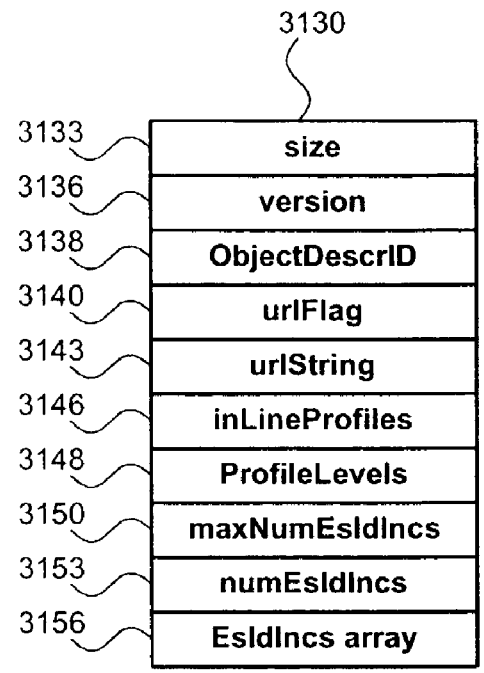
FIG. 31B shows an exemplary Mp4fInitObjectDescr element.

2. Mp4fInitObjectDescr 3106: the address of an Mp4fInitObjectDescr data structure 3130 representing the properties of the iods atom 778 contained within the moov atom 712, 754 contained within the mp4 binary file 700 represented by this QtInfo data structure 3100, 3. mediaDataSize 3108: an integer which specifies the sum of the sizes 724 of all of the mdat atoms 706, 718 in the mp4 binary file 700 represented by this QtInfo data structure 3100, 4. numMdatAtoms 3110: an integer which specifies the number of mdat atoms 706 contained in the mp4 binary file 700 represented by this QtInfo data structure 3100, 5. mdat array 3113: the address of a sequence of maxNumTracks 3103 mdat structures 3160. As an alternative, this may specify the address of a sequence of maxNumTracks 3103 addresses of mdat structures 3160. Each of the first numMdatAtoms mdat structures in this array represent one of the mdat atoms 706 contained in the mp4 binary file 700 represented by this QtInfo data structure 3100, 6. MoovHeader 3116: the address of a MoovHeader data structure 3170 representing the properties of the mvhd atom 772 contained within the moov atom 712, 754 contained within the mp4 binary file 700 represented by this QtInfo data structure 3100, 7. numTracks 3118: an integer specifying the number of trak atoms 790 in the mp4 binary file 700 represented by this QtInfo data structure 3100, 8. trak array 3120: the address a sequence of maxNumTracks 3103 trak structures 3200. As an alternative, this may specify the address of a sequence of maxNumTracks 3103 addresses of trak structures 3200. Each of the first numTrakAtoms trak structures in this array represent one of the trak atoms 790 contained within the moov atom 712, 754 contained within the mp4 binary file 700 represented by this QtInfo data structure 3100, 9. (UserData): the address of an optional data structure representing a possible udta atom outside the moov atom 712 in the mp4 binary file 700 represented by this QtInfo data structure 3100, An Mp4fInitObjectDescr data structure 3130 represents the properties of an iods atom 778, 800. As shown in FIG. 31B, an Mp4fInitObjectDescr data structure 3130 consists of the following components:

1. size 3133: an integer which indicates the number of bytes in the iods atom 778, 2. version 3136: an integer which indicates the values of the version 812 and flags 816 properties of the iods atom 800, 3. ObjectDescrID 3138: an integer which indicates the value of the ObjectDescriptorID property 836 of the Mp4fInitObjectDescr object 824 contained within the iods atom 800, 4. urlFlag 3140: a boolean value which indicates the value of the URL_Flag property 840 of the Mp4fInitObjectDescr object 824 contained within iods atom 800, 5. urlString 3143: If the value of the quantity "urlFlag" is "false", then the value of the quantity "urlString" is zero (null). Otherwise, the value of this quantity specifies the address of a null-terminated sequence bytes representing a character string.

6. inLineProfiles 3146: a boolean value which represents the value of the includeInlineProfilesFlag property 844 of the Mp4fInitObjectDescr object 824 contained within the iods atom 800, 7. ProfileLevels 3148: A set of five integers, ODProfileLevel, sceneProfileLevel, audioProfileLevel, visualProfileLevel, and graphicsProfileLevel, which indicate the values of the properties ODProfileLevelIndication 852, sceneProfileLevelIndication 856, audioProfileLevelIndication 860, visualProfileLevelIndication 864, and graphicsProfileLevelIndication 868 of the Mp4fInitObjectDescr object 824 contained within the iods atom 800, 8. maxNumEsIdIncs 3153: an integer which indicates the number of entries in the EsIdInc array 3156 (a value of "2" is sufficient), 9. numEsIdIncs 3153: an integer which indicates the number of ES_ID_Inc objects 872 in the Mp4fInitObjectDescr object 824 contained within the iods atom 800, 10. EsIdInc array 3156: a sequence of maxNumEsIdIncs EsIdInc structures, or the address of a sequence of maxNumEsIdIncs EsIdInc structures.

If the value of the URL_Flag property 840 is "0", then the value "false" is assigned to the component "urlFlag" 3140, otherwise the value "true" is assigned to the quantity "urlFlag" 3140. The value of the URL_Flag property 840 is expected to be "0".

If the value of the includeInlineProfilesFlag property 844 is "0", then the value "false" is assigned to the component "inLineProfiles" 3146, otherwise the value "true" is assigned to the quantity "inLineProfiles" 3146.

An EsIdInc structure consists of two integers, "size" and "trackID". These integers represent the values of the quantity "numBytes" 884 and "ES_ID" 888 in a corresponding ES_ID_Inc object 872, 876 within an Mp4fInitObjectDescr object 824.

Figure 31C:
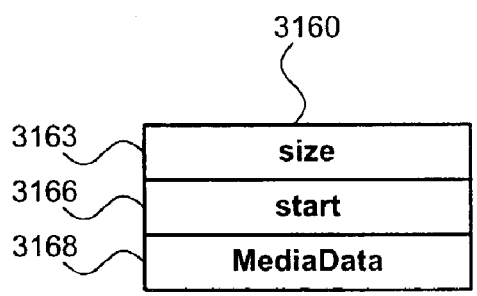
FIG. 31C shows an exemplary mdat structure.

Each mdat structure 3160 represents the properties of an mdat atom 706, 718. As shown in FIG. 31C, an mdat structure 3160 consists of the following components:

1. size 3163: The number of bytes comprising the mdat atom 706. This is the same as the "atom size" property 724 of the mdat atom 718.

2. start 3166: This specifies the number of bytes between the start of the mp4 binary file 700 and the first byte of the mdat atom 706.

3. MediaData 3168: This is the address of an array of (size-8) bytes which contains a copy of the set of chunks 736 contained within the mdat atom 706.

Figure 31D:
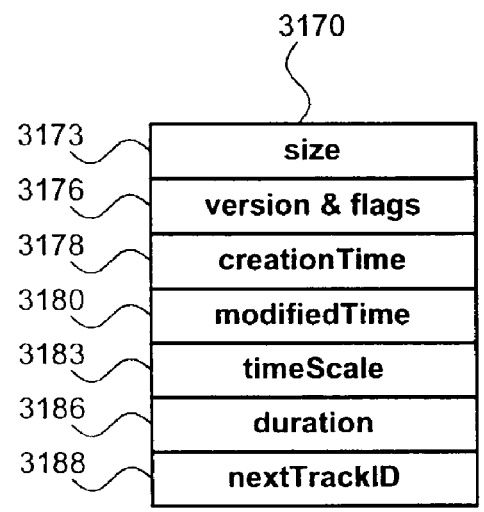
FIG. 31D shows an exemplary MoovHeader element.
Figure 32A:
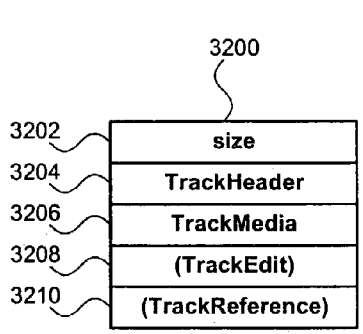
FIG. 32A shows an exemplary track structure.

A MoovHeader structure 3170 represents the properties of an mvhd atom 772. As shown in FIG. 31D, a MoovHeader structure 3170 consists of the following values:

1. size 3173: an integer which indicates the number of bytes in the mvhd atom 772, 2. version & flags 3176: a pair of integers which indicate the values of the "version" and "flags" properties of the mvhd atom 772, 3. creationTime 3178: an integer which indicates the value of the "creationTime" property of the mvhd atom 772, 4. modifiedTime 3180: an integer which indicates the value of the "modificationTime" property of the mvhd atom 772, 5. timescale 3183: an integer which indicates the value of the "timescale" property of the mvhd atom 772, 6. duration 3186: an integer which indicates the value of the "duration" property of the mvhd atom 772, 7. nextTrackID 3188: an integer which indicates the value of the "nextTrackID" property of the mvhd atom 772, Each trak structure 3200 represents the properties of a trak atom 790, 900. As shown in FIG. 32A, each trak structure 3200 may contain the following components:

1. size 3202: an integer which indicates the number of bytes 903 in the trak atom 900, 2. TrackHeader 3204: the address of a TrackHeader data structure 3212 which represents the properties of the tkhd atom 910 contained within the trak atom 900 represented by this trak structure 3200, 3. TrackMedia 3206: the address of a TrackMedia data structure 3226 which represents the properties of the mdia atom 912 contained within the trak atom 900 represented by this trak structure 3200, 4. TrackEdit 3208: the address of an optional TrackEdit data structure 3236 which represents the properties of an optional edts atom 945 contained within the trak atom 900 represented by this trak structure 3200, 5. TrackReference 3210: the address of an optional TrackReference data structure 3264 which represents the properties of an optional tref atom 940 contained within the trak atom 900 represented by this trak structure 3200.

Figure 32B:
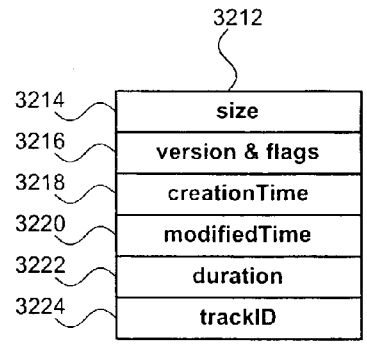
FIG. 32B shows an exemplary TrackHeader structure.
Figure 32C:
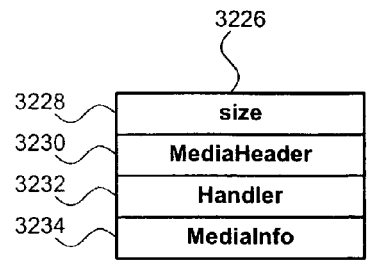
FIG. 32C shows an exemplary TrackMedia structure.

A TrackHeader structure 3212 represents the properties of a tkhd atom 910. As shown in FIG. 32B, a TrackHeader structure 3212 consists of the following components:

1. size 3214: an integer which indicates the number of bytes in the tkhd atom 910, 2. version & flags 3216: a pair of integers which indicate the values of the "version" and "flags" properties of the tkhd atom 910, 3. creationTime 3218: an integer which indicates the value of the "creationTime" property of the tkhd atom 910, 4. modifiedTime 3220: an integer which indicates the value of the "modificationTime" property of the tkhd atom 910, 5. duration 3222: an integer which indicates the value of the "duration" property of the tkhd atom 910, 6. trackID 3224: an integer which indicates the value of the "trackID" property of the tkhd atom 910, A TrackMedia structure 3226 represents the properties of an mdia atom 912. As shown in FIG. 32C, a TrackMedia structure 3226 consists of the following components:

1. size 3228: an integer which indicates the number of bytes in the mdia atom 912, 2. MediaHeader 3230: the address of a MediaHeader structure 3300 which represents the properties of mdhd atom 915 contained within the mdia atom 912, 3. Handler 3232: the address of a Handler structure 3320 which represents the properties of the hdlr atom 918 contained within the mdia atom 912, 4. MediaInfo 3234: the address of a MediaInfo structure 3333 which represents the minf atom 920 contained within the mdia atom 912.

Figure 32D:
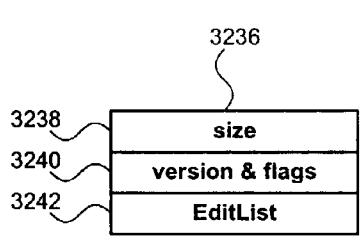
FIG. 32D shows an exemplary TrackEdit structure.

A TrackEdit structure 3236 represents the properties of an edts atom 945. As shown in FIG. 32D, a TrackEdit structure 3236 contains the following components:

1. size 3238: an integer which indicates the number of bytes in the edts atom 945, 2. version & flags 3240: a pair of integers which indicate the values of the "version" and "flags" properties of the edts atom 945, 3. EditList 3242: the address of an EditList structure 3244 representing the elst atom 948 contained in the edts atom 945.

Figure 32E:
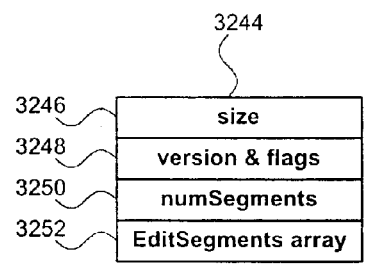
FIG. 32E shows an exemplary EditList structure.

A EditList structure 3244 represents the properties of an elst atom 948. As shown in FIG. 32E, an EditList structure 3244 consists of the following components:

1. size 3246: an integer which indicates the number of bytes in the elst atom 948.

2. version & flags 3248: a pair of integers which indicate the values of the "version" and "flags" properties of the elst atom 948, 3. numSegments 3250: an integer which specifies the number of EditSegment structures 3256 in the EditSegment array 3252, 4. EditSegment array 3252: this may be a sequence of numSegments EditSegment structures 3256 or a sequence of numSegments addresses of EditSegment structures 3256.

Figure 32F:
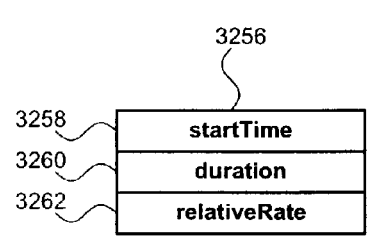
FIG. 32F shows an exemplary EditSegment structure.

Each EditSegment structure 3256 represents the properties of an "edit segment" contained within the elst atom 948 represented by the EditList structure 3244 which contains this EditSegment structure 3256. As shown in FIG. 32F, each EditSegment structure 3256 consists of three integers: startTime 3258, duration 3260, and relativeRate 3262. Each of these integers represents a like-named property of the corresponding edit segment.

Figure 32G:
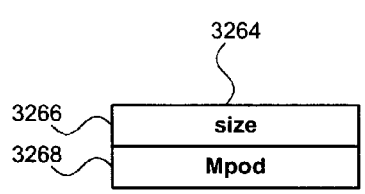
FIG. 32G shows an exemplary TrackReference structure.

A TrackReference structure 3264 represents the properties of a tref atom 940. As shown in FIG. 32G, a TrackReference structure 3264 consists of the following components:

1. size 3266: an integer which indicates the number of bytes in the tref atom 940, 2. Mpod 3268: the address of an Mpod structure 3270 representing the mpod atom 942 contained within the tref atom 940.

Figure 32H:
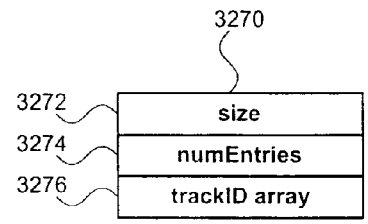
FIG. 32H shows an exemplary Mpod structure.

An Mpod structure 3270 represents the properties of an mpod atom 942. As shown in FIG. 32H, an Mpod structure 3270 consists of the following components:

1. size 3272: an integer which indicates the number of bytes in the mpod atom 942, 2. numEntries 3274: an integer which specified the number of entries in the trackID array 3276, 3. trackID array 3276: the address of a sequence of numEntries integers. Each of these integers represents one of the trackID values specified within the mpod atom 942.

Figure 32I:
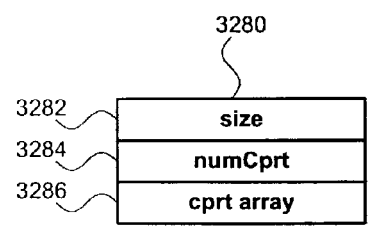
FIG. 32I shows an exemplary UserData structure.

A UserData structure 3280 represents the properties of a udta atom 784. As shown in FIG. 32I, a UserData structure 3280 consists of the following components:

1. size 3282: an integer which indicates the number of bytes in the udta atom 784, 2. numCprt 3284: an integer which specifies the number of members to the cprt array 3286, 3. cprt array 3286: the address of a sequence of cprt structures 3290, or a sequence of addresses of cprt structures 3290.

Figure 32J:
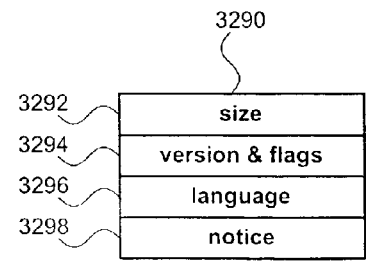
FIG. 32J shows an exemplary cprt structure.

A cprt structure 3290 represents the properties of a cprt atom. As shown in FIG. 32J, a cprt structure 3290 consists of the following components:

1. size 3282: an integer which indicates the number of bytes in the cprt atom, 2. version & flags 3294: a pair of integers which indicate the values of the "version" and "flags" properties of the cprt atom, 3. language 3296: an integer which indicates the value of the "language" property of the cprt atom, and 4. notice 3298: a null-terminated string which indicates the message specified in the cprt atom.

Figure 33A:
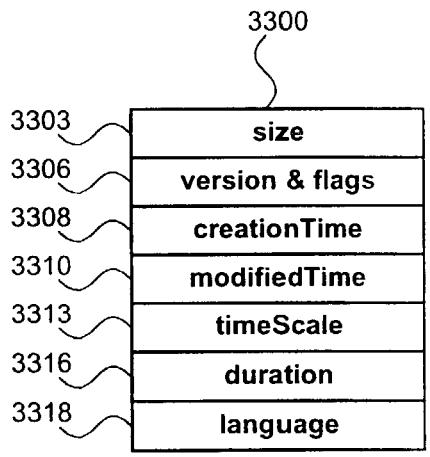
FIG. 33A shows an exemplary MediaHeader structure.
Figure 33B:
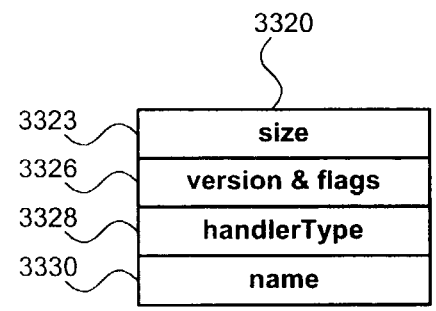
FIG. 33B shows an exemplary Handler structure.

A MediaHeader structure 3300 represents the properties of an mdhd atom 915. As shown in FIG. 33A, a MediaHeader structure 3300 includes the following values:

1. size 3303: an integer which indicates the number of bytes in the mdhd atom 915, 2. version & flag 3306: a pair of integers which indicate the values of the "version" and "flags" properties of the mdhd atom 915, 3. creationTime 3308: an integer which indicates the value of the "creationTime" property of the mdhd atom 915, 4. modifiedTime 3310: an integer which indicates the value of the "modificationTime" property of the mdhd atom 915, 5. timeScale 3313: an integer which indicates the value of the "timeScale" property of the mdhd atom 915, 6. duration 3316: an integer which indicates the value of the "duration" property of the mdhd atom 915, 7. language 3318: an integer which indicates the value of the "language" property of the mdhd atom 915, A Handler structure 3320 represents the properties of a hdlr atom 918. As shown in FIG. 33B, a Handler structure 3320 includes the following values:

1. size 3323: an integer which indicates the number of bytes in the hdlr atom 918, 2. version & flags 3326: a pair of integers which indicate the values of the "version" and "flags" properties of the hdlr atom 918, 3. handlerType 3328: a 4-character tag which specifies a handler type property of the hdlr atom 918, and 4. name 3330: the address of a null-terminated string provided for descriptive or diagnostic purposes.

Figure 33C:
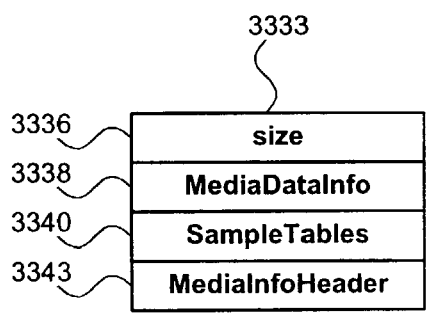
FIG. 33C shows an exemplary MediaInfo structure.

A MediaInfo structure 3333 represents the properties of a minf atom 920. As shown in FIG. 33C, a MediaInfo structure 3333 includes the address of a MediaDataInfo structure 3338, 3350, the address of a SampleTables structure 3340, 3400, and the address of a MediaInfoHeader structure 3343. The MediaInfoHeader structure 3343 represents one of the following media information header atoms 936:

1. nmhd atom (for the scene description stream, sdsm, or the object descriptor stream, odsm), 2. vmhd atom (for a visual stream), or 3. smhd atom (for an audio stream).

Figure 33D:
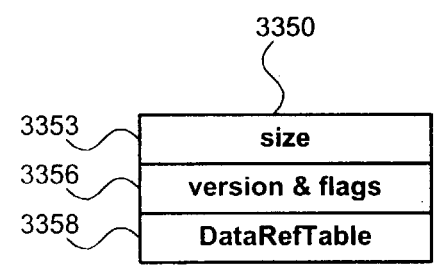
FIG. 33D shows an exemplary MediaDataInfo structure.

A MediaInfoHeader structure 3343 includes the following values:

1. size: an integer which indicates the number of bytes in the media information header atom 936, 2. version & flags: a pair of integers which indicate the values of the "version" and "flags" properties of the media information header atom 936, A MediaDataInfo structure 3350 represents the properties of a dinf atom 924. As shown in FIG. 33D, a MediaDataInfo structure 3350 includes the following components:

1. size 3353: an integer which indicates the number of bytes in the dinf atom 924, 2. version & flags 3356: a pair of integers which indicate the values of the "version" and "flags" properties of the dinf atom 924, 3. DataRefTable 3358: the address of a DataRefTable data structure 3360.

Figure 33E:
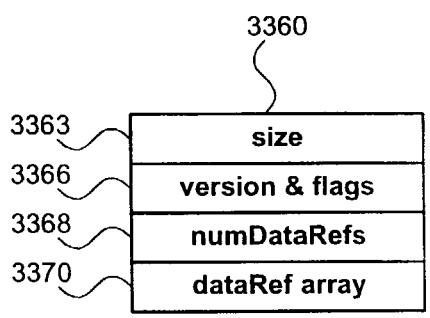
FIG. 33E shows an exemplary DataRefTable structure.

A DataRefTable structure 3360 represents the properties of a dref atom 927. As shown in FIG. 33E, a DataRefTable structure 3360 includes the following components:

1. size 3363: an integer which indicates the number of bytes in the dref atom 927, 2. version & flags 3366: a pair of integers which indicate the values of the "version" and "flags" properties of the dref atom 927, 3. numDataRefs 3368: an integer which indicates the number of entries in the dataRef array 3370, and 4. dataRef array 3370: the address of a sequence of dataRef data structures 3380.

Figure 33F:
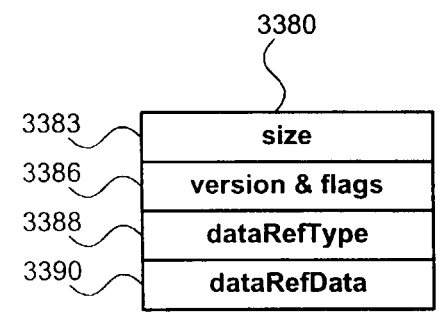
FIG. 33F shows an exemplary dataRef structure.

A dataRef structure 3380 represents an entry in a data reference table. As shown in FIG. 33F, a dataRef structure 3380 includes the following components:

1. size 3383: an integer which indicates the number of bytes in the data reference structure represented by this dataRef structure 3380, 2. version & flags 3386: a pair of integers which indicate the values of the "version" and "flags" properties of the data reference structure, 3. dataRefType 3388: a sequence of four characters which indicate the type of data reference structure represented by this dataRef structure 3380, and 4. dataRefData 3390: the address of a sequence of size-12 bytes representing the remainder of the data reference structure.

Figure 34A:
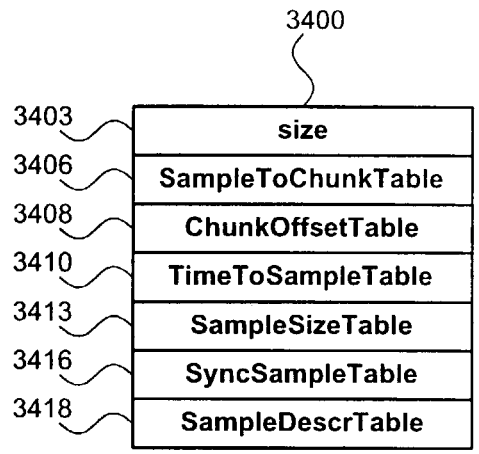
FIG. 34A shows an exemplary SampleTables structure.

A SampleTables structure 3400 represents the properties of an stbl atom 933, 950. As shown in FIG. 34A, a SampleTables structure 3400 includes the following components:

1. size 3403: an integer which indicates the number of bytes 954 in the stbl atom 950, 2. SampleToChunkTable 3406: the address of a data structure which represents the contents of an stsc atom 960, 3. ChunkOffsetTable 3408: the address of a data structure which represents the contents of an stco atom 966, 4. TimeToSampleTable 3410: the address of a data structure which represents the contents of an stts atom 963, 5. SampleSizeTable 3413: the address of a data structure which represents the contents of an stsz atom 970, 6. SyncSampleTable 3416: the address of an optional data structure which represents the contents of an stss atom 974, 7. SampleDescriptionTable 3418: the address of a data structure which represents the contents of an stsd atom 978.

Figure 34B:
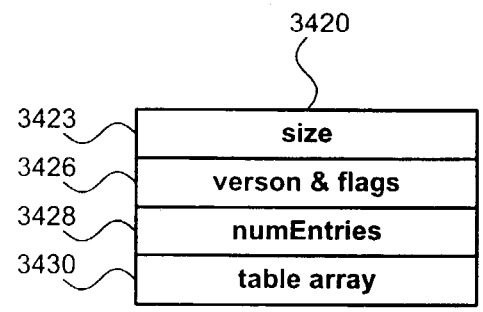
FIG. 34B shows an exemplary sample table structure.

Except for the SampleSizeTable 3413, each of the sample tables contained in the SampleTables structure 3400 has the following members, as shown in FIG. 34B 3420:

1. size 3423: an integer which indicates the number of bytes in the sample table atom represented by this data structure, 2. version & flags 3426: a pair of integers which indicate the values of the "version" and "flags" properties of the sample table atom represented by this data structure, 3. numEntries 3428: an integer which indicates the number of entries in the table array 3430, and 4. table array 3430: the address of an array of integers or data structures.

Figure 34C:
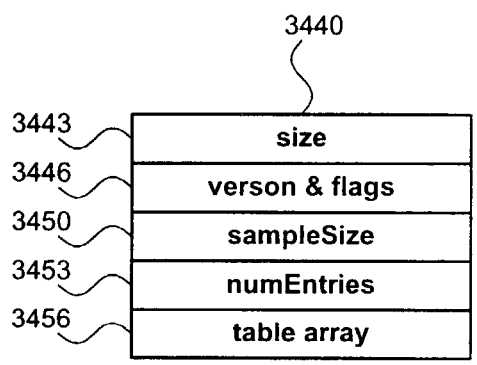
FIG. 34C shows an exemplary SampleSizeTable structure.

As shown in FIG. 34C, the SampleSizeTable structure 3440 is similar to the other sample tables except that it includes and additional member, "sampleSize" 3450, an integer which specifies a fixed sample size for all samples.

If the value of the member "samplesize" 3450 is non-zero, then the member "table array" 3456 is omitted.

The structure of the member "table array" depends on the type of sample table. In the case of the ChunkOffsetTable structure 3408, the SampleSizeTable structure 3413, and the SyncSampleTable stucture 3416, this member represents a sequence of 32-bit integers.

Figure 34D:
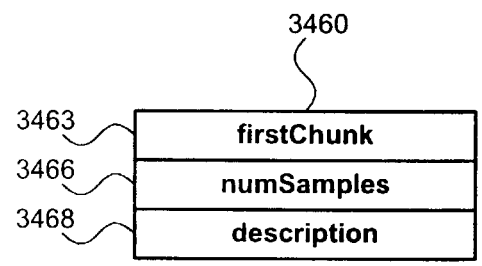
FIG. 34D shows an exemplary SampleToChunk structure.

In the case of the SampleToChunkTable structure 3406, the table array represents an array of SampleToChunk data structures 3460. As shown in FIG. 34D, each SampleToChunk data structure 3460 consists of three integer members, "firstChunk" 3463, "numSamples" 3466, and "description" 3468.

Figure 34E:
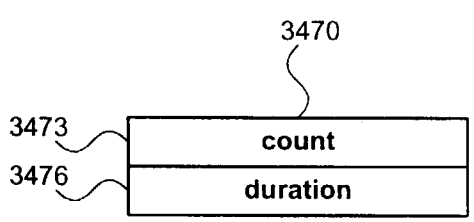
FIG. 34E shows an exemplary TimeToSample structure.

In the case of the TimeToSampleTable structure 3410, the table array represents an array of TimeToSample data structures 3470. As shown in FIG. 34E, each TimeToSample data structure 3470 consists of two integer members, "count" 3473 and "duration" 3476.

Figure 34F:
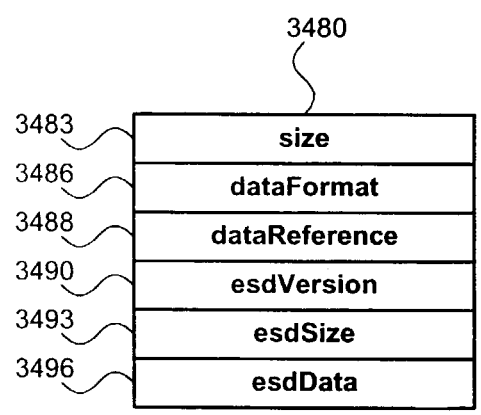
FIG. 34F shows an exemplary SampleDescription structure.

In the case of the SampleDescriptionTable structure 3418, the table array represents an array of SampleDescription data structures 3480. As shown in FIG. 34F, each SampleDescription data structure 3480 consists of the following six members:

1. size 3483: an integer which indicates the number of bytes in the sample description table entry represented by this SampleDescription structure 3480, 2. dataFormat 3486: a four-character identifier ("mp4s", "mp4a", or "mp4v") which specifies the type of mp4* atom 982 represented by this SampleDescription structure 3480, 3. dataReference 3488: an integer representing the dataReference property of the mp4* atom 982 represented by this SampleDescription structure 3480, 4. esdversion 3490: an integer which indicates the version property of the "esds" atom 986 contained in the mp4* atom 982 represented by this SampleDescription structure 3480, 5. esdSize 3493: an integer which indicates the number of bytes in the "esds" atom 986 contained in the mp4* atom 982 represented by this SampleDescription structure 3480, 6. esdData 3496: the address of an array of bytes containing a copy of the ES_Descr object structure 990 contained within the "esds" atom 986 contained in the mp4* atom 982 represented by this SampleDescription structure 3480.

Creation of a QtInfo Structure Based on an mp4 Binary File

Figure 35:
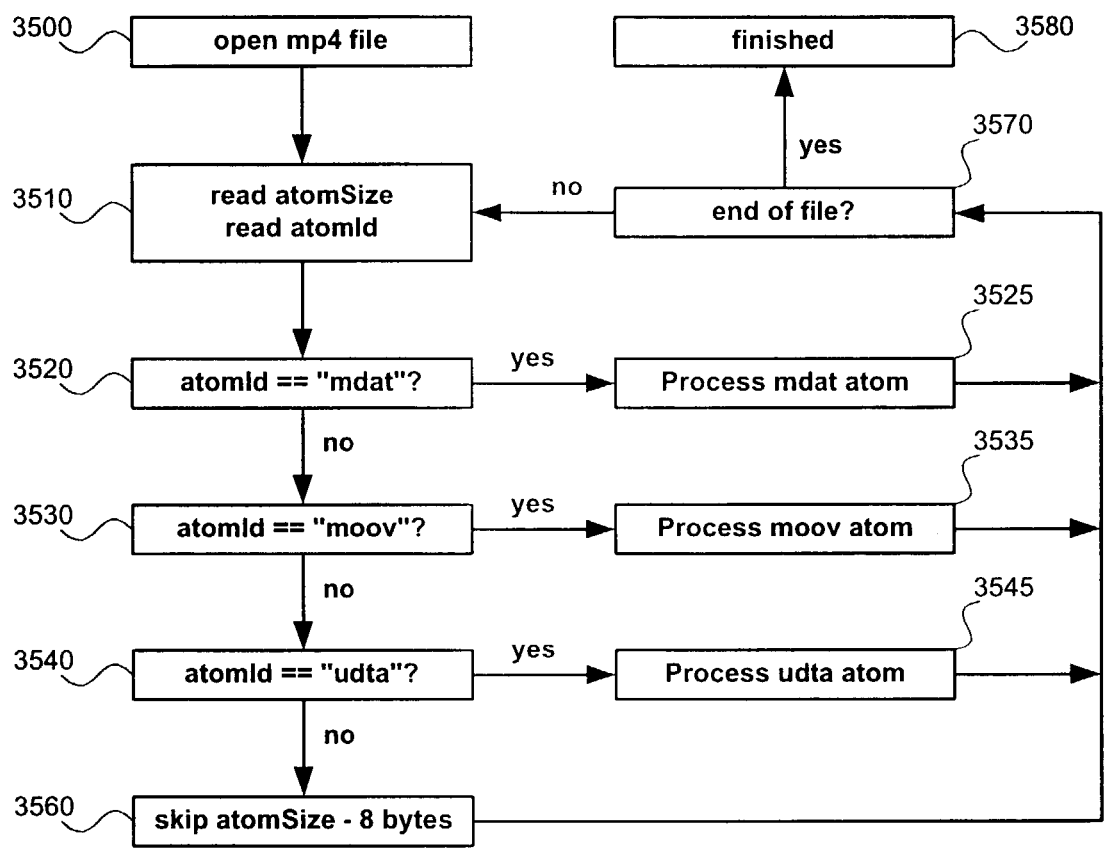
FIG. 35 shows an exemplary mp4 file interpretation flowchart.

The process of creating a QtInfo data structure based on an mp4 binary file starts with the creation of a new empty QtInfo data structure based on a particular value of the quantity "maxNumTracks". The value of the quantity "maxNumTracks" may be a predetermined constant such as 128 which is sufficiently large to exceed the actual number of tracks in a particular mp4 binary file, or it may be determined by opening the mp4 binary file and counting the number of trak atoms contained within the file. After the new empty QtInfo structure has been created, the mp4 file is interpreted as shown in FIG. 35. This process consists of the following steps:

1. Operation 3500 to open the mp4 binary file (for reading).

2. Operation 3510 to read a 32-bit integer from the mp4 file and assign the value of this integer to the quantity "atomSize". Then read a second 32-bit integer from the mp4 file and assign the value of this integer to the quantity "atomId".

3. Operation 3520 to compare the value of the quantity "atomId" to the value "mdat".

4. Operation 3525, if the value of the quantity "atomId" corresponds to "mdat", to perform the procedure "Process mdat atom".

5. Operation 3530 to compare the value of the quantity "atomId" to the value "moov".

6. Operation 3535, if the value of the quantity "atomId" corresponds to "moov", to perform the procedure "Process moov atom".

7. Operation 3540 to compare the value of the quantity "atomId" to the value "udta".

8. Operation 3545, if the value of the quantity "atomId" corresponds to "udta", to perform the procedure "Process udta atom" followed by operation 3570 below.

9. Operation 3560 to, otherwise, skip atomSize-8 bytes in the mp4 file. That is, read this number of bytes from the mp4 file, but do nothing with the resulting values.

10. Operation 3570 to test the current file position for the mp4 binary file 700.

11. Operation 3580 finishes the process if the current file position for the mp4 binary file 700 corresponds to the end of file condition (number of bytes read equals number of bytes in the complete mp4 file). Otherwise, repeat operation 3510 through operation 3570.

Figure 36:
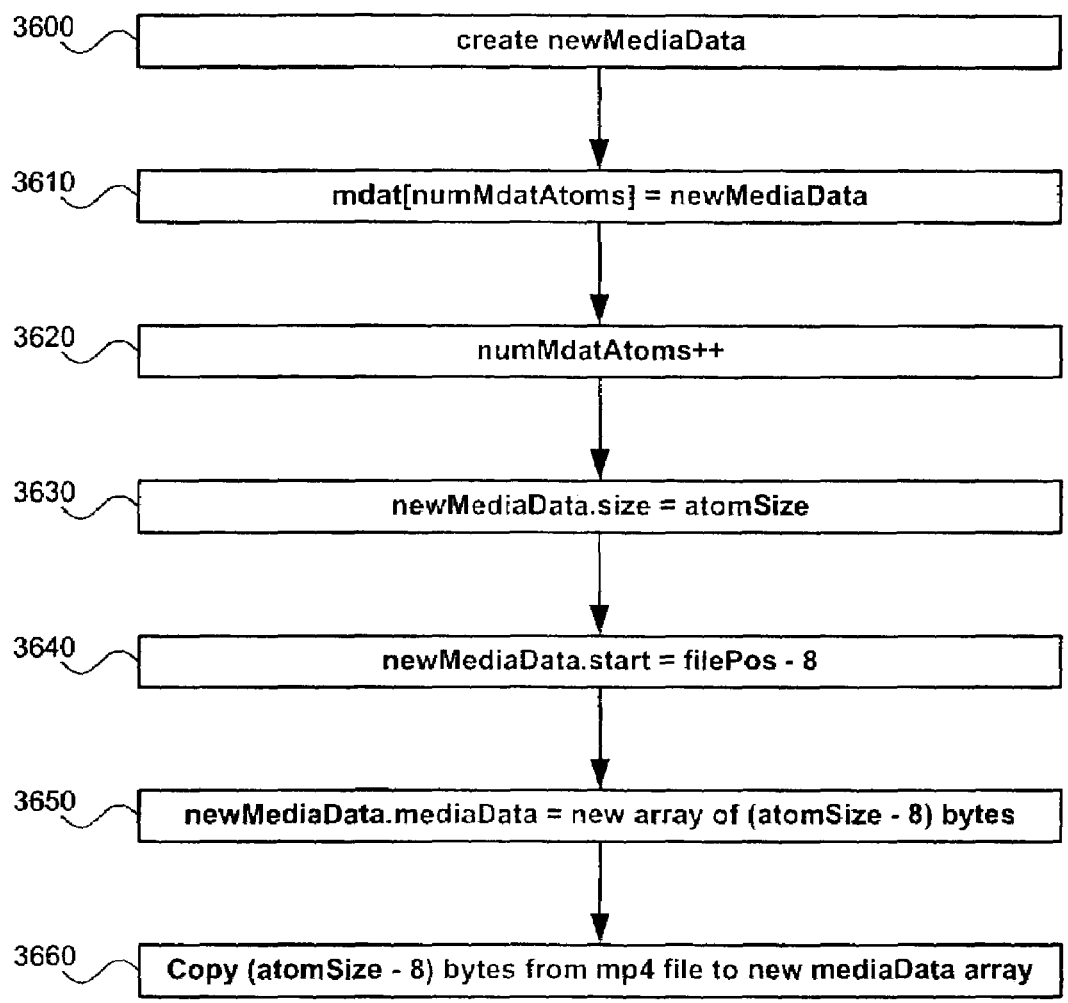
FIG. 36 shows an exemplary mdat atom processing flowchart.

As shown in FIG. 36 the procedure "Process mdat atom" operation 3530 consists of the following steps:

1. Operation 3600 to create a new MediaData structure "newMediaData" 3160.

2. Operation 3610 to assign the address of this new MediaData structure 3160 to entry numMdatAtoms in the mdat array 3113 in the QtInfo structure 3100.

3. Operation 3620 to increment the value of numMdatAtoms 3110 by one.

4. Operation 3630 to assign the value of the quantity "atomSize" to the member "size" 3163 in the new MediaData structure 3160.

5. Operation 3640 to assign the value of the current file pointer (minus 8) to the member "start" 3166 in the new MediaData structure 3160.

6. Operation 3650 to create a new byte array with (atomSize-8) bytes and assign the address of this array to member "MediaData" 3168 in the new MediaData structure 3160.

7. Operation 3660 to read (atomSize-8) bytes from the mp4 binary file and copy the results into the new byte array specified by member "MediaData" 3168 in the new MediaData structure 3160.

Figure 37:
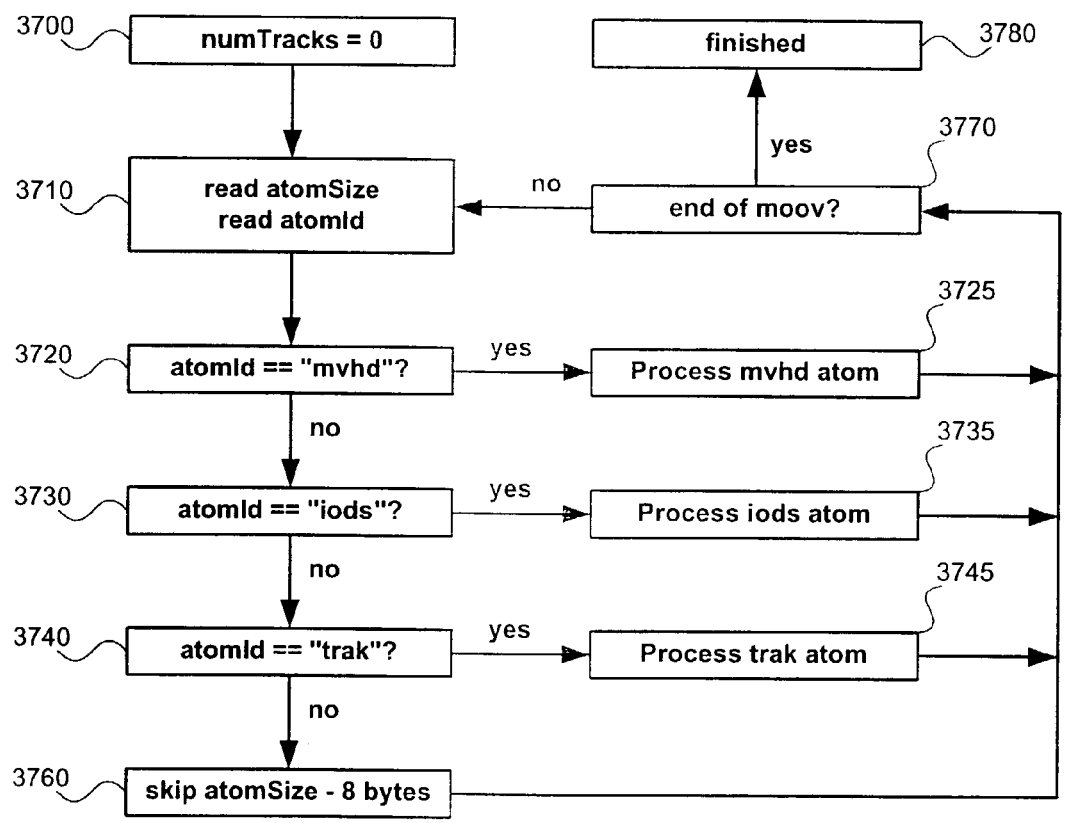
FIG. 37 shows an exemplary moov atom processing flowchart.

As shown in FIG. 37, the procedure "Process moov atom" operation 3550 consists of the following steps:

1. Operation 3700 to assign the value zero to member "numTracks" 3113 in the QtInfo structure 3100.

2. Operation 3710 to read a 32-bit integer from the mp4 file and assign the value of this integer to the quantity "atomSize". Then read a second 32-bit integer from the mp4 file and assign the value of this integer to the quantity "atomId".

3. Operation 3720 to compare the value of the quantity "atomId" to the value "mvhd".

4. Operation 3725, if the value of the quantity "atomId" corresponds to "mvhd", to perform the procedure "Process mvhd atom". Then continue with operation 3770 below.

5. Operation 3730 to compare the value of the quantity "atomId" to the value "iods".

6. Operation 3735, if the value of the quantity "atomId" corresponds to "iods", to perform the procedure "Process iods atom". Then continue with operation 3770 below.

7. Operation 3740 to compare the value of the quantity "atomId" to the value "trak".

8. Operation 3745, if the value of the quantity "atomId" corresponds to "trak", to perform the procedure "Process trak atom". Then continue with operation 3770 below.

9. Operation 3760 to, otherwise, skip atomSize-8 bytes in the mp4 file. That is, read this number of bytes from the mp4 file, but do nothing with the resulting values.

10. Operation 3770 checks for reaching the end of the moov atom 754. The condition of reaching the end of the moov atom 754 is satisfied when the number of data bytes read from the mp4 file since the start of the moov atom 754 equals the value of the quantity atomSize determined in operation 3710.

12. Operation 3780 finishes this process if the end of the moov atom (754) has been reached. Otherwise, repeat operation 3710 through operation 3770.

The procedure "Process user data atom" may be used to represent the contents of an optional udta atom 784 in a UserData structure 3280. This information is not required for the final XMT-A file, consequently it is sufficient to simply skip over the remaining portion (atomSize minus 8 bytes) of any udta atom 784.

Alternatively, the following steps may be used to interpret the contents of a udat atom 784:

1. Create a new UserData data structure 3280.

2. Assign the address of this new UserData data structure 3280 to the member UserData 3123 in the QtInfo structure 3100.

3. Assign the value of the quantity "atomSize" to the member "size" 3282 in this new UserData data structure 3280.

4. Assign the value "0" to member "numcprt" 3284 of the UserData structure 3280.

5. Repeat the procedure "Read Copyright atom" until reaching the end of the udta atom 784. The condition of reaching the end of the udta atom 784 is satisfied when the number of data bytes read from the mp4 file since the start of the udta atom 784 equals the value of the member "size" 3282.

The procedure "Read Copyright atom" consists of the following steps:

1. Read a 32-bit integer from the mp4 file and assign the value of this integer to the quantity "atomSize". Then read a second 32-bit integer from the mp4 file and assign the value of this integer to the quantity "atomId".

2. Compare the value of the quantity "atomId" to the value "cprt".

3. If the value of the quantity "atomId" does not correspond to "cprt", skip atomSize-8 bytes of data in the mp4 file and continue with step 5 of the procedure "Process user data atom". Otherwise perform the following steps.

4. Create a new cprt structure "newCprt" 3290.

5. Assign the address of this new cprt structure to entry numCprt in the cprt array member 3286 of the UserData structure 3280.

6. Assign the value of the quantity "atomSize" to member "size" (3292) of the new cprt structure 3290.

7. Read a 32-bit integer from the mp4 file and assign the value of this integer to member "version & flags" 3294 of the new cprt structure 3290.

8. Read a 16-bit integer from the mp4 file and assign the value of this integer to member "language" 3296 of the new cprt structure 3290.

9. Read a null-terminated sequence of bytes from the mp4 file and copy these bytes to a new string quantity "newNotice".

10. Assign the address of the new string quantity "newNotice" to member "notice" 3298 of the new cprt structure 3290.

11. Increment the value of member numCprt 3284 of the UserData structure 3280 by 1.

The procedure "Process mvhd atom" operation 3725 consists of the following steps:

1. Create a new MoovHeader data structure 3170.

2. Assign the address of this new MoovHeader data structure 3170 to member MoovHeader 3116 in the QtInfo structure 3100.

3. Assign the value of the quantity "atomSize" to member "size" 3173 in this new MoovHeader data structure 3170.

4. Read a 32-bit integer from the mp4 file and assign the result to member "version & flags" 3176 in the MoovHeader structure 3170.

5. Read a 32-bit integer from the mp4 file and assign the result to member "creationTime" 3178 in the MoovHeader structure 3170.

6. Read a 32-bit integer from the mp4 file and assign the result to member "modificationTime" 3180 in the MoovHeader structure 3170.

7. Read a 32-bit integer from the mp4 file and assign the result to member "timeScale" 3183 in the MoovHeader structure 3170.

8. Read a 32-bit integer from the mp4 file and assign the result to member "duration" 3186 in the MoovHeader structure 3170.

9. Read 76 bytes in the mp4 file and ignore the resulting values.

10. Read a 32-bit integer from the mp4 file and assign the result to member "nextTrackID" 3188 in the MoovHeader structure 3170.

The procedure "Process iods atom" consists of the following steps:

1. Create a new Mp4fInitObjectDescr data structure 3130.

2. Assign the address of this new Mp4fInitObjectDescr data structure 3130 to member Mp4fInitObjectDescr 3106 in the QtInfo structure 3100.

3. Assign the value of "atomSize" to member "size" 3133 in the Mp4fInitObjectDescr structure 3130.

4. Read a 32-bit integer 812, 816 from the mp4 file and assign the result to member "version" 3136 in the Mp4fInitObjectDescr structure 3130.

5. Read an 8-bit integer 828 from the mp4 file and verify that the result has the expected value of "16" (MP4_IOD_Tag).

6. Read an 8-bit integer 832 from the mp4 file and assign the result to the quantity "objSize".

7. If the value of objsize is greater than 127, repeat step 6.

8. Read a 16-bit integer 836 to 848 from the mp4 file and assign the result to the quantity "odidandflags".

9. Assign the value of the high-order 10 bits of the value "odidandflags" 836 to member "ObjectDescriptorID" 3138 in the Mp4fInitObjectDescr structure 3130.

10. If the result of the logical operation ((value of "odidandflags") and 32) is zero, assign the value "0" to member "urlFlag" 3140 in the Mp4fInitObjectDescr structure 3130. Otherwise, assign the value "1" to member "urlFlag" 3140 in the Mp4fInitObjectDescr structure 3130.

11. If the result of the logical operation ((value of "odidandflags") and 16) is zero, assign the value "0" to member "inlineProfiles" 3146 in the Mp4fInitObjectDescr structure 3130. Otherwise, assign the value "1" to member "inlineprofiles" 3146 in the Mp4fInitObjectDescr structure 3130.

12. Assign the value "2" to member "maxNumEsIdIncs" 3150 in the Mp4fInitObjectDescr structure 3130.

13. Assign the value zero to member numEsIdIncs 3153 in the Mp4fInitObjectDescr structure 3130.

14. Create an array of maxNumEsIdIncs address values.

15. Assign the address of this array to member "EsIdInc array" 3156 in the Mp4fInitObjectDescr structure 3130.

16. If the value of member urlFlag is "1", perform the procedure "Process URL string". Otherwise (the value of urlFlag is "0"), perform the procedure "Process profile-level indicators".

The procedure "Process URL string" consists of the following steps:

1. Read a null-terminated sequence of bytes from the mp4 file,

2. Save these bytes in a new byte array,

3. Assign the address of this new byte array to member urlString 3143 in the Mp4fInitObjectDescr structure 3130.

The procedure "Process profile-level indicators" consists of the following steps:

1. Assign the value zero to the quantity urlString 3143 in the Mp4fInitObjectDescr structure 3130.

2. Read five profile-level indication values 852 to 868 from the mp4 file and assign each to a corresponding member of the Mp4fInitObjectDescr structure 3130. Each of these profile-level values consists of a single byte and these 5 values are represented by the "ProfileLevels" 3146 portion of the Mp4fInitObjectDescr structure 3130.

3. Repeat the procedure "Process EsIdInc object" until the end of the iods atom 800 is reached. The condition of reaching the end of the iods atom 800 is satisfied when the number of data bytes read from the mp4 file since the start of the iods atom 800 equals the size 804, 3133 of the iods atom 800.

The procedure "Process EsIdInc object" consists of the following steps:

1. Read the one-byte object tag 880 from the mp4 file.

2. Verify that the value of the object tag has the expected value (14, "EsIdIncTag").

3. Create a new EsIdInc structure. This structure contains two member values, "size" and "trackID".

4. Assign the address of this new EsIdInc structure to entry numEsIdIncs in the EsIdInc array 3156 in the Mp4fInitObjectDescr structure 3130, 5. Read the number of bytes 884 comprising the remainder of the EsIdInc object and assign the result to member "size" member of the new EsIdInc structure.

6. Read a 32-bit integer from the mp4 file 888 and assign the result member "trackID" of the new EsIdInc structure.

7. Increment the value of member numEsIdIncs 3153 by one.

Figure 38:
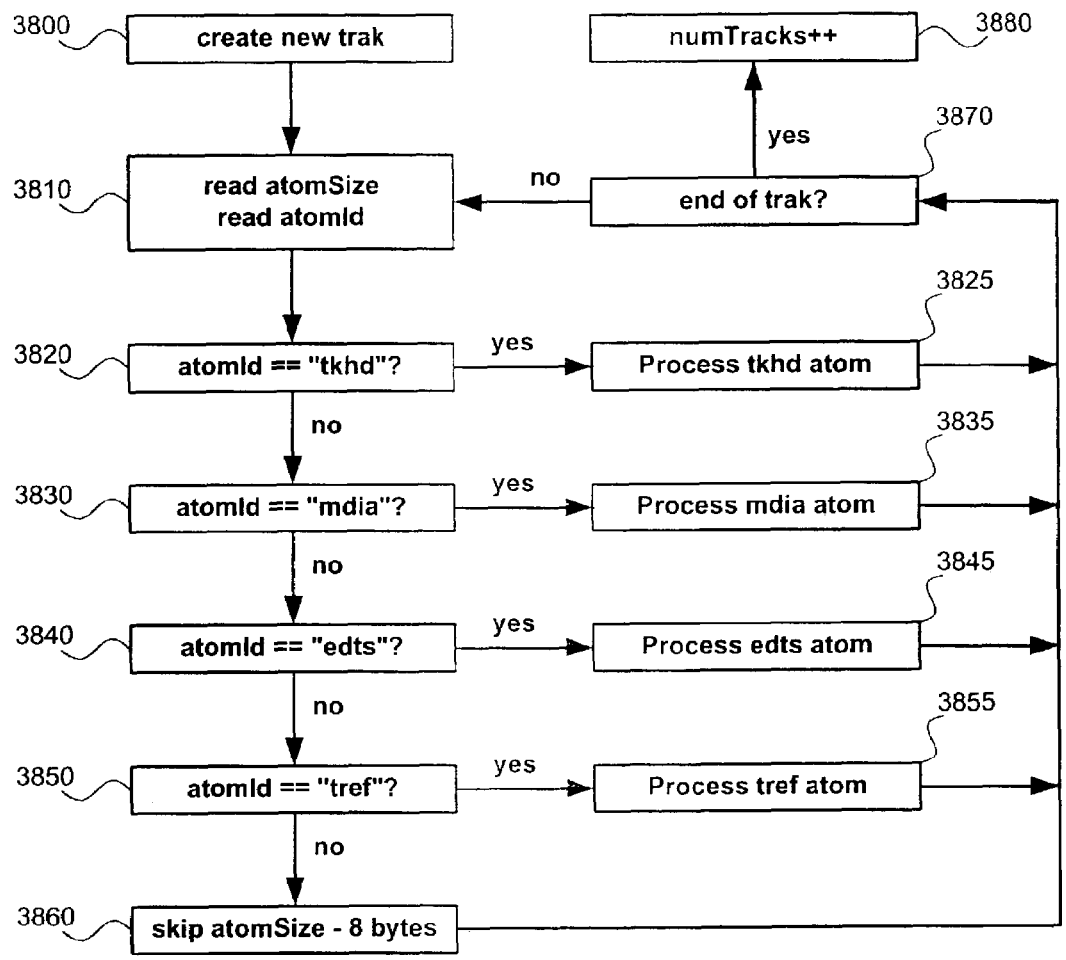
FIG. 38 shows an exemplary trak atom processing flowchart.

As shown in FIG. 38, the procedure "Process trak atom" operation 3745 consists of the following steps:

1. Operation 3800 to create a new trak data structure 3200. Assign the address of this new trak structure to entry numTracks in the trak array member 3120 of the current QtInfo structure 3100. Assign the value of the quantity "AtomSize" to member "size" 3202 of the new trak structure 3200.

2. Operation 3810 to read a 32-bit integer from the mp4 file and assign the value of this integer to the quantity "atomSize". Then read a second 32-bit integer from the mp4 file and assign the value of this integer to the quantity "atomId".

3. Operation 3820 to compare the value of the quantity "atomId" to the value "tkhd".

4. Operation 3825 to, if the value of the quantity "atomId" corresponds to "tkhd", perform the procedure "Process track header (tkhd) atom". Then continue with operation 3870.

5. Operation 3830 to compare the value of the quantity "atomId" to the value "mdia".

6. Operation 3835 to, if the value of the quantity "atomId" corresponds to "mdia", perform the procedure "Process track media (mdia) atom". Then continue with operation 3870.

7. Operation 3840 to compare the value of the quantity "atomId" to the value "edts".

8. Operation 3845 to, if the value of the quantity "atomId" corresponds to "edts", perform the procedure "Process track edit (edts) atom". Then continue with operation 3870.

9. Operation 3850 to compare the value of the quantity "atomId" to the value "tref".

10. Operation 3855 to, if the value of the quantity "atomId" corresponds to "tref", perform the procedure "Process track reference (tref) atom". Then continue with operation 3870.

11. Operation 3860 to, otherwise, skip atomSize-8 bytes in the mp4 file. That is, read atomSize-8 bytes from the mp4 file and ignore the resulting values.

12. Operation 3870 to check for reaching the end of the trak atom 900. The condition of reaching the end of the trak atom 900 is satisfied when the number of data bytes read from the mp4 file since the start of the trak atom 900 equals the value of the member "size" 3202 for the current trak structure 3200.

13. Operation 3880 to, if the end of the trak atom 900 has been reached, increment the value of numTracks by 1. Otherwise, repeat operation 3810 through operation 3870.

Figure 39:
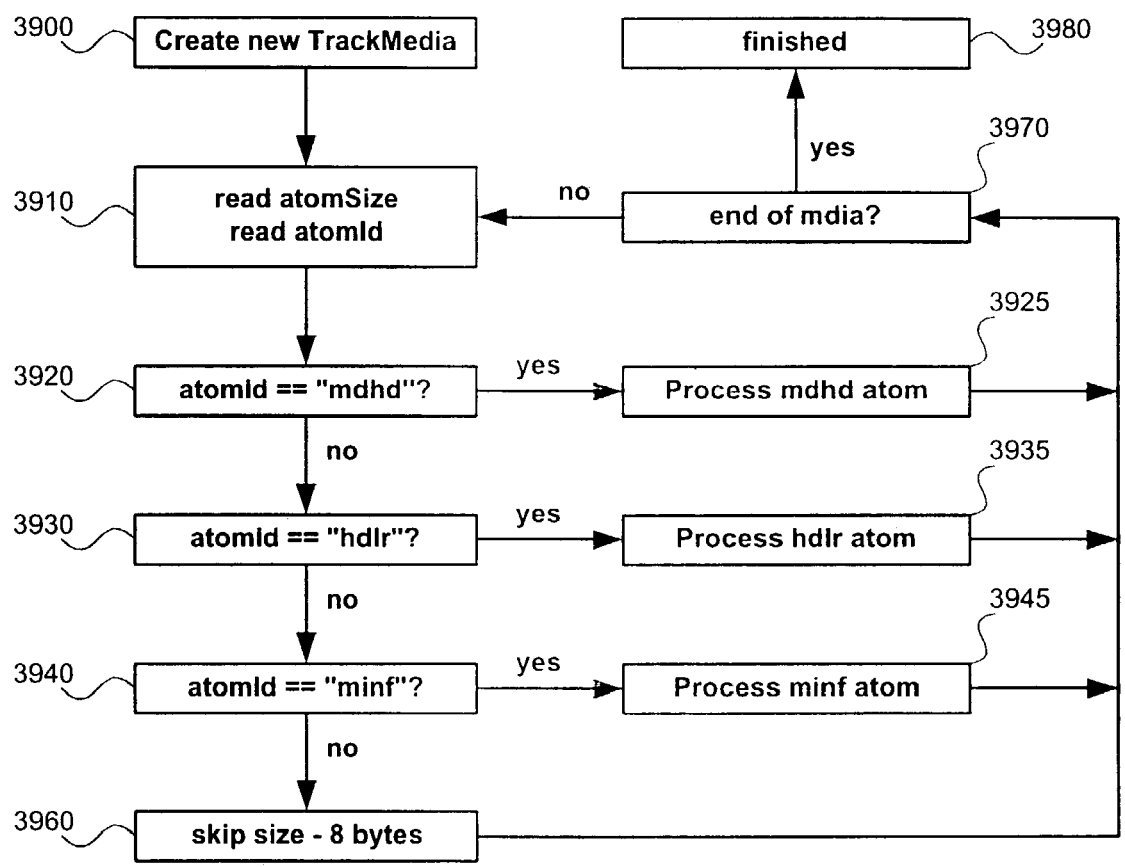
FIG. 39 shows an exemplary track media atom processing flowchart.

The procedure "Process track header atom" consists of the following steps:

1. Create a new TrackHeader data structure 3212.
2. Assign the address of this new TrackHeader data structure 3212 to member TrackHeader 3204 in the current trak structure 3200.
3. Assign the value of the quantity "atomSize" to member "size" 3214 in the TrackHeader structure 3212.
4. Read a 32-bit integer from the mp4 file and assign the result to the member "version & flags" 3216 in the TrackHeader structure 3212.
5. Read a 32-bit integer from the mp4 file and assign the result to the member "creationTime" 3218 of the TrackHeader structure 3212.
6. Read a 32-bit integer from the mp4 file and assign the result to the member "modifiedTime" 3220 of theTrackHeader structure 3212.
7. Read a 32-bit integer from the mp4 file and assign this value to the quantity "trackID". Assign the value of the quantity "trackID" to the member "trackID" 3224 of the TrackHeader structure 3212.
8. Read 4 bytes from the mp4 file and ignore the resulting values.
9. Read a 32-bit integer from the mp4 file and assign the result to the member "duration" 3222 of theTrackHeader structure 3212.
10. Read 60 bytes in the mp4 file and ignore the resulting values As shown in FIG. 39, the procedure "Process track media atom" consists of the following steps:

1. Operation 3900 to create a new TrackMedia data structure 3226. Assign the address of this TrackMedia structure 3226 to member TrackMedia 3206 in the current trak structure 3200. Assign the value of "atomSize" to member "size" 3228 in the new TrackMedia structure 3226.

2. Operation 3910 to read a 32-bit integer from the mp4 file and assign the value of this integer to the quantity "atomSize". Then read a second 32-bit integer from the mp4 file and assign the value of this integer to the quantity "atomId".

3. Operation 3920 to compare the value of the quantity "atomId" to the value "mdhd".

4. Operation 3925 to, if the value of the quantity "atomId" corresponds to "mdhd", perform the procedure "Process media header (mdhd) atom". Then continue with operation 3970 below.

5. Operation 3930 to compare the value of the quantity "atomId" to the value "hdlr".

6. Operation 3935 to, if the value of the quantity "atomId" corresponds to "hdlr", perform the procedure "Process handler (hdlr) atom". Then continue with operation 3970 below.

7. Operation 3940 to compare the value of the quantity "atomId" to the value "minf".

8. Operation 3945 to, if the value of the quantity "atomId" corresponds to "minf", perform the procedure "Process media info (minf) atom". Then continue with operation 3970 below.

9. Operation 3960 to, otherwise, skip atomSize-8 bytes in the mp4 file. That is, read this number of bytes from the mp4 file, but do nothing with the resulting values.

10. Operation 3970 to check for reaching the end of the mdia atom 912. The condition of reaching the end of the mdia atom 912 is satisfied when the number of data bytes read from the mp4 file since the start of the mdia atom 912 equals the value of member "size" 3228 for the current TrackMedia structure 3226.

11. Operation 3980 to if the end of the mdia atom 912 has been reached, this procedure is finished and processing continues with operation 3870. Otherwise, repeat operation 3910 through operation 3970.

The procedure "Process track edit atom" consists of repeating the following steps until reaching the end of the data for the edts atom 945. The condition of reaching the end of the edts atom 945 is satisfied when the number of data bytes read from the mp4 file since the start of the edts atom 945 equals the size of the edts atom. A single elst atom 948 is expected to be found within the edts atom 945.

1. Create a new TrackEdit structure 3236.
2. Assign the address of this new TrackEdit structure 3236 to the member TrackEdit 3208 of the current trak structure 3200.
3. Assign the value of "atomSize" to member "size" 3238 in the new TrackEdit structure 3236.
4. Read a 32-bit integer from the mp4 file and assign the result to the member "version & flags" 3240 in the TrackEdit structure 3236.
5. Read a 32-bit integer from the mp4 file and assign the value of this integer to the quantity "atomSize". Then read a second 32-bit integer from the mp4 file and assign the value of this integer to the quantity "atomId".
6. Compare the value of the quantity "atomId" to the value "elst".
7. If the value of the quantity "atomId" corresponds to "elst", perform the procedure "Process edit list atom". Otherwise, skip atomSize-8 bytes in the mp4 file. That is, read atomSize-8 bytes from the mp4 file and ignore the resulting values.
8. Check for reaching the end of the edts (track edit) atom 945. The condition of reaching the end of the edts atom 945 is satisfied when the number of data bytes read from the mp4 file since the start of the edts atom 945 equals the value of member "size" 3238 of the TrackEdit structure 3236.

9. If the end of the edts atom 945 has been reached, this procedure is finished. Otherwise, repeat steps 5 through 8.

The procedure "Process edit list atom" consists of the following steps:

1. Create a new EditList structure 3244.
2. Assign the address of this new EditList structure 3244 to the member "EditList" 3242 of the current TrackEdit structure 3236.
3. Assign the value of "atomSize" to member "size" 3246 in the new EditList structure 3244.
4. Read a 32-bit integer from the mp4 file and assign the result to the member "version & flags" 3248 in the EditList structure 3244.
5. Read a 32-bit integer from the mp4 file and assign this value to the quantity "numSegments".
6. Assign the value of the quantity "numSegments" to the member "numSegments" 3250 of the EditList structure 3244.
7. Create an array of numSegments EditSegment structures 3256 and assign the address of this array to member "EditSegment array" of the EditList structure 3244.
8. Assign the value zero to a quantity "segment".
9. Repeat the following steps (10 to 13) numSegments times (until the value of the quantity "segment" equals the value of the quantity "numSegments"):
10. Read a 32-bit integer from the mp4 file and assign the result to member "startTime" 3258 of entry "segment" in the array of EditSegment structures 3252.
11. Read a 32-bit integer from the mp4 file and assign the result to member "duration" 3260 of entry "segment" in the array of EditSegment structures 3252.
12. Read a 32-bit integer from the mp4 file and assign the result to member "relativeRate" 3262 of entry "segment" in the array of EditSegment structures 3252.
13. Increment the value of the quantity "segment" by 1.

The procedure "Process track reference atom" consists of the following steps. A single mpod atom 942 is expected to be found within the tref atom 940.

1. Create a new TrackReference structure 3264.
2. Assign the address of this new TrackReference structure 3264 to the member "TrackReference" of the current trak structure 3200.
3. Assign the value of atomSize to the member "size" 3266 of this new TrackReference structure 3264.
4. Repeat the following steps until reaching the end of the data for the tref atom 940. The condition of reaching the end of the tref atom 940 is satisfied when the number of data bytes read from the mp4 file since the start of the tref atom 940 equals the size of the tref atom 940.
5. Read a 32-bit integer from the mp4 file and assign the value of this integer to the quantity "atomSize". Then read a second 32-bit integer from the mp4 file and assign the value of this integer to the quantity "atomId".
6. Compare the value of the quantity "atomId" to the value "mpod".
7. If the value of the quantity "atomId" corresponds to "mpod", perform the procedure "Process mpod atom". Otherwise, skip atomSize-8 bytes in the mp4 file. That is, read atomSize-8 bytes from the mp4 file and ignore the resulting values.
8. Check for reaching the end of the tref (track reference) atom 940. The condition of reaching the end of the tref atom 940 is satisfied when the number of data bytes read from the mp4 file since the start of the tref atom 940 equals the value of member "size" 3266 of the TrackReference structure 3264.

9. If the end of the tref atom 940 has been reached, this procedure is finished. Otherwise, repeat steps 5 through 8.

The procedure "Process mpod atom" consists of the following steps:

1. Create a new Mpod data structure 3270.
2. Assign the address of this new Mpod data structure 3270 to the member "Mpod" 3268 of the current TrackReference data structure 3264.
3. Assign the value of atomSize to the member "size" 3272 of this new Mpod data structure.
4. Subtract 8 from the value of the Mpod member "size", divide the result by four, and assign the result to the quantity "numEntries".
5. Assign the value of "numEntries" to member "numEntries" 3274 of the new Mpod data structure 3270.
6. Create an array of integers with "numEntries" entries, and assign the address of this array to member "trackID array" 3276 of the new Mpod data structure 3270.
6. Assign the value zero to a quantity "entry".
7. Repeat the following steps (7 to 9) numEntries times (until the value of the quantity "entry" equals the value of the quantity "numEntries"):
8. Read a 32-bit integer from the mp4 file and assign the result to entry "entry" in the array "trackID array" 3276 in the current Mpod data structure 3270.
9. Increment the value of the quantity "entry" by 1.

The procedure "Process media header atom" consists of the following steps:

1. Create a new MediaHeader structure 3300.
2. Assign the address of this new MediaHeader structure 3300 to member "MediaHeader" 3230 in the current TrackMedia structure 3226.
3. Assign the value of the quantity "atomSize" to member "size" 3303 in the MediaHeader structure 3300.
4. Read a 32-bit integer from the mp4 file and assign the result to the member "version & flags" 3306 in the MediaHeader structure 3300.
5. Read a 32-bit integer from the mp4 file and assign the result to the member "creationTime" 3308 of the MediaHeader structure 3300.
6. Read a 32-bit integer from the mp4 file and assign the result to the member "modifiedTime" 3310 of the MediaHeader structure 3300.
7. Read a 32-bit integer from the mp4 file and assign the result to the member "timeScale" 3313 of the MediaHeader structure 3300.
8. Read a 32-bit integer from the mp4 file and assign the result to the member "duration" 3316 of the MediaHeader structure 3300.
9. Read a 16-bit integer from the mp4 file and assign the result to the member "language" 3318 of the MediaHeader structure 3300.
10. Read 2 bytes in the mp4 file and ignore the resulting values The procedure "Process handler atom" consists of the following steps:

1. Create a new Handler structure 3320.
2. Assign the address of this new Handler structure 3320 to member "Handler" 3232 in the current TrackMedia structure 3226.
3. Assign the value of the quantity "atomSize" to member "size" 3323 in the Handler structure 3320.
4. Read a 32-bit integer from the mp4 file and assign the result to the member "version & flags" 3326 in the Handler structure 3300.

5. Read a 32-bit integer from the mp4 file and assign the result to the member "handlerType" 3328 in the Handler structure 3300.

8. Read 12 bytes in the mp4 file and ignore the resulting values

9. Read a null-terminated string of characters from the mp4 file, store the resulting sequence of characters in an array of characters, and assign the address of this array of characters to member "name" 3330 in the Handler structure 3320.

Figure 40:
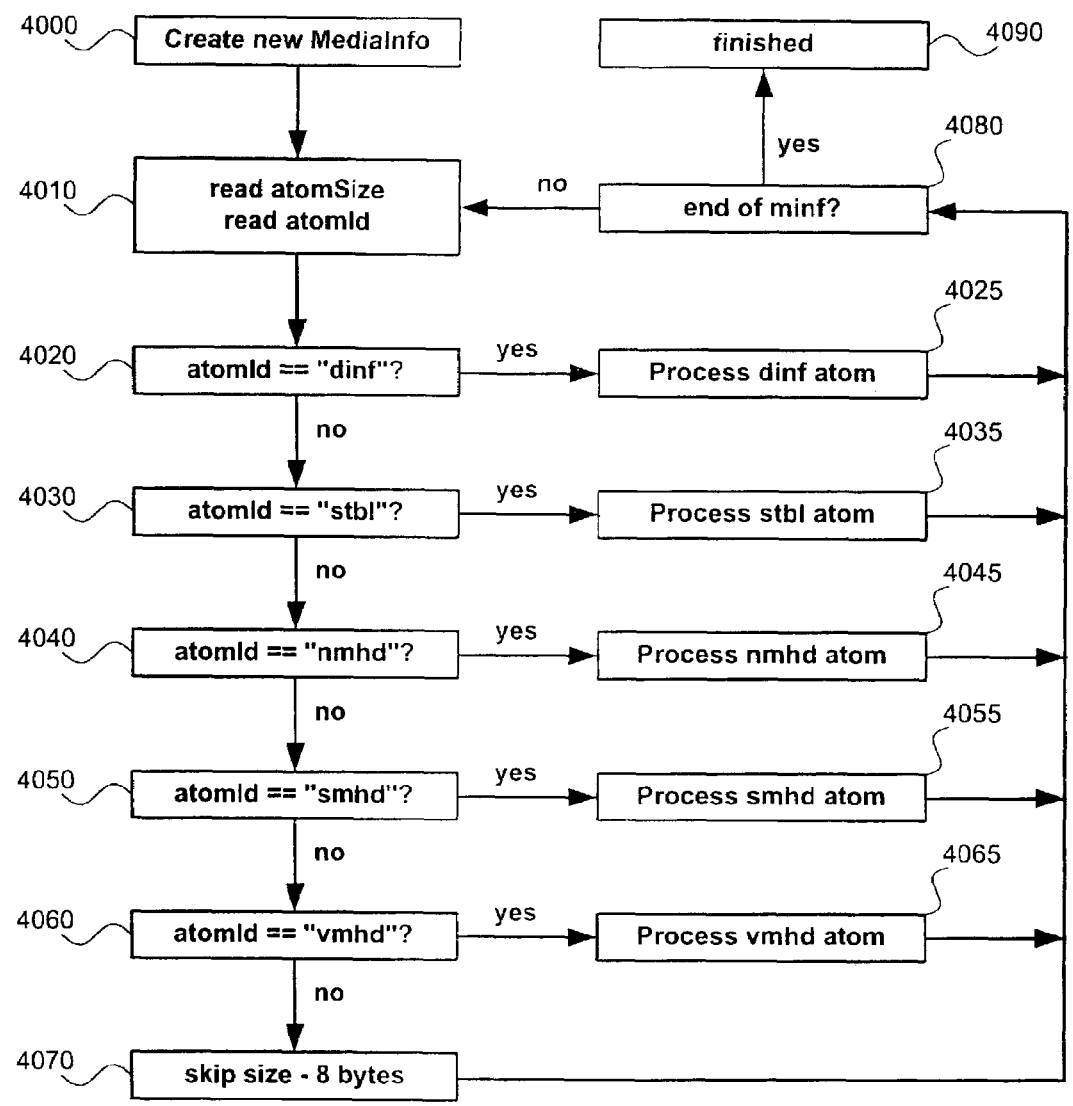
FIG. 40 shows an exemplary media info atom processing flowchart.

As shown in FIG. 40, the procedure "Process media info atom" consists of the following steps:

1. Operation 4000 to create a new MediaInfo data structure 3333. Assign the address of this new MediaInfo data structure 3333 to member MediaInfo 3234 in the current TrackMedia data structure 3226. Assign the value of the quantity "atomSize" to member "size" 3336 in the MediaInfo data structure 3333.

2. Operation 4010 to read a 32-bit integer from the mp4 file and assign the value of this integer to the quantity "atomSize". Then read a second 32-bit integer from the mp4 file and assign the value of this integer to the quantity "atomId".

3. Operation 4020 to compare the value of the quantity "atomId" to the value "dinf".

4. Operation 4025 to, if the value of the quantity "atomId" corresponds to "dinf", perform the procedure "Process media data info (dinf) atom". Then continue with operation 4080.

5. Operation 4030 to compare the value of the quantity "atomId" to the value "stbl".

6. Operation 4035 to, if the value of the quantity "atomId" corresponds to "stbl", perform the procedure "Process sample tables atom". Then continue with operation 4080.

7. Operation 4040 to compare the value of the quantity "atomId" to the value "nmhd".

8. Operation 4045 to, if the value of the quantity "atomId" corresponds to "nmhd", perform the procedure "Process mpeg4 media header atom". Then continue with operation 4080.

9. Operation 4050 to compare the value of the quantity "atomId" to the value "smhd".

10. Operation 4055 to, if the value of the quantity "atomId" corresponds to "smhd", perform the procedure "Process sound media header atom". Then continue with operation 4080.

11. Operation 4060 to compare the value of the quantity "atomId" to the value "vmhd".

12. Operation 4065 to, if the value of the quantity "atomId" corresponds to "vmhd", perform the procedure "Process video media header atom". Then continue with operation 4080.

13. Operation 4070 to, otherwise, skip atomSize-8 bytes in the mp4 file. That is, read atomSize-8 bytes from the mp4 file and ignore the resulting values.

14. Operation 4080 to check for reaching the end of the minf atom 920. The condition of reaching the end of the minf atom 920 is satisfied when the number of data bytes read from the mp4 file since the start of the minf atom 920 equals the value of member "size" 3336 in the MediaInfo data structure 3333.

15. Operation 4090 to finish the procedure if the end of the minf atom 920 has been reached. Otherwise, repeat operation 4010 through operation 4080.

The procedure "Process media data info (dinf) atom" consists of the following steps:

1. Create a new MediaDataInfo structure 3350.

2 Assign the address of this new MediaDataInfo structure 3350 to member "MediaDataInfo" 3338 in the current MediaInfo structure 3333.

3. Assign the value of the quantity "atomSize" to member "size" 3353 in the MediaDataInfo structure 3350.

4. Read a 32-bit integer from the mp4 file and assign the result to member "version & flags" 3356 in the MediaDataInfo structure 3350.

5. Repeat the following steps until reaching the end of the data for the dinf atom 924. The condition of reaching the end of the dinf atom 924 is satisfied when the number of data bytes read from the mp4 file since the start of the dinf atom 924 equals the value of member "size" of the MediaDataInfo structure 3350.

6. Read a 32-bit integer from the mp4 file and assign the value of this integer to the quantity "atomSize".

7. Read a 32-bit integer from the mp4 file and assign the value of this integer to the quantity "atomId".

8. If the value of the quantity "atomId" corresponds to "dref", perform the procedure "Process data reference table atom". Otherwise, skip atomSize-8 bytes in the mp4 file. That is, read atomSize-8 bytes from the mp4 file and ignore the resulting values.

9. Check for reaching the end of the dinf atom 924. If the end of the dinf atom 924 has been reached, this procedure is finished. Otherwise, repeat steps 2 through 9.

The procedure "Process data reference table atom" consists of the following steps:

1. Create a new DataRefTable data structure 3360.

2. Assign the address of this new DataRefTable data structure 3360 to the member DataRefTable 3358 of the current MediaDataInfo data structure 3350.

3. Assign the value of the quantity "atomSize" to member "size" 3363 of the DataRefTable data structure 3360.

4. Read a 32-bit integer from the mp4 file and assign the result to member "version & Flags" 3366 in the DataRefTable structure 3360.

6. Read a 32-bit integer from the mp4 file and assign this value to the quantity "numDataRefs".

7. Assign the value of the quantity "numDataRefs" to the member "numDataRefs" 3368 in the DataRefTable structure 3360.

8. Create an array of addresses with "numDataRefs" entries, and assign the address of this array to member "dataRef array" 3370 of the new DataRefTable data structure 3360.

9. Assign the value zero to a quantity "entry".

10. Repeat the following steps numDataRefs times (until the value of the quantity "entry" equals the value of the quantity "numDataRefs"):

11. Create a new dataRef data structure 3380.

12. Assign the address of this new dataRef data structure 3380 to entry "entry" in the dataRef array member 3370 of the DataRefTable data structure 3360.

13. Read a 32-bit integer from the mp4 file and assign the value to the quantity "drefSize".

14. Assign the value of the quantity "drefSize" to member "size" 3383 of this new dataRef data structure 3380.

15. Read a 32-bit integer from the mp4 file and assign the result to member "version & Flags" 3386 in the current dataRef data structure 3380.

16. Read a 32-bit integer from the mp4 file and assign the result to member "dataRefType" 3388 of this new dataRef data structure 3380. The value of the quantity "type" may be interpreted as a sequence of four text characters.

17. Create an array of (drefSize-12) bytes and assign the address of this array to member "dataRefData" 3390 in the current DataRef data structure 3380.

18 Read a sequence of (drefSize-12) bytes from the mp4 file and copy these to successive entries in the array "dataRefData" 3390.

19. Increment the value of the quantity "entry" by 1.

The procedure "Process mpeg4 media header atom" consists of the following steps:

1. Create a new Mpeg4MediaHeader data structure. An Mpeg4MediaHeader data structure contains members "size" and "version & flags".

2. Assign the address of this new Mpeg4MediaHeader data structure to the member MediaInfoHeader 3343 of the current MediaInfo data structure 3333.

3. Assign the value of the quantity "atomSize" to member "size" of this new Mpeg4MediaHeader data structure.

4. Read a 32-bit integer from the mp4 file and assign the result to member "verFlags" of this new Mpeg4MediaHeader data structure.

5. Skip any remaining data contained within the mpeg4 media header (nmhd) atom 936 (if atomSize is greater than 12).

The procedure "Process sound media header atom" consists of the following steps:

1. Create a new SoundMediaHeader data structure. A SoundMediaHeader data structure contains members "size", "version & flags", and "balance".

2. Assign the address of this new SoundMediaHeader data structure to the member MediaInfoHeader 3343 of the current MediaInfo data structure 3333.

3. Assign the value of the quantity "atomSize" to the member "size" of this new SoundMediaHeader data structure.

4. Read a 32-bit integer from the mp4 file and assign the result to member "version & Flags" in the new SoundMediaHeader structure.

5. Read a 32-bit integer from the mp4 file and assign the result to the member "balance" in the current SoundMediaHeader structure.

6. Skip any remaining data contained within the sound media header (smhd) atom 936 (if atomSize is greater than 16).

The procedure "Process video media header atom" consists of the following steps:

1. Create a new VideoMediaHeader data structure. A VideoMediaHeader data structure contains members "size", "version & flags", "mode", "opRed", "opGreen", and "opBlue".

2. Assign the address of this new VideoMediaHeader data structure to the member MediaInfoHeader 3343 of the current MediaInfo data structure 3333.

3. Assign the value of atomSize to the member "size" of this new VideoMediaHeader data structure.

4. Read a 32-bit integer from the mp4 file and assign the result to member "version & Flags" in the new VideoMediaHeader structure.

6. Read a 16-bit integer from the mp4 file and assign the result to member "mode" in the new VideoMediaHeader structure.

7. Read a 16-bit integer from the mp4 file and assign the result to member "opRed" in the current VideoMediaHeader structure.

8. Read a 16-bit integer from the mp4 file and assign the result to member "opgreen" in the current VideoMediaHeader structure.

9. Read a 16-bit integer from the mp4 file and assign the result to member "opBlue" in the current VideoMediaHeader structure.

10. Skip any remaining data contained within the video media header (vmhd) atom 936 (if atomSize is greater than 20).

Figure 41:
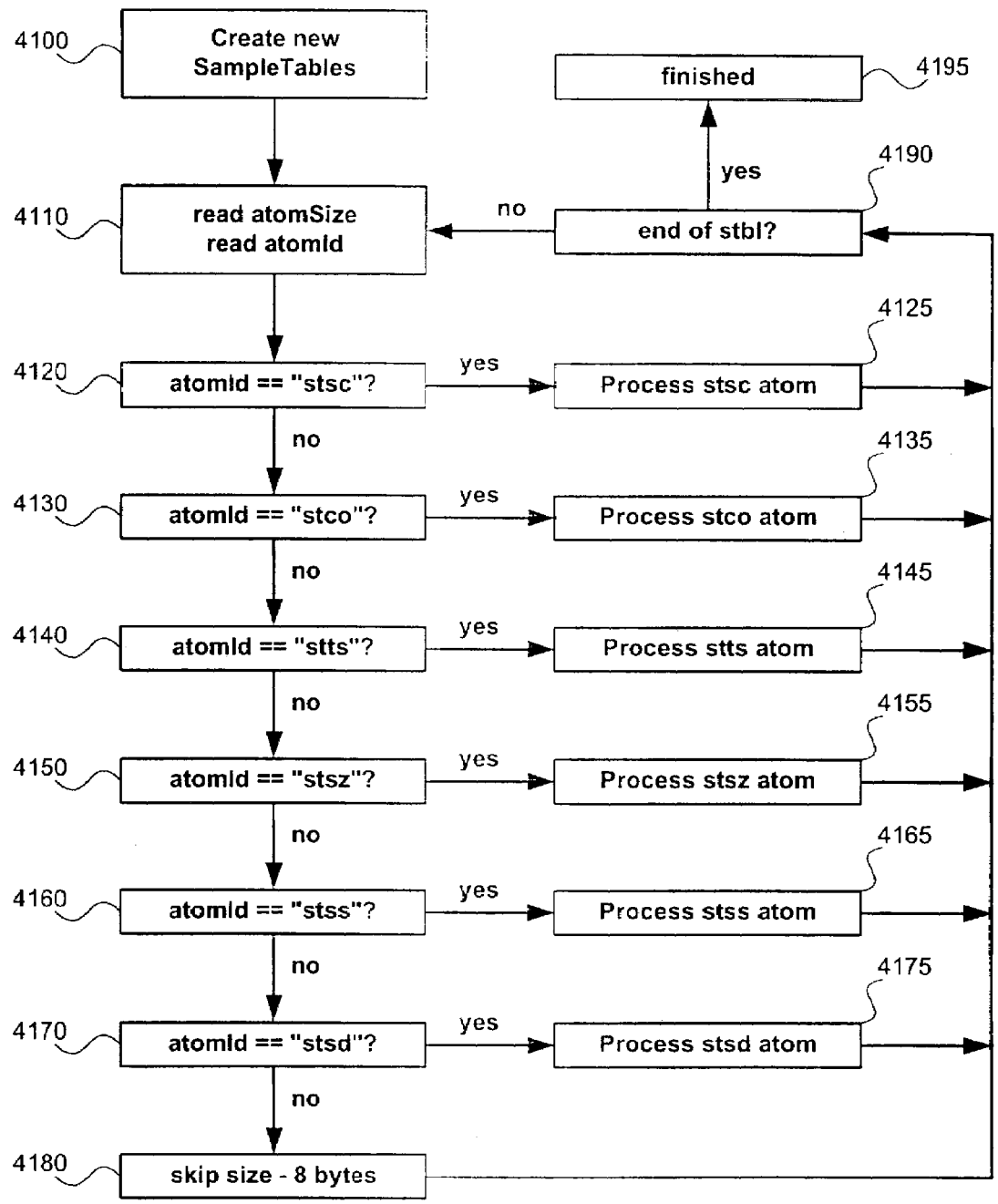
FIG. 41 shows an exemplary sample tables atom processing flowchart.

As shown in FIG. 41, the procedure "Process sample tables atom" consists of the following steps:

1. Operation 4100 to create a new SampleTables data structure 3400. Assign the address of this new SampleTables data structure 3400 to member SampleTables 3340 in the current MediaInfo data structure 3333. Assign the value of "atomSize" to the member "size" 3403 in the new SampleTables data structure 3400.

2. Operation 4110 to read a 32-bit integer from the mp4 file and assign the value of this integer to the quantity "atomSize". Then read a second 32-bit integer from the mp4 file and assign the value of this integer to the quantity "atomId".

3. Operation 4120 to compare the value of the quantity "atomId" to the value "stsc".

4. Operation 4125 to, if the value of the quantity "atomId" corresponds "stsc", perform the procedure "Process sample to chunk table (stsc) atom". Then continue with operation 4190.

5. Operation 4130 to compare the value of the quantity "atomId" to the value "stco".

6. Operation 4135 to, if the value of the quantity "atomId" corresponds to "stco", perform the procedure "Process chunk offset table (stco) atom". Then continue with operation 4190.

7. Operation 4140 to compare the value of the quantity "atomId" to the value "stts".

8. Operation 4145 to, if the value of the quantity "atomId" corresponds to "stts", perform the procedure "Process time to sample table (stts) atom". Then continue with operation 4190.

9. Operation 4150 to compare the value of the quantity "atomId" to the value "stsz".

10. Operation 4155 to, if the value of the quantity "atomId" corresponds to "stsz", perform the procedure "Process sample size table (stsz) atom". Then continue with operation 4190.

11. Operation 4160 to compare the value of the quantity "atomId" to the value "stss".

12. Operation 4165 to, if the value of the quantity "atomId" corresponds to "stss", perform the procedure "Process sync sample table (stss) atom". Then continue with operation 4190.

13. Operation 4170 to compare the value of the quantity "atomId" to the value "stsd".

14. Operation 4175 to, if the value of the quantity "atomId" corresponds to "stsd", perform the procedure "Process sample description table (stsd) atom". Then continue with operation 4190.

15. Operation 4180 to, otherwise, skip atomSize-8 bytes in the mp4 file. That is, read atomSize-8 bytes from the mp4 file and ignore the resulting values.

16. Operation 4190 to check for reaching the end of the stbl atom 950. The condition of reaching the end of the stbl atom 950 is satisfied when the number of data bytes read from the mp4 file since the start of the stbl atom 950 equals the value of member "size" 3403 in the SampleTables data structure 3400.

17. Operation 4195 to, if the end of the stbl atom 950 has been reached, this procedure is finished. Otherwise, repeat operation 4110 through operation 4190.

The procedure "Process sample to chunk table (stsc) atom" consists of the following steps:

1. Create a new sample table data structure 3420.
2. Assign the address of this new sample table data structure 3420 to member SampleToChunkTable 3406 in the current SampleTables data structure 3400.
3. Assign the value of the quantity "atomSize" to the member "size" 3423 in the new sample table data structure 3420.
4. Read a 32-bit integer from the mp4 file and assign the result to the member "version & Flags" 3426 in the new sample table data structure 3420.
5. Read a 32-bit integer from the mp4 file and assign the result to member "numEntries" 3428 in the new sample table data structure 3420.
6. Create an array of addresses with numEntries entries, and assign the address of this array to member "table array" 3430 in the new sample table data structure 3420.
7. Assign the value zero to the quantity "entry"
8. Repeat the following steps numEntries times (until the value of the quantity "entry" equals the value of member "numEntries" 3428).
9. Create a new SampleToChunk data structure 3460.
10. Assign the address of this new SampleToChunk data structure 3460 to entry "entry" in the member "table array" 3430 of the new sample table data structure 3420.
13. Read a 32-bit integer from the mp4 file and assign the result to member "firstChunk" 3463 in the new SampleToChunk data structure 3460.
14. Read a 32-bit integer from the mp4 file and assign the result to member "numSamples" 3466 in the SampleToChunk data structure 3460.
15. Read a 32-bit integer from the mp4 file and assign the result to member "description" 3468 of the SampleToChunk data structure 3460.
16. Increment the value of the quantity "entry" by 1.

The procedure "Process chunk offset table (stco) atom" consists of the following steps:

1. Create a new sample table data structure 3420.
2. Assign the address of this new sample table data structure 3420 to member ChunkOffsetTable 3408 in the current SampleTables data structure 3400.
3. Assign the value of the quantity "atomSize" to the member "size" 3423 in the new sample table data structure 3420.
4. Read a 32-bit integer from the mp4 file and assign the result to the member "version & Flags" 3426 in the new sample table data structure 3420.
5. Read a 32-bit integer from the mp4 file and assign the result to member "numEntries" 3428 in the new sample table data structure 3420.
6. Create an array of integers with numEntries entries, and assign the address of this array to member "table array" 3430 in the new sample table data structure 3420.
7. Assign the value zero to the quantity "entry"
8. Repeat the following steps numEntries times (until the value of the quantity "entry" equals the value of member "numEntries" 3428).
9. Read a 32-bit integer from the mp4 file and assign the result to entry "entry" in the array "table array" 3430 in the new sample table data structure 3420.
10. Increment the value of the quantity "entry" by 1.

The procedure "Process time to sample table (stts) atom" consists of the following steps:

1. Create a new sample table data structure 3420.
2. Assign the address of this new sample table data structure 3420 to member TimeToSampleTable 3410 in the current SampleTables data structure 3400.
3. Assign the value of the quantity "atomSize" to the member "size" 3423 in the new sample table data structure 3420.
4. Read a 32-bit integer from the mp4 file and assign the result to the member "version & Flags" 3426 in the new sample table data structure 3420.
5. Read a 32-bit integer from the mp4 file and assign the result to member "numEntries" 3428 in the new sample table data structure 3420.
6. Create an array of addresses with numEntries entries, and assign the address of this array to member "table array" 3430 in the new sample table data structure 3420.
7. Assign the value zero to the quantity "entry"
8. Repeat the following steps numEntries times (until the value of the quantity "entry" equals the value of member "numEntries" 3428).
9. Create a new TimeToSample data structure 3470.
10. Assign the address of this new TimeToSample data structure 3470 to entry "entry" in the member "table array" 3430 of the sample table data structure 3420.
11. Create a new TimeToSample data structure 3470.
12. Assign the address of this new TimeToSample data structure 3470 to entry "entry" in the array "table array" 3430 of the sample table data structure 3420.
13. Read a 32-bit integer from the mp4 file and assign the result to member "count" 3473 in the new TimeToSample data structure 3470.
14. Read a 32-bit integer from the mp4 file and assign the result to member "duration" 3476 in the new TimeToSample data structure 3470.
15. Increment the value of the quantity "entry" by 1.

The procedure "Process sample size table (stsz) atom" consists of the following steps:

1. Create a new SampleSizeTable data structure 3440.
2. Assign the address of this new SampleSizeTable structure 3440 to member SampleSizeTable 3413 in the current SampleTables data structure 3400.
3. Assign the value of the quantity "atomSize" to the member "size" 3443 in the new SampleSizeTable data structure 3440.
4. Read a 32-bit integer from the mp4 file and assign the result to the member "version & Flags" 3446 in the new SampleSizeTable data structure 3440.
5. Read a 32-bit integer from the mp4 file and assign the result to member "sampleSize" 3450 in the new SampleSizeTable data structure 3440. If the value of member sampleSize 3450 in the new SampleSizeTable data structure 3440 is zero, perform the following steps, otherwise assign the value zero to members "numEntries" 3453 and "table array" 3456 in the new SampleSizeTable data structure 3440.
6. Read a 32-bit integer from the mp4 file and assign the result to member "numEntries" 3453 in the new SampleSizeTable data structure 3440.
7. Create an array of integers with numEntries entries, and assign the address of this array to member "table array" 3456 in the new SampleSizeTable data structure 3440.
8. Assign the value zero to the quantity "entry".
9. Repeat the following steps numEntries times (until the value of the quantity "entry" equals the value of member "numEntries" 3453).

10. Read a 32-bit integer from the mp4 file and assign the result to entry "entry" in member "table array" 3456 in the SampleSizeTable data structure 3440.

11. Increment the value of the quantity "entry" by 1.

The procedure "Process sync sample table (stss) atom" consists of the following steps:

1. Create a new sample table data structure 3420.

2. Assign the address of this new sample table data structure 3420 to member SyncSampleTable 3416 in the current SampleTables data structure 3400.

3. Assign the value of the quantity "atomSize" to the member "size" 3423 in the new sample table data structure 3420.

4. Read a 32-bit integer from the mp4 file and assign the result to the member "version & Flags" 3426 in the new sample table data structure 3420.

5. Read a 32-bit integer from the mp4 file and assign the result to member "numEntries" 3428 in the new sample table data structure 3420.

6. Create an array of integers with numEntries entries, and assign the address of this array to member "table array" 3430 in the new sample table data structure 3420.

7. Assign the value zero to the quantity "entry".

8. Repeat the following steps numEntries times (until the value of the quantity "entry" equals the value of member "numEntries" 3428).

9. Read a 32-bit integer from the mp4 file and assign the result to entry "entry" in the array "table array" 3430 in the new sample table data structure 3420.

10. Increment the value of the quantity "entry" by 1.

The procedure "Process sample description table (stsd) atom" consists of the following steps:

1. Create a new sample table data structure 3420.

2. Assign the address of this new sample table data structure 3420 to member SampleDescriptionTable 3418 in the current SampleTables data structure 3400.

3. Assign the value of the quantity "atomSize" to the member "size" 3423 in the new sample table data structure 3420.

4. Read a 32-bit integer from the mp4 file and assign the result to the member "version & Flags" 3426 in the new sample table data structure 3420.

5. Read a 32-bit integer from the mp4 file and assign the result to member "numEntries" 3428 in the new sample table data structure 3420.

6. Create an array of addresses with numEntries entries, and assign the address of this array to member "table array" 3430 in the new sample table data structure 3420.

7. Assign the value zero to the quantity "entry".

8. Repeat the following steps numEntries times (until the value of the quantity "entry" equals the value of member "numEntries" 3428).

9. Create a new SampleDescription data structure 3480.

10. Assign the address of this new SampleDescription data structure 3480 to entry "entry" in the member "table array" 3430 of the new sample table data structure 3420.

11. Read a 32-bit integer from the mp4 file and assign the result to the member "size" 3483 in the SampleDescription data structure 3480.

12. Read a 32-bit integer from the mp4 file and assign the result to member "dataFormat" 3486 in the SampleDescription data structure 3480. The value of member "dataFormat" may represent one of the following 4-character sequences: "mp4a", "mp4v", "mp4s".

13. Read 6 bytes from the mp4 file and ignore their values.

14. Read a 16-bit integer from the mp4 file and assign the result to member "dataReference" 3488 in the SampleDescription data structure 3480.

15. If the value of the quantity "dataFormat" corresponds to the string "mp4a", read 20 bytes from the mp4 file and ignore their values.

16. If the value of the quantity "dataFormat" corresponds to the string "mp4v", read 70 bytes from the mp4 file and ignore their values.

17. Read a 32-bit integer from the mp4 file and assign the result to the quantity "atomSize".

18. Read a 32-bit integer from the mp4 file and assign this value to the quantity "atomId".

19. If the value of the quantity "atomId" corresponds to "esds", perform the procedure "Process esds atom". Otherwise, read (atomSize-8) bytes from the mp4 file and ignore their values.

The procedure "Process esds atom" consists of the following steps:

1. Read a 32-bit integer from the mp4 file and assign the result to member "esdversion" 3490 in the SampleDescription data structure 3480.

2. Subtract 12 from the value of the quantity "atomSize" and assign the result to the member "esdSize" 3493 in the current SampleDescription data structure 3480.

4. Create a new array of bytes with esdSize 3493 entries, and assign the address of this array to member "esdData" 3496 in the current SampleDescription data structure 3480.

5. Read a sequence of esdSize 3496 bytes from the mp4 file and copy these values to successive entries in the array "esdData" 3496.

Creation of Intermediate xml Documents and Media Data Files Based on a QtInfo Data Structure.

After creating a QtInfo data structure 3100 based on an mp4 binary file 700, 2210, the QtInfo data structure 3100 is used to create a set of media data files 2230 and a pair of intermediate xml documents 2250, 2260. These xml documents include an "mp4file" document 2250, 2300 and an "mp4bifs" document 2260, 2800. The structure of an mp4file document 2250, 2300 is represented in FIGS. 23 to 27. The structure of an mp4bifs document 2260, 2800 is represented in FIGS. 28 to 30.

This process is divided into two steps:

1. Form xml representations 2310 of the media data (mdat) atoms 706 represented 3113, 3160 in the QtInfo data structure 3100, and store the associated media data 3168 in xml documents or binary media data files 2230.

2. Form an xml representation 2320 of the moov atom 712 represented in the QtInfo data structure 3100.

Each of these steps is described below.

Step 1. Form an xml Representation of the Media Data Atoms Represented in the QtInfo Data Structure, and Store the Associated Media Data in xml Documents or Binary Media Data Files.

In this step, each mdat atom 706 represented in the QtInfo data structure 3100 is represented by an mdat element 2310 in the mp4file document 2300. The media data 3168 associated with an audio or visual stream (if any) is transferred to a new binary media data file 2230. The media data 3168 associated with the scene description stream (sdsm or BIFS) is represented in the form of an mp4bifs document 2260, 2800. The media data 3168 associated with the object descriptor stream (if any) is represented in xml form 2500 within the mp4file document 2300.

Figure 42:
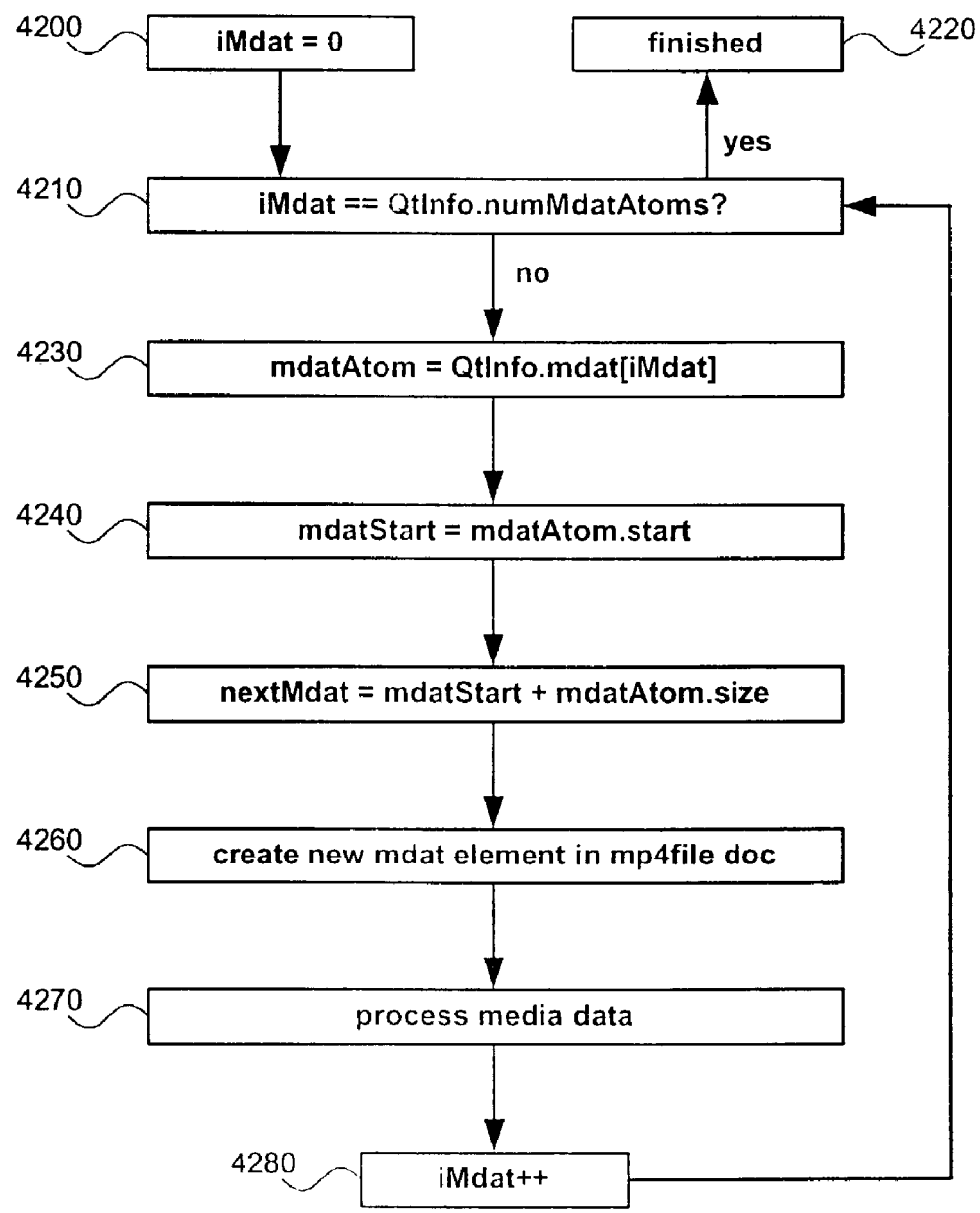
FIG. 42 shows an exemplary flowchart to form xml representation of media data atoms represented in a QtInfo data structure.

As shown in FIG. 42, this step is accomplished with the following procedures:

1. At operation 4200, the value zero is assigned to a quantities "iMdat", "numVisual", and "numAudio".

2. Operation 4210 compares the value of the quantity "iMdat" to the value of member "numMdatAtoms" 3110 of the QtInfo structure 3100.

3. At operation 4220, if the value of the quantity "iMdat" equals the value of member "numMdatAtoms", this step is finished. Otherwise, continue with the following procedures.

4. Operation 4230 assigns the value of entry "iMdat" in member "mdat array" 3113 of the QtInfo structure 3100 to the quantity "mdatAtom" representing the address of an mdat data structure 3160.

5. Operation 4240 assigns the value of member "start" 3166 of mdat data structure "mdatAtom" 3160 to the quantity "mdatStart".

6. Operation 4250 assigns the sum of the value of mdatAtom member "size" 3163 and the value of the quantity "mdatStart" to the quantity "nextMdat".

7. Operation 4260 creates a new "mdat" element 2310 and appends it to the top level element of the mp4file document 2300. It assigns the value of the quantity "iMdat" to the attribute "mdatID" of the new mdat element, assigns the value of the quantity "mdatSize" to the attribute "size" of the new mdat element, and assigns the value of member "MediaData" of mdat data structure "mdatAtom" to the quantity "mediaData".

8. Operation 4270 performs the procedure "process media data".

9. Operation 4280 increments the value of the quantity "iMdat" by one, then repeats operation 4210.

The Procedure "Process Media Data"

Figure 43:
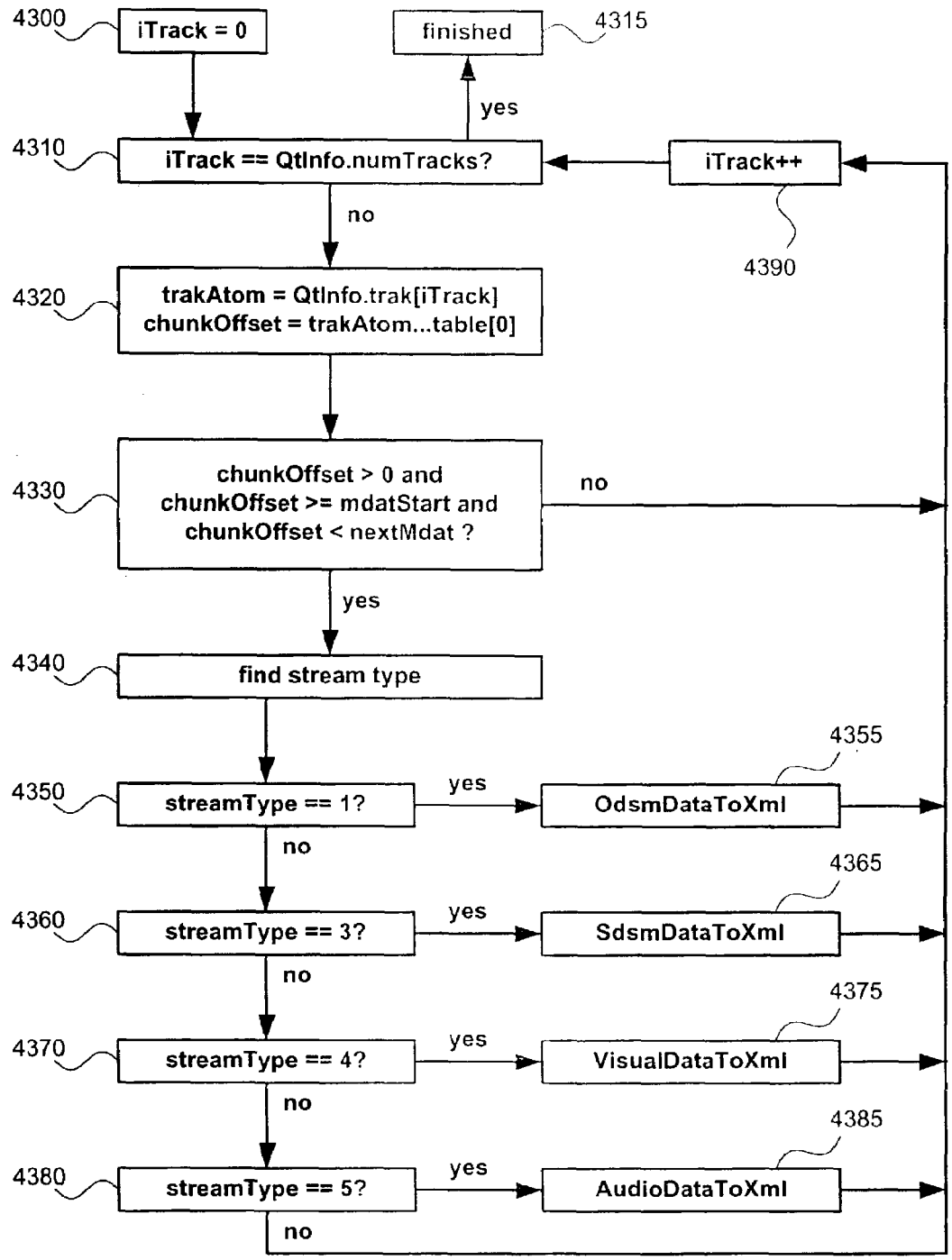
FIG. 43 shows an exemplary media data processing flowchart.

The procedure "process media data" 4270, as shown in FIG. 43, consists of the following steps:

1. Operation 4300 to assign the value zero to the quantity "iTrack".

2. Operation 4310 to compare the value of the quantity "iTrack" to the value of member "numTracks" 3118 of the QtInfo structure 3100.

3. Operation 4315 to, if the value of the quantity "iTrack" equals the value of member "numTracks" 3118 of the QtInfo structure 3100, this procedure is finished.

4. Operation 4320 to assign the value of entry "iTrack" in member "trak array" 3120 of the QtInfo structure 3100 to the address of a trak data structure 3200 "trakAtom". Assign the value of the first entry (entry 0) in the array of integers specified by member "table array" 3430 in member ChunkOffsetTable 3408 in member SampleTables 3340 in member MediaInfo 3234 in member TrackMedia 3206 in the data structure "trakatom" 3200 to the quantity "chunkOffset".

5. Operation 4330 to, if the value of the quantity "chunkoffset" is greater than zero, greater than or equal to the value of the quantity "mdatStart", and less than the value of the quantity "nextMdat", perform the following steps. Otherwise, increment the value of the quantity "iTrack" by one (operation 4390).

6. Operation 4340 to perform the procedure "find stream type". 7. Operation 4350 to compare the value of the quantity "streamType" to the value "1".

8. Operation 4355 to, if the value of the quantity "streamType" is "1", perform the procedure "OdsmDataToXml".

9. Operation 4360 to compare the value of the quantity "streamType" to the value "3".

10. Operation 4365 to, if the value of the quantity "streamType" is "3", perform the procedure "SdsmDataToXml".

11. Operation 4370 to compare the value of the quantity "streamType" to the value "4".

12. Operation 4360 to, if the value of the quantity "streamType" is "4", perform the procedure "VisualDataToXml", and then increment the value of "numvisual" by one.

13. Operation 4380 to compare the value of the quantity "streamType" to the value "5".

14. Operation 4385 to, if the value of the quantity "streamType" is "5", perform the procedure "AudioDataToXml", and then increment the value of "numAudio" by one.

15. Operation 4390 to increment the value of the quantity "iTrack" by one.

The Procedure "Find Stream Type"

Figure 44:
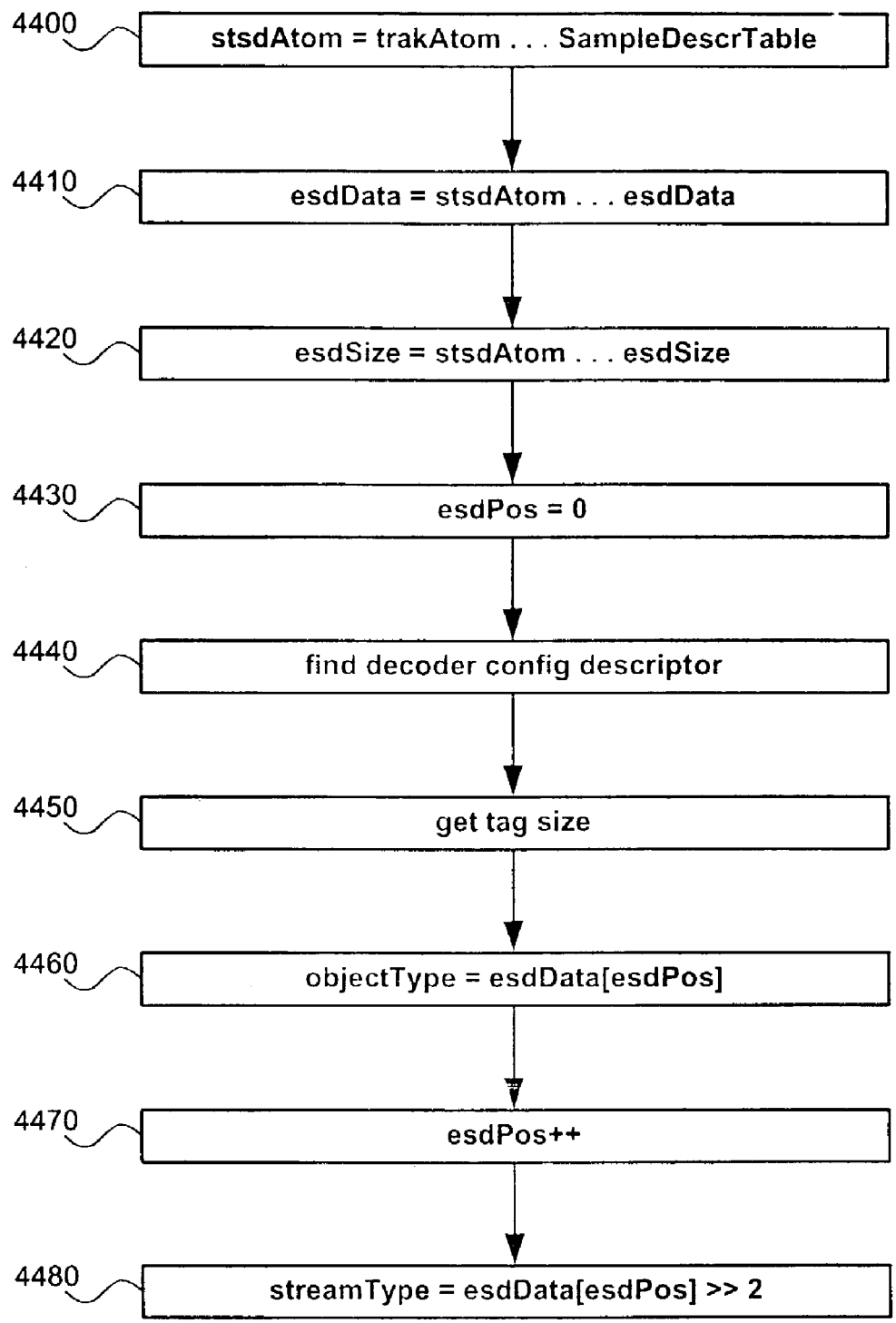
FIG. 44 shows an exemplary flowchart to find a stream type.

The procedure "find stream type", as shown in FIG. 44, consists of the following steps:

1. Operation 4400 to assign the value of member SampleDescrTable 3418 in member SampleTables 3340 in member MediaInfo 3234 in member TrackMedia 3206 in the data structure "trakAtom" to the quantity "stsdAtom" representing the address of a sample table structure 3420.

2. Operation 4410 to assign the value of member "esddata" 3496 in the SampleDescription data structure 3480 specified by the first entry (entry 0) in member "table array" 3430 of the sample table data structure 3420 specified by the value of the quantity "stsdatom" to the quantity "esdData" representing an array of bytes.

3. Operation 4420 to assign the value of member "esdSize" in the SampleDescription data structure 3480 specified by the first entry (entry 0) in member "table array" of the sample table data structure 3420 specified by the value of the quantity "stsdatom" to the quantity "esdSize".

4. Operation 4430 to assign the value zero to the quantity "esdPos".

5. Operation 4440 to perform the procedure "find decoder config descriptor".

6. Operation 4450 to perform the procedure "get tag size".

7. Operation 4460 to assign the value of entry "esdpos" in the array "esdData" to the quantity "objectType".

9. Operation 4470 to increment the value of the quantity "esdpos" by one.

10. Operation 4480 to obtain the value of entry "esdpos" in the array "esddata", shift the result right by two bits (divide by 4) and assign the result to the quantity "streamType".

If the value of the quantity "esdpos" equals or exceeds the value of the quantity "esdSize" during steps 5 to 10, assign the value zero to the quantities "streamType" and "objectType" and terminate this process.

The Procedure "Find Decoder Config Descriptor"

Figure 45:
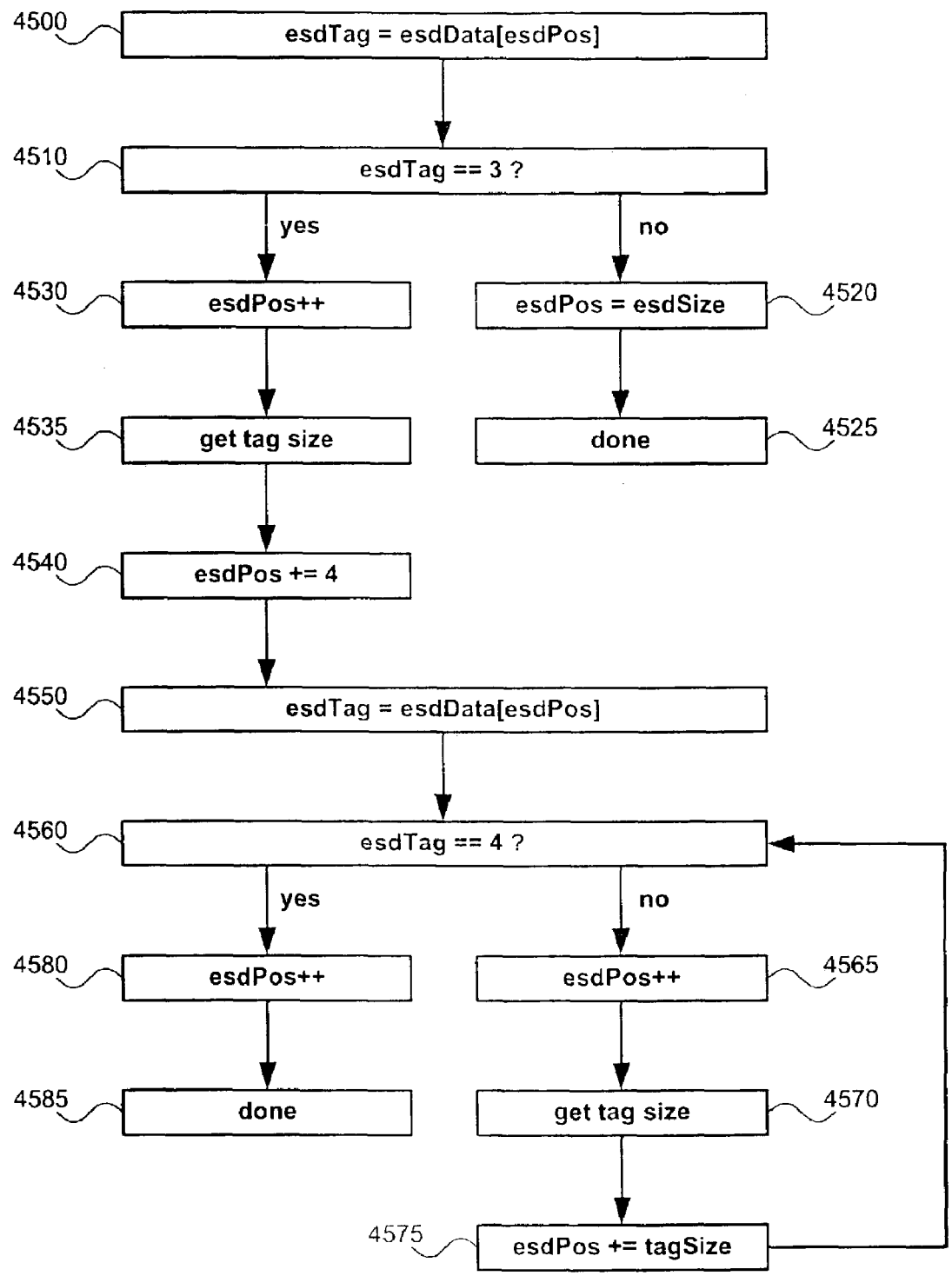
FIG. 45 shows an exemplary flowchart to find a decoder config descriptor.
Figure 46:
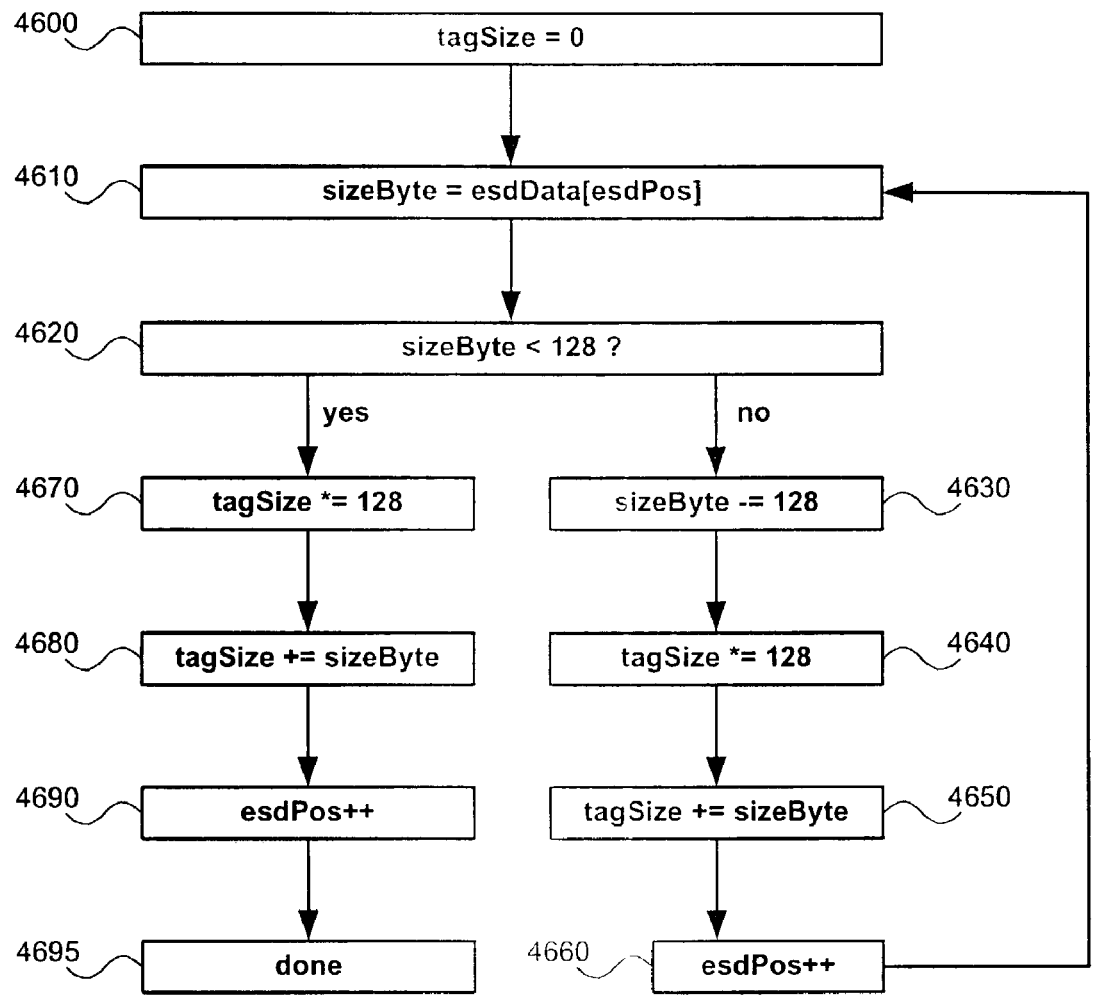
FIG. 46 shows an exemplary get tag size flowchart.

The procedure "find decoder config descriptor", as shown in FIG. 45, consists of the following steps:

1. Operation 4500 to assign the value of entry "esdpos" in the array "esdData" to the quantity "esdTag".

2. Operation 4510 to compare the value of the quantity "esdTag" to the value "3".

3. Operation 4520 to, if the value of the quantity "esdTag" is not "3", assign the value of the quantity "esdSize" to the quantity "esdPos" and end this procedure 4525. Otherwise perform the following steps.

4. Operation 4530 to increment the value of the quantity "esdPos" by one.

5. Operation 4535 to perform the procedure "get tag size".

6. Operation 4540 to increment the value of the quantity "esdPos" by "4".

7. Operation 4550 to assign the value of entry "esdPos" in the array "esdData" to the quantity "esdTag".

8. Operation 4560 to compare the value of the quantity "esdTag" to the value "4".

9. Operation 4565 to, if the value of the quantity "esdTag" is not "4", increment the value of the quantity "esdPos" by one, perform the procedure "get tag size" 4570, add the value of the quantity "tagSize" to the value of the quantity "esdPos" 4575, then repeat operation 4550.

10. Operation 4580 to, otherwise, increment the value of the quantity "esdPos" by one.

11. Operation 4585 to finish this procedure and continue with the procedure "find stream type".

The Procedure "Get Tag Size"

The procedure "get tag size" consists of the following steps:

1. Operation 4600 to assign the value zero to the quantity "tagSize".

2. Operation 4610 to assign the value of entry "esdPos" in the array "esdData" to the quantity "sizeByte".

3. Operation 4620 to compare the value of the quantity "sizeByte" to the value 128. If the value of the quantity "sizeByte" is greater than or equal to 128, perform the following operations:

5. Operation 4630 to subtract 128 from the value of the quantity "sizeByte" (or replace the value of the quantity "sizeByte" with the lower 7 bits of this value), 6. Operation 4640 to multiply the value of the quantity "tagSize" by 128 (or shift this value left by 7 bits), 7. Operation 4650 to add the value of the quantity "sizeByte" to the value of the quantity "tagSize", 8. Operation 4660 to increment the value of the quantity "esdPos" by the value "1".

9. Repeat operation 4610. If the value of the quantity "sizeByte" is less than 128, perform the following operations:

10. Operation 4670 to multiply the value of the quantity "tagSize" by 128 (shift left by 7 bits).

11. Operation 4680 to add the value of the quantity "sizeByte" to the value of the quantity "tagSize".

12. Operation 4690 to increment the value of the quantity "esdPos" by the value "1".

13. Operation 4695 finishes this procedure and continues with the procedure that invoked this procedure.

The Procedure "OdsmDataToXml"

Figure 47:
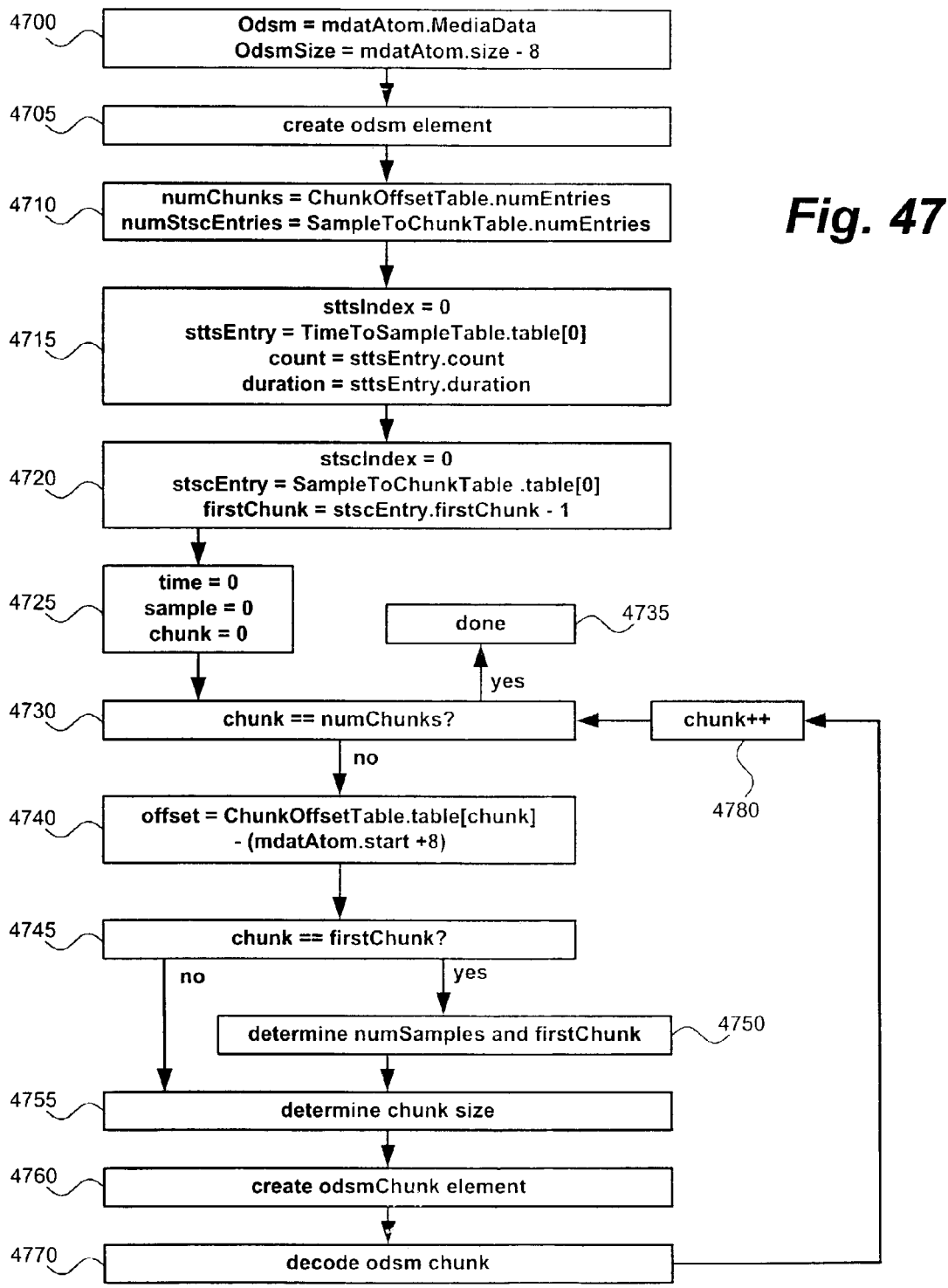
FIG. 47 shows an exemplary flowchart to create an xml representation from an odsm data stream.

The procedure "OdsmDataToXml" 4355 creates an xml representation of an odsm data stream (object descriptor stream) contained within mdat structure "mdatAtom" 4230. As shown in FIG. 47, the following operations are used to create the xml representation of this odsm data stream:

1. Operation 4700 assigns the value of member "MediaData" 3168 of the mdat structure "mdatAtom" 4230 to the quantity "OdsmData" representing the address of an array of bytes. The value of member "size" 3163 of mdat structure "mdatAtom" 4230 is assigned to the integer quantity "OdsmSize".

2. Operation 4705 creates a new "odsm" element 2460 and appends to the current mdat element 2400, 2460. The value of member trackID 3224 of the TrackHeader structure 3212, 3204 contained within the trak structure 3200 "trakatom" 4320 is assigned to the value of the attribute "trackID" of the new "odsm" element.

3. Operation 4710 assigns the value of member numEntries 3428 of the sample table structure 3420 ChunkOffsetTable 3408 to the quantity "numChunks". The value of member numEntries 3428 of the sample table structure 3420 SampleToChunkTable 3406 is assigned to the quantity "numStscEntries". The sample table structures ChunkOffsetTable, SampleToChunkTable, etc., are members of the SampleTables structure 3400 represented by member "Sample Tables" 3340 of the MediaInfo data structure 3333 represented by member "MediaInfo 3234 of the TrackMedia data structure 3226 represented by member "TrackMedia" 3206 of the trak structure 3200 trakAtom 4320.

4. Operation 4715 assigns the value zero to the quantity "sttsIndex". The value of the first entry in the table array 3430 contained within the sample table structure 3420 TimeToSampleTable 3410 is assigned to the quantity sttsEntry representing the address of a TimeToSample structure 3470. The value of member "count" of TimeToSample structure sttsEntry is assigned to the quantity "count". The value of member "duration" of TimeToSample structure sttsEntry is assigned to the quantity "duration".

5. Operation 4720 assigns the value zero to the quantity "stscIndex". The value of the first entry in the table array 3430 contained within the sample table structure 3420 SampleToChunkTable 3406 is assigned to the quantity stscEntry representing the address of a SampleToChunk structure 3460. The value of member "firstChunk" of SampleToChunk structure stscEntry, minus one, is assigned to the integer quantity "firstChunk".

6. Operation 4725 assigns the value zero to integer quantities "time", "sample", and "chunk".

7. Operation 4730 compares the value of the quantity "chunk" to the value of the quantity "numChunks".

8. At operation 4735, if the value of the quantity "chunk" equals the value of the quantity "numChunks", the procedure "OdsmDataToXml" is finished.

9. At operation 4740, if the value of the quantity "chunk" does not equal the value of the quantity "numChunks", the value "8" is added to the value of member "start" of mdat structure 3160 mdatAtom 4230, the result is subtracted from the value of entry "chunk" in the table array 3430 contained in the sample table structure 3420 ChunkOffsetTable 3408, and the result is assigned to integer quantity "offset".

10. Operation 4745 compares the value of the quantity "chunk" to the value of the quantity "firstChunk".

11. At operation 4750, if the value of the quantity "chunk" equals the value of the quantity "firstChunk", the value of member "numSamples" 3466 in SampleToChunk structure 3460 stscEntry is assigned to the quantity "numSamples". The value of quantity "stscIndex" is incremented by 1. If the value of the quantity "stscindex" is less than the value of the quantity "numStscEntries", the value of the entry "stscIndex" in the table array 3430 contained within the sample table structure 3420 SampleToChunkTable 3406 is assigned to the SampleToChunk structure 3460 stscEntry, and the value of member "firstChunk" of SampleToChunk structure stscEntry, minus one, is assigned to the integer quantity "firstChunk". Otherwise, the value of the quantity "numchunks" is assigned to the quantity "firstChunk".

12. Operation 4755 determines the value of the quantity "chunkSize" by summing the entries "sample" through "sample+numSamples−1" in the array of integers 3456 contained in the SampleSizeTable structure 3440 SampleSizeTable 3413.

13. Operation 4760 creates a new "odsmChunk" element and appends to the new "odsm" element created in operation 4705. The value of the quantity "offset" is assigned to the attribute "offset" of the new "odsmChunk" element. The value of the quantity "chunkSize" is assigned to the attribute "size" of the new "odsmChunk" element.

14. Operation 4770 performs the procedure "decode odsm chunk", as shown in FIG. 48.

15. Operation 4780 increments the value of the quantity "chunk" by 1 and operation 4730 is repeated.

The Procedure "Decode Odsm Chunk"

Figure 48:
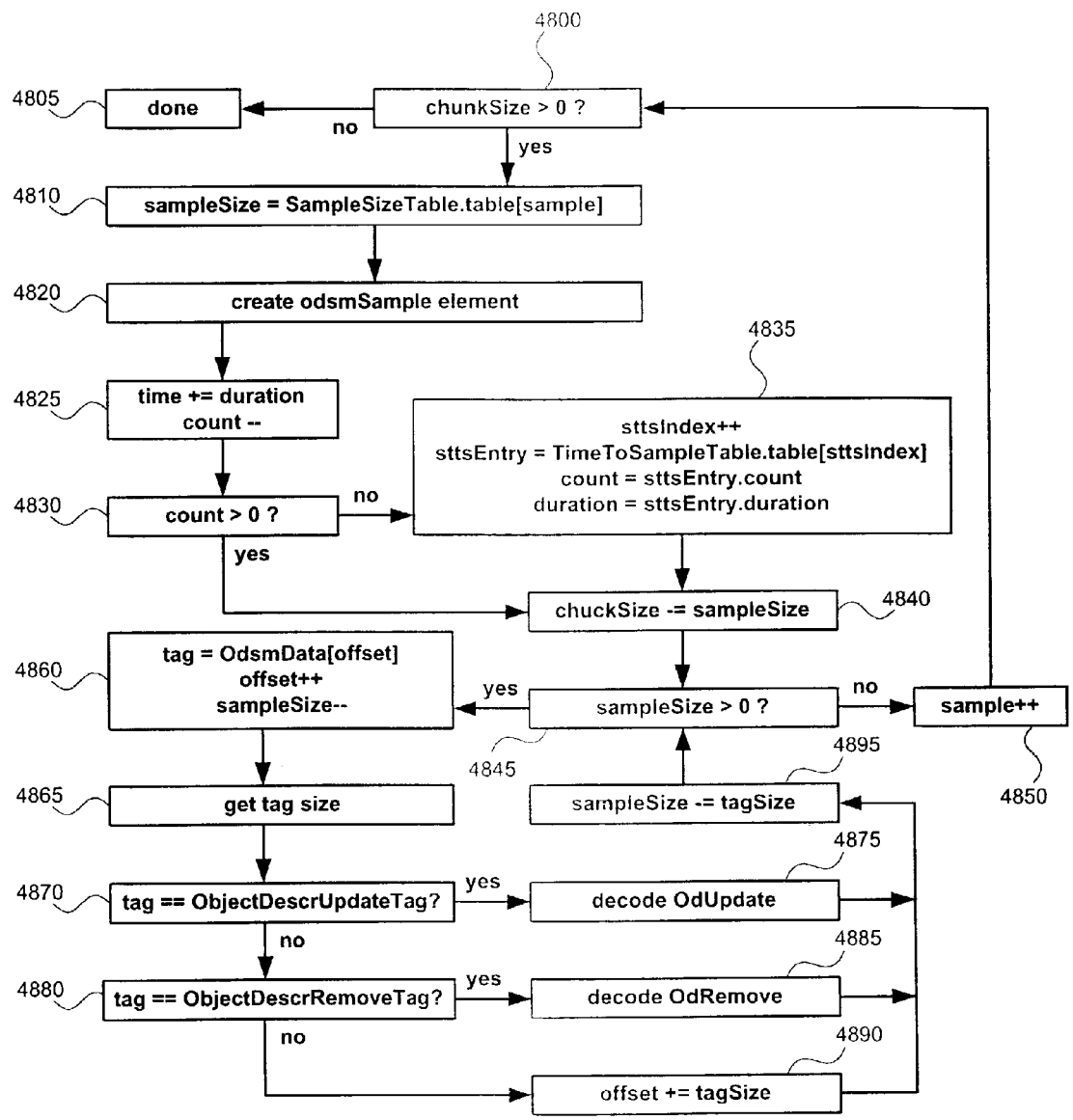
FIG. 48 shows an exemplary decode odsm chunk flowchart.

As shown in FIG. 48, the procedure "decode odsm chunk" consists of the following steps:

1. Operation 4800 to compare the value of the quantity "chunkSize" to zero.

2. Operation 4805 to, if the value of the quantity "chunkSize" is not greater than zero, the procedure "decode odsm chunk" is finished, and the procedure "OdsmDataToXml" resumes at operation 4780.

3. Operation 4810 to, if the value of the quantity "chunkSize" is greater than zero, the value of entry "sample" in member table 3456 in SampleSizeTable structure 3440 SampleSizeTable 3413 is assigned to the integer quantity "sampleSize".

4. Operation 4820, where a new odsmsample element is created and appended to the odsmChunk element created above 4760. The value of the quantity "offset" is assigned to the attribute "offset" of the new odsmSample element. The value of the quantity "sampleSize" is assigned to the attribute "size" of the new odsmSample element. The value of the quantity "time" is assigned to the attribute "time" of the new odsmSample element.

5. Operation 4825, where the value of the quantity "time" is incremented by the value of the quantity "duration". The value of the quantity "count" is decremented by the value "1".

6. Operation 4830, where the value of the quantity "count" is compared to zero.

7. Operation 4835 to, if the value of the quantity "count" is not greater than zero, the value of the quantity "sttsIndex" is incremented by the value "1". The value of the entry "sttsIndex" in the table array 3430 contained within the sample table structure 3420 TimeToSampleTable 3410 is assigned to the TimeToSample structure 3470 sttsEntry. The value of member "count" of TimeToSample structure sttsEntry is assigned to the quantity "count". The value of member "duration" of TimeToSample structure sttsEntry is assigned to the quantity "duration".

8. Operation 4840, where the value of the quantity "chunkSize" is decremented by the value of the quantity "sampleSize".

9. Operation 4845, where the value of the quantity "sampleSize" is compared to zero.

10. Operation 4850 to, if the value of the quantity "sampleSize" is not greater than zero, the value of the quantity "sample" is incremented by the value "1" and processing continues with operation 4800.

11. Operation 4860 to, if the value of the quantity "sampleSize" is greater than zero, assign the value of entry "offset" in the array of bytes "OdsmData" to the quantity "tag". The value of the quantity "offset" is incremented by the value "1" and the value of the quantity "sampleSize" is decremented by the value "1".

12. Operation 4865 where the procedure "get tag size" is performed. This is equivalent to the procedure "get tag size" described above, except that (a) the array of bytes OdsmData is used in place of the array "esdData", (b) the quantity "offset" is used in place of the quantity "esdPos"

(c) the value of the quantity "sampleSize" is decremented by the value "1" each time the value of the quantity "offset" (esdPos) is incremented by one (operations 4660, 4690).

13. Operation 4870, where the value of the quantity "tag" is compared to the value of the quantity "ObjectDescrUpdateTag" defined in the MPEG-4 Systems Specifications.

14. Operation 4875 to, if the value of the quantity "tag" equals the value of the quantity "ObjectDescrUpdateTag", the procedure "decode OdUpdate" is performed.

15. Operation 4880 to, otherwise, the value of the quantity "tag" is compared to the value of the quantity "ObjectDescrRemoveTag" defined in the MPEG-4 Systems Specifications.

16. Operation 4885 to, if the value of the quantity "tag" equals the value of the quantity "ObjectDescrRemoveTag", the procedure "decode OdRemove" is performed.

17. Operation 4890 to, otherwise, the value of the quantity "offset" is incremented by the value of the quantity "tagSize"

18. Operation 4895 where the value of the quantity "sampleSize" is decremented by the value of the quantity "tagSize" (as determined in operation 4865).

18. Processing continues with operation 4845.

The Procedure "Decode OdUpdate"

Figure 49:
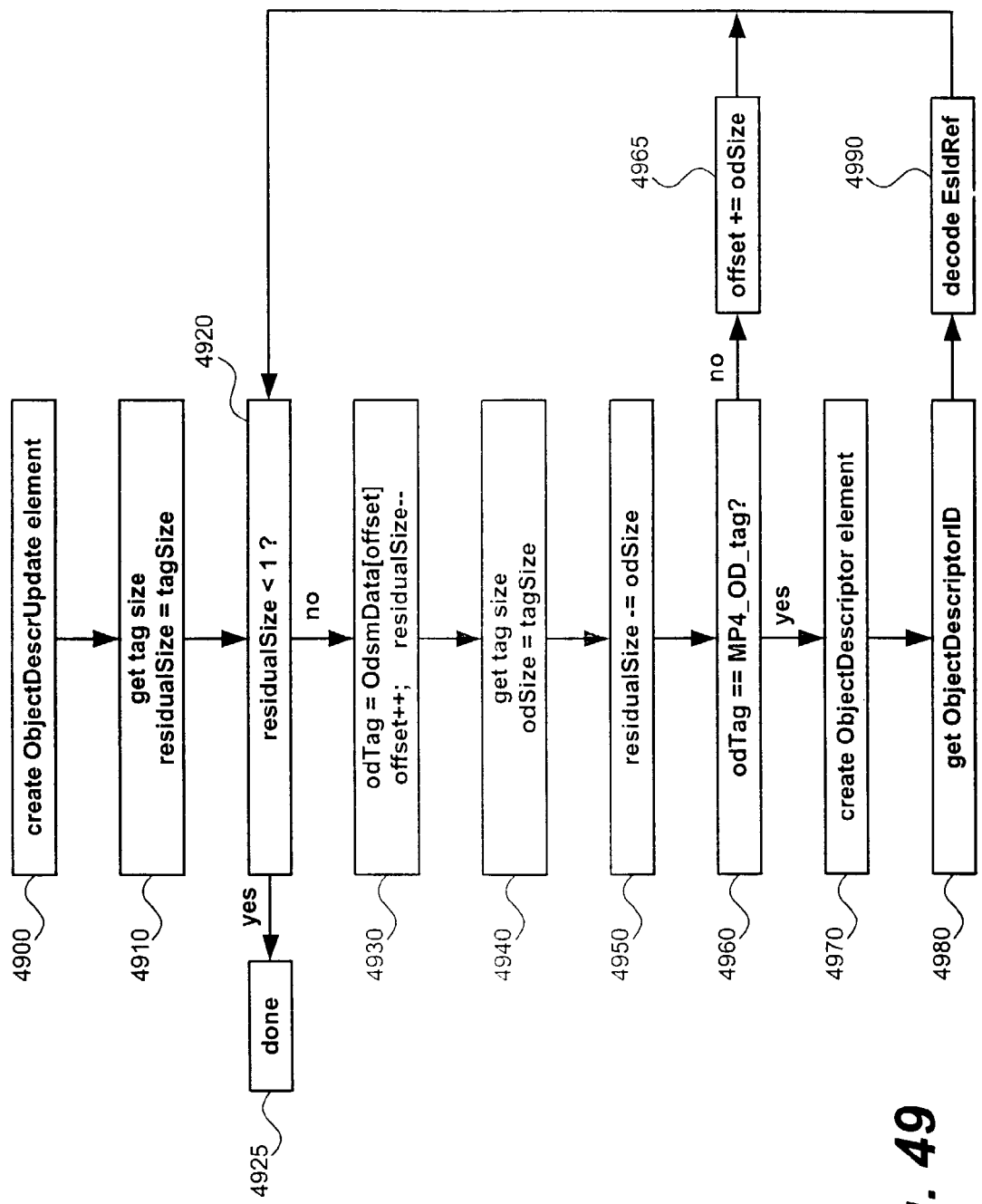
FIG. 49 shows an exemplary decode OdUpdate flowchart.

If the value of the command tag at operation 4860 for an odsm command equals the value "ObjectDescrUpdateTag" (operation 4870, 2000), the following steps 4875 are performed, as shown in FIG. 49:

1. Operation 4900 creates a new ObjectDescrUpdate element 2540 and appends it to the current odsmSample element 2520.

2. Operation 4910 uses the procedure "get tag size" to obtain the value of the quantity "tagSize" (numBytes 2020). This is equivalent to the procedure "get tag size" described above, except that (a) the array of bytes OdsmData is used in place of the array "esdData", and (b) the quantity "offset" is used in place of the quantity "esdPos". Assign the value of the quantity "tagsize" to the quantity "residualSize".

3. Operation 4920 compares the value of the quantity "residualSize" to the value "1".

4. At operation 4925, if the value of the quantity "residualSize" is less than 1, this procedure is complete.

5. At operation 4930, if the value of the quantity "residualSize" is not less than 1, assign the value of entry "offset" in the array of bytes "OdsmData" to the quantity "odTag". Increment the value of the quantity "offset" by "1" and decrement the value of the quantity "residualSize" by "1".

6. Operation 4940 uses the procedure "get tag size" to obtain the value of the quantity "tagSize" (numBytes 2116). This is equivalent to the procedure "get tag size" described above, except that (a) the array of bytes OdsmData is used in place of the array "esdData", and (b) the quantity "offset" is used in place of the quantity "esdPos". Assign the value of the quantity "tagSize" to the quantity "odSize".

7. Operation 4950 decrements the value of the quantity "residualSize" by the value of the quantity "odSize".

8. Operation 4960 compares the value of the quantity "odTag" to the value "MP4_OD_Tag" defined in the MPEG-4 System Specificiations.

9. At operation 4965, if the valueof the quantity "odTag" is not equal to "MP4_OD_Tag", increment the value of the quantity "offset" by the value of the quantity "tagSize", then repeat operation 4920.

10. At operation 4970, if the value of the quantity "odTag" equals the value "MP4_OD_Tag" 2108, create a new "ObjectDescriptor" element 2550 and append it to the current ObjectDescriptorUpdate element 2540.

11. Operation 4980 determines the value of the quantity "ObjectDescriptorID" 2124 and assigns the result to the attribute "ODID" of the new ObjectDescriptor element 2550.

The value of the quantity "ObjectDescriptorID" may be determined by means of the following operations:

(a) assign the value of entry offset in the array of bytes "OdsmData" to the integer quantity "temp1"

(b) increment the value of the quantity "offset" by one and decrement the value of the quantity "odSize by one, (c) assign the value of entry offset in the array of bytes "OdsmData" to the integer quantity "temp2"

(d) increment the value of the quantity "offset" by one and decrement the value of the quantity "odSize" by one, (e) multiply the value of the quantity "temp1" by 4 (shift left by 2 bits), (f) divide the value of the quantity "temp2" by 64 (shift right by 6 bits), (g) assign the sum of values "temp1" and "temp2" to the integer quantity "ObjectDescriptorID", 12. Operation 4990 performs the procedure "decodeEsIdRef" described below.

The Procedure "decodeEsIdRef"

Figure 50:
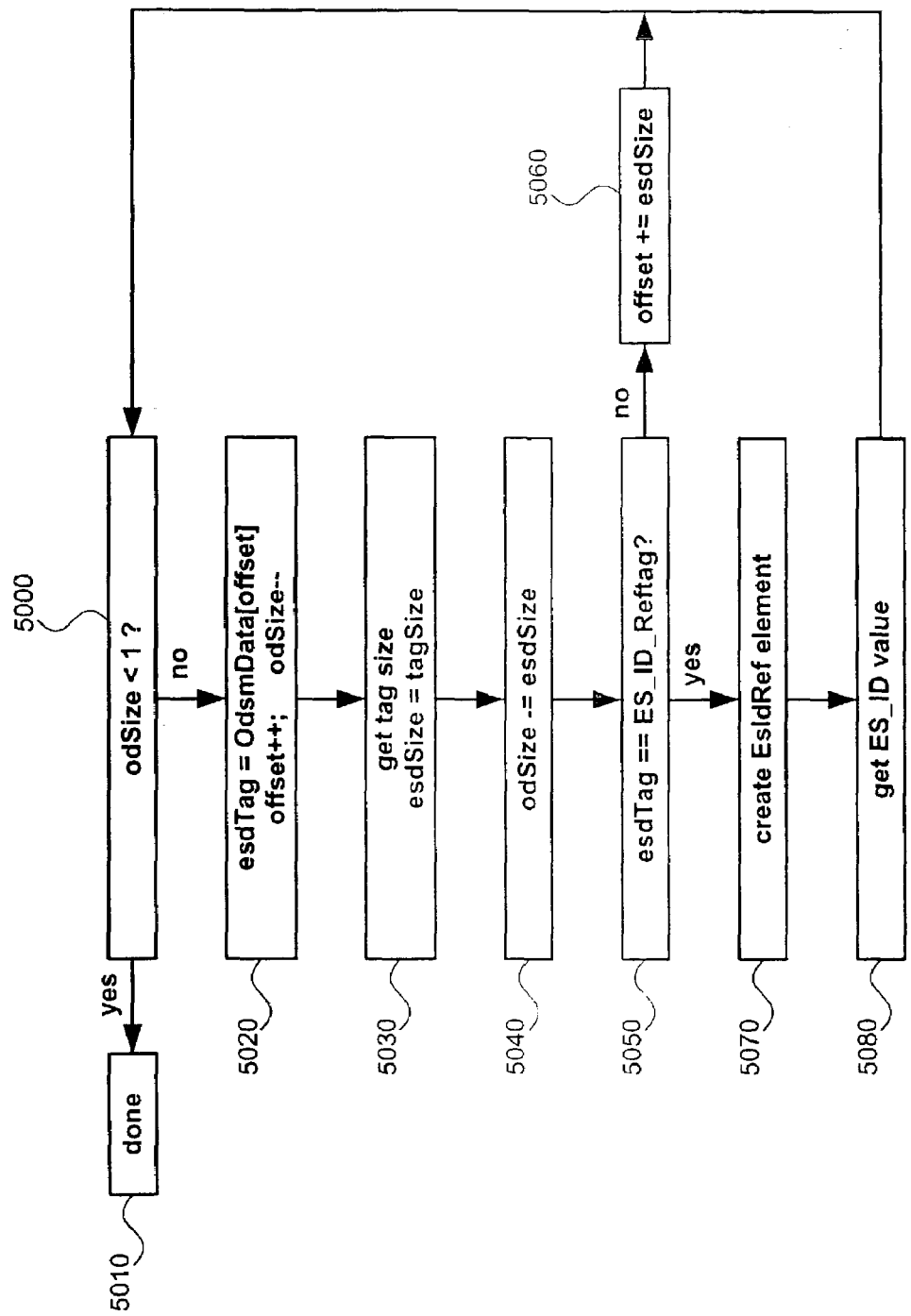

As shown in FIG. 50, the procedure "decodeEsIdRef" 4990 consists of the following steps:

1. Operation 5000 compares the value the quantity "odSize" to the value "1".

2. At operation 5010, if the value of the quantity "odSize" is less than "1", this procedure is finished.

3. Operation 5020 assigns the value of entry "offset" in the array of bytes "OdsmData" to the quantity "esdTag", increments the value of the quantity "offset" by "1" and decrements the value of the quantity "odSize" by "1".

4. Operation 5030 uses the procedure "get tag size" to obtain the value of the quantity "tagSize" (numBytes 2180). This is equivalent to the procedure "get tag size" described above, except that (a) the array of bytes OdsmData is used in place of the array "esdData", and (b) the quantity "offset" is used in place of the quantity "esdPos". Assign the value of the quantity "tagSize" to the quantity "esdSize".

5. Operation 5040 decrements the value of the quantity "odSize" by the value of the quantity "esdSize".

6. Operation 5050 compares the value of the quantity "esdTag" to the value "ES_ID_RefTag" defined in the MPEG-4 System Specificiations.

7. At operation 5060, if the valueof the quantity "esdTag" is not equal to the value "ES_ID_RefTag", increment the value of the quantity "offset" by the value of the quantity "esdSize", then repeat operation 5000.

8. At operation 5070, if the valueof the quantity "esdTag" equals the value "ES_ID_RefTag" 2170, create a new "EsIdRef" element 2560 and append it to the current ObjectDescriptor element 2550.

9. Operation 5080 determines the value of the quantity "ES_ID" 2190 and assigns the result to the attribute "EsId" of the new EsIdRef element 2560.

The value of the quantity "ES_ID" may be determined by means of the following operations:

(a) assign the value of entry offset in the array of bytes "OdsmData" to the integer quantity "temp1"

(b) increment the value of the quantity "offset" by one, (c) assign the value of entry offset in the array of bytes "OdsmData" to the integer quantity "temp2"

(d) increment the value of the quantity "offset" by one, (e) multiply the value of the quantity "temp1" by 256 (shift left by 8 bits), (f) assign the sum of values "temp1" and "temp2" to the integer quantity "ES_ID".

The Procedure "Decode OdRemove"

If the value of the command tag 4860 for an odsm command 1960 equals the value "ObjectDescrRemoveTag" 4880, 2050, the following steps are performed 4885:

1. Create a new ObjectDescrRemove element 2570 and append it to the current odsmSample element 2520.

2. Use the procedure "get tag size" to obtain the value of the quantity "tagSize" (numbytes 2060). This is equivalent to the procedure "get tag size" described above, except that (a) the array of bytes OdsmData is used in place of the array "esData", and (b) the quantity "offset" is used in place of the quantity "esdPos".

3. Multiply the value of the quantity "tagSize" by 8, divide the result by 10, and assign the result to the quantity "numOdIds".

4. Create a new null string quantity "OdIdList".

5. Treat the array of bytes "OdsmData" as a sequence of bits starting with entry "offset". Extract numOdId successive 10-bit integer values (objectDescriptorId 2070) from this sequence of bits.

6. Create a string representation for each of these objectDescriptorId values 2070. Concatenate each of these string values to the string quantity "OdIdList", separating successive values with a single blank space character.

7. Assign the resulting value of the string quantity "OdIdList" to the attribute "ODID" of the new ObjectDescrRemove element 2570.

The Procedure "VisualDataToXml"

Figure 51:
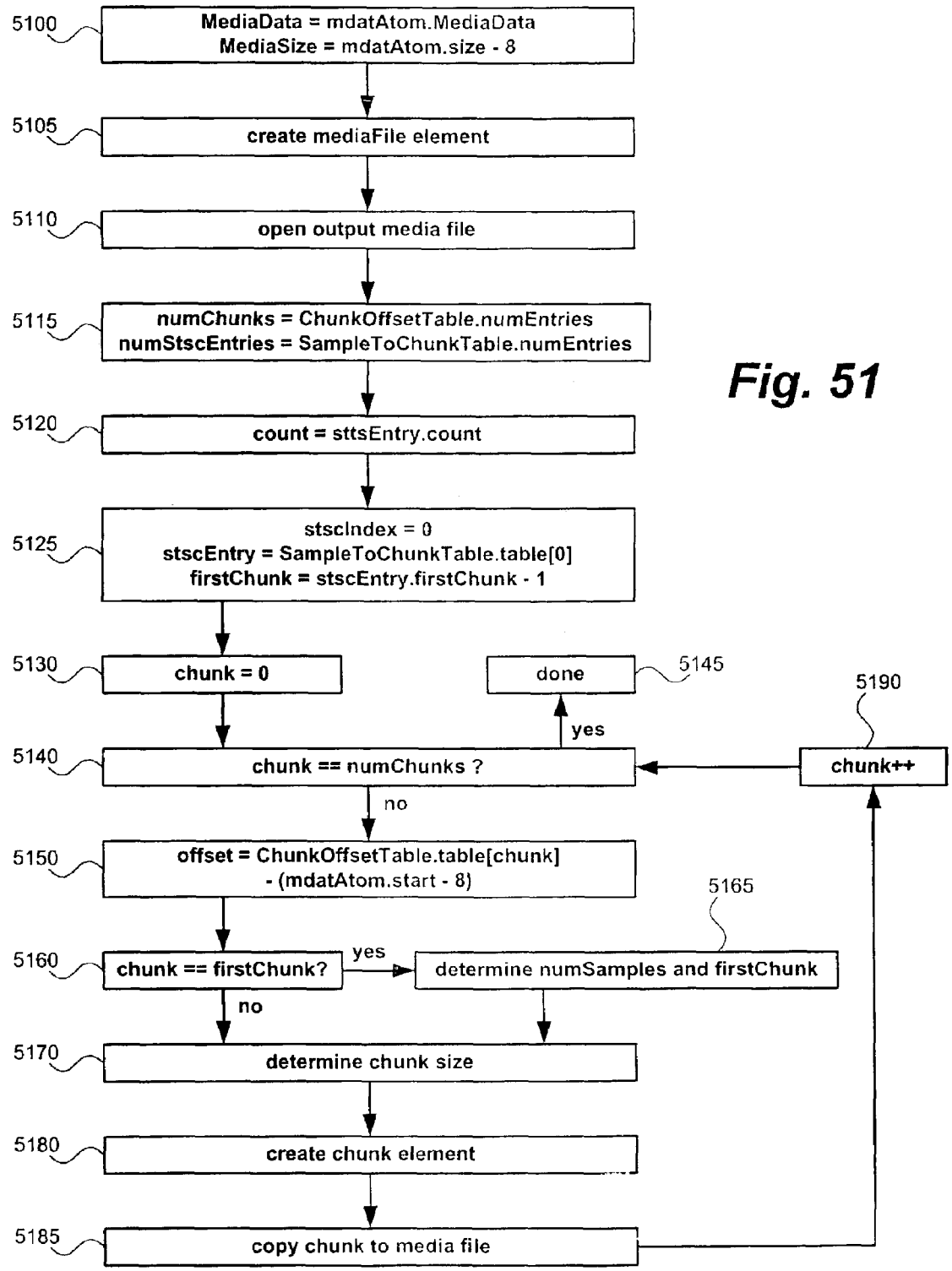

The procedure "VisualDataToXml" 4375 creates an xml representation of the chunks comprising a visual media data stream contained within mdat structure "mdatAtom" 4230. The media data contained within these chunks is also copied to an external media data file. As shown in FIG. 51, this procedure consists of the following operations:

1. At operation 5100 the value of member "MediaData" 3168 of the mdat structure "mdatAtom" 4230 is assigned to the quantity "MediaData" representing the address of an array of bytes. The value of member "size" 3163 of mdat structure "mdatAtom" 4230 is assigned to the integer quantity "MediaSize".

2. At operation 5105, a new "mediaFile" element 2480 is created and appended to the current mdat element 2400, 4260. Each such "mediaFile" element 2480 has two attributes, "trackID" and "name". The value of the attribute "name" specifies the name of a media data file 2230 that will contain the media data chunks comprising this stream.

The value of member trackID 3224 of the TrackHeader structure 3212, 3204 contained within the trak structure "trakAtom" 4320 is assigned to the value of the attribute "trackID" of the new "mediaFile" element 2480.

The value of the "name" attribute is determined by concatenating three strings of characters, a file name stub, a sequence number, and a file type suffix. The file name stub may be determined by a copy of the name of the input mp4 file, excluding the last occurrence of a "." (dot or period) character and all subsequent characters. The sequence number may be formed from a string representation of the value of a visual object sequence number, "numVisual".

The file type suffix may depend on the value of the quantity objectType and/or file format indications contained within the media data stream. For example, if the value of the quantity objectType is "32", the file type suffix may be specified as "m4v" (MPEG-4 video).

3. At operation 5110, a new media data file is opened for writing. The name of this new media data file is determined by the value of the "name" attribute of the mediaFile element 2480 established in operation 5105.

In the case of "MPEG-4 video" (objectType 1044 is "32"), an initial block of data must be placed at the beginning of the new media data file. This block of data is contained in the "decoder specific info" block 1072, 1076 contained within the array of bytes specified by member "esdData" 3496 in the SampleDescription data structure 3480 for the trak structure 3200 with a trackID value 3224 having the value specified by the quantity "iTrack". The SampleDescription data structure 3480 is determined by the first entry (entry 0) in member table 3430 of the SampleDescriptionTable data structure 3418 in the SampleDescriptions data structure 3400 for this trak structure. The "decoder specific info" block 1072, 1076 is contained within the "decoder config descriptor" data block 1024, 1032 contained within this esdData data block 3496.

The decoder config descriptor data 1032 may be located using the procedure "find decoder config descriptor" described above. The decoder specific info data block 1072, 1076 is located within the decoder config descriptor 1032 following the decoderConfigDescriptorTag 1036, the decoder config descriptor size value 1040, and 14 bytes of decoder config descriptor data 1044 to 1068. The decoder specific info data block 1076 consists of the one-byte decoderSpecificInfoTag 1080 (value "5"), the decoder specific info data block size value (numBytes 1084), and numBytes bytes of decoder specific info data. This sequence of numBytes 1084 bytes is copied to the output MPEG-4 video file 2230.

4. At operation 5115, the value of member numEntries 3428 of the sample table structure 3420 ChunkOffsetTable 3408 is assigned to the quantity "numChunks". The value of member numEntries 3428 of the sample table structure 3420 SampleToChunkTable 3406 is assigned to the quantity "numStscEntries". The sample table structures ChunkoffsetTable, SampleToChunkTable, etc., are members of the SampleTables structure 3400 represented by member "Sample Tables" 3340 of the MediaInfo data structure 3333 represented by member "MediaInfo 3234 of the TrackMedia data structure 3226 represented by member "TrackMedia" 3206 of the trak structure 3200 trakAtom 4230.

5. At operation 5120 the value of member "count" of TimeToSample structure sttsEntry is assigned to the quantity "count".

6. At operation 5125, the value zero is assigned to the quantity "stscIndex". The value of the first entry in the table array 3430 contained within the sample table structure 3420 SampleToChunkTable 3406 is assigned to sts- cEntry representing the address of a SampleToChunk structure 3460. The value of member "firstChunk" of SampleToChunk structure stscEntry, minus one, is assigned to the integer quantity "firstChunk".

7. At operation 5130, the value zero is assigned to integer quantity "chunk".

8. At operation 5140, the value of the quantity "chunk" is compared to the value of the quantity "numChunks".

9. At operation 5145, if the value of the quantity "chunk" equals the value of the quantity "numChunks", the procedure "VisualDataToXml" is finished.

10. At operation 5150, if the value of the quantity "chunk" does not equal the value of the quantity "numChunks", the value "8" is added to the value of member "start" of mdat structure 3160 mdatAtom 4230, the result is subtracted from the value of entry "chunk" in the table array 3430 contained in the sample table structure 3420 ChunkOffsetTable 3408, and the result is assigned to integer quantity "offset".

11. At operation 5160, the value of the quantity "chunk" is compared to the value of the quantity "firstChunk".

12. At operation 5165, if the value of the quantity "chunk" equals the value of the quantity "firstChunk", the value of member "numSamples" 3466 in SampleToChunk structure 3460 stscEntry is assigned to the quantity "numSamples". The value of quantity "stscindex" is incremented by 1. If the value of the quantity "stscIndex" is less than the value of the quantity "numStscEntries", the value of the entry "stscIndex" in the table array 3430 contained within the sample table structure 3420 SampleToChunkTable 3406 is assigned to the SampleToChunk structure 3460 stscEntry, and the value of member "firstChunk" of SampleToChunk structure stscEntry, minus one, is assigned to the integer quantity "firstChunk". Otherwise, the value of the quantity "numChunks" is assigned to the quantity "firstChunk".

13. At operation 5170, the value of the quantity "chunkSize" is determined by summing the entries "sample" through "sample+numSamples−1" in the array of integers 3456 contained in the SampleSizeTable structure 3440 SampleSizeTable 3413.

14. At operation 5180, a new "chunk" element is created and appended to the new "mediaFile" element created in operation 5105. The value of the quantity "offset" is assigned to the attribute "offset" of the new "chunk" element. The value of the quantity "chunkSize" is assigned to the attribute "size" of the new "chunk" element.

15. At operation 5185, the chunkSize bytes of media data starting at offset bytes from the start of byte array MediaData are copied to the output media data file opened in operation 5110.

16. At operation 5190, the value of the quantity "chunk" is incremented by 1 and operation 5140 is repeated.

The Procedure "AudioDataToXml"

The procedure "AudioDataToXml" 4385 creates an xml representation of the chunks comprising an audio media data stream contained within mdat structure "mdatAtom" 4230. The media data contained within these chunks is also copied to an external media data file. As shown in FIG. 51, this procedure is equivalent to the procedure "VisualDataToXml" described above, except for the following differences:

The sequence number used to form the value of the "name" attribute may be formed from a string representation of an audio object sequence number, "numAudio".

The file type suffix may depend on the value of the quantity objectType and/or file format indications contained within the media data stream. For example, if the value of the quantity objectType is "107", the file type suffix may be specified as ".mp3" (MPEG-1 layer 3 audio).

At operation 5145, if the value of the quantity "chunk" equals the value of the quantity "numChunks", the procedure "AudioDataToXml" is finished.

Certain types of audio data, such as MPEG-2 AAC (Advanced Audio Coding) may require additional processing beyond what has been described here. Means of performing such processing may be devised by one skilled in the art based on the corresponding media-specific file structure Epecifications. The particular means used to process each type of audio data are not covered here.

The Procedure "SdsmDataToXml"

The procedure "SdsmDataToXml" 4365 creates an xml representation of an sdsm (BIFS) data stream (scene description stream) contained within the current mdat structure "mdatAtom" 4230. The xml representation of the sdsm created by this procedure consists of two parts:

(a) An sdsm element 2440 containing a summary of the media data chunks 2450 comprising the sdsm. This sdsm element 2440 is contained within the current mdat element 4260 which forms part of the mp4file document 2300.

(b) An xml representation of the sdsm media data samples 1100, 1110 is created in the mp4bifs document 2260, 2800.

Figure 52:
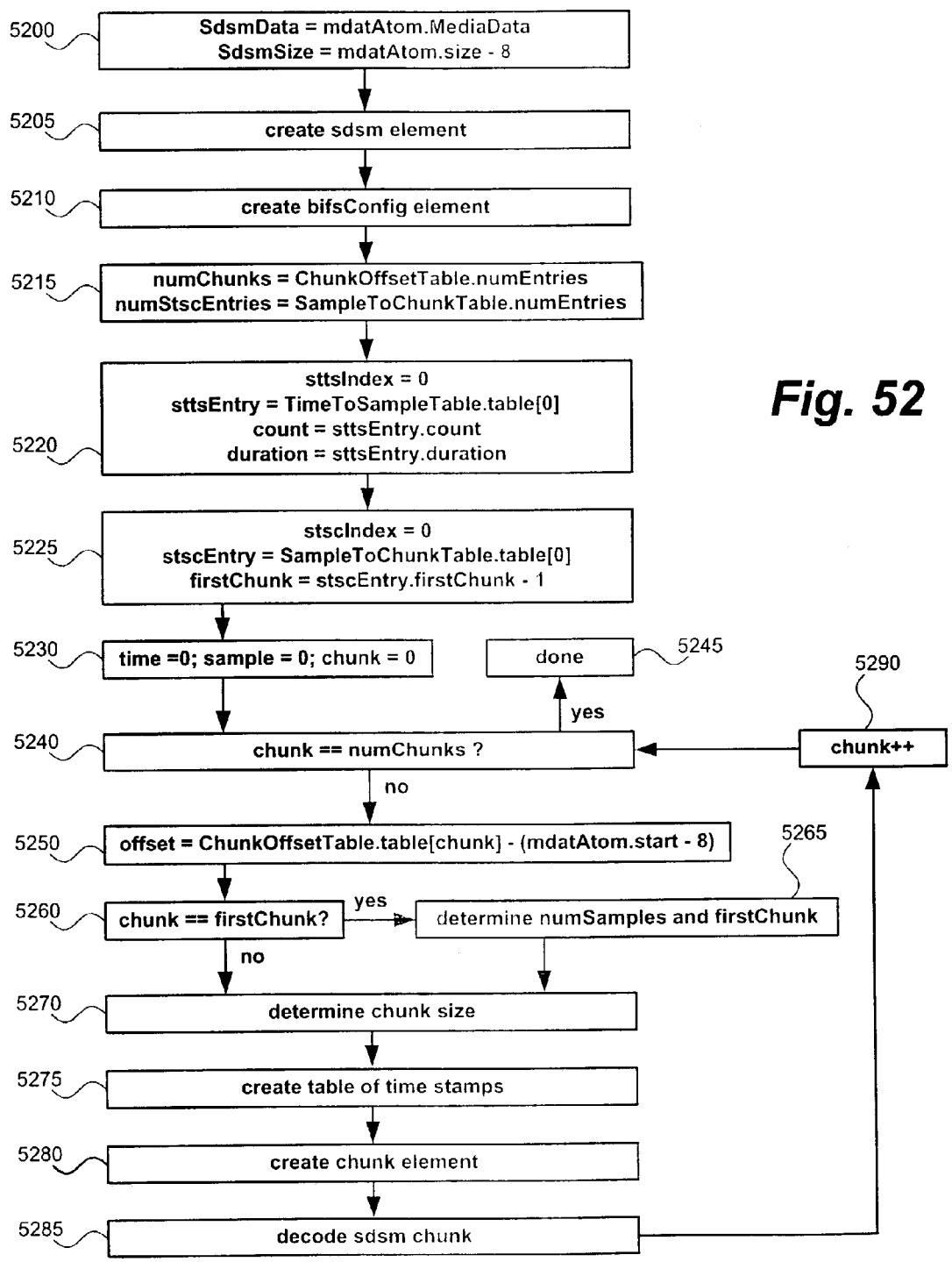

As shown in FIG. 52, this procedure consists of the following operations:

1. At operation 5200, the value of member "MediaData" 3168 of the mdat structure "mdatAtom" 4230 is assigned to the quantity "SdsmData" representing the address of an array of bytes. The value of member "size" 3163 of mdat structure "mdatAtom" 4230 is assigned to the integer quantity "SdsmSize".

2. At operation 5205, a new "sdsm" element 2410, 2440 is created and appended to the current mdat element 2400, 4260. Each such "sdsm" element 2440 has two attributes, "trackID" and "xmlFile". The attribute "xmlFile" specifies the name of an optional xml output file that may be used to represent the resulting mp4bifs document 2260, 2800. This optional xml output file may be useful for diagnostic purposes, but it is not required for the operation of this invention (that is for creation of an XMT-A file based on and mp4 binary file).

The value of member trackID 3224 of the TrackHeader structure 3212, 3204 contained within the trak structure "trakAtom" 4320 is assigned to the value of the attribute "trackID" of the new "sdsm" element 2440.

The value of the attribute "xmlFile" is determined by concatenating two strings of characters, a file name stub and a file type suffix. The file name stub may be determined by a copy of the name of the input mp4 file, excluding the last occurrence of a "." (dot or period) character and all subsequent characters. The file type suffix is "Bifs.xml".

3. At operation 5210, a new "bifsconfig" element 2810 is created and appended to the top element in the mp4bifs document 2260, 2800. The procedure "set bifsconfig attributes" described below is then used to set the attributes of the "bifsconfig" element 2810.

4. At operation 5215, the value of member numEntries 3428 of the sample table structure 3420 ChunkOffsetTable 3408 is assigned to the quantity "numChunks". The value of member numEntries 3428 of the sample table structure 3420 SampleToChunkTable 3406 is assigned to the quantity "numStscEntries". The sample table structures Chunkoffset-Table, SampleToChunkTable, etc., are members of the SampleTables structure 3400 represented by member "Sample Tables" 3340 of the MediaInfo data structure 3333 represented by member "MediaInfo 3234 of the TrackMedia data structure 3226 represented by member "TrackMedia" 3206 of the trak structure 3200 trakAtom 4320.

5. At operation 5220, the value zero is assigned to the quantity "sttsIndex". The value of the first entry in the table array 3430 contained within the sample table structure 3420 TimeToSampleTable 3410 is assigned to the quantity sttsEntry representing the address of a TimeToSample structure 3470. The value of member "count" of TimeToSample structure sttsEntry is assigned to the quantity "count". The value of member "duration" of TimeToSample structure sttsEntry is assigned to the quantity "duration".

6. At operation 5225, the value zero is assigned to the quantity "stscIndex". The value of the first entry in the table array 3430 contained within the sample table structure 3420 SampleToChunkTable 3406 is assigned to the quantity stscEntry representing the address of a SampleToChunk structure 3460. The value of member "firstChunk" of SampleToChunk structure stscEntry, minus one, is assigned to the integer quantity "firstChunk".

7. At operation 5230, the value zero is assigned to integer quantity "chunk".

8. At operation 5240, the value of the quantity "chunk" is compared to the value of the quantity "numChunks".

9. At operation 5245, if the value of the quantity "chunk" equals the value of the quantity "numChunks", the procedure "SdsmDataToXml" is finished.

10. At operation 5250, if the value of the quantity "chunk" does not equal the value of the quantity "numChunks", the value "8" is added to the value of member "start" of mdat structure 3160 mdatAtom 4230, the result is subtracted from the value of entry "chunk" in the table array 3430 contained in the sample table structure 3420 ChunkOffsetTable 3408, and the result is assigned to integer quantity "offset".

11. At operation 5260, the value of the quantity "chunk" is compared to the value of the quantity "firstChunk".

12. At operation 5265, if the value of the quantity "chunk" equals the value of the quantity "firstChunk", the value of member "numSamples" 3466 in SampleToChunk structure 3460 stscEntry is assigned to the quantity "numSamples". The value of quantity "stscIndex" is incremented by 1. If the value of the quantity "stscIndex" is less than the value of the quantity "numStscEntries", the value of the entry "stscIndex" in the table array 3430 contained within the sample table structure 3420 SampleToChunkTable 3406 is assigned to the SampleToChunk structure 3460 stscEntry, and the value of member "firstChunk" of SampleToChunk structure stscEntry, minus one, is assigned to the integer quantity "firstChunk". Otherwise, the value of the quantity "numChunks" is assigned to the quantity "firstChunk".

13. At operation 5270, the value of the quantity "chunkSize" is determined by summing the entries "sample" through "sample+numSamples-1" in the array of integers 3456 contained in the SampleSizeTable structure 3440 SampleSizeTable 3413.

14. At operation 5275, a table of time stamps with numSamples entries is created based on the contents of the entries in the table array member 3430 in the TimeToSampleTable data structure 3410, the TrackEdit data structure 3208, 3236, and the MediaHeader data structure 3230 contained in the associated trak structure 3200. This table contains one entry for each sample in the current chunk, and each entry in this table represents the sum of duration values 3476 for all preceding samples in this stream, plus any initial delay specified in the optional TrackEdit data structure 3208, 3236, if present. Any person skilled in the art can create means for generating such a table from the available information.

15. At operation 5280, a new "chunk" element is created and appended to the new "sdsm" element created in step 2. The value of the quantity "offset" is assigned to the attribute "offset" of the new "chunk" element. The value of the quantity "chunkSize" is assigned to the attribute "size" of the new "chunk" element.

Figure 53:
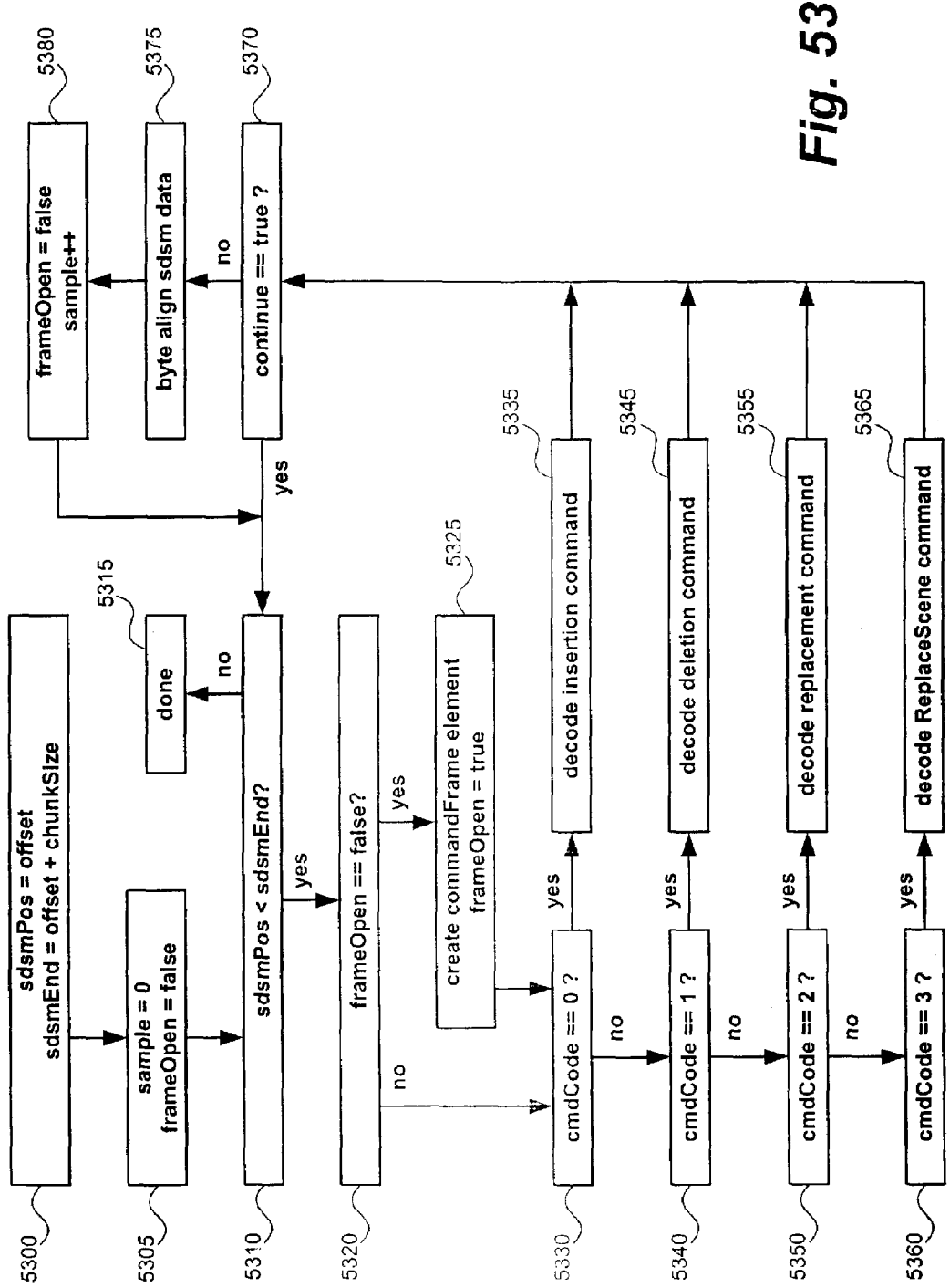

16. At operation 5285, the procedure "decode sdsm chunk", as shown in FIG. 53, is performed.

17. At operation 5290, the value of the quantity "chunk" is incremented by 1 and operation 5240 is repeated.

Procedure Set bifsConfig Attributes

The mp4bifs bifsConfig element 2810 has seven attributes, "nodeIdBits", "routeIdBits", "commandFrame", "useBIFSv2Config", "protoIdbits", "use3DMeshCoding", and "usePredictiveMFField". The values of these attributes are determined by the contents of the decoder specific info data 1072 for the current trak data structure "trakAtom" 4320. This data block is contained within the decoder config descriptor 1024, 1032 within the esdData member 1000, 3496 of the SampleDescription data structure 3480 specified by entry 0 in the member "table array" 3430 of member SampleDescriptionTable 3418 of the SampleTables data structure 3400 contained within the current trackAtom data structure 3400, 4320.

If the value of the quantity "objectType" 4460 is "2", then the decoder specific info data represents a "version 2" BIFS configuration. In this case, the first three bytes of the decoder specific info block have the following contents:

[uraaaaab bbbbpppp pcxxxxxx]

where, u=1-bit value for "use3DMeshCoding",
r=1-bit value for "usePredictiveMFField",
aaaaa=5-bit unsigned integer value for "nodeIdBits"
bbbbb=5-bit unsigned integer value for "routeIdBits"
ppppp=5-bit unsigned integer value for "protoidbits"
c=1-bit value for "commandFrame".

The values specified by aaaaa, bbbbb, and ppppp are assigned to the indicated attributes.

The unsigned integer value specified by "aaaaa" is assigned to the "nodeIdBits" attribute of the mp4bifs bifsConfig element 2810. The unsigned integer value specified by "bbbbb" is assigned to the "routeIdBits" attribute of the mp4bifs bifsConfig element 2810. The unsigned integer value specified by "ppppp" is assigned to the "protoIdbits" attribute of the mp4bifs bifsConfig element 2810.

If the value of "u", "r", or "c" is "0", then the value "false" is assigned to the corresponding attribute of the mp4bifs bifsConfig element 2810. If the value of "u", "r", or "c" is "1", then the value "true" is assigned to the corresponding attribute of the mp4bifs bifsConfig element 2810.

If the value of the quantity "objectType" 4460 is not "2", then the decoder specific info data represents a "version 1" BIFS configuration. In this case, the first two bytes of the decoder specific info block have the following contents:

[aaaaabbb bbcxxxxx]

where, aaaaa=5-bit unsigned integer value for "nodeIdBits"
bbbbb=5-bit unsigned integer value for "routeIdBits"
c=1-bit value for "commandFrame".

In this case, the values of "protoIdbits", "use3DMeshCoding", and "usePredictiveMFField" are not needed.

The unsigned integer value specified by "aaaaa" is assigned to the "nodeIdBits" attribute of the mp4bifs bifsConfig element 2810. The unsigned integer value specified by "bbbbb" is assigned to the "routeIdBits" attribute of the mp4bifs bifsConfig element 2810.

If the value of "c" is "0", then the value "false" is assigned to the "commandFrame" attribute of the mp4bifs bifsConfig element 2810. Otherwise, (if the value of "c" is "1"), the value "true" is assigned to the "commandFrame" attribute of the mp4bifs bifsConfig element 2810.

The Procedure "Decode sdsm Chunk"

As shown in FIG. 53, the procedure "decode sdsm chunk" consists of the following steps:

1. At operation 5300, the value of the quantity "offset" 5250 is assigned to the integer quantity "sdsmPos". The value of the quantity "chunkSize" 5270 is added to the value of the quantity "offset" and the result is assigned to the integer quantity "sdsmEnd". The value of the quantity "sdsmPos" specifies the location of a byte within the array of bytes "SdsmData" 5200.

An associated integer quantity "sdsmBit" specifies the position of a bit within the byte specified by the value of the quantity sdsmPos. Initially, the value zero is assigned to the associated quantity "sdsmBit". Subsequently, the value of sdsmBit is incremented by 1 for each bit extracted from sdsm bitstream. Whenever the value of sdsmBit exceeds 7, the value of "sdsmBit" is decremented by 8 and the value of "sdsmPos" is incremented by 1.

2. At operation 5305, the value zero is assigned to the integer quantity "sample" and the value "false" is assigned to the boolean quantity "frameOpen".

3. At operation 5310, the value of the quantity "sdsmPos" is compared to the value of the quantity "sdsmEnd".

4. At operation 5315, if the value of the quantity "sdsmPos" is not less than the value of the quantity "sdsmEnd", this procedure is finished.

5. At operation 5320, if the value of the quantity "sdsmPos" is less than the value of the quantity "sdsmEnd", the value of the quantity "frameOpen" is compared to the value "false".

6. At operation 5325, if the value the quantity "frameOpen" equals the value "false", a new "commandFrame" element 2820 is created and appended to the mp4bifs document 2800. The value of entry "sample" in the table of time stamps 5275 is assigned to the "time" attribute of the new commandFrame element. The value "true" is assigned to the boolean quantity "frameOpen".

7. At operation 5330, the next two bits in the sdsm bitstream starting at the point specified by the values of "sdsmPos" and "sdsmBit" are assigned to the quantity "cmdCode". The value of the quantity "sdsmBit" is incremented by 2, and the value of the quantity "cmdCode" is compared to 0.

8. At operation 5335, if the value of the quantity "cmdCode" equals "0" 1206, the procedure "decode insertion command" is performed.

9. At operation 5340, the value of the quantity "cmdCode" is compared to "1".

10. At operation 5345, if the value of the quantity "cmdcode" equals "1" 1226, the procedure "decode deletion command" is performed.

11. At operation 5350, the value of the quantity "cmdCode" is compared to "2".

12. At operation 5355, if the value of the quantity "cmdcode" equals "2" 1244, the procedure "decode replacement command" is performed.

13. At operation 5360, if the value of "cmdcode" is not "0", "1", or "2", it must be "3" because this value is determined by two bits of data. Consequently, the result of this step is always "yes".

14. At operation 5365, if the value of the quantity "cmdCode" equals "3" 1280, the procedure "decode ReplaceScene command" is performed.

The procedure "decode ReplaceScene cmd" comprises creating a new "ReplaceScene" bifsCommand element 2930 and appending it to the current "commandFrame" element 2830, operation 5310. The BIFS Scene data structure 1290, 1600 following the scene replacement cmdCode 1280 is then interpreted, advancing the values of sdsmBit and sdsm-Byte as needed.

The value specified by the "reserved" component 1610 is skipped by incrementing the value of sdsmBit. The values specified by the USENAMES 1620, and protoList 1630 components of the BIFS Scene structure 1600 are determined and assigned to corresponding attributes of the new "ReplaceScene" element.

The procedure "decode SFNode" is then used to interpret the SFTopNode component 1640 of the BIFS Scene structure 1600. The new "ReplaceScene" bifsCommand element 2930 serves as the parent for the resulting TopNode BIFS node element 2940.

The one-bit value "hasRoutes" 1650 is assignd to the boolean value "hasRoutes". If the value of "hasRoutes" is "1" ("true"), then the following Routes component 1660, 1800, 1830 is interpreted. A new "Routes" element 2950 is created and appended to the new "ReplaceScene" element 2930. A new "Route" element 2950 is created and appended to the new "Routes" element 2950 for each Route structure 1810 or 1850 contained within the Routes component 1660. The values specified by the routeID 1870, routeName 1875, outNodeID 1880, outFieldRef 1885, inNodeID 1890, and inFieldRef 1895 components of each Route structure 1860 are determined and assigned to corresponding attributes of each new "Route" element 2960.

15. At operation 5370, following completion of the procedure "decode insertion command", "decode deletion command", "decode replacement command", or "decode ReplaceScene command", the next bit in the sdsm bitstream is assigned to the boolean quantity "continue" 1130 or 1140. If the resulting value of the quantity "continue" is "1" ("true") 1130, this procedure continues with operation 5310.

16. Operation 5375 to, if the value of the quantity "continue" is "0" ("false") 1140, the sdsm bitstream is advanced to the start of the next byte. That is, if the value of the quantity sdsmBit is zero, nothing is done. Otherwise, the value of "sdsmBit" is set to zero and the value of sdsmByte is incremented by one. This step skips over the "padding bits" 1150 at the end of an sdsm command frame 1110.

17. At operation 5380, the value of the boolean quantity "frameOpen" is set to "false", the value of the quantity "sample" is incremented by one, and this procedure continues with operation 5310.

The Procedure "Decode Insertion Command"

Figure 54:
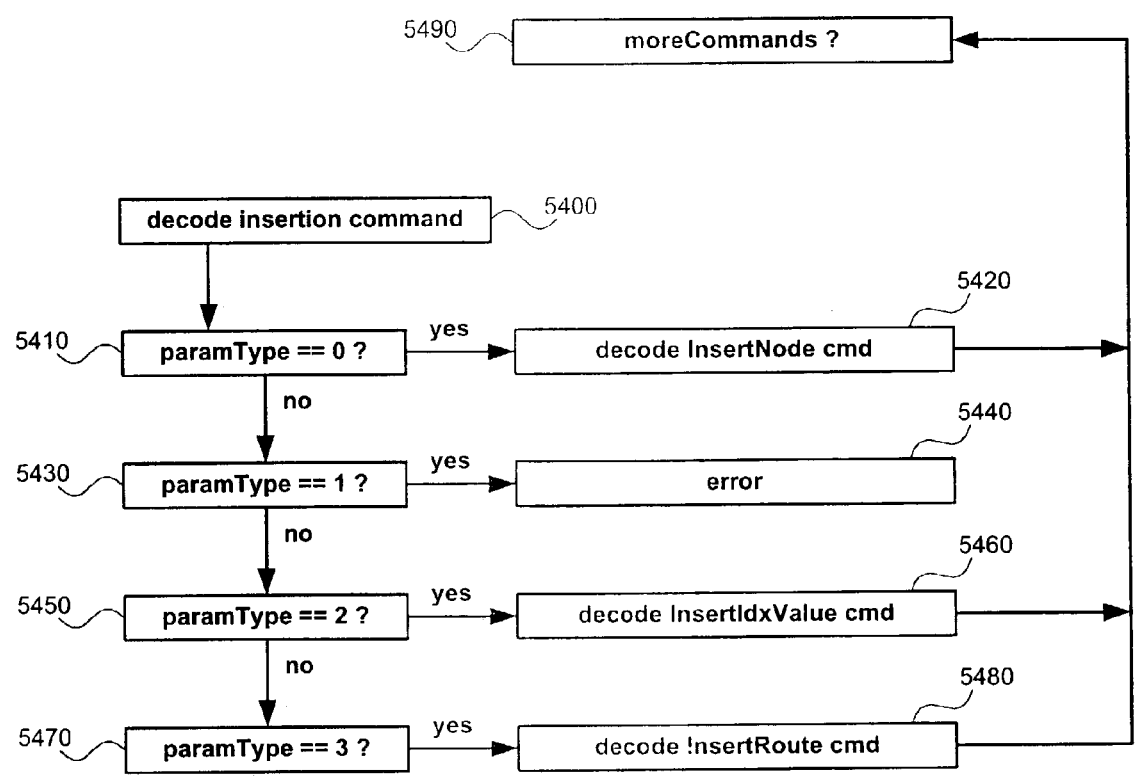

As shown in FIG. 54, the procedure "decode insertion command" consists of the following steps:

1. At operation 5400, the next two bits in the sdsm bitstream 1210 are assigned to the quantity "paramType".

2. At operation 5410, the value of the quantity "paramType" is compared to "0".

3. At operation 5420, if the value of the quantity "paramType" is "0" 1308, the procedure "decode InsertNode cmd" is performed.

The procedure "decode InsertNode cmd" comprises creating a new "InsertNode" bifsCommand element 2840 and appending it to the current parent element 2830, operation 5310. The values specified by the nodeID 1312, insertionposition 1316, and position 1320 components of the Node Insertion command 1300 are determined and assigned to corresponding attributes of the new "InsertNode" bifsCommand element.

The procedure "decode SFNode" is then used to interpret the SFNode component 1324 of the Node Insertion command 1300.

4. At operation 5430, the value of the quantity "paramType" is compared to "1".

5. At operation 5440, if the value of the quantity "paramType" is 1, an error has been encountered. This value is not permitted within a valid sdsm data stream. The process of decoding the sdsm bitstream must be terminated.

6. At operation 5450, the value of the quantity "paramType" is compared to "2".

7. At operation 5460, if the value of the quantity "paramType" is "2" 1336, the procedure "decode InsertIdxvalue cmd" is performed.

The procedure "decode InsertIdxValue cmd" comprises creating a new "InsertIndexedValue" bifsCommand element 2840 and appending it to the current parent element 2830, 5310. The values specified by the nodeID 1340, inFieldID 1344, insertionPosition 1348, and position 1320 components of the Indexed Value Insertion command 1328 are determined and assigned to corresponding attributes of the new "InsertIndexedValue" bifsCommand element.

The type of data (boolean, integer, string, etc.) represented by component "field value" 1356 is determined by the values of the quantities "nodeID", "inFieldID", and tables defined in the MPEG-4 Systems Specifications. If the data type for a field value is "SFNode", then the procedure "decode SFNode" is used to interpret the "field value", component 1356 of the Indexed Value Insertion command 1328 and the name of the BIFS node contained in the "field value" component is assigned to the "value" attribute of the new InsertIndexedValue" element. Otherwise, the numerical value or string value represented by the "field value" component 1356 is assigned to the "value" attribute of the new "InsertIndexedValue" bifsCommand element.

8. At operation 5470, if the value of "paramType" is not "0", "1", or "2", it must be "3" 1368 because this value is determined by two bits of data. Consequently, the result of this step is always "yes".

9. At operation 5480, the procedure "decode InsertRoute cmd" is performed.

The procedure "decode InsertRoute cmd" comprises creating a new "InsertRoute" bifsCommand element 2840 and appending it to the current parent element 2830, operation 5310. The values specified by the isupdateable 1372, routeID 1376, departureNodeID 1380, departureFieldID 1384, arrivalNodeID 1388, and arrivalFieldID 1392 components of the Route Insertion command 1360 are determined and assigned to corresponding attributes of the new "InsertRoute" bifsCommand element.

10. At operation 5490, after completion of the procedure "decode InsertNode cmd", "decode InsertIdxValue cmd", or "decode InsertRoute cmd", processing of the sdsm bitstream continues with the value of the quantity "moreCommands" 5370.

The Procedure "Decode Deletion Command"

Figure 55:
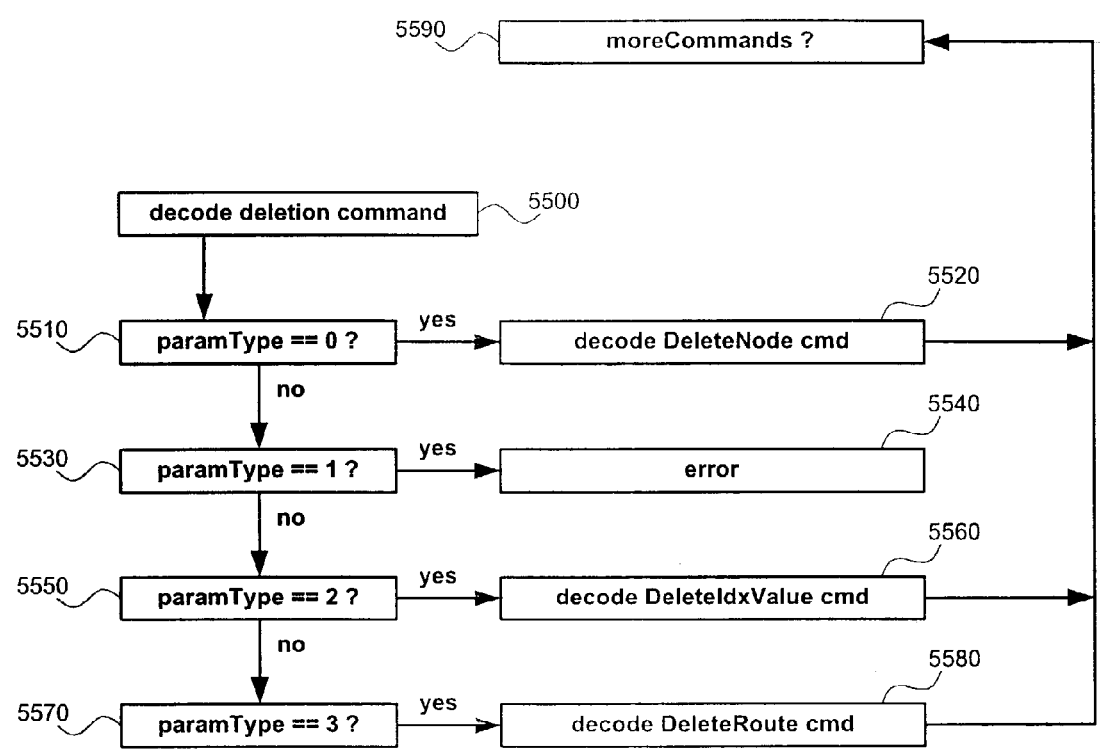

As shown in FIG. 55, the procedure "decode deletion command" consists of the following steps:

1. At operation 5500, the next two bits in the sdsm bitstream are assigned to the quantity "paramType".

2. At operation 5510, the value of the quantity "paramType" is compared to "0".

3. At operation 5520, if the value of the quantity "paramType" is "0" 1412, the procedure "decode DeleteNode cmd" is performed.

The procedure "decode DeleteNode cmd" comprises creating a new "DeleteNode" bifsCommand element 2840 and appending it to the current parent element 2830, at operation 5310. The value specified by the nodeID 1418 component of the Node Deletion command 1400 is determined and assigned to the "nodeID" attribute of the new "DeleteNode" bifsCommand element.

4. At operation 5530, the value of the quantity "paramType" is compared to "1".

5. At operation 5540, if the value of the quantity "paramType" is 1, an error has been encountered. This value is not permitted within a valid sdsm data stream. The process of decoding the sdsm bitstream must be terminated.

6. At operation 5550, the value of the quantity "paramType" is compared to "2".

7. At operation 5560, if the value of the quantity "paramType" is "2" 1436, the procedure "decode DeleteIdxValue cmd" is performed.

The procedure "decode DeleteIdxValue cmd" comprises creating a new "DeleteIndexedValue" bifsCommand element 2840 and appending it to the current parent element 2830, at operation 5310. The values specified by the nodeID 1442, inFieldID 1448, deletionPosition 1454, and position 1460 components of the Node Deletion command 1424 are determined and assigned to corresponding attributes of the new "DeleteIndexedValue" bifsCommand element.

8. At operation 5570, if the value of "paramType" is not "0", "1", or "2", it must be "3" 1478 because this value is determined by two bits of data. Consequently, the result of this step is always "yes".

9. At operation 5580, the procedure "decode DeleteRoute cmd" is performed.

The procedure "decode DeleteRoute cmd" comprises creating a new "DeleteRoute" bifsCommand element 2840 and appending it to the current parent element 2830, at operation 5310. The value specified by the routeID 1484 component of the Route Deletion command 1466 is determined and assigned to the "routeID" attribute of the new "DeleteRoute" bifsCommand element.

10. At operation 5590, after completion of the procedure "decode InsertNode cmd", "decode InsertIdxvalue cmd", or "decode InsertRoute cmd", processing of the sdsm bitstream continues with the value of the quantity "moreCommands" 5370.

The Procedure "Decode Replacement Command"

Figure 56:
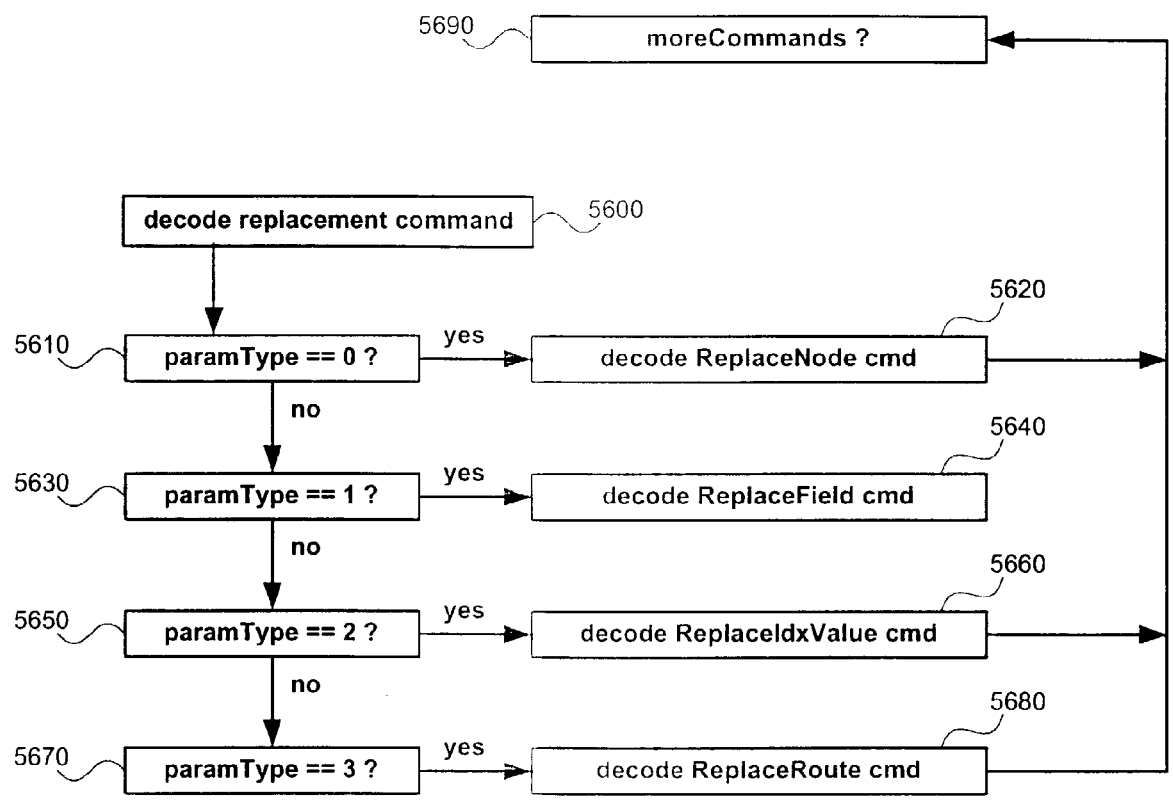

As shown in FIG. 56, the procedure "decode replacement command" consists of the following steps:

1. At operation 5600, the next two bits in the sdsm bitstream are assigned to the quantity "paramType".

2. At operation 5610, the value of the quantity "paramType" is compared to "0".

3. At operation 5620, if the value of the quantity "paramType" is "0" 1508, the procedure "decode ReplaceNode cmd" is performed.

The procedure "decode ReplaceNode cmd" comprises creating a new "ReplaceNode" bifsCommand element 2840 and appending it to the current parent element 2830, at operation 5310. The value specified by the nodeID 1510 component of the Node Replacement command 1500 is determined and assigned to the "nodeID" attributes of the new "ReplaceNode" bifsCommand element.

The procedure "decode SFNode" is then used to interpret the SFNode component 1514 of the Node Replacement command 1500.

4. At operation 5630, the value of the quantity "paramType" is compared to "1"

5. At operation 5640, if the value of the quantity "paramType" is "1" 1538, the procedure "decode ReplaceField cmd" is performed.

The procedure "decode ReplaceField cmd" comprises creating a new "ReplaceField" bifsCommand element 2840 and appending it to the current parent element 2830, at operation 5310. The values specified by the nodeID 1530, and inFieldID 1534 components of the Field Replacement command 1520 are determined and assigned to corresponding attributes of the new "ReplaceField" bifsCommand element.

The type of data (boolean, integer, string, etc.) represented by component "field value" 1538 is determined by the values of the quantities "nodeID", "inFieldID", and tables defined in the MPEG-4 Systems Specifications. If the data type for a field value is "SFNode", then the procedure "decode SFNode" is used to interpret the "field value" component 1538 of the Field Replacement command 1520 and the name of the BIFS node contained in the "field value" component is assigned to the "value" attribute of the new ReplaceField" element. Otherwise, the numerical value or string value represented by the "field value", component 1538 is assigned to the "value" attribute of the new "ReplaceField" bifsCommand element.

6. At operation 5650, the value of the quantity "paramType" is compared to "2".

7. At operation 5660, if the value of the quantity "paramType" is "2" 1548, the procedure "decode ReplaceIdxValue cmd" is performed.

The procedure "decode ReplaceIdxvalue cmd" comprises creating a new "ReplaceIndexedValue" bifsCommand element 2840 and appending it to the current parent element 2830, at operation 5310. The values specified by the nodeID 1550, inFieldID 1554, replacementPosition 1558, and position 1560 components of the Indexed Value Replacement command 1540 are determined and assigned to corresponding attributes of the new "ReplaceIndexedValue" bifsCommand element.

The type of data (boolean, integer, string, etc.) represented by component "field value" 1564 is determined by the values of the quantities "nodeID", "inFieldID", and tables defined in the MPEG-4 Systems Specifications. If the data type for a field value is "SFNode", then the procedure "decode SFNode" is used to interpret the "field value" component 1564 of the Indexed Value Replacement command 1540 and the name of the BIFS node contained in the "field value" component is assigned to the "value" attribute of the new ReplaceIndexedValue" element. Otherwise, the numerical value or string value represented by the "field value" component 1564 is assigned to the "value" attribute of the new "replaceIndexedValue" bifsCommand element.

8. At operation 5670, if the value of "paramType" is not "0", "1", or "2", it must be "3" 1578 because this value is determined by two bits of data. Consequently, the result of this step is always "yes".

9. At operation 5680, the procedure "decode ReplaceRoute cmd" is performed.

The procedure "decode ReplaceRoute cmd" comprises creating a new "ReplaceRoute" bifsCommand element 2840 and appending it to the current "commandFrame" element 2830, at operation 5310. The values specified by the routeID 1580, departureNodeID 1584, departureFieldID 1588, arrivalNodeID 1590, and arrivalFieldID 1594 components of the Route Replacement command 1570 are determined and assigned to corresponding attributes of the new "ReplaceRoute" bifsCommand element.

10. At operation 5490, after completion of the procedure "decode InsertNode cmd", "decode InsertIdxValue cmd", or "decode InsertRoute cmd", processing of the sdsm bitstream continues with the value of the quantity "moreCommands" at operation 5370.

The Procedure "Decode SFNode"

The structure of an SFNode data structure 1700, 1710, 1730 is summarized in FIG. 17. Each SFNode data structure is contained within a parent data structure. The parent data structure may be either a BIFS command 1120 or another SFNode structure. In either case, there will be a corresponding parent element in the mp4bifs document. In the case of a BIFS command parent structure, the mp4bifs parent element will be a bifsCommand element 2910. In the case of an SFNode parent structure, the mp4bifs parent element will be a BIFS Node element.

Figure 57:
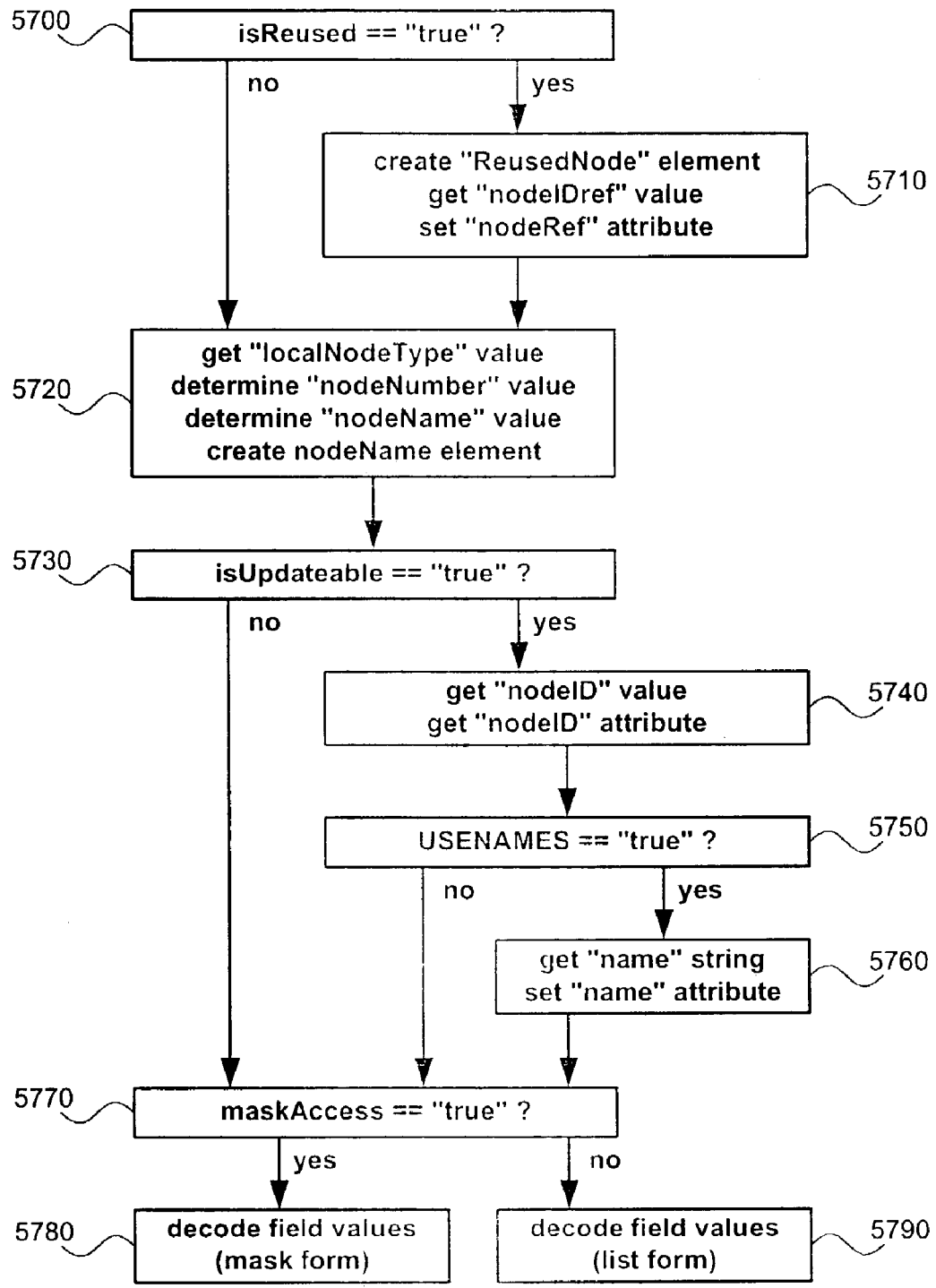

As shown in FIG. 57, the procedure "decode SFNode" comprises the following steps:

1. At operation 5700, the next bit in the sdsm bitstream is assigned to the boolean quantity "isReused" 1704, 1712, 1732 and the resulting value is compared to the value "true" (1).

2. At operation 5710, if the value of "isReused" is "true" (1) 1704, then a new "ReusedNode" element is created and appended to the current mp4bifs parent element. The value of the "nodeIDRef" component 1708 is then interpreted and the resulting integer value is assigned to the "nodeRef" attribute of the new "ReusedNode" element. The number of bits used to specify the value "nodeIDRef" is determined by the "nodeIdBits" attribute of the "bifsConfig" element 2810 of the mp4bifs document 2800. This completes the processing of an SFNode structure.

3. At operation 5720, if the value of "isReused" is "0" ("false") 1712, 1732, the value of "localNodeType" 1714, 1734 is extracted from the sdsm bitstream. The number of bits representing this value is determined by the identity of the parent structure and tables defined in the MPEG-4 Systems Specifications.

The identity of the parent structure, the value of "localNodeType", and tables defined in the MPEG-4 Systems Specifications are used to determine the integer value of the "nodeNumber" property for the particular type of BIFS node represented by this SFNode structure. The value of the integer quantity "nodeNumber" and tables defined in the MPEG-4 Systems Specifications are used to determine the value of the string quantity "nodeName" which describes the type of BIFS node represented by this SFNode structure. A new BIFS node element with an element name specified by the value of the quantity "nodeName" is created and appended to the mp4bifs parent element.

4. At operation 5730, the next bit in the sdsm bitstream is assigned to the boolean quantity "isupdateable" 1716, 1736 and the resulting value is compared to the value "true" (1).

5. At operation 5740, if the value of "isupdateable" is "1", then the integer value of the quantity "nodeID" is extracted from the sdsm bitstream. The number of bits used to specify the value "nodeID" is determined by the "nodeIdBits" attribute of the "bifsConfig" element 2810 of the mp4bifs document 2800. The resulting value is assigned to the "nodeID" attribute of the new BIFS node element created in operation 5720.

6. At operation 5750, the boolean value of the "USENAMES" attribute of the associated "ReplaceScene" element is compared to the value "true" (1).

7. At operation 5760, if the value of "USENAMES" is "true", then a null-terminated string of alphanumeric characters 1720, 1740 is extracted from the SFNode structure, and the resulting string value is assigned to the "name" attribute of the new BIFS node element created in operation 5720.

8. At operation 5770, the next bit in the sdsm bitstream is assigned to the boolean quantity "maskAccess" 1722, 1742 and the resulting value is compared to the value "true" (1).

9. At operation 5780, if the value of "maskAccess" is 1 ("true"), the SFNode structure has the form shown in FIG. 17B. In this case, the maskAccess bit 1722 is followed by a sequence of mask bits 1726. The number of mask bits is represented by the value of the quantity "nFields" 1728. The value of the quantity "nFields" is determined by the value of the quantity "nodeNumber" at operation 5720 and tables defined in the MPEG-4 Systems Specifications. A quantity "fieldIndex" is set to zero after interpreting the value of "maskaccess" 1722. The value of the quantity "fieldIndex" is incremented by one after interpreting each mask bit 1726. Each mask bit 1726 with a value of "1" is followed by the value of the property field specified by the value the quantity "nodeNumber" and the value of the quantity "fieldIndex".

The value of each property field is determined by the procedure "decode field value".

10. At operation 5790, if the of "maskAccess" is 0 ("false"), the SFNode structure has the form shown in FIG. 17C. In this case, the maskAccess bit 1722 is followed by an endFlag bit 1744. If the valueof the endFlag bit is "1" 1750, the end of the SFNode structure has been reached. If the value of the endFlag bit is "0" 1744, the endFlag bit is followed by a fieldRef value 1746 and the value 1748 of the property field specified by the value the quantity "nodeNumber" and the value of the quantity "fieldIndex".

The value of each property field is determined by the procedure "decode field value".

The Procedure "Decode Field Value"

Each property field of each SFNode structure has a particular field data type property and a particular fieldName string. The field data type property may be one of the following: boolean, integer, float, vector2d, vector3d, rotation, color, time, string, URL, node, or buffer. Each property field is also defined as an SFField (single value field) or an MFField (multi-valued field).

The field data type property, fieldName string, and MFField/SFField property of each property field are determined by the value of the "nodeNumber" quantity 5720 of the SPNode structure, the value of the "fieldIndex" or "fieldRef" quantity of the property field, and tables defined in the MPEG-4 Systems Specifications.

In the case of an SFField property field, the sequence of bits used to represent the field value is determined by the field data type property and information provided in the MPEG-4 Systems Specifications.

In the case of an MFField property field, the field value is determined by a set of zero or more SFField values. The set of SFField values comprising an MFField property field value has the form described in FIG. 17D or FIG. 17E. In either case, the first bit 1762, 1782 must be zero. The next bit specifies the value of the boolean quantity "isList" 1766, 1786.

If the value of the quantity "isList" is "1", the MFField property field has the list form shown in FIG. 17D. In this case, the isList bit 1766 is followed by an endFlag bit 1770. If the value of the endFlag bit is "0" 1770, the endFlag bit is followed by an SFField value 1774 formatted according to the current field data type. Each such SFField value 1774 is followed by another endFlag bit 1770. An endFlag bit with the value "1" 1772 terminates a list-form MFField.

If the value of the quantity "isList" is "1", the MFField property field has the list form shown in FIG. 17D. In this case, the isList bit 1766 is followed by 5-bit integer value "numBits" 1790. The value of "numBits" is followed by an integer value "nFields" 1792 consisting of numBits bits. The value of "nFields" is followed by nFields SFField values, each formatted according to the current field data type.

In each case (SFField, list form MFField, or vector form MFField), each SFField value is converted to a character string. Each such character string is appended to an attribute string with successively appended values separated by blank spaces. In the cases of field data types integer, float, vector2d, vector3d, rotation, color, time, standard means are used to represent each numerical value as a character string. In the case of field data type boolean, the values "0" and "1" are represented by the character strings "false" and "true". In the cases of field data types string and URL, each SFField value is enclosed in quotes.

In the case of field data type "node", each SFField value represents an SFNode structure 1700, 1710, or 1720. Each such SFNode structure is called a "child node". Each such child node is interpreted by recursive usage of the procedure "decode SFNode". The value of the string quantity "nodeName" determined for each such child node is appended to the current attribute string. In addition, a new xml element with an element name specified by the value of the string quantity "nodeName" is created and appended to the BIFS node element created in step 3 of the procedure "decode SFNode".

In the case of field data type "buffer", each SFField value represents an sdsm BIFS command 1120. Each such BIFS command is interpreted using operation 5330 to operation 5365 of the procedure "decode sdsm chunk", with the current node element serving as the parent element. The commandname string associated with each BIFS command (for example, "InsertNode") is appended to the current attribute string. In addition, a new xml element with an element name specified by the commandname string is created and appended to the BIFS node element created in step 3 of the procedure "decode SFNode".

After completing the interpretation of each field data value, the resulting attribute string is assigned to the fieldName attribute of the corresponding BIFS node element. That is, the resulting attribute string is assigned to the attribute value for the attribute having an attribute name given by the fieldName string for the specified property field of the specified BIFS node.

Form an xml Representation of the moov Atom Represented in the QtInfo Data Structure.

Figure 58:
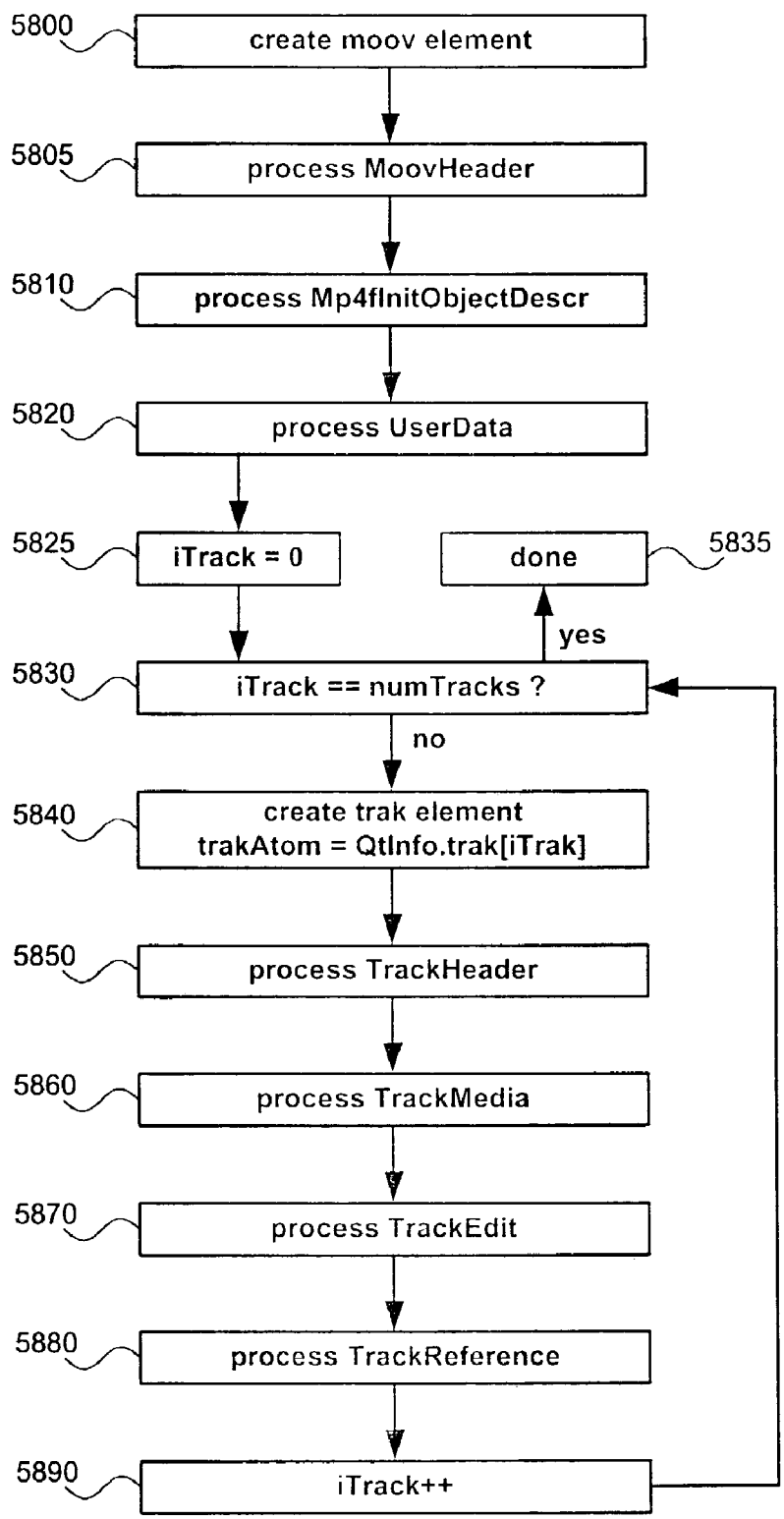

The second step in the creation of an mp4file document 2300 on based on a QtInfo data structure 3100 is to create an xml representation of the moov atom 712, 754 contained in the mp4 binary file 700. As shown in FIG. 58, this step consists of the following operations:

1. At operation 5800, create a new "moov" element 2320 and append it to the top level element of the mp4file document 2300.

2. At operation 5805, process the MoovHeader member 3116 of the QtInfo data structure 3100. As shown in FIG. 31D, the MoovHeader data structure 3170 includes values of the quantities size 3173, version & flags 3176, creationTime 3178, modifiedTime 3180, timeScale 3183, duration 3186, and nextTrackID 3188. Each of these values is assigned to a like-named attribute of the new "moov" element 2320.

3. At operation 5810, the procedure "Process the Mp4fInitobjectDescr" is performed.

4. At operation 5820, if the value of member UserData 3123 is not zero, the procedure "Process UserData data structure" is performed.

5. At operation 5825, assign the value zero to the integer quantity "iTrack".

6. At operation 5830, the value of the quantity "iTrack" is compared to the value of QtInfo member "numTracks" 3118.

7. At operation 5835, if the value of the quantity "iTrack" equals the value of QtInfo member "numTracks", this step is completed. At this point, the process of creating the intermediate xml files 2250 and 2260 has been completed. The process of creating the final XMT-A document continues with "Creation of an XMT-A xml document based on the intermediate xml documents."

8. At operation 5840, if the value of the quantity "iTrack" does not equal the value of QtInfo member "numTracks", a new trak element 2350 is created and appended this to the new moov element 2320 created in operation 5800. This is the "current trak element".

Entry "iTrack" in the QtInfo member "trak array" 3120 is assigned to the quantity "trakAtom" representing the address of a trek structure 3200. The trak structure represented by the value "trakAtom" is the "current trak structure".

9. At operation 5850, perform the procedure "Process TrakHeader data structure".

10. At operation 5860, perform the procedure "Process TrakMedia data structure".

11. At operation 5870, if the TrackEdit member 3208 of the current trak structure is not zero, perform the procedure "Process TrackEdit data structure".

12. At operation 5880, if the TrackReference member 3210 of the current trak structure is not zero, perform the procedure "Process TrackReference data structure".

13. At operation 5890, increment the value of the quantity "iTrack" by one, then repeat the comparison of the value of the quantity "iTrack" to the value of the quantity "numTracks" 5830.

The Procedure "Process Mp4InitObjectDescr"

The procedure "Process Mp4InitObjectDescr" consists of the following steps:

1. A new "mp4fiods" element 2330 is created and appended to the "moov" element 2320.

2. The integer value of Mp4fInitobjectDescr member "ObjectDescrID" 3138 is assigned to the "objectDescriptorID" attribute 2370 of the new "mp4fiods" element 2360.

3. The boolean value of member "inlineprofiles" 3146 is assigned to the "includeInlineProfilesFlag" attribute of the new mp4fiods element 2360.

4. If the boolean value of member "urlFlag" 3140 is "true", the character string represented by the member "urlString" 3143 is assigned to the "url" attribute of the "mp4fiods" element 2360, completing the processing of the Mp4fInitobjectDescr data structure 3130. If the boolean value of member "urlFlag" 3140 is "false", a null string is assigned to the "url" attribute of the mp4fiods element 2360.

5. Integer values are assigned to the "ODProfileLevelIndication", "sceneProfileLevelIndication", "audioProfileLevelIndication", "visualProfileLevelIndication", and "graphicsProfileLevelIndication" attributes of the mp4fiods element 2360 based on the corresponding members (ODProfileLevel, sceneProfileLevel, audioProfileLevel, visualProfileLevel, and graphicsProfileLevel) of the "ProfileLevels" member 3148 of the Mp4fInitObjectDescr data structure 3130.

6. A new EsIdInc element 2380 is created for each of the numEsIdIncs 3153 entries in the EsIdInc array 3156 in the Mp4fInitObjectDescr data structure 3130. Each new EsIdInc element 2380 is appended to the mp4fiods element 2360. Each entry in the EsIdInc array 3156 includes an integer member "trackID". The value of member "trackID" is assigned to the "trackID" attribute 2390 of the corresponding new EsIdInc element 2380.

The Procedure "Process UserData Data Structure"

The procedure "Process UserData data structure" consists of the following steps:

1. Create a new "udta" element 2340 and appended it to the new "moov" element 2320.

If the value of member numCprt 3284 in the UserData data structure 3280 is greater than zero, repeat the following steps for each entry in member cprt array 3286:

2. Create a new "cprt" element and appended it to the new "udta" element 2340.

3. Assign the values of the version & flags members 3294 of the cprt structure 3290 represented by the selected entry in the cprt array 3286 to the "version" and "flags" attributes of the new "cprt" element.

4. Assign the values of the member "language" 3296 in the "cprt" structure 3290 to the "language" attribute of the new "cprt" element.

5. Create a new xml text node based on the member "notice" 3298 in the cprt data structure 3290, and append this new text node to the "cprt" element.

The Procedure "Process TrakHeader Data Structure"

The procedure "Process TrakHeader data structure" consists of the following steps:

1. Assign the value of member "version" 3216 of the TrackHeader member of the current trak structure to the "version" attribute of the current "trak" element 2600.

2. Assign the value of member "flags" 3216 of the TrackHeader member of the current trak structure to the "flags" attribute of the current "trak" element 2600.

3. Assign the value of member "creationTime" 3218 of the TrackHeader member of the current "trak" structure to the "creationTime" attribute of the current "trak" element 2600.

4. Assign the value of member "modifiedTime" 3220 of the TrackHeader member of the current "trak" structure to the "modifiedTime" attribute of the current "trak" element 2600.

5. Assign the value of member "duration" 3222 of the TrackHeader member of the current "trak" structure to the "duration" attribute of the current "trak" element 2600.

6. Assign the value of member "trackID" 3224 of the TrackHeader member of the current "trak" structure to the "trackID" attribute of the current "trak" element 2600.

The Procedure "Process TrakMedia Data Structure"

The procedure "Process TrakMedia data structure" consists of the following steps:

1. Create a new "mdia" element 2604 and append it to the current "trak" element 2600.

2. Perform the procedure "Process MediaHeader data structure".

3. Perform the procedure "Process Handler data structure".

4. Perform the procedure "Process MediaInfo data structure".

The Procedure "Process TrackEdit Data Structure"

The procedure "Process TrackEdit data structure" consists of the following steps:

1. Create a new edts element 2644 and append it to the current trak element.

If the member EditList 3242 of the current TrackEdit data structure 3208, 3236 is not zero, perform the following additional steps:

2. Create a new elst element 2648 and append it to the new edts element 2644.

3. Assign the values of members version & flags 3248 of the EditList data structure 3244 represented by the EditList member 3242 of the current TrackEdit data structure 3208, 3236 to the "version" and "flags" attributes of the new "elst" element 2648.

4. Assign the value zero to the quantity "segment" and assign the value of member "numSegments" 3250 in the EditList data structure 3244 to the quantity "numSegments". The value of the quantity "numSegments" is expected to be "2".

5. Repeat the following steps for each of the numSegments entries in the EditSegment array member 3252 of the EditList data structure 3244. Each of these entries consists of an EditSegment structure 3256.

6. Create a new "segment" element and appended to the new "elst" element 2648.

7. Assign the value of member "startTime" 3258 of the EditSegment structure 3256 to the "startTime" attribute of the new "segment" element.

8. Assign the value of member "duration" 3260 of the EditSegment structure 3256 to the "duration" attribute of the new "segment" element.

9. Assign the value of member "relativeRate" 3262 of the EditSegment structure 3256 to the "relativeRate" attribute of the new "segment" element.

The Procedure "Process TrackReference Data Structure"

The procedure "Process TrackReference data structure" consists of the following steps:

1. Create a new "tref" element 2636 and appended it to the current trak element 2600.

If the member Mpod 3268 of the current TrackReference data structure 3210, 3264 is not zero, perform the following additional steps:

2. Create a new "mpod" element 2640 and appended it to the new "tref" element 2636.

3. Assign the value zero to the quantity "entry", assign the value of member "numEntries" 3274 in the Mpod structure 3268, 3270 to the quantity "numEntries", and create a new character string named "trackIdList" (as a null string).

4. If the value of the quantity "numEntries" is greater than zero, repeat the following three steps for each of the numEntries entries in member trackID array 3276 in the Mpod structure 3270:

a. If the value of the quantity "entry" is greater than zero, append a blank space to the character string "trackIdList".

b. Create a character string representation of the integer value represented by entry "entry" in the trackID array 3276, and append the result to the character string "trackIdList".

c. Increment the value of the quantity "entry" by "1".

5. Assign the value of the character strung "trackIdList" to the trackID attribute of the mpod element 2640.

The Procedure "Process MediaHeader Data Structure"

The procedure "Process MediaHeader data structure" consists of the following steps:

1. Assign the value of member "version" 3306 of the MediaHeader structure 3230, 3300 to the "version" attribute of the current "mdia" element 2604.

2. Assign the value of member "flags" 3306 of the MediaHeader structure 3230, 3300 to the "flags" attribute of the current "mdia" element 2604.

3. Assign the value of member "creationTime" 3308 of the MediaHeader structure 3230, 3300 to the "creationTime" attribute of the current "mdia" element 2604.

4. Assign the value of member "modifiedTime" 3310 of the MediaHeader structure 3230, 3300 to the "modifiedTime" attribute of the current "mdia" element 2604.

5. Assign the value of member "timeScale" 3313 of the MediaHeader structure 3230, 3300 to the "timeScale" attribute of the current "mdia" element 2604.

6. Assign the value of member "duration" 3316 of the MediaHeader structure 3230, 3300 to the "duration" attribute of the current "mdia" element 2604.

7. Assign the value of member "language" 3318 of the MediaHeader structure 3230, 3300 to the "language" attribute of the current "mdia" element 2604.

The Procedure "Process Handler Data Structure"

The procedure "Process Handler data structure" consists of the following steps:

1. Create a new "hdlr" element 2608 and append it to the current "mdia" element 2604.

2. Assign the value of member "version" 3326 of the Handler structure 3232, 3320 to the "version" attribute of the new "hdlr" element 2608.

3. Assign the value of member "flags" 3326 of the Handler structure 3232, 3320 to the "flags" attribute of the new "hdlr" element 2608.

4. Assign the value of member "handlerType" 3328 of the Handler structure 3232, 3320 to the "handlerType" attribute of the new "hdlr" element 2608.

5. Assign the value of member "name" 3330 of the Handler data structure 3232, 3320 to the "name" attribute of the new "hdlr" element 2608.

The procedure "Process MediaInfo Data Structure"

The procedure "Process MediaInfo data structure" consists of the following steps:

1. Create a new "minf" element 2612 and append it to the current "mdia" element 2604.

2. Perform the procedure "Process MediaDataInfo data structure".

3. Perform the procedure "Process MediaInfoHeader data structure".

4. Perform the procedure "Process SampleTables data structure".

The Procedure "Process MediaDataInfo Data Structure"

The procedure "Process MediaDataInfo data structure" consists of the following steps:

1. Create a new "dinf" element 2616 and append it to the current "minf" element 2612.

2. If member DataRefTable 3358 of the MediaDataInfo structure 3338, 3350 is not zero, perform the following steps:

3. Create a new "dref" element 2620 and append it to the new "dinf" element 2616.

4. Assign the value of member "version" 3366 of the DataRefTable structure 3360 represented by member DataRefTable 3358 in the MediaDataInfo structure 3338, 3350 to the "version" attribute of the new "dref" element 2620.

5. Assign the value of member "flags" 3366 of the DataRefTable structure 3360 to the "flags" attribute of the new "dref" element 2620.

6. Repeat the following steps for each entry in member dataRef array 3370 in the DataRefTable structure 3360:

7. Create a new "urlData" element 2624 and append this to the new "dref" element 2620.

8. Assign the value of member "version" 3386 in the dataRef structure 3380 represented by the selected entry in the DataRef array 3370 to the "version" attribute of the new "urlData" element 2624.

9. Assign the value of member "flags" 3386 of the dataRef structure 3380 to the "flags" attribute of the new "urlData" element 2624.

10. If the value of member "flags" 3386 of the dataRef structure 3380 is not "1", and the value of member "dataRefType" 3388 is "url" (that is, u-r-l-space), then interpret the member "dataRefData" 3390 as a character string and assign the result to the "location" attribute of the new "urlData" element 2624.

The Procedure "Process MediaInfoHeader Data Structure"

The MediaInfoHeader data structure contained within in a given trak structure may be one of three types depending on the stream type for the media data associated with the trak structure.

If the current "trak" structure is associated with a scene description stream (sdsm) or object descriptor stream (odsm), then the MediaInfoHeader structure 3343 must be an "Mpeg4MediaHeader" data structure. This structure has members "size", "version", and "flags". In this case, the procedure "Process MediaInfoHeader data structure" consists of the following steps:

1. Create a new "nmhd" element 2632 and append it to the current "minf" element 2616.

2. Assign the value of member "version" of the MediaInfoHeader structure 3343 to the "version" attribute of the new "nmhd" element 2632.

3. Assign the value of member "flags" of the MediaInfoHeader structure 3343 to the "flags" attribute of the new "nmhd" element 2632.

If the current "trak" structure is associated with an audio stream, then the MediaInfoHeader structure 3343 must be a "SoundMediaHeader" data structure. This data structure has members "size", "version", "flags", and "balance". In this case, the procedure "Process MediaInfoHeader data structure" consists of the following steps:

1. Create a new "smhd" element 2632 and append it to the current "minf" element.

2. Assign the value of member "version" of the MediaInfoHeader structure 3343 to the "version" attribute of the new "smhd" element 2632.

3. Assign the value of member "flags" of the MediaInfoHeader structure 3343 to the "flags" attribute of the new "smhd" element 2632.

4. Assign the value of member "balance", of the MediaInfoHeader structure 3343 to the "balance" attribute of the new "smhd" element 2632.

If the current "trak" structure is associated with a visual stream, then the MediaInfoHeaderstructure 3343 must be a "VideoMediaHeader" data structure. This data structure has members "size", "version", "flags", "graphMode", "opRed", "opGreen" and "opBlue". In this case, the procedure "Process MediaInfoHeader data structure" consists of the following steps:

1. Create a new "vmhd" element 2632 and append it to the current "minf" element.

2. Assign the value of member "version" of the MediaInfoHeader structure 3343 to the "version" attribute of the new "nmhd" element 2632.

3. Assign the value of member "flags" of the MediaInfoHeader structure 3343 to the "flags" attribute of the new "vmhd" element 2632.

4. Assign the value of member "graphMode" of the MediaInfoHeader structure 3343 to the "transferMode" attribute of the new "vmhd" element 2632.

5. Assign the value of member "opRed" of the MediaInfoHeader structure 3343 to the "opColorRed" attribute of the new "vmhd" element 2632.

6. Assign the value of member "opGreen" of the MediaInfoHeader structure 3343 to the "opColorGreen" attribute of the new "vmhd" element 2632.

7. Assign the value of member "opBlue" of the MediaInfoHeader structure 3343 to the "opColorBlue" attribute of the new "vmhd" element 2632.

The Procedure "Process SampleTables Data Structure"

The procedure "Process SampleTables data structure" consists of the following steps:

1. Create a new "stbl" element 2628 and append it to the current "minf" element 2612.

2. Perform the procedure "Process SampleToChunkTable data structure".

3. Perform the procedure "Process ChunkOffsetTable data structure".

4. Perform the procedure "Process TimeToSampleTable data structure".

5. Perform the procedure "Process SampleSizeTable data structure".

6. If the value of SampleTables 3400 member SyncSampleTable 3416 is not zero, perform the procedure "Process SyncSampleTable data structure".

7. Perform the procedure "Process SampleDescrTable data structure".

The Procedure "Process SampleToChunkTable Data Structure"

A SampleToChunkTable data structure consists of a sample table data structure 3420 in which each entry in member "table array" consists of a SampleToChunk structure 3460. The procedure "Process SampleToChunkTable data structure" consists of the following steps:

1. Create a new "stsc" element 2656 and append it to the current "stbl" element 2628, 2652.

2. Assign SampleTables member SampleToChunkTable 3406 to sample table structure 3420 "SampleToChunkTable".

3. Assign the value of SampleToChunkTable member "version" 3426 to the "version" attribute of the new "stsc" element 2656.

4. Assign the value of SampleToChunkTable member "flags" 3426 to the "flags" attribute of the new "stsc" element 2656.

5. Assign the value of SampleToChunkTable member "numEntries" 3428 to the quantity "numEntries". Assign the value zero to the quantity "entry", and repeat the following steps until the value of the quantity "entry" equals the value of the quantity "numEntries":

6. Create a new "sampleToChunk" element and append it to the new "stsc" element 2656.

7. Assign entry "entry" in SampleToChunkTable member "table array" 3430 to SampleToChunk structure 3460 "SampleToChunkTableEntry".

8. Assign the value of SampleToChunkTableEntry member "firstChunk" 3463 to the "firstChunk" attribute of the new "sampleToChunk" element.

9. Assign the value of SampleToChunkTableEntry member "numSamples" 3466 to the "numSamples" attribute of the new "sampleToChunk" element.

10. Assign the value of SampleToChunkTableEntry member "description" 3468 to the "sampleDesc" attribute of the new "sampleToChunk" element.

11. Increment the value of the quantity "entry" by "1".

The Procedure "Process ChunkOffsetTable Data Structure"

A ChunkOffsetTable data structure 3408 consists of a sample table data structure 3420 in which each entry in member "table array" consists of a sequence of integers. The procedure "Process ChunkOffsetTable data structure" consists of the following steps:

1. Create a new "stco" element 2664 and append it to the current "stbl" element 2652.

2. Assign SampleTables member ChunkOffsetTable 3408 to sample table structure 3420 "ChunkOffsetTable".

3. Assign the value of ChunkOffsetTable member "version" to the "version" attribute of the new "stco" element 2664.

4. Assign the value of ChunkOffsetTable member "flags" to the "flags" attribute of the new "stco" element 2664.

5. Assign the value of ChunkOffsetTable member "numEntries" 3428 to the quantity "numEntries". Assign the value zero to the quantity "entry", and repeat the following steps until the value of the quantity "entry" equals the value of the quantity "numEntries":

6. Create a new "chunkOffset" element and append it to the new "stco" element 2664.

7. Assign the value of entry "entry" in member "table array" to the quantity "offset".

8. Assign the value of the quantity "offset" to the "offset" attribute of the new "chunkOffset" element.

9. Compare the value of the quantity "offset" to the values of members "start" 3166 and "size" 3163 in each entry 3160 in QtInfo member "mdat array" 3113 to determine the value of index "mdatId" of the mdat atom 706 associated with the specified offset value. The value of the quantity "ImdatId" is determined by the index of the entry in "mdat array" 3113 for which the value of the quantity "offset" is greater than the value of member "start" 3166 and less than the sum of members "start" 3166 and "size" 3163.

10. Assign the value of member "start" 3163 of mdat array entry "mdatId" to the quantity "mdatStart". Add "8" to the value of "mdatStart", subtract the result from the value of the quantity "offset", and assign the result to the quantity "mdatOffset".

11. Assign the value of the quantity "mdatId" to the "mdatId" attribute of the new "chunkOffset" element.

12. Assign the value of the quantity "mdatOffset" to the "mdatOffset" attribute of the new "chunkoffset" element.

13. Increment the value of the quantity "entry" by "1".

The Procedure "Process TimeToSampleTable Data Structure"

A TimeToSampleTable data structure 3410 consists of a sample table data structure 3420 in which each entry in member "table array" consists of a TimeToSample structure 3470. The procedure "Process TimeToSampleTable data structure" consists of the following steps:

1. Create a new "stts" element 2660 and append it to the current "stbl" element.

2. Assign SampleTables member TimeToSampleTable 3410 to sample table structure 3420 "TimeToSampleTable".

3. Assign the value of TimeToSampleTable member "version" 3426 to the "version" attribute of the new "stts" element 2660.

4. Assign the value of TimeToSampleTable member "flags" 3426 to the "flags" attribute of the new "stts" element 2660.

5. Assign the value of TimeToSampleTable member "numEntries" 3428 to the quantity "numEntries". Assign the value zero to the quantity "entry", and repeat the following steps until the value of the quantity "entry" equals the value of the quantity "numEntries":

6. Create a new "timeToSample" element and append it to the new "stts" element 2660.

7. Assign entry "entry" in TimeToSampleTable member "table array" 3430 to TimeToSample structure 3470 "TimeToSampleTableEntry".

8. Assign the value of TimeToSampleTableEntry member "count" 3473 to the "count" attribute of the new "timeToSample" element.

9. Assign the value of TimeToSampleTableEntry member "duration" 3476 to the "duration" attribute of the new "timeToSample" element.

10. Increment the value of the quantity "entry" by "1".

The Procedure "Process SampleSize" Table Data Structure"

The procedure "Process SampleSizeTable data structure" consists of the following steps:

1. Create a new "stsz" element 2668 and append it to the current "stbl" element 2652.

2. Assign SampleTables member SampleSizeTable 3413 to SampleSizeTable structure 3440 "SampleSizeTable".

3. Assign the value of SampleSizeTable member "version" 3446 to the "version" attribute of the new "stsz" element 2668.

4. Assign the value of SampleSizeTable member "flags" 3446 to the "flags" attribute of the new "stsz" element 2668.

5. Assign the value of SampleSizeTable member "numEntries" 3453 to the quantity "numEntries".

6. Assign the value of the quantity "numEntries" to the "numSamples" attribute of the new "stsz" element 2668.

7. If the value of SampleSizeTable 3413, 3440 member "sampleSize" 3450 is not zero, assign the value of SampleSizeTable 3413, 3440 member "sampleSize" 3450 to the "sizeForAll" attribute of the new "stsz" element. In this case, this process is completed.

8. If the value of SampleSizeTable 3413, 3440 member "sampleSize" 3450 is zero, assign the value zero to the quantity "entry", and repeat the following steps until the value of the quantity "entry" equals the value of the quantity "numEntries":

9. Create a new "sampleSize" element and append it to the new "stsz" element 2668.

10. Assign the value of entry "entry" in SampleSizeTable member "table array" 3456 to the "size" attribute of the new "sampleSize" element.

11. Increment the value of the quantity "entry" by "1".

The Procedure "Process SyncSampleTable Data Structure"

A SyncSampleTable data structure 3416 consists of a sample table data structure 3420 in which each entry in member "table array" consists of a sequence of integers. The procedure "Process SyncSampleTable data structure" consists of the following steps:

1. Create a new "stss" element 2672 and append it to the current "stbl" element 2652.

2. Assign SampleTables member SyncSampleTable 3416 to sample table structure 3420 "SyncSampleTable".

3. Assign the value of SyncSampleTable member "version" 3426 to the attribute "version" of the new "stss" element 2672.

4. Assign the value of SyncSampleTable member "flags" 3426 to the attribute "flags" of the new "stss" element 2672.

5. Assign the value of SyncSampleTable member "numEntries" 3428 to the quantity "numEntries". Assign the value zero to the quantity "entry", and repeat the following steps until the value of the quantity "entry" equals the value of the quantity "numEntries":

6. Create a new "syncSample" element and append it to the new "stss" element 2672.

7. Assign the value of entry "entry" in SyncSampleTable member "table array" 3430 to the attribute "sampleNumber" of the new "syncSample" element.

8. Increment the value of the quantity "entry" by "1".

The Procedure "Process SampleDescrTable Data Structure"

A SampleDescrTable data structure 3418 consists of a sample table data structure 3420 in which each entry in member "table array" consists of a SampleDescription structure 3480. The procedure "Process SampleDescrTable data structure" consists of the following steps:

1. Create a new "stsd" element 2676 and append it to the current "stbl" element 2652.

2. Assign SampleTables member SampleDescrTable 3418 to sample table structure 3420 "SampleDescrTable".

3. Assign the value of SampleDescrTable member "version" 3426 to the attribute "version" of the new "stsd" element 2676.

4. Assign the value of SampleDescrTable member "flags" 3426 to the attribute "flags" of the new "stsd" element 2676.

5. Assign the value of SampleDescrTable member "numEntries" 3428 to the quantity "numEntries". Assign the value zero to the quantity "entry", and repeat the following steps until the value of the quantity "entry" equals the value of the quantity "numEntries":

6. Assign entry "entry" in SampleDescrTable member "table array" 3430 to SampleDescription structure 3480 "SampleDescription".

7. If the value of SampleDescription member "dataFormat" corresponds to "mp4a", create a new "mp4a" element and append it to the new "stsd" element 2676. If the value of SampleDescription member "dataFormat" corresponds to "mp4v", create a new "mp4v" element and append it to the new "stsd" element 2676. If the value of SampleDescription member "dataFormat" corresponds to "mp4s", create a new "mp4s" element and append it to the new "stsd" element 2676. The resulting element ("mp4a", "mp4v", or "mp4s") will be referred to as the "mp4*" element 2680.

8. Assign the value of SampleDescription member "dataReference" 3488 to the attribute "dataRefIndex" of the new "mp4*" element 2680.

9. Create a new "esds" element 2684 and append it to the new "mp4*" element 2680.

10. Assign the value of SampleDescription member "esdVersion" 3490 to the attribute "version" of the new "esds" element 2684.

11. Assign the value of SampleDescription member "esdData" 3496 to the quantity "esdData" represeting the address of an array of bytes, and assign the value zero to the quantity "esdPos".

12. Perform the procedure "decode esdData array".

13. Increment the value of the quantity "entry" by "1".

The Procedure "Decode esdData Array"

The procedure "decode esdData array" consists of the following steps:

1. Assign the value of the entry "esdPos" in the array "esdData" to the quantity "EsDescTag", and increment the value of the quantity "esdPos" by "1".

2. Use the procedure "get tag size" to obtain the value of the quantity "numBytes".

3. If the value of the quantity "EsDescTag" equals the value of the constant "ES_DescrTag" (3), perform the following steps. Otherwise, quit.

4. Create a new "ES_Descr" element 2688, 2700 and append it to the current "esds" element 2684.

5. Assign the value of the quantity "numBytes" to the attribute "size" of the new "ES_Descr" element 2688, 2700.

6. Combine the values of entries "esdPos" and "esdPos+1" in the array "esdData" into a 16-bit integer, assign the result to the "ES_ID" attribute 2700 of the new "ES_Descr" element 2688, and increment the value of the quantity "esdPos" by "2".

7. Assign the value of the entry "esdPos" in the array "esdData" to the quantity "flagsAndPriority", then assign the high-order 5 bits of this value to the quantity "priority", assign the low-order 3 bits to the quantity "flags", and increment the value of the quantity "esdPos" by "1".

8. Assign the value of the quantity "priority" to the attribute "priority" of the new "ES_Descr" element 2688, 2700.

9. Assign the value of the quantity "flags" to the attribute "flags" of the new "ES_Descr" element 2688, 2700.

10. If the low order bit of the quantity "flags" is "1", assign the value "true" to the attribute "OCRstreamFlag" of the new "ES_Descr" element 2688.

11. Repeat the following steps until the value of the quantity "numBytes" is less than "1":

12. Assign the value of the entry "esdPos" in the array "esdData" to the quantity "descrTag", decrement the value of the quantity "numBytes" by "1", and increment the value of the quantity "esdPos" by "1".

13. Use the procedure "get tag size" to determine the value of the quantity "descrSize", and decrement the value of the quantity "numBytes" by the number of bytes used to specify the value of this quantity.

14. Decrement the value of the quantity "numBytes" by the value of the quantity "descrSize".

15. If the value of the quantity "descrTag" equals the value of the constant "DecoderConfigDescrTag" (4), perform the procedure "process decoder config descriptor".

16. If the value of the quantity "descrTag" equals the value of the constant "SLConfigDescrTag" (6), perform the procedure "process sl config descriptor".

17. Otherwise (i.e., the value of the quantity "descrTag" does not equal either "DecoderConfigDescrTag" or "SLConfigDescrTag"), increment the value of the quantity "esdPos" by the value of the quantity "infoSize".

The Procedure "Process Decoder Config Descriptor"

The procedure "process decoder config descriptor" consists of the following steps:

1. Create a new "DecoderConfigDescriptor" element 2710 and append it to the current "ES_Descr" element 2700.

2. Assign the value of the quantity "descrSize" to the "size" attribute of the new "DecoderConfigDescriptor" element 2710.

3. Assign the value of entry "esdPos" in the array "esdData" to the quantity "objectType" and to the attribute "objectType" of the new "DecoderConfigDescriptor" element 2710, and increment the value of the quantity "esdPos" by "1".

4. Assign the value of entry "esdPos" in the array "esdData" to the quantity "streamType", and increment the value of the quantity "esdPos" by "1".

5. If the second bit ("2" bit) of the quantity "streamType" is not zero, assign the value "true" to the attribute "upStream" of the new "DecoderConfigDescriptor" element 2710.

6. Divide the value of the quantity "streamType" by 4 (shift right by two bits) and assign the result to the quantity "streamType" and to the attribute "streamType" of the new "DecoderConfigDescriptor" element 2710.

7. Combine the next three entries in the array "esdData" into a 24-bit value and assign the result to the attribute "bufferSize" of the new "DecoderConfigDescriptor" element 2710, and increment the value of the quantity "esdPos" by "3".

8. Combine the next four entries in the array "esdData" into a 32-bit value and assign the result to the attribute "maxBitrate" of the new "DecoderConfigDescriptor" element 2710, and increment the value of the quantity "esdPos" by "4".

9. Combine the next four entries in the array "esdData" into a 32-bit value and assign the result to the attribute "avgBitrate" of the new "DecoderConfigDescriptor" element 2710, and increment the value of the quantity "esdPos" by "4".

10. Decrement the value of the quantity "descrSize" by 13.

11. If the value of the quantity "descrSize" is greater than zero, repeat the following steps until the value of the quantity "descrSize" is less than 1:

12. Assign the next entry in the array "esdData" to the quantity "infoTag", and decrement the value of the quantity "descrSize" by "1".

13. Use the procedure "get tag size" to determine the value of the tag size value which follows the value assigned to the quantity "infoTag", and assign the result to the quantity "infoSize", and decrement the value of the quantity "descrSize" by the number of bytes used to specify the value of this quantity.

14. Decrement the value of the quantity "descrSize" by the value of the quantity "infoSize".

15. If the value of the quantity "infoTag" equals the value of the constant "DecoderSpecificInfoTag" (5), perform the procedure "process decoder specific info". Otherwise, increment the value of the quantity "esdPos" by the value of the quantity "infoSize".

The Procedure "Process sl Config Descriptor"

The procedure "process sl config descriptor" consists of the following steps:

1. Create a new "SLConfigDescriptor" element 2760 and append it to the current "ES_Descr" element 2700.

2. Assign the value of entry "esdPos" in the array "esdData" to the attribute "predefined" of the new "SLConfigDescriptor" element 2760, and increment the value of the quantity "esdPos" by "1".

The Procedure "Process Decoder Specific Info"

The contents of the entries in the array "esdData" following a "DecoderSpecificInfoTag" depend on the values of the quantities "streamType" and "objectType".

If the value of the quantity "streamType" is "3", perform the procedure "process BIFS config".

If the value of the quantity "streamType" is "4", and the value of the quantity "objectType" is "108", perform the procedure "process JPEG config".

If the value of the quantity "streamType" is "4", and the value of the quantity "objectType" is not "108", perform the procedure "process visual config".

If the value of the quantity "streamType" is "5", perform the procedure "process audio config".

The Procedure "Process BIFS Config"

The procedure "process BIFS config" consists of the following steps. These steps treat the sequence of "infoSize" entries in the "esdData" array, starting with entry "esdPos", as a sequence of bits.

1. Create a new "BIFS_DecoderConfig" element 2720 and append it to the current "DecoderConfigDescriptor" element 2710.

2. If the value of the quantity "objectType" is "2", extract the values of the following quantities from the array "esdData" (starting with entry :esdPos"), and assign each of the resulting values to a like-named attribute of the new BIFS_DecoderConfig element:
   a. use3DMeshCoding (1 bit),
   b. usePredictiveMFField (1 bit),
   c. numNodeIdBits (5 bits),
   d. numRouteIdBits (5 bits),
   e. numPROTOIDbits (5 bits), 3. Otherwise (i.e., the value of the quantity "objectType" is not "2"), extract the values of the following quantities from the array "esdData" (starting with entry "esdPos"), and assign each of the resulting values to a like-named attribute of the new BIFS_DecoderConfig element:
   a. numNodeIdBits (5 bits),
   b. numRouteIdBits (5 bits), 4. Extract the value of the value of the next bit in the array "esdData". If the result is "0", assign the value "false" to the attribute "isCommandStream" of the new BIFS_DecoderConfig element, and skip to step 8. If the result is "1", assign the value "true" to the attribute "isCommandStream" and perform the following steps.

5. Extract the value of the value of the next bit in the array "esdData". If the result is "0", assign the value "false" to the attribute "pixel metric" of the new BIFS_DecoderConfig element. Otherwise, assign the value "true" to the attribute "pixel metric".

6. Extract the value of the value of the next bit in the array "esdData". If the result is "0", assign the value "false" to the attribute "hasSize" of the new BIFS_DecoderConfig element, and skip to step 8. If the result is "1", assign the value "true" to the attribute "hasSize" and perform the following steps.

7. Extract the values of the following quantities from the array "esdData" (starting with entry "esdPos"), and assign each of the resulting values to a like-named attribute of the new BIFS_DecoderConfig element:
   a. pixelWidth (16 bits),
   b. pixelHeight (16 bits).

8. Increment the value of the quantity "esdPos" by the value of the quantity "infoSize".

The Procedure "Process JPEG Config"

The procedure "process JPEG config" consists of the following steps:

1. Create a new "JPEG_DecoderConfig" element 2730 and append it to the current "DecoderConfigDescriptor" element 2710.

2. Assign the value of the quantity "infoSize" to the "size" attribute of the new "JPEG_DecoderConfig" element 2730.

3. Combine the next two entries in the array "esdData" into a 16-bit value and assign the result to the attribute "headerLength" of the new "JPEG_DecoderConfig" element 2730, and increment the value of the quantity "esdPos" by "2".

4. Combine the next two entries in the array "esdData" into a 16-bit value and assign the result to the attribute "Xdensity" of the new "JPEG_DecoderConfig" element 2730, and increment the value of the quantity "esdPos" by "2".

5. Combine the next two entries in the array "esdData" into a 16-bit value and assign the result to the attribute "Ydensity" of the new "JPEG_DecoderConfig" element 2730, and increment the value of the quantity "esdPos" by "2".

6. Assign the value of entry "esdPos" in the array "esdData" to the attribute "numComponents" of the new "JPEG_DecoderConfig" element 2730, and increment the value of the quantity "esdPos" by "1".

The Procedure "Process Visual Config"

The procedure "process visual config" consists of the following steps:

1. Create a new "VisualConfig" element 2740 and append it to the current "DecoderConfigDescriptor" element 2710.

2. Assign the value of the quantity "infoSize" to the "size" attribute of the new "VisualConfig" element 2740.

3. Increment the value of the quantity "esdPos" by the value of the quantity "infoSize".

The Procedure "Process Audio Config"

The procedure "process audio config" consists of the following steps:

1. Create a new "AudioConfig" element 2750 and append it to the current "DecoderConfigDescriptor" element 2710.

2. Assign the value of the quantity "infoSize" to the "size" attribute of the new "AudioConfig" element 2750.

3. Increment the value of the quantity "esdPos" by the value of the quantity "infoSize".

Creation of an XMT-A xml Document Based on the Pair of Intermediate xml Documents.

Figure 59:
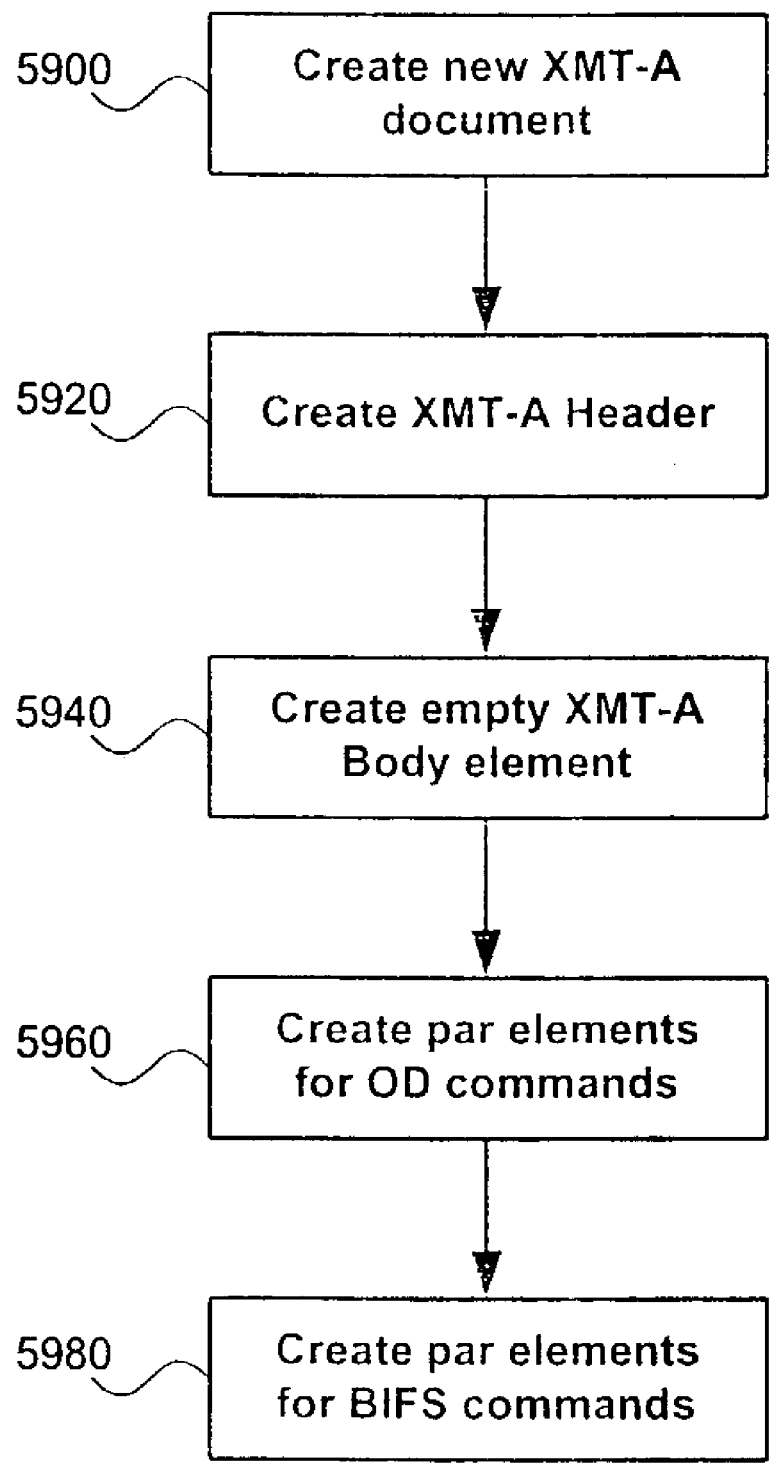

As shown in FIG. 59, the process of creating an XMT-A document 100 consists of the following steps:

1. At operation 5900, use standard xml means to create a new empty XMT-A document 100.

2. At operation 5920, perform the procedure Create XMT-A Header.

3. At operation 5940, use standard xml means to create a new empty XMT-A Body element 120 and append it to the new XMT-A document 100.

4. At operation 5960, perform the procedure "Create par elements for OD commands".

5. At operation 5980, perform the procedure "Create par elements for BIFS commands".

Steps 2, 4, and 5 are described below.

In preparation for these steps, the value of the "timeScale" attribute of the "moov" element subordinate to the mp4file document is assigned to the quantity "timeScale".

The Procedure Create XMT-A Header Element

Figure 60:
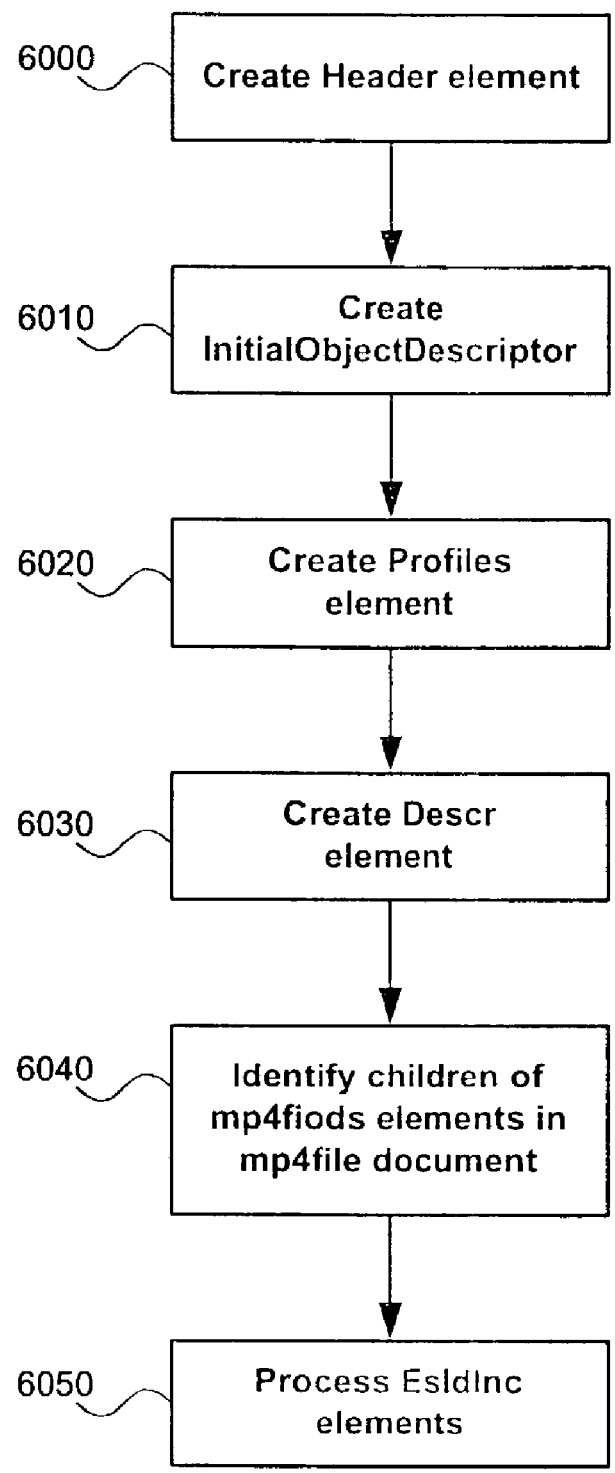
Figure 61:
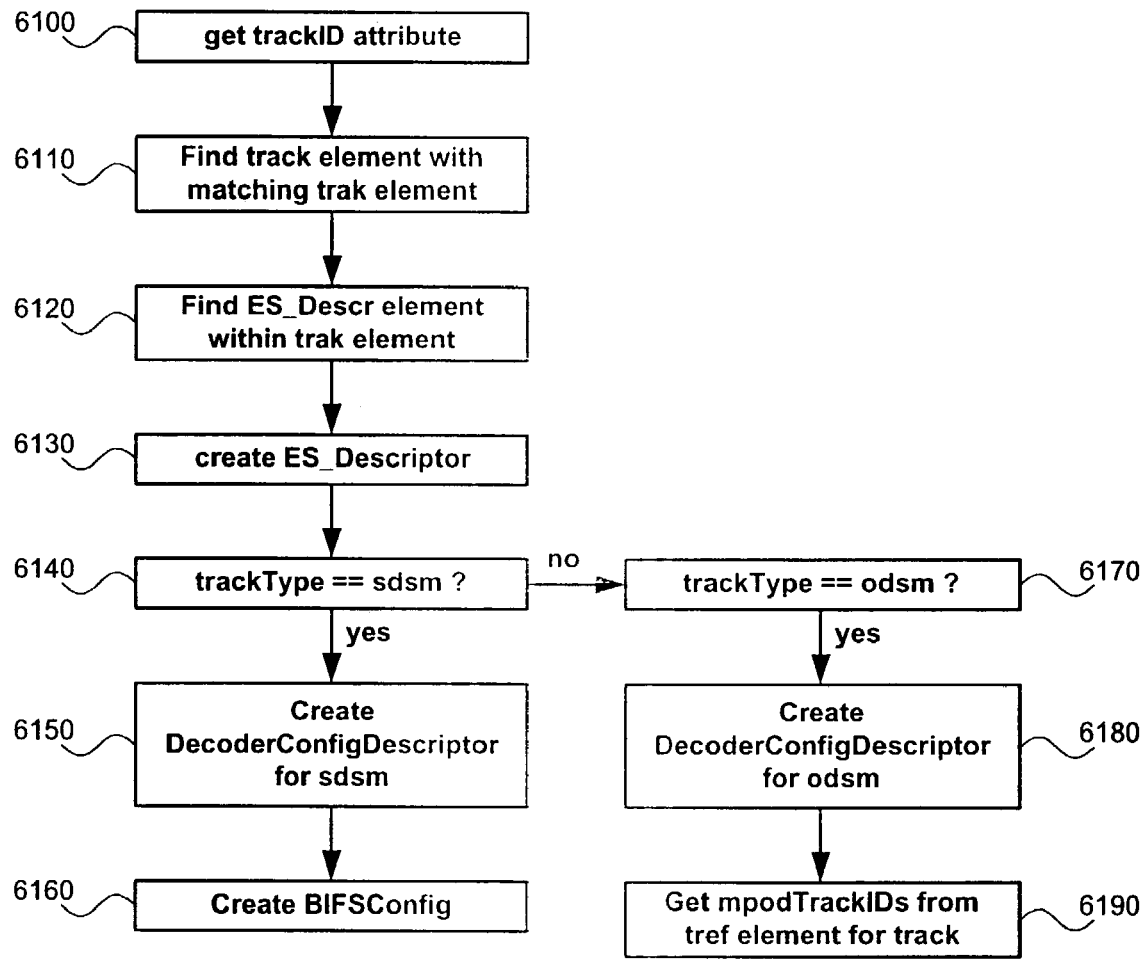

As shown in FIG. 60, the procedure Create XMT-A Header consists of the following steps:

1. At operation 6000, use standard xml means to create a new Header element 110 and append it to the XMT-A document 100.

2. At operation 6010, perform the procedure "Create InitialobjectDescriptor".

3. At operation 6020, perform the procedure "Create Profiles element".

4. At operation 6030, perform the procedure "Create Descr element".

5. At operation 6040, use standard xml means to select each element subordinate to the mp4fiods element 2330, 2360 in the mp4file document 2300.

6. At operation 6050, perform the procedure "Process EsIdInc element" for each EsIdInc element 2380 subordinate to the mp4fiods element 2330, 2360.

The procedure "Create InitialobjectDescriptor" in Step 2 consists of the following operations:

a. Use standard xml means to create a new InitialObjectDescriptor element 130 and append it to the new Header element 110.

b. Use standard xml means to locate the moov element 2320 contained in the mp4file document 2300.

c. Use standard xml means to locate the mp4fiods element 2330, 2360 contained in the moov element 2320.

d. Create a new string consisting of the prefix "IODID:" followed by the value of the objectDescriptorID attribute 2370 of the mp4iods element 2360, and assign the value of this string to the ODID attribute of the InitialObjectDescriptor element 130.

The procedure "Create Profiles element" in Step 3 consists of the following operations:

a. Use standard xml means to create a new Profiles element 150 and append it to the new InitialObjectDescriptor element 130.

b. Assign the value of the includeInlineProfilesFlag attribute of the mp4fiods element 2360 to the includeInlineProfileLevelFlag attribute of the Profiles element 150.

c. Assign values to the following attributes of the Profiles element 150 based on the values of the corresponding attributes of the mp4fiods element 2360:

i. sceneProfileLevelIndication
ii. ODProfileLevelIndication
iii. audioProfileLevelIndication
iv. visualProfileLevelIndication
v. graphicsProfileLevelIndication The values assigned to the attributes of the Profiles element 150 may consist of alphanumeric strings representing particular numerical values represented by the corresponding attributes of the mp4fiods element 2360. For example, the string "None" may be used to represent the numerical values "−1" or "255". Other numerical values permitted for attributes of the mp4fiods element 2360 may be replaced by string values defined in the MPEG-4 systems specifications.

The procedure "Create Descr element" in Step 4 consists of the following operations:

a. Use standard xml means to create a new Descr element 160 and append it to the new InitialObjectDescriptor element 130.

b. Use standard xml means to create a new esDescr element 170 and append it to the new Descr element 160.

Step 5 consists of using standard xml means to select each element 2380 subordinate to the mp4fiods element 2320, 2360 in the mp4file document 2300. The elements selected in this step are expected to be EsIdInc elements 2380. The procedure "Process EsIdInc element" is performed for each EsIdInc element 2380 identified in this step.

The Procedure "Process EsIdInc Element"

The following operations are performed for each EsIdInc element 2380 subordinate to the mp4fiods element 2360 in the mp4file document 2300:

1. At operation 6100, assign the value of the trackID attribute 2390 of the EsIdInc element 2380 to the quantity "trackID".

2. At operation 6110, use standard xml means to find the trak element 2350 subordinate to the moov element 2320 in the mp4file document 2300 for which the value of the trackID attribute of the trak element 2350 matches the value of the quantity "trackID".

3. At operation 6120, use standard xml means to find the ES_Descr element 2688 contained within the trak element 2350, 2600 identified in the previous step.

4. At operation 6130, use standard xml means create a new ES_Descriptor element 180, 190 and append it to the esDescr element 170.

5. At operation 6140, compare the value of the string quantity "trackType" determined in step "2" to the string "sdsm".

6. At operation 6150, if the value of the string quantity "trackType" is "sdsm", perform the procedure "Create the DecoderConfigDescriptor for the scene description stream".

7. At operation 6160, perform the procedure "Create BIFSConfig".

8. At operation 6170, if the value of the string quantity "trackType" is not "sdsm", compare the value of the string quantity "trackType" to the string "odsm".

9. At operation 6180, if the value of the string quantity "trackType" is "odsm", perform the procedure "Create the DecoderConfigDescriptor for the object descriptor stream".

10. At operation 6190, perform the procedure "Get mpodTrackIDs from tref element for trak".

Step 2 includes the following operations which are performed after the selected trak element has been identified:

a. Use standard xml means to find the hdlr element 2608 subordinate to the specified trak element 2600.

b. Assign the value of the "name" attribute of this hdlr element to the string quantity "trackName".

c. Assign the value of the "handlerType" attribute of this hdlr element to the string quantity "trackType". The value of this quantity is expected to be either "sdsm" or "odsm".

d. Create a new string quantity "ES_ID" by concatenating the string "IOD" with the value of the quantity "trackName" and the string "ESID:1", and assign the result to the "ES_ID" attribute of the new ES_Descriptor element 180, 190.

e. Create a new decConfigDescr element 646 and append it to the ES_Descriptor element 180, 190, 640.

f. Create a new DecoderConfigDescriptor element 650 and append it to the decConfigDescr element 646.

g. Create a new slConfigDescr element 660 and append it to the ES_Descriptor element 640.

h. Create a new SLConfigDescriptor element 666 and append it to the slConfigDescr element 660.

i. Create a new "predefined" element and append it to the SLConfigDescriptor element 666.

j Assign the value "2" to the "value" attribute of the "predefined" element.

Create the DecoderConfigDescriptor for the Scene Description Stream

1. Use standard xml means to find the DecoderConfigDescriptor element 2710 contained within the ES_Descr element 2688, 2700 contained within the selected trak element 2600 in the mp4file document 2300.

2. Assign the values of the "avgBitrate" and "maxbitrate" attributes of the DecoderConfigDescriptor element 2710 to the corresponding attributes of the new DecoderConfigDescriptor element 650 in the XMT-A document 100.

3. Assign the value of the "bufferSize" attribute of the DecoderConfigDescriptor element 2710 to the "bufferSizeDB" attribute of the new DecoderConfigDescriptor element 650.

4. Assign a string value to the "streamType" attribute of the new DecoderConfigDescriptor element 650 in the XMT-A document 100 based on the numerical value of the "streamType" attribute of the DecoderConfigDescriptor element 2710 in the mp4file document 2300. The value of the "streamType" attribute of the DecoderConfigDescriptor element 2710 in the mp4file document 2300 is expected to match one of the entries in the first column 6200 in FIG. 62A. The corresponding entry in the second column 6220 in FIG. 62A is assigned to the "streamType" attribute of the new DecoderConfigDescriptor element 650 in the XMT-A document 100.

In this case, the value of the streamType attribute of the DecoderConfigDescriptor element 2710 in the mp4file document 2300 is expected to be "3", and the value "SceneDescription" is assigned to the "streamType" attribute of the new DecoderConfigDescriptor element 650 in the XMT-A document 100.

5. Assign a string value to the "objectTypeIndication" attribute of the new DecoderConfigDescriptor element 650 in the XMT-A document 100 based on the numerical value of the "objectType" attribute of the DecoderConfigDescriptor element 2710 in the mp4file document 2300. The value of the "objectType" attribute of the DecoderConfigDescriptor element 2710 in the mp4file document 2300 is expected to match one of the entries in the first column 6240 in FIG. 62B. The corresponding entry in the second column 6260 in FIG. 62B is assigned to the "objectTypeIndication" attribute of the new DecoderConfigDescriptor element 650 in the XMT-A document 100.

6. Create a new decSpecificInfo element 656, 680 and append it to the DecoderConfigDescriptor element 650.

Create BIFSConfig

The procedure "Create BIFS Config" consists of the following steps:

1. Create a new BIFSConfig element 686 and append it to the new decSpecificInfo element 680.

2. Use standard xml means to find the BIFS_DecoderConfig element 2720 subordinate to the DecoderConfigDescriptor element 2710.

3. Assign the value of the "nodeIdBits" attribute of the BIFS_DecoderConfig element 2720 to the quantity nodeIdBits and to the "nodeIDbits" attribute of the BIFSConfig element 686.

4. Assign the value of the "routeIdBits" attribute of the BIFS_DecoderConfig element 2720 to the "routeIDbits" attribute of the BIFSConfig element 686.

5. If the value of the quantity "v2Config" is "true", perform the following three steps:

a. Assign the value of the "protoIdBits" attribute of the BIFS_DecoderConfig element 2720 to the "PROTOIDbits" attribute of the BIFSConfig element 686.

b. Assign the value of the "use3DMeshCoding" attribute of the BIFS_DecoderConfig element 2720 to the "use3DMeshCoding" attribute of the BIFSConfig element 686.

c. Assign the value of the "usePredictiveMFField" attribute of the BIFS_DecoderConfig element 2720 to the "usePredictiveMFField" attribute of the BIFSConfig element 686.

6. If the value of the "commandStream" attribute of the BIFS_DecoderConfig element 2710 is "true", perform the following steps:

a. Create a new "commandStream" element 690 and append it to the BIFSConfig element 686.

b. Assign the value of the "pixelMetric" attribute of the BIFS_DecoderConfig element 2710 to the "pixelMetric" attribute of the commandStream element 686.

c. Create a new "size" element 696 and append it to the commandStream element 690.

d. Assign the value of the "pixelHeight" attribute of the BIFS_DecoderConfig element 2710 to the "pixelHeight" attribute of the "size" element 696.

e. Assign the value of the "pixelWidth" attribute of the BIFS_DecoderConfig element 2710 to the "pixelWidth" attribute of the "size" element 696.

Create the DecoderConfigDescriptor for the Object Descriptor Stream

1. Use standard xml means to find the DecoderConfigDescriptor element 2710 contained within the ES_Descr element 2688, 2700 contained within the selected trak element 2600 in the mp4file document 2300.

2. Assign the values of the "avgBitrate" and "maxBitrate" attributes of the DecoderConfigDescriptor element 2710 to the corresponding attributes of the new DecoderConfigDescriptor element 650 in the XMT-A document.

3. Assign the value of the "bufferSize" attribute of the DecoderConfigDescriptor element in the trak atom in the mp4file document to the "bufferSizeDB" attribute of the new DecoderConfigDescriptor element 650.

4. Assign a string value to the "streamType" attribute of the new DecoderConfigDescriptor element 650 in the XMT-A document 100 based on the numerical value of the "streamType" attribute of the DecoderConfigDescriptor element 2710 in the mp4file document 2300. The value of the "streamType" attribute of the DecoderConfigDescriptor element 2710 in the mp4file document 2300 is expected to match one of the entries in the first column 6200 in FIG. 62A. The corresponding entry in the second column 6220 in FIG. 62A is assigned to the "streamType" attribute of the new DecoderConfigDescriptor element 650 in the XMT-A document 100.

In this case, the value of the streamType attribute of the DecoderConfigDescriptor element 2710 in the mp4file document 2300 is expected to be "1", and the value "ObjectDescriptor" is assigned to the "streamType" attribute of the new DecoderConfigDescriptor element 650 in the XMT-A document 100.

5. Assign a string value to the "objectTypeIndication" attribute of the new DecoderConfigDescriptor element 650 in the XMT-A document 100 based on the numerical value of the "objectType" attribute of the DecoderConfigDescriptor element 2710 in the mp4file document 2300. The value of the "objectType" attribute of the DecoderConfigDescriptor element 2710 in the mp4file document 2300 is expected to match one of the entries in the first column 6240 in FIG. 62B. The corresponding entry in the second column 6260 in FIG. 62B is assigned to the "objectTypeIndication" attribute of the new DecoderConfigDescriptor element 650 in the XMT-A document 100.

Get mpodTrackIDs from tref Element for trak

The procedure "Get mpodTrackIDs from tref element for trak" consists of the following steps:

1. Use standard xml means to find the tref element 2636 subordinate to the selected trak element 2600.

2. Use standard xml means to find the mpod element 2640 subordinate to the selected tref element 2636.

3. Assign the value of the "trackID" attribute of the "mpod" element 2640 to the quantity "mpodTrackIds"

The Procedure "Create par Elements for OD Commands".

The XMT-A "par" elements 140 representing Object Descriptor command elements are derived from elements 2460 of the mp4file document 2300 representing the Object Descriptor stream (odsm). Each Object Descriptor command represented in the XMT-A document 100 may also include ES_Descriptor elements 630, each of which is derived from an ES_Descriptor element 2688 contained in a trak element 2350, 2600 in the mp4file document 2300.

In preparation for creation of these "par" elements, the string quantity "mpodTrackIds" is used to create an array of trackid values, pMpodTrackId. The value of mpodTrackIds was assigned during creation of the XMT-A Header element 110, if an Object Descriptor stream (odsm) exists for the corresponding mp4 file. If a value has not been assigned to this quantity, then there is no Object Descriptor stream, no "par" elements are generated to represent Object Descriptor command elements, and this step is finished. If the corresponding mp4 file includes one or more media data streams exclusive of the sdsm and odsm, then the value of the quantity "mpodTrackIds" will contain a sequence of integer trackID values, and each element of the array pMpodTrackId will represent the corresponding member of this sequence.

As shown in FIG. 63, the procedure for creating "par" elements representing Object Descriptor commands consists of the following steps:

1. At operation 6300, standard xml means are used to find all of the odsm elements 2420 within the mp4file document 2300. This is accomplished by first using standard xml means to select each mdat element 2310 within the mp4file document. Standard xml means are then used to select each odsm element 2420 within each mdat element 2400.

2. At operation 6310, standard xml means are used to select each odsmChunk element 2470 within each odsm element 2460.

3. At operation 6320, standard xml means are used to select each odsmSample element 2510 within each odsmchunk element 2500.

4. At operation 6330, standard xml means are used to create a new empty "par" element 140 and appended to the XMT-A Body element 120.

5. At operation 6340, the value of the "time" attribute 2515, 2525 of the odsmSample element 2510, 2520 is divided by the value of the quantity "timeScale" and the result is assigned to the "begin" attribute of the new "par" element 140.

6. At operation 6350, standard xml means are used to select each odsm-command element 2530 contained within each odsmSample element 2520.

7. At operation 6360, the element name of each odsm-command element 2530 is compared to the string "ObjectDescrUpdate".

8. At operation 6370, if the element name for an odsm-command element 2530 is "ObjectDescrUpdate", the procedure "Create ObjectDescrUpdate element" is performed.

9. At operation 6380, if the element name for an odsm-command element 2530 is not "ObjectDescrUpdate", the element name of the odsm-command element 2530 is compared to the string "ObjectDescrRemove".

10. At operation 6390, if the element name for an odsm-command element 2530 is "ObjectDescrRemove", the procedure "Create ObjectDescrRemove element" is performed.

Create ObjectDescriptorUpdate Element

The procedure Create ObjectDescriptorUpdate element consists of the following steps:

1. Standard xml means are used to create a new "ObjectDescriptorUpdate" element 220 and append it to the current "par" element 210.

2. Standard xml means are used to create a new "OD" element 230 and append it to the current "ObjectDescriptorUpdate" element 220.

3. Standard xml means are used to find the "ObjectDescriptor" element 2550 subordinate to the ObjectDescrUpdate odsm-command element 2540.

4. Standard xml means are used to create a new "ObjectDescriptor" element 240, 600 and append it to the current "OD" element 230.

5. The value of the ODID attribute 2555 of the ObjectDescriptor element 2550 is assigned to the string quantity "ODID".

6. The value of the string quantity "ODID" is concatenated with the prefix "ODID:" and the result is assigned to the objectDescriptorID attribute of the new ObjectDescriptor element 240, 606, with "objectDescriptorID" represented as "ODID".

7. Standard xml means are used to create a new "Descr" element 610 and append it to the new ObjectDescriptor element 600.

8. Standard xml means are used to create a new "esDescr" element 620 and append it to the new "Descr" element 610.

9. Standard xml means are used to create a new "ES_Descriptor" element 630 and append it to the current "esDescr" element 620.

10. Standard xml means are used to select the "EsIdRef" element 2560 subordinate to the ObjectDescriptor element 2550.

11. The value of the "EsId" attribute 2565 of the "EsIdRef" element 2560 is assigned to the quantity "EsId".

12. Standard xml means are used to create a new "decConfigDescr" element 646 and append it to the new "ES_Descriptor" element 630, 640.

13. Standard xml means are used to create a new "DecoderConfigDescriptor" element 650 and append it to the new "decConfigDescr" element 640.

14. The value of entry (EsId-1) in the array pMpodTrackId is assigned to the quantity "mpodTrackID". For example, if the value of "EsId" is "1", the value of mpodTrackID is determined by entry "0", the first entry, in the array pMopdTrackId.

15. Standard xml means are used to select the trak element 2350 for which the value of the trackID attribute matches the value of the quantity "ImpodTrackID".

16. Standard xml means are used to select the hdlr element 2608 subordinate to the selected trak element 2350, 2600.

17. The value of the "name" attribute of the selected hdlr element 2608 is assigned to the string quantity "trackName".

18. The value of the "handlerType" attribute of the selected hdlr element 2608 is assigned to the string quantity "trackType".

19 A new string quantity is created by concatenating the string "ESID:" with the value of the quantity "trackname" and the value of the quantity "EsId", and the result is assigned to the "ES_ID" attribute 636 of the new "ES_Descriptor" element 640.

20. Standard xml means are used to create a new "slConfigDescr" element 660 and append it to the current "ES_Descriptor" element 640.

21. Standard xml means are used to create a new "SLConfigDescriptor" element 666 and append it to the new "slConfigDescr" element 660.

22. Standard xml means are used to create a new "predefined" element and append it to the new "SLConfigDescriptor" element 666.

23 The value "2" is assigned to the "value" attribute of the new "predefined" element.

24. Perform the procedure "Create the DecoderConfigDescriptor element for a media data stream".

25. Perform the procedure "Create StreamSource element".

Create the DecoderConfigDescriptor Element for a Media Data Stream

The procedure "Create the DecoderConfigDescriptor element for a media data stream" consists of the following steps:

1. Standard xml means are used to select the DecoderConfigDescriptor element 2710 contained within the trak element 2350 selected in the step 15 of the procedure "Create ObjectDescriptorUpdate element".

2. A string value is assigned to the "streamType" attribute of the new DecoderConfigDescriptor element 650 created in step 13 of the procedure "Create ObjectDescriptorUpdate element". The value of this string is determined by an entry in the second column 6220 in FIG. 62A. This entry corresponds to the entry on the first column 6200 which matches the numerical value of the "streamType" attribute of the selected DecoderConfigDescriptor 2710.

3. A string value is assigned to the "objectTypeIndication" attribute of the new DecoderConfigDescriptor element 650 created in step 13 of the procedure "Create ObjectDescriptorUpdate element". The value of this string is determined by an entry in the second column 6260 in FIG. 62B. This entry corresponds to the entry on the first column 6240 which matches the numerical value of the "objectType" attribute of the selected DecoderConfigDescriptor 2710.

4. Assign the values of the "avgBitrate" and "maxBitrate" attributes of the selected DecoderConfigDescriptor element 2710 to the corresponding attributes of the new DecoderConfigDescriptor element 650 in the XMT-A document.

5. Assign the value of the "bufferSize" attribute of the selected DecoderConfigDescriptor element 2710 to the "bufferSizeDB" attribute of the new DecoderConfigDescriptor element 650 in the XMT-A document.

6. If the selected DecoderConfigDescriptor element 2710 contains a subordinate JPEG_DecoderConfig element 2730, VisualConfig element 2740, or AudioConfig element 2750, perform the following steps:

a. Standard xml means are used to create a new "decSpecificInfo" element 656 and append it to the new "DecoderConfigDescriptor" element 650.

b. Standard xml means are used to create a new "DecoderSpecificInfo" element and append it to the current "decSpecificInfo" element 656.

c. The value "auto" is assigned to the "type" attribute of the new DecoderSpecificInfo element.

Create StreamSource Element

The procedure "Create StreamSource element" consists of the following steps:

1. Standard xml means are used to select each mdat element 2310 contained in the mp4file document 2300.

2. Standard xml means are used to select each mediaFile element 2430, 2480 contained in each mdat element 2310.

3. The value of the "trackID" attribute of each selected mediaFile element 2480 is assigned to the quantity "mdatTrackID".

4. The value of the quantity "mdatTrackID" is compared to the current value of the quantity "mpodTrackID.

5. If the value of the quantity "mdatTrackID" matches the current value of the quantity "mpodTrackID", the following steps are performed:

a. Standard xml means are used to create a new "StreamSource" element 670 and append it to the current "ES_Descriptor" element 640.

b. The value of the "name" attribute of the selected mediaFile element 2480 is concatenated with the prefix "file:///" and the result is assigned to the "url" attribute of the new "StreamSource" element 670.

Create ObjectDescriptorRemove Element

The procedure "Create objectDescriptorRemove element" consists of the following steps:

1. Standard xml means are used to create a new "ObjectDescriptorRemove" element 250 and append it to the current "par" element 210.

2. The value of the "ODID" attribute of the "ObjectDescriptorRemove" element 2570 in the odsm-sample element 2530 is concatenated to the prefix "ODID:" and the result is assigned to the "objectDescriptorId" attribute of the new "ObjectDescriptorRemove" element 250. The "objectDescriptorId" attribute of the XMT-A "ObjectDescriptorRemove" element is represented as "ODID" in FIG. 2B.

The Procedure "Create par Elements for BIFS Commands".

As shown in FIG. 64, the procedure "Create par elements for BIFS commands" consists of the following steps:

1. At operation 6400, standard xml means are used to select the bifsConfig element 2810 in the mp4bifs document 2800. The value of the "nodeIdBits" attribute is assigned to the quantity "numNodeIdBits". An array of integers named "pNodeNumber" and an array of strings named "pNodeIdName" are created. The number of elements in each of these arrays is specified by 2 raised to the power numNodeIdBits.

2. At operation 6410, standard xml means are used to select each "commandFrame" element 2820 in the mp4bifs document 2800.

3. At operation 6420, standard xml means are used to create a new "par" element 140 and append it to the XMT-A Body element 120.

4. At operation 6430, the value of the "time" attribute of the commandFrame element 2820 is assigned to the "begin" attribute of the "par" element 140.

5. At operation 6440, perform the procedure "Build arrays of node numbers and node names" using the current commandFrame element 2820.

6. At operation 6450, perform the procedure "Convert mp4bifs commandFrame element into XMT-A elements" using the current commandFrame element 2820.

Build Arrays of Node Numbers and Node Names

The procedure "Build arrays of node numbers and node names" is summarized in FIG. 65. This procedure consists of the following steps:

1. At operation 6500, standard xml means are used to select each subordinate element possessed by the current mp4bifs commandFrame element 2830. Each such subordinate element corresponds to a bifsCommand element 2840, 2910.

2. At operation 6510, standard xml means are used to select each subordinate element possessed by the current bifsCommand element. If a selected subordinate element corresponds to a bifsCommand element, this procedure is repeated recursively. Otherwise, the selected subordinate element must correspond to an mp4bifs Node element and the following steps are performed.

3. At operation 6520, compare the element name for the selected mp4bifs Node element 2920, 3000 to the string "ReusedNode". If the element name for the selected mp4bifs Node element 2920, 3000 is "ReusedNode", continue with selection of the next mp4bifs Node element 6510, 6590, if any.

4. At operation 6530, if the element name for the selected mp4bifs Node element 2920, 3000 is not "ReusedNode", use standard xml means to determine whether a value has been specified for the "NodeId" attribute of the selected mp4bifs Node element 2920, 3000.

5. At operation 6540, if a value has been specified for the "NodeId" attribute of the selected mp4bifs Node element 2920, 3000, assign the numerical value of the "NodeId" attribute to the integer quantity "nodeId".

6. At operation 6550, compare the name of the selected mp4bifs Node element 2920, 3000 to each entry in an array of Node names defined in the MPEG-4 specifications. Assign the index of the matching entry in the array of MPEG-4 Node names to the integer quantity nodeNumber. Assign the value of the integer quantity nodeNumber to entry nodeId in the array pNodeNumber.

7. At operation 6560, use standard xml means to determine whether a value has been specified for the "name" attribute of the selected mp4bifs Node element 2920, 3000.

8. At operation 6570, if a value has been specified for the "name" attribute of the selected mp4bifs Node element 2920, 3000, assign the value of this "name" attribute to entry nodeId in the array pNodeIdName.

9. At operation 6580, use standard xml means to select each subordinate element 3030, 3070 possessed by the selected mp4bifs Node element 2920, 3000. For each subordinate element corresponding to a bifsCommand element 3070, repeat step 2 6510 recursively.

10. At operation 6590, for each subordinate element corresponding to an mp4bifs Node element 3030, repeat step 3 6520 recursively.

Convert mp4bifs commandFrame Element into XMT-A Elements

The following procedure used to convert the contents of an mp4bifs commandFrame element 2830 into XMT-A BIFS command elements 300, 310, 320. In this case, the "current mp4bifs element" is the mp4bifs commandFrame element 2830 selected at 6410, and the "XMT-A parent element" is the XMT-A "par" element created at 6420.

The same procedure is used to convert an mp4fbifs Conditional Node 3040 into XMT-A BIFS command elements 300, 310, 320. In this case, the "current mp4bifs element" is an mp4bifs Conditional Node element 3040 subordinate to an mp4bifs command element 2910 or an mp4bifs Node element 3000, and the "XMT-A parent element" is an XMT-A command element 300, 310, 320 or an XMT-A CommandBuffer nodeField element 410.

1. Standard xml means are used to select each mp4bifs element subordinate to the current mp4bifs element. Each such subordinate element is processed as described in one of the following steps:

2. If the element name for the selected subordinate element is "InsertNode", perform the procedure "Convert an mp4bifs InsertNode element into XMT-A elements".

3. If the element name for the selected subordinate element is "InsertIndexedValue", perform the procedure "Convert an mp4bifs InsertIndexedValue element into XMT-A elements".

4. If the element name for the selected subordinate element is "InsertRoute", perform the procedure "Convert an mp4bifs InsertRoute element into XMT-A elements".

5. If the element name for the selected subordinate element is "DeleteNode", perform the procedure "Convert a mp4bifs DeleteNode element into XMT-A elements".

6. If the element name for the selected subordinate element is "DeleteIndexedValue", perform the procedure "Convert an mp4bifs DeleteIndexedValue element into XMT-A elements".

7. If the element name for the selected subordinate element is "DeleteRoute", perform the procedure "Convert an mp4bifs DeleteRoute element into XMT-A elements".

8. If the element name for the selected subordinate element is "ReplaceNode", perform the procedure "Convert an mp4bifs ReplaceNode element into XMT-A elements".

9. If the element name for the selected subordinate element is "ReplaceIndexedValue", perform the procedure "Convert an mp4bifs ReplaceIndexedvalue element into XMT-A elements".

10. If the element name for the selected subordinate element is "ReplaceField", perform the procedure "Convert an mp4bifs ReplaceField element into XMT-A elements".

11. If the element name for the selected subordinate element is "iReplaceRoute", perform the procedure "Convert an mp4bifs ReplaceRoute element into XMT-A elements".

12. If the element name for the selected subordinate element is "ReplaceScene", perform the procedure "Convert an mp4bifs ReplaceScene element into XMT-A elements".

Convert an mp4bifs InsertNode Element into XMT-A Elements

The procedure "Convert an mp4bifs InsertNode element into XMT-A elements" consists of the following steps:

1. Create a new XMT-A "Insert" element 300 and append it to the XMT-A parent element.

2. Process the parentId Attribute:

a. Assign the value of the "parentId" attribute of the mp4bifs "InsertNode" element to the integer quantity "nodeId".

b. Assign the value of entry nodeId in the array pNodeIdName to the string quantity "nodeIdName".

c. If the value of the string quantity "nodeIdName" is null or has no contents (zero length), append the value of the quantity "nodeId" to the prefix "nodeId:" and assign the result to the quantity "nodeIdName".

d. Assign the value of the quantity "nodeIdName" to the "atNode" attribute of the XMT-A "Insert" element 300.

3. Process insertionPosition attribute:

a. Assign the value of the "insertionPosition" attribute of the mp4bifs "InsertNode" element to the string quantity "position".

b. If the value of the quantity "position" is "0", assign the value of the "position" attribute of the mp4bifs "InsertNode" element to the "positition" attribute of the XMT-A "Insert" element 300.

c. If the value of the quantity "position" is "12", assign the value "BEGIN" to the "positition" attribute of the XMT-A "Insert" element 300.

d. If the value of the quantity "position" is "3", assign the value "END" to the "positition" attribute of the XMT-A "Insert" element 300.

4. Process subordinate mp4bifs Node elements:

a. Standard xml means are used to select each subordinate Node element 2920 possessed by the current bifsCommand element 2910.

b. Perform the procedure "Convert an mp4bifs Node element into an XMT-A Node element" for each such selected subordinate Node element 2920.

Convert an mp4bifs InsertIndexedValue Element into XMT-A Elements

The procedure "Convert an mp4bifs InsertIndexedValue element into XMT-A elements" consists of the following steps:

1. Create a new XMT-A "Insert" element 300 and append it to the current XMT-A parent element.

2. Process the nodeId attribute:

a. Assign the value of the "nodeId" attribute of the mp4bifs "InsertNode" element to the integer quantity "nodeId".

b. Assign the value of entry nodeId in the array pNodeNumber to the integer quantity "nodeNumber".

c. Assign the value of entry nodeId in the array pNodeIdName to the string quantity "nodeIdName".

d. If the value of the string quantity "nodeIdName" is null or has no contents (zero length), append the value of the quantity "nodeId" to the prefix "nodeId:" and assign the result to the quantity "nodeIdName".

e. Assign the value of the quantity "nodeIdName" to the "atNode" attribute of the XMT-A "Insert" element.

3. Process the inFieldName and value attributes:

a. Assign the value of the "inFieldName" attribute of the mp4bifs "InsertIndexedValue" element to the "atField" attribute of the XMT-A "Insert" element.

b. Assign the value of the "value" attribute of the mp4bifs "InsertIndexedValue" element to the "value" attribute of the XMT-A "Insert" element.

4. Process the insertionPosition attribute:

a. Assign the value of the "insertionPosition" attribute of the mp4bifs "InsertIndexedValue" element to the string quantity "position".

b. If the value of the quantity "position" is "0", assign the value of the "position" attribute of the mp4bifs "InsertNode" element to the "positition" attribute of the XMT-A "Insert" element 300.

c. If the value of the quantity "position" is "2", assign the value "BEGIN" to the "positition" attribute of the XMT-A "Insert" element 300.

d. If the value of the quantity "position" is "3", assign the value "END" to the "positition" attribute of the XMT-A "Insert" element 300.

5. Process subordinate mp4bifs Node elements:

a. Standard xml means are used to select each subordinate Node element 2920 possessed by the current bifsCommand element 2910.

b. Perform the procedure "Convert an mp4bifs Node element into an XMT-A Node element" for each such selected subordinate Node element 2920.

Convert an mp4bifs InsertRoute Element into XMT-A Elements

The procedure "Convert an mp4bifs InsertRoute element into XMT-A elements" consists of the following steps:

1. Create a new XMT-A "Insert" element 300 and append it to the current XMT-A parent element.

2. Create a new XMT-A "Route" element 340 and append it to the new XMT-A "Insert" element 300.

3. Process the routeid attribute:

a. Assign the value of the "routeid" attribute of the mp4bifs "InsertRoute" element to the string quantity "iRoute".

b. Assign the value of the "name" attribute of the mp4bifs "InsertRoute" element to the string quantity "routeName".

c. If the value of the string quantity "routeName" is not null and includes at least one character, assign the quantity "routeName" to the "DEF" attribute of the XMT-A "ROUTE" element 340. Otherwise, if the value of the string quantity "iRoute" is not null and includes at least one character, append the value of the quantity "iRoute" to the prefix "route:" and assign the result to the "DEF" attribute of the XMT-A "ROUTE" element 340.

4. Perform the procedure "Convert the attributes of an mp4bifs Route element into the attributes of an XMT-A ROUTE element" based on the mp4bifs "InsertRoute" element.

Convert an mp4bifs DeleteNode Element into XMT-A Elements

The procedure "Convert an mp4bifs DeleteNode element into XMT-A elements" consists of the following steps:

1. Create a new XMT-A "Delete" element 310 and append it to the current XMT-A parent element.

2. Process the nodeId attribute:

a. Assign the value of the "nodeId" attribute of the mp4bifs "DeleteNode" element to the integer quantity "nodeId".

b. Assign the value of entry nodeId in the array pNodeIdName to the string quantity "nodeIdName".

c. If the value of the string quantity "nodeIdName" is null or has no contents (zero length), append the value of the quantity "nodeId" to the prefix "nodeId:" and assign the result to the quantity "nodeIdName".

d. Assign the value of the quantity "nodeIdName" to the "atNode" attribute of the XMT-A "Delete" element 310.

Convert an mp4bifs DeleteIndexedValue Element into XMT-A Elements

The procedure "Convert an mp4bifs DeleteIndexedValue element into XMT-A elements" consists of the following steps:

1. Create a new XMT-A "Delete" element 310 and append it to the current XMT-A parent element.

2. Process the nodeId attribute:

a. Assign the value of the "nodeId" attribute of the mp4bifs "DeleteIndexedValue" element to the integer quantity "nodeId".

b. Assign the value of entry nodeId in the array pNodeNumber to the integer quantity "nodeNumber".

c. Assign the value of entry nodeId in the array pNodeIdName to the string quantity "nodeIdName".

d. If the value of the string quantity "nodeIdName" is null or has no contents (zero length), append the value of the quantity "nodeId" to the prefix "nodeId:" and assign the result to the quantity "nodeIdName".

e. Assign the value of the quantity "nodeIdName" to the "atNode" attribute of the XMT-A "Delete" element 310.

3. Process the inField attribute:

a. Assign the value of the "inField" attribute of the mp4bifs "DeleteIndexedValue" element to the integer quantity "field".

b. Assign the value of entry "field" in an array of field names defined in the MPEG-4 specifications for the BIFS node with index "nodeNumber" to the string quantity "fieldName".

c. Assign the value of the quantity "fieldName" to the "atField" attribute of the XMT-A "Delete" element 310.

4. Process the deletionPosition attribute:

a. Assign the value of the "deletionPosition" attribute of the mp4bifs "DeleteIndexedValue" element to the string quantity "position".

b. If the value of the quantity "position" is "0", assign the value of the "position" attribute of the mp4bifs "InsertNode" element to the "positition" attribute of the XMT-A "Delete" element 310.

c. If the value of the quantity "position" is "2", assign the value "BEGIN" to the "positition" attribute of the XMT-A "Delete" element 310.

d. If the value of the quantity "position" is "3", assign the value "END" to the "positition" attribute of the XMT-A "Delete" element 310.

Convert an mp4bifs DeleteRoute Element into XMT-A Elements

The procedure "Convert an mp4bifs DeleteRoute element into XMT-A elements" consists of the following steps:

1. Create a new XMT-A "Delete" element 310 and append it to the current XMT-A parent element.

2. Assign the value of the "routeId" attribute of the mp4bifs "DeleteRoute" element to the string quantity "routeId".

3. Append the value of the quantity "routeid" to the prefix "route:" and assign the result to the "atRoute" attribute of the XMT-A "Delete" element 310.

Convert an mp4bifs ReplaceNode Element into XMT-A Elements

The procedure "Convert an mp4bifs ReplaceNode element into XMT-A elements" consists of the following steps:

1. Create a new XMT-A "Replace" element 320 and append it to the current XMT-A parent element.

2. Process the nodeId attribute:

a. Assign the value of the "nodeId" attribute of the mp4bifs "ReplaceNode" element to the integer quantity "nodeId".

b. Assign the value of entry nodeId in the array pNodeIdName to the string quantity "nodeIdName".

c. If the value of the string quantity "nodeIdName" is null or has no contents (zero length), append the value of the quantity "nodeId" to the prefix "nodeId:" and assign the result to the quantity "nodeIdName".

d. Assign the value of the quantity "nodeIdName" to the "atNode" attribute of the XMT-A "Replace" element 320.

3. Process subordinate mp4bifs Node elements:

a. Standard xml means are used to select each subordinate Node element 2920 possessed by the current bifsCommand element 2910.

b. Perform the procedure "Convert an mp4bifs Node element into an XMT-A Node element" for each such selected subordinate Node element 2920.

Convert an mp4bifs ReplaceIndexedValue Element into XMT-A Elements

The procedure "Convert an mp4bifs ReplaceindexedValue element into XMT-A elements" consists of the following steps:

1. Create a new XMT-A "Replace" element 320 and append it to the current XMT-A parent element (FIG. 3C).

2. Process the nodeId attribute:

a. Assiqn the value of the "nodeId" attribute of the mp4bifs "ReplaceIndexedValue" element to the integer quantity "nodeId".

b. Assign the value of entry nodeId in the array pNodeNumber to the integer quantity "nodeNumber".

c. Assign the value of entry nodeId in the array pNodeIdName to the string quantity "nodeIdName".

d. If the value of the string quantity "nodeIdName" is null or has no contents (zero length), append the value of the quantity "nodeId" to the prefix "nodeId:" and assign the result to the quantity "nodeIdName".

e. Assign the value of the quantity "nodeIdName" to the "atNode" attribute of the XMT-A "Replace" element 320.

3. Process the inFieldName and value attributes:

a. Assign the value of the "inFieldName" attribute of the mp4bifs "ReplaceIndexedValue" element to the "atField" attribute of the XMT-A "Replace" element.

b. Assign the value of the "value" attribute of the mp4bifs "ReplaceIndexedValue" element to the "value" attribute of the XMT-A "Replace" element 320.

4. Process the replacementPosition attribute:

a. Assign the value of the "replacementPosition" attribute of the mp4bifs "ReplaceIndexedValue" element to the string quantity "position".

b. If the value of the quantity "position" is "0", assign the value of the "position" attribute of the mp4bifs "InsertNode" element to the "positition" attribute of the XMT-A "Replace" element 320.

c. If the value of the quantity "position" is "2", assign the value "BEGIN" to the "positition" attribute of the XMT-A "Replace" element 320.

d. If the value of the quantity "position" is "3", assign the value "END" to the "positition" attribute of the XMT-A "Replace" element 320.

5. Process subordinate mp4bifs Node elements:

a. Standard xml means are used to select each subordinate Node element 2920 possessed by the current bifsCommand element 2910.

b. Perform the procedure "Convert an mp4bifs Node element into an XMT-A Node element" for each such selected subordinate Node element 2920.

Convert an mp4bifs ReplaceField Element into XMT-A Elements

The procedure "Convert an mp4bifs ReplaceField element into XMT-A elements" consists of the following steps:

1. Create a new XMT-A "Replace" element 320 and append it to the current XMT-A parent element.

2. Process the nodeId attribute:

a. Assign the value of the "nodeId" attribute of the mp4bifs "ReplaceField" element to the integer quantity "nodeId".

b. Assign the value of entry nodeId in the array pNodeNumber to the integer quantity "nodeNumber".

c. Assign the value of entry nodeId in the array pNodeIdName to the string quantity "nodeIdName".

d. If the value of the string quantity "nodeIdName" is null or has no contents (zero length), append the value of the quantity "nodeId" to the prefix "nodeId:" and assign the result to the quantity "nodeIdName".

e. Assign the value of the quantity "nodeIdName" to the "atNode" attribute of the XMT-A "Replace" element.

3. Process the inFieldName and value attribute:

a. Assign the value of the "inFieldName" attribute of the mp4bifs "ReplaceField" element to the "atField" attribute of the XMT-A "Replace" element.

b. Assign the value of the "value" attribute of the mp4bifs "ReplaceField" element to the "value" attribute of the XMT-A "Replace" element.

4. Process subordinate mp4bifs Node elements:

a. Standard xml means are used to select each subordinate Node element 2920 possessed by the current bifsCommand element 2910.

b. Perform the procedure "Convert an mp4bifs Node element into an XMT-A Node element" for each such selected subordinate Node element 2920.

Convert an mp4bifs ReplaceRoute Element into XMT-A Elements

The procedure "Convert an mp4bifs ReplaceRoute element into XMT-A elements" consists of the following steps:

1. Create a new XMT-A "Replace" element 320 and append it to the current XMT-A parent element.

2. Assign the value of the "routeid" attribute of the mp4bifs "ReplaceRoute" element to the string quantity "routeId".

3. Append the value of the quantity "routeid" to the prefix "route:" and assign the result to the "atRoute" attribute of the XMT-A "Replace" element.

4. Perform the procedure "Convert the attributes of an mp4bifs Route element into the attributes of an XMT-A ROUTE element" based on the mp4bifs "ReplaceRoute" element.

Convert an mp4bifs ReplaceScene Element into XMT-A Elements

The procedure "Convert an mp4bifs ReplaceScene element into XMT-A elements" consists of the following steps:

1. Create a new XMT-A "Replace" element 320 and append it to the current XMT-A parent element.

2. Create a new XMT-A "Scene" element 370 and append it to the new XMT-A "Replace" element 320.

3. Assign the value of the "USENAMES" attribute of the ReplaceScene element 2930 to the string quantity "useNames". If the value of the quantity useNames is "true", assign the value of the quantity useNames to the "USENAMES" attribute of the new XMT-A Scene element 370.

4. Standard xml means are used to select each subordinate element possessed by the ReplaceScene element 2930. The following operations are performed for each such selected subordinate element:

5. If the name of the selected subordinate element is "Routes" 2950, perform the following steps. Otherwise, perform the procedure "Convert an mp4bifs Node element into an XMT-A Node element".

6. Standard xml means are used to select each subordinate element possessed by the selected "Routes" element 2950. Each such subordinate element is expected to be a "Route" element 2960. The following steps are performed for each such "Route" element 2960:

7. Create a new XMT-A "ROUTE" element 390 and append it to the new XMT-A "Scene" element 370.

8. Process the optional routeid attribute:

a. Assign the value of the "routeid" attribute of the selected "Route" element 2960 to the string quantity "iRoute".

b. Assign the value of the "name" attribute of the mp4bifs "Route" element 2960 to the string quantity "routeName".

c. If the value of the string quantity "routeName" is not null and includes at least one character, assign the quantity "routeName" to the "DEF" attribute of the XMT-A "ROUTE" element 390. Otherwise, if the value of the string quantity "iRoute" is not null and includes at least one character, append the value of the quantity "iRoute" to the prefix "route:" and assign the result to the "DEF" attribute of the XMT-A "ROUTE" element 390.

9. Perform the procedure "Convert the attributes of an mp4bifs Route element into the attributes of an XMT-A ROUTE element" based on the mp4bifs "Route" element 2960.

Convert the Attributes of an mp4bifs Route Element into the Attributes of an XMT-A ROUTE Element The procedure "Convert the attributes of an mp4bifs Route element into the attributes of an XMT-A ROUTE element" consists of the following steps.

The mp4bifs Route element referred to in this procedure may be an mp4bifs "Route" element 2960, an mp4bifs "InsertRoute" bifsCommand element 2910, or an mp4bifs "ReplaceRoute" bifsCommand element 2910.

1. Process the departureNode value:

a. Assign the value of the "departureNode" attribute of the mp4bifs Route element to the integer quantity "nodeId".

b. Assign the value of entry nodeId in the array pNodeNumber to the integer quantity "nodeNumber".

c. Assign the value of entry nodeId in the array pNodeIdName to the string quantity "nodeIdName".

d. If the value of the string quantity "nodeIdName" is null or has no contents (zero length), append the value of the quantity "nodeId" to the prefix "nodeId:" and assign the result to the quantity "nodeIdName".

e. Assign the value of the quantity "nodeIdName" to the "fromNode" attribute of the XMT-A "ROUTE" element 360 or 390.

2. Process the departureField value:

a. Assign the value of the "departureField" attribute of the mp4bifs Route element to the integer quantity "field".

b. Assign the value of entry "field" in an array of field names defined in the MPEG-4 specifications for the BIFS node with index "nodeNumber" to the string quantity "fieldName".

c. Assign the value of the quantity "fieldName" to the "fromField" attribute of the XMT-A "ROUTE" element 360 or 390.

3. Process the arrivalNode value:

a. Assign the value of the "arrivalNode" attribute of the mp4bifs Route element to the integer quantity "nodeId".

b. Assign the value of entry nodeId in the array pNodeNumber to the integer quantity "nodeNumber".

c. Assign the value of entry nodeId in the array pNodeIdName to the string quantity "nodeIdName".

d. If the value of the string quantity "nodeIdName" is null or has no contents (zero length), append the value of the quantity "nodeId" to the prefix "nodeId:" and assign the result to the quantity "nodeIdName".

e. Assign the value of the quantity "nodeIdName" to the "toNode" attribute of the XMT-A "ROUTE" element 360 or 390.

4. Process the arrivalField value:

a. Assign the value of the "arrivalField" attribute of the mp4bifs Route element to the integer quantity "field".

b. Assign the value of entry "field" in an array of field names defined in the MPEG-4 specifications for the BIFS node with index "nodeNumber" to the string quantity "fieldName".

c. Assign the value of the quantity "fieldName" to the "toField" attribute of the XMT-A "ROUTE" element 360 or 390.

Convert an mp4bifs Node Element into an XMT-A Node Element

Each mp4bifs Node element 3000 is represented by a new XMT-A Node element 400 subordinate to a particular XMT-A parent element. The identity of this XMT-A parent element is determined by the mp4bifs element to which the mp4bifs Node 3000 element is subordinate:

a. If the mp4bifs Node element 2920 is subordinate to an InsertNode bifsCommand element 2910 or InsertIndexedValue bifsCommand element 2910, then the XMT-A parent element is defined by the corresponding XMT-A "Insert" element 300.

b. If the mp4bifs Node element 2920 is subordinate to a ReplaceNode bifsCommand element 2910, ReplaceField bifsCommand element 2910, or ReplaceIndexedValue bifsCommand element 2910, then the XMT-A parent element is defined by the corresponding XMT-A "Replace" element 320.

c. If the mp4bifs Node element 2940 is subordinate to a ReplaceScene bifsCommand element 2930, then the XMT-A parent element is defined by the corresponding XMT-A "Scene" element 370.

d. If the mp4bifs Node element 3030 is subordinate to another mp4bifs Node element 3000 or InsertIndexedValue bifsCommand element 2910, then the XMT-A parent element is defined by the corresponding XMT-A "nodeField" element 410.

If the element name for the mp4bifs Node element is "ReusedNode" 3080, perform the procedure "Create XMT-A Node element for an mp4bifs ReusedNode element". Otherwise perform the following steps.

1. Determine the value of the integer quantity "nodeNumber". This value is determined by the entry number in an array of node names defined in the MPEG-4 Specifications for which the value of the indicated entry matches the NodeName of the current mp4bifs Node element 3000.

2. Create a new XMT-A Node element 400 with the same element name (NodeName) as the mp4bifs Node element 3000, and append this to the XMT-A parent element. This new XMT-A Node element is defined as "the current XMT-A Node element".

3. Determine the value of the "DEF" attribute, if needed:

a. Assign the value of the "name" attribute 3016 of the mp4bifs Node element 3000 to the string quantity "nodeIdName".

b. If the value of the quantity "nodeIdName" is not null and the string represented by this quantity has at least one character, assign the value of the quantity "nodeIdName" to the "DEF" attribute of the new XMT-A Node element 400.

c. If the value of the quantity "nodeIdName" is null or the string represented by this quantity has less than one character, assign the value of the "NodeId" attribute 3010 of the mp4bifs Node element 3000 to the string quantity "nodeId", d. If the value of the quantity "nodeId" is not null and the string represented by this quantity has at least one character, append the value of the quantity "nodeId" to the prefix "nodeId:" and assign the result to the "DEF" attribute of the new XMT-A Node element 400.

4. Use standard xml means to select each of the property field attribute values 3020 specified for the current mp4bifs Node element 3000.

5. Assign the value of the name of the current attribute value to the string quantity "attributeName".

6. Perform the following steps for each property field attribute 3020 of the mp4bifs Node element 3000.

5. Determine the field data type:

a. Determine the value of the integer quantity "field". This value is equal to the value of the entry number for the member of a table of field names which matches the value of "attributeName". The table of field names is defined by the MPEG-4 Specifications for the BIFS node with the node name and node number associated with the current mp4bifs Node element.

b. Assign the value of entry "field" in a table of fieldDataType values to the integer quantity "fieldDataType". The table of fieldDataType values is defined by the MPEG-4 Specifications for the BIFS node with the node name and node number associated with the current mp4bifs Node element 3000.

6. Check for URL field data type. If the field data type equals a value defined in the MPEG-4 specifications as representing the "URL" field data type, perform the following operations:

a. Assign the value of the "attributeName" attribute of the mp4bifs Node element to the string quantity "urlString".

b. Replace the first five characters of the character string represented by the quantity "urlString" with the prefix: "odid://ODID:"

c. Assign the resulting string value to the "attributeName" attribute of the current XMT-A Node element 400.

7. Check for Node field data type. If the field data type equals a value defined in the MPEG-4 specifications as representing the "Node" field data type, perform the following operations:

a. Create a new XMT-A element with element name "attributeName" and append it to the current XMT-A Node element. This element is defined as "the current XMT-A nodeField element".

b. Use standard xml means to select each subordinate element possessed by the current mp4bifs Node element. Each of these subordinate elements is expected to be another mp4bifs Node element. These subordinate elements are designated as the "child" elements, and the current mp4bifs Node element is designated as the "parent" element.

c. Perform the procedure "Convert an mp4bifs Node element into an XMT-A Node element" on each child element, using the current XMT-A nodeField element as the "parent" element.

8. Check for Command Buffer field data type. If the field data type equals a value defined in the MPEG-4 specifications as representing the "Command Buffer" field data type, perform the following operations:

a. Create a new XMT-A element with element name "attributeName" and append it to the current XMT-A Node element. This element is defined as "the current XMT-A nodeField element" 400.

b. Perform the procedure "Convert mp4bifs commandFrame element into XMT-A elements" using the current XMT-A nodeField element as the "parent" element.

9. Process other attributes. If the field data type is not one of the values identified in the preceding steps, perform the following operations:

a. Assign the value of the "attributeName" attribute of the mp4bifs Node element to the string quantity "attributeValue".

b. Assign the value of the quantity "attributevalue" to the "attributeName" attribute of the current XMT-A Node element 400.

Create XMT-A Node Element for an mp4bifs ReusedNode Element.

In the case of an mp4bifs ReusedNode element 3080, a nodeRef value 3090 is a required attribute. The following steps are performed for each mp4bifs ReusedNode element 3080:

1. Assign the value of the nodeRef attribute 3090 to the integer quantity "nodeId".
2. Assign the value of entry "nodeId" in the array pNodeNumbers to the integer quantity "nodeNumber".
3. Assign the value of entry "nodeNumber" in a table of node names defined in the MPEG-4 Specifications to the string quantity "nodeName".
4. Create a new XMT-A node element 400 of type "nodeName" and append it to the current XMT-A parent element.
5. Assign the value of the quantity nodeId to the "USE" attribute of the new XMT-A node element 400.

The foregoing description of the invention has been presented for purposes of illustration and description. It is not intended to be exhaustive or to limit the invention to the precise form disclosed, and other modifications and variations may be possible in light of the above teachings. For example, the precise definition of XMT-A files may change or evolve with time. Likewise, the precise definition of the MPEG-4 Intermedia Format may change or evolve with time. The invention described here is not limited to the particular definition specified in the document(s) cited above. Thus, the principles of this invention may also apply to other unrelated data structures. Other extended forms of the SFNode data structure are also defined in the MPEG-4 Systems specifications. Means of extending this invention as described in the following embodiment to cover such cases will be apparent to those skilled in the art. Thus, the embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A method for converting an MPEG-4 (mp4) binary file into an Extensible MPEG-4 Textual (XMT-A) file, the method comprising:
    generating at least one intermediary structured document representing the mp4 binary file;
    translating the at least one intermediary structured document into an XMT structured document; and
    creating the XMT-A file based on the XMT structured document.

2. The method of claim 1, wherein the intermediary structured document includes data structures representing a moov atom and one or more mdat atoms, the moov atom including an iods atom and one or more trak atoms.

3. The method of claim 2, further comprising generating external media files based on the data structures representing the mdat atoms and trak atoms.

4. The method of claim 1, wherein translating the intermediary structured document includes generating an mp4-file structured document.

5. The method of claim 4, wherein the mp4-file structured document is based on eXtemsible Markup Language.

6. The method of claim 4, wherein the mp4-file structured document includes a moov structured element and one or more mdat structured elements, the moov structured element representing the moov atom and each mdat structured element representing one of the mdat atoms represented by the intermediary structured document.

7. The method of claim 6, wherein the moov structured element includes an iods element and one or more trak elements representing corresponding portions of the intermediary structured document.

8. The method of claim 7, further comprising:
    generating a mp4-bifs structured document representing a scene description stream; and
    wherein the mp4-bifs structured document is a distinct document separate from the mp4-file structured document.

9. The method of claim 4, wherein the mp4-file structured document includes elements representing an object descriptor stream.

10. The method of claim 4, wherein the mp4-file structured document includes elements representing a scene description stream.

11. The method of claim 1, wherein generating the intermediary structured document includes:
    generating at set of data structures representing the mp4 binary file; and
    translating the set of data structures into the intermediary structured document.

12. The method of claim 1, wherein translating the intermediary structured document includes generating an mp4-bifs structured document representing a scene description stream.

13. A system for converting an MPEG-4 (mp4) binary file into an Extensible MPEG-4 Textual (XMT-A) file, the system comprising:
    a binary file decoder configured to input the mp4 binary file and to generate at least one intermediary structured document representing the mp4 binary file;
    a translator configured to input the intermediary structured document and generate an XMT structured document; and
    an XMT serializer configured to input the XMT structured document and generate the XMT-A file.

14. The system of claim 13, wherein the least one intermediary structured document includes data structures representing a moov atom and one or more mdat atoms.

15. The system of claim 14, wherein the data structure representing a moov atom includes data structures representing an iods atom and one or more trak atoms.

16. The system of claim 15, further comprising one or more external media files based on the data structures representing the mdat atoms and trak atoms.

17. The system of claim 14, wherein the at least one intermediary structured document includes an mp4-file structured document, the mp4-file structured document including one or more mdat elements, a moov element, and an iods element based on the set of data structures.

18. The system of claim 17, wherein the mp4-file structured document represents an object descriptor stream.

19. The system of claim 17, further including an mp4-bifs structured document representing a scene description stream.

20. The system of claim 19, wherein the mp4-bifs structured document is a distinct structured document separate from the mp4-file structured document.

21. A computer program product embodied in a tangible media comprising:
    computer readable program codes coupled to the tangible media for converting an MPEG-4 (mp4) binary file into an Extensible MPEG-4 Textual (XMT-A) file, the computer readable program codes configured to cause the program to:

generate a least one intermediary structured document representing the mp4 binary file;

translate the intermediate structured document into an XMT structured document; and create the XMT-A file based on the XMT structured document.

22. The computer program product of claim 21, wherein the least one intermediary structured document includes data structures representing a moov atom and one or more mdat atoms, the moov atom including one or more trak atoms.

23. The computer program product of claim 22, wherein the computer readable program code is further configured to generate external media files based on the data structures representing the mdat atoms and the trak atoms.

24. The computer program product of claim 21, wherein the least one intermediary structured document includes an mp4-file structured document.

25. The computer program product of claim 24, wherein the mp4-file structured document includes one or more mdat elements, a moov element, and an lads element based on the least one intermediary structured document.

26. The computer program product of claim 25, wherein the mp4-file structured document represents an object descriptor stream.

27. The computer program product of claim 25, wherein the mp4-file structured document represents a scene description stream.

28. The computer program product of claim 21, wherein the least one intermediary structured document includes an mp4-bifs structured document representing a scene description stream.

29. The computer program product of claim 28, wherein the mp4-bifs structured document is a distinct document separate from the mp4-file structured document.

30. The computer program product of claim 21, wherein the computer readable program code is further configured to:

generate a set of data structures representing the mp4 binary file; and translate the set of data structures into the least one intermediary structured document.

* * * * *